US012656137B2

(12) United States Patent　　　　(10) Patent No.:　US 12,656,137 B2

Aviv et al.　　　　　　　　　　　　　(45) Date of Patent:　Jun. 16, 2026

(54) METHOD AND APPARATUS FOR PLANNING AN ELECTRIC CAR TRIP

(71) Applicant: MAKE MY DAY LTD., Herzliya Pituach (IL)

(72) Inventors: Cnaan Aviv, Herzliya Pituach (IL); Nisan Katz, Yaaf (IL)

(73) Assignee: MAKE MY DAY LTD., Herzliya Pituach (IL)

( * ) Notice: Subject to any disclaimer, the term of this patent is extended or adjusted under 35 U.S.C. 154(b) by 108 days.

(21) Appl. No.: 18/759,922

(22) Filed: Jun. 30, 2024

(65) Prior Publication Data

US 2024/0361137 A1　　Oct. 31, 2024

Related U.S. Application Data

(63) Continuation of application No. PCT/IL2023/050626, filed on Jun. 15, 2023.

(Continued)

(51) Int. Cl.
*G01C 21/34*　　　(2006.01)
*G06Q 10/047*　　(2023.01)

(52) U.S. Cl.
CPC ....... *G01C 21/3469* (2013.01); *G06Q 10/047* (2013.01)

(58) Field of Classification Search
CPC ......................... G01C 21/3469; G06Q 10/047
See application file for complete search history.

(56) References Cited

U.S. PATENT DOCUMENTS 5,832,218 A　　11/1998　Gibbs et al.
6,081,832 A　　6/2000　Gilchrist et al.
(Continued)

FOREIGN PATENT DOCUMENTS

CN　　　107525513 A　　12/2017
EP　　　2551639　　　1/2013
(Continued)

OTHER PUBLICATIONS

International Search Report of PCT/IL2023/050626 dated Dec. 20, 2023.
(Continued)

*Primary Examiner* — Aryan E Weisenfeld
(74) *Attorney, Agent, or Firm* — May Patents Ltd.

(57)　　　　　ABSTRACT

A method for planning an optimal geographical route by an electric car from origin to destination locations, using an objective of minimizing estimated time, minimizing distance to travel, or minimizing charging price, while arriving at all user-defined multiple locations along the route. The method uses time or trip sensitive data and non-time/trip sensitive data, the data include environmental factors (such as roads map, charging stations location, and weather), car related factors, and driver or user factors. The optimal route planning may be based on Bayesian network or optimization, such as by using a Travelling Salesman Problem (TSP), a Linear Programming (LP) problem, using unsupervised clustering such as K-Means clustering or algorithm, or using casual inference methodology or process that is based on Bayesian inference or Frequentist statistical inference. Any data item used may be obtained from a database, a server, or from a local or remote sensor.

34 Claims, 35 Drawing Sheets

Related U.S. Application Data

(60) Provisional application No. 63/390,378, filed on Jul. 19, 2022.

(56) References Cited

U.S. PATENT DOCUMENTS

| | | | |
|---|---|---|---|
| 6,236,652 | B1 | 5/2001 | Preston et al. |
| 6,484,092 | B2 | 11/2002 | Seibel |
| 6,546,119 | B2 | 4/2003 | Ciolli et al. |
| 6,694,316 | B1 | 2/2004 | Langseth et al. |
| 6,931,309 | B2 | 8/2005 | Phelan et al. |
| 6,983,203 | B1 | 1/2006 | Wako |
| 7,082,365 | B2 | 7/2006 | Sheha et al. |
| 7,136,482 | B2 | 11/2006 | Wille |
| 7,136,901 | B2 | 11/2006 | Chung et al. |
| 7,239,960 | B2 | 7/2007 | Yokota et al. |
| 7,330,786 | B2 | 2/2008 | Odinak et al. |
| 7,334,001 | B2 | 2/2008 | Eichstaedt et al. |
| 7,421,334 | B2 | 9/2008 | Dahlgren et al. |
| 7,557,689 | B2 | 7/2009 | Seddigh et al. |
| 7,653,573 | B2 | 1/2010 | Hayes, Jr. et al. |
| 7,761,350 | B1 | 7/2010 | Ridgeway |
| 7,778,773 | B2 | 8/2010 | Yaqub et al. |
| 7,818,383 | B2 | 10/2010 | Kodama |
| 7,889,101 | B2 | 2/2011 | Yokota |
| 7,929,535 | B2 | 4/2011 | Chen et al. |
| 7,932,857 | B2 | 4/2011 | Ingman et al. |
| 8,451,114 | B2 | 5/2013 | Gold |
| 8,467,959 | B2 | 6/2013 | Nesbitt et al. |
| 8,560,227 | B2 | 10/2013 | Feng |
| 8,600,831 | B2 | 12/2013 | Xiao et al. |
| 8,762,059 | B1 | 6/2014 | Balogh |
| 8,909,463 | B2 | 12/2014 | Chapman et al. |
| 9,031,788 | B2 | 5/2015 | Balogh |
| 9,043,148 | B2 | 5/2015 | Bourque et al. |
| 9,390,062 | B1 | 7/2016 | Ashton et al. |
| 9,395,233 | B2 | 7/2016 | Dourra et al. |
| 9,535,602 | B2 | 1/2017 | Gutentag et al. |
| 9,726,510 | B2 | 8/2017 | Peri et al. |
| 10,351,181 | B2 | 7/2019 | Mckillen et al. |
| 2003/0065442 | A1 | 4/2003 | Touney |
| 2003/0084011 | A1 | 5/2003 | Shetty |
| 2003/0189499 | A1 | 10/2003 | Stricklin et al. |
| 2004/0252193 | A1 | 12/2004 | Higgins |
| 2005/0018645 | A1 | 1/2005 | Mustonen et al. |
| 2005/0122235 | A1 | 6/2005 | Teffer et al. |
| 2006/0129314 | A1 | 6/2006 | Gi Ryoong |
| 2006/0287807 | A1 | 12/2006 | Teffer |
| 2007/0198144 | A1 | 8/2007 | Norris et al. |
| 2007/0214095 | A1 | 9/2007 | Adams et al. |
| 2008/0258913 | A1 | 10/2008 | Busey |
| 2009/0024759 | A1 | 1/2009 | McKibben et al. |
| 2009/0171529 | A1 | 7/2009 | Hayatoma |
| 2010/0106514 | A1 | 4/2010 | Cox |
| 2010/0210315 | A1 | 8/2010 | Miyake |
| 2010/0256846 | A1 | 10/2010 | Shaffer |
| 2010/0280737 | A1 | 11/2010 | Ewert et al. |
| 2011/0022380 | A1 | 1/2011 | Zaslavskiy et al. |
| 2011/0145025 | A1 | 6/2011 | Jiang et al. |
| 2011/0313603 | A1 | 12/2011 | Laberteaux et al. |
| 2012/0179315 | A1 | 7/2012 | Tate, Jr. et al. |
| 2012/0210315 | A1 | 8/2012 | Kapadekar et al. |
| 2012/0242687 | A1 | 9/2012 | Choi |
| 2012/0278507 | A1 | 11/2012 | Menon et al. |
| 2012/0330494 | A1 | 12/2012 | Hendrix et al. |
| 2013/0024060 | A1 | 1/2013 | Sukkarié et al. |
| 2013/0106750 | A1 | 5/2013 | Kurosawa |
| 2013/0179007 | A1 | 7/2013 | Dalum |
| 2013/0201316 | A1 | 8/2013 | Binder et al. |
| 2013/0298052 | A1 | 11/2013 | Nara et al. |
| 2014/0070613 | A1 | 3/2014 | Garb et al. |
| 2014/0159877 | A1 | 6/2014 | Huang |
| 2014/0225564 | A1 | 8/2014 | Cheung et al. |
| 2014/0279707 | A1 | 9/2014 | Joshua et al. |
| 2015/0046582 | A1 | 2/2015 | Gelvin et al. |
| 2015/0158397 | A1 | 6/2015 | Soto et al. |
| 2015/0378598 | A1 | 12/2015 | Takeshi |
| 2016/0127693 | A1 | 5/2016 | Chung |
| 2016/0332527 | A1 | 11/2016 | North et al. |
| 2017/0030728 | A1 | 2/2017 | Baglino et al. |
| 2018/0045526 | A1 | 2/2018 | Trancik et al. |
| 2018/0086223 | A1 | 3/2018 | Lindemann et al. |
| 2018/0188332 | A1 | 7/2018 | Newman et al. |
| 2018/0201148 | A1 | 7/2018 | Donnelly et al. |
| 2019/0118655 | A1 | 4/2019 | Grimes et al. |
| 2019/0195650 | A1 | 6/2019 | Matthews et al. |
| 2019/0316924 | A1 | 10/2019 | Morgan-Brown |
| 2020/0139842 | A1 | 5/2020 | Logvinov et al. |
| 2020/0158526 | A1* | 5/2020 | Mckenna ........... G01C 21/3415 |
| 2020/0269717 | A1 | 8/2020 | Gaertner et al. |
| 2020/0294401 | A1 | 9/2020 | Kerecsen |
| 2020/0369175 | A1 | 11/2020 | Rajabally et al. |
| 2020/0393259 | A1 | 12/2020 | Gantt et al. |
| 2021/0086647 | A1 | 3/2021 | Kiessling et al. |
| 2021/0094435 | A1 | 4/2021 | Rechkemmer et al. |
| 2021/0231450 | A1* | 7/2021 | Pedersen .............. G05D 1/0285 |
| 2021/0331603 | A1 | 10/2021 | Brombach et al. |
| 2021/0356279 | A1 | 11/2021 | Szigeti |
| 2021/0382501 | A1 | 12/2021 | Cheung et al. |
| 2021/0387546 | A1 | 12/2021 | Grubwinkler |
| 2022/0009372 | A1 | 1/2022 | Bhargava et al. |
| 2022/0118875 | A1 | 4/2022 | Astorg et al. |
| 2022/0138532 | A1 | 5/2022 | Dalli et al. |
| 2022/0173594 | A1 | 6/2022 | Brombach |
| 2022/0185135 | A1 | 6/2022 | Langton et al. |
| 2022/0228877 | A1 | 7/2022 | Feldman et al. |
| 2022/0348105 | A1 | 11/2022 | Sujan et al. |
| 2022/0363140 | A1 | 11/2022 | Dayal et al. |
| 2022/0410750 | A1 | 12/2022 | Mangal et al. |

FOREIGN PATENT DOCUMENTS

| | | |
|---|---|---|
| IN | 2022/41047393 | 9/2022 |
| WO | 2009149704 A1 | 12/2009 |
| WO | 2021/069597 A1 | 4/2021 |
| WO | 2022087716 A1 | 5/2022 |
| WO | 2022214849 A1 | 10/2022 |
| WO | 2022218700 A1 | 10/2022 |

OTHER PUBLICATIONS

Xueyuan Song of the State University of New Jersey entitled: "On my Way: System for Optimizing Driving Routes for Crowdsourcing Applications", published May 2014 (6 pages).

Robin Henniges, "Current approaches of Wifi Positioning", U-Berlin, 2012 as part of Service-Centric Networking—Seminar WS2011/2012 (8 pages).

Balaram Singh, Soumya Pallai, and Susil Kumar, "A Survey of Cellular Positioning Techniques in GSM Networks", Sep. 2012 (7 pages).

Andreas Haeberlen, Eliot Flannery, Andrew M. Ladd, Algis Rudys, Dan S. Wallach, and Lydia E. Kavraki, "Practical Robust Localization over Large-Scale 802.11 Wireless Networks", published by ACM 2004 in MobiCom'04, Sep. 26-Oct. 1, 2004, Philadelphia, Pennsylvania, USA [1-58113-868-7/04/0009 . . . $5.00] (15 pages).

Shu Wang, Jungwon Min and Byung K. Yi, "Technologies and Standards", in the IEEE International Conference on Communication (ICC) 2008, Beijing, China (123 pages).

Balaram Singh, Santosh Kumar Sahoo, and Soumya Ranjan Pradhan, "Analysis of Cellular Positioning Techniques in UMTS Networks", published Jan. 2014 in the Journal of Telecommunication, Switching Systems and Networks vol. 1, Issue 1 (11 pages).

2005 Pontiac Grand Prix Navigation Manual, published 2004 by General Motors Corporation [Part No. 10382568 A First Edition] (82 pages).

A guide entitled: "Wi-Fi Location-Based Services 4.1 Design Guide", published May 20, 2008 by Cisco Systems, Inc. (headquartered in 170 West Tasman Drive San Jose, CA 95134-1706 USA) [Text Part No. OL-11612-01] (206 pages).

Google article, "A good day for salesmen that travel on bicycles", published Mar. 10, 2010 (5 pages).

(56)          References Cited

OTHER PUBLICATIONS

A guide entitled: "Twitter for Small Business—A Guide to Get Started", (retrieved Oct. 2015 from https://g.twimg.com/business/pdfs/Twitter_Smallbiz_Guide.pdf) by Twitter, Inc. (22 pages).

Owner's Guide Supplement (Document No. BA5J 19A285 AB) entitled: "2011 Centerstack (ng1) Supplement, 2nd Printing USA (fus)", by Ford Motor Company, Apr. 2010 (203 pages).

Jean-Marie_Zogg, "GPS Basics—Introduction to the system—Application overview" dated Mar. 26, 2002) published by u-blox AG (of CH-8800 Thalwil, Switzerland) [Doc Id GPS-X-02007] (94 pages).

El-Rabbany, Ahmed, "Introduction to GPS: the Global Positioning System", published 2002 by Artech House, Inc. [ISBN 1-58053-183-1] (194 pages).

Maestro ™ 4200 by Magellan® described in a User Manual Published 2007 [Document No. 604-0046-001 A] (60 pages).

Nuvi 2707/2708 Series by Garmin described in an Owner Manual dated Mar. 2013 [Document No. 190-01589-00_0A] (22 pages).

3GPP Technical Specification 3GPP TS 22.011 (v143.0.0, Sep. 2015) entitled: "3rd Generation Partnership Project; Technical Specification Group Services and System Aspects; Service accessibility (Release 14)" (28 pages).

3GPP technical specification 3GPP TS 23.140 V6.16.0 (Mar. 2009) entitled: "3rd Generation Partnership Project; Technical Specification Group Core Network and Terminals; Multimedia Messaging Service (MMS); Functional description; Stage 2 (Release 6)" (223 pages).

Mobile HCI 2013—Collaboration and Communication by Karen Church and Rodrigo de Oliveira (both of Telefonica Research) entitled: "What's up with WhatsApp? Comparing Mobile Instant—Messaging Behaviors with Traditional SMS", published (Aug. 30, 2013) (10 pages).

RFC 5598 entitled: "Internet Mail Architecture", Jul. 2009 (40 pages).

IETF RFC 5321 entitled: "Simple Mail Transfer Protocol", Oct. 2008 (95 pages).

RFC 7504 entitled: "SMTP 521 and 556 Reply Codes", Jun. 2015 (7 pages).

Craig Partridge of BBN Technologies entitled: "The technical Development of Internet Mail", 2008 (27 pages).

'Pocket Consultant' book [ISBN: 978-0-7356-8168-2] published 2013 by Microsoft Press and entitled: "Microsoft Exchange Server 2013—Configuration & Clients" (384 pages).

RFC 1939 entitled: "Post Office Protocol", May 1996 (23 pages).

RFC 2449 entitled: "POP3 Extension Mechanism", Nov. 1998 (19 pages).

RFC 1734 entitled: "POP3 AUTHentication command", Dec. 1994 (5 pages).

RFC 3501 entitled: "Internet Message Access Protocol—Version 4rev1", Mar. 2003 (108 pages).

IETF RFC 4314 entitled: "IMAP4 Access Control List (ACL) Extension", Dec. 2005 (27 pages).

RFC 6914 entitled: "Simple Made Simple: An Overview of the IETF Specifications for Instant Messaging and Presence Using the Session Initiation Protocol (SIP)", Apr. 2013 (15 pages).

Telemark University College entitled "Introduction to Database Systems", authored by Hans-Petter Halvorsen (dated Mar. 3, 2014) (40 pages).

"Oracle / SQL Tutorial" by Michael Gertz of the University of California, Jan. 2000 (66 pages).

Kristina Chodorow and Michael Dirolf, entitled: "MongoDB: The Definitive Guide", Sep. 2010 (First Edition) by O'Reilly Media, Inc. [ISBN: 978-1-449-38156-1] (216 pages).

Manual "80186/80188 High-Integration 16-Bit Microprocessors" by Intel Corporation, Nov. 1994 (34 pages).

The manual "MC68360 Quad Integrated Communications Controller—User's Manual" by Motorola, Inc., (962 pages).

Data sheet published 2015 by Texas Instruments Incorporated [DS-TM4C123GH6PM-15842.2741, SPMS376E, Revision 15842.

2741 Jun. 2014], entitled: "Tiva™ TM4C123GH6PM Microcontroller—Data Sheet", Jun. 12, 2014 (1409 pages).

Lukman Medriavin Silalahi, Mudrik Alaydrus, Agus Dendi Rochendi, and Muhtar Muhtar, "Design of Tire Pressure Monitoring System Using a Pressure Sensor Base", Feb. 2019: 70-78, Sinergi vol. 23, No. 1, [http://doi.org/10.22441/sinergi.2019.1.010] (9 pages).

Abbas Fotouhi, Neda Shateri, Dina Shona Laila, and Daniel J. Auger, "Electric vehicle energy consumption estimation for a fleet management system", Oct. 30, 2019 in International Journal of Sustainable Transportation, 15:1, 40-54 [DOI: 10.1080/15568318.2019.1681565] (16 pages).

Judea Pearl, "The Seven Tools of Causal Inference, with Reflections on Machine Learning", Feb. 21, 2019 in Communications of the ACM vol. 62 Issue 3 pp. 54-60 [https://doi.org/10.1145/3241036] (7 pages).

Michal Horný, "Technical Report No. 5 Bayesian Networks", Apr. 18, 2014 by Boston University School of public health (17 pages).

Junjie Hu, Hugo Morais, Tiago Sousa, and Morten Lind, "Electric vehicle fleet management in smart grids: a review of services, optimization and control aspects", Apr. 2016 in Renewable and Sustainable Energy Reviews 56:1207-1226 [DOI:10.1016/j.rser.2015.12.014] (20 pages).

Laura Eboli, Gabriella Mazzulla, and Giuseppe Pungillo, "How drivers' characteristics can affect driving style", ublished by Elsevier B.V, presented in the 20th EURO Working Group on Transportation Meeting, EWGT 2017 [Sep. 4-6, 2017, Budapest, Hungary] (8 pages).

Marta V. Fariaa, Patrícia C. Baptistab, and Tiago L. Fariasa, "Identifying driving behavior patterns and their impacts on fuel", published by Elsevier B.V, presented in the 20th EURO Working Group on Transportation Meeting, EWGT 2017 [Sep. 4-6, 2017, Budapest, Hungary] (8 pages).

Ning Zhou Xu, Ka Wing Chan, Chi Yung Chung, and Ming Niu, "Enhancing Adequacy of Isolated Systems With Electric Vehicle-Based Emergency Strategy" published in IEEE Transactions on Intelligent Transportation Systems ( vol. 21, Issue: 8, Aug. 2020) [DOI: 10.1109/TITS.2019.2929767] (7 pages).

YanPing Zhao and XiaoLai Zhou, "K-means Clustering Algorithm and its Improvement Research", Apr. 2021 in Journal of Physics Conference Series 1873(1):012074 [DOI:10.1088/1742-6596/1873/1/012074] (6 pages).

Roman Garnett, "Bayesian Optimization", published 2023 by Cambridge University Press [DOI: 10.1017/9781108348973; ISBN 978-1-108-42578-0] (376 pages).

Miguel A. Hernán and James M. Robins, "Causal Inference: What If", published Oct. 1, 2019 by Boca Raton: Chapman & Hall/CRC, (310 pages).

Mehrdad Ehsani; Yimin Gao; Stefano Longo; and Kambiz M. Ebrahimi and entitled: "Modern Electric, Hybrid Electric, and Fuel Cell Vehicles Third Edition" [ISBN—13: 978-1-4987-6177-2], published 2018 by Taylor & Francis Group, LLC, (573 pages).

Amogha Abbi and T. Ramakrishnaiah, "Tyre Pressure Monitoring System" by published 2021 by IOP Publishing in ICMLSC 2020 IOP Conf. Series: Materials Science and Engineering 1042 (2021) 012024 [doi:10.1088/1757-899X/1042/1/012024] (8 pages).

Quan Xin, Gong Jingfeng, Guan Junjie, Bai ri, You Mingxing, and Zou Pian, "Automobile tire pressure monitoring technology and development trend", published 2019 by IOP Publishing in IOP Conf. Series: Journal of Physics: Conf. Series 1314 (2019) 012100 [doi:10.1088/1742-6596/1314/1/012100] (8 pages).

American Majority organization (retrieved Oct. 2015 from http://cmrw.org/) entitled: "facebook—A Beginner's Guide", (28 pages).

John G. Hayes and G. Abas Goodarzi, entitled: "Energy Systems, Power Electronics and Drives for Hybrid, Electric and Fuel Cell Vehicles" [ISBN—9781119063667], published 2018 by John Wiley & Sons Ltd, (557 pages).

Ingrid C.M. Flinsenberg of the Eindhoven University, "Route Planning Algorithms for Car Navigation" by published 2004 [ISBN: 90-386-0902-7] (277 pages).

Handbook entitled: "Alternate Route Handbook", Report No. FHWA-HOP-06-092 published May 2006 by Federal Highway Administration (89 pages).

(56) References Cited

OTHER PUBLICATIONS

T.S. Ferguson, "Linear Programming, A Concise Introduction" (66 pages).

Tim van Lokven , "Review and Comparison of Instant Messaging Protocols", Jan. 23, 2011 (52 pages).

Corinne Brucato, "The Traveling Salesman Problem" by published 2013 by the University of Pittsburgh (57 pages).

David S. Johnson and Lyle A. McGeoch, "The Traveling Salesman Problem: A Case Study in Local Optimization" by published Nov. 20, 1995 (103 pages).

W. Wen & S. W. Hsu, LungHwa, "A route navigation system with a new revised shortest path routing algorithm and its performance evaluation", published 2005 in WTT Transaction on The Built Environment, vol. 77 [ISSN 1743-3509] (11 pages).

Dalip and Vijay Kumar, both from MMEC, Maharishi Markandeshwar University, Ambala, India entitled: "Optimum Route Selection for Vehicle Navigation", published in (IJACSA) International Journal of Advanced Computer Science and Applications, vol. 7, No. 2, 2016 (7 pages).

Joaquín Perez Ortega, Nelva Nely Almanza-Ortega, Andrea Vega-Villalobos, and Rodolfo Pazos-Rangel, "The K- Means Algorithm Evolution", Apr. 2019 [DOI: 10.5772/intechopen.85447] (23 pages).

Zhiyong Wang and Sisi Zlatanova, both of Delft University of Technology, Delft, The Netherlands, "An A*-Based Search Approach for Navigation Among Moving Obstacles", published 2013 by Springer—Verlag Berlin Heidelberg [ISBN: 978-3-642-33217-3] (15 pages).

Standard Microsystems Corporation (SMSC) data-sheet "LAN91C111 10/100 Non-PCI Ethernet Single Chip MAC + PHY" Data-Sheet, Rev. 15 (Feb. 20, 04) (127 pages).

Cisco Systems, Inc. publication No. 1-587005-001-3 (Jun. 1999), "Internetworking Technologies Handbook", Chapter 7: "Ethernet Technologies", pp. 7-1 to 7-38 (38 pages).

"Android Tutorial", downloaded from tutorialspoint.com on Jul. 2014 (216 pages).

"iOS Tutorial", downloaded from tutorialspoint.com on Jul. 2014 (185 pages).

Muhammad Ayoub Kamal, Hafiz Wahab Raza, Muhammad Mansoor Alam, and Mazliham Mohd Su'ud, "Highlight the Features of AWS, GCP and Microsoft Azure that Have an Impact when Choosing a Cloud Service Provider", 'International Journal of Recent Technology and Engineering (IJRTE)' ISSN: 2277-3878, vol. 8, Jan. 2020 (10 pages).

Microsoft publication entitled: "Inside-Out Windows Server 2012", by William R. Stanek, published 2013 by Microsoft Press (1,500 pages).

"UNIX Tutorial" by tutorialspoint.com, downloaded on Jul. 2014 (152 pages).

"Windows Internals—Part 1" by Mark Russinovich, David A. Solomon, and Alex loescu, published by Microsoft Press in 2012 (752 pages).

"Windows Internals—Part 2", by Mark Russinovich, David A. Solomon, and Alex loescu, published by Microsoft Press in 2012 (672 pages).

Jerry Honeycutt, "Introducing Windows 8—An Overview for IT Professionals" Microsoft Press 2012 (168 pages).

Samsung Electronics Co., Ltd. presentation entitled: "Google™ Chrome OS User Guide" published 2011 (41 pages).

Application Note No. RES05B00008-0100/Rec. 1.00 by Renesas Technology Corp. entitled: "R8C Family—General RTOS Concepts", published Jan. 2010 (20 pages).

Walter Cedeno et al, "An Overview of Real-Time Operating Systems", The Association for Laboratory Automation, Feb. 2007 (6 pages).

Dac-Nhuong Le et al, "Cloud Computing and Virtualization", published 2018 by John Wiley & Sons, Inc. [ISBN 978-1-119-48790-6] (223 pages).

Chapter 2 entitled: "Basic Concepts of Real Time Operating Systems" of a book entitled: "Hardware-Dependent Software—

Principles and Practice", published 2009 [ISBN—978-1-4020-9435-4] by Springer Science + Business Media B.V. (304 pages).

Nicolas Melot, "Study of an operating system: FreeRTOS—Operating systems for embedded devices", (downloaded Jul. 2015) (39 pages).

Dr. Richard Wall entitled: "Carebot PIC32 MX7ck implementation of Free RTOS", (dated Sep. 23, 2013) (18 pages).

"FreeRTOS™ Modules" published in the www,freertos.org website dated Nov. 26, 2006 (112 pages).

Rich Goyette of Carleton University as part of 'SYSC5701: Operating System Methods for Real-Time Applications', entitled: "An Analysis and Description of the Inner Workings of the FreeRTOS Kernel", published Apr. 1, 2007 (46 pages).

SAE J3016, entitled: "Taxonomy and Definitions for Terms Related to On-Road Motor Vehicle Automated Driving Systems" [Revised Sep. 2016] (35 pages).

Book published by Robert Bosch GmbH, "Bosch Automotive Electric and Automotive Electronics", (5th Edition, Jul. 2007) (530 pages).

Meiyuan Zhao of Security & Privacy Research, Intel Labs, "Advanced Driver Assistant System—Threats, Requirements, Security Solutions", Intel Corporation 2015 Technical White Paper (0115/MW/HBD/PDF 331817-001US) (36 pages).

PhD Thesis by Alexandre Dugarry entitled: "Advanced Driver Assistance Systems—Information Management and Presentation", Jun. 2004 (124 pages).

200v2.0.3-D2.2-ADASIS_v2_Specification.0 entitled: "ADASIS v2 Protocol—Version 2.0.3.0", dated Dec. 2013 (182 pages).

User Manual UK English ver. 1.0 entitled: "User Manual—iGO Navigation app—Navigation software for the iGO Navigation app", dated Aug. 2016 (98 pages).

Isaac Skog and Peter Handel, "In-car positioning and navigation technologies—a survey", Published in IEEE Transactions on Intelligent Transportation Systems (vol. 10, Issue: 1, Mar. 2009) (18 pages).

Vineet P. Aras of the Department of Electrical Engineering, Indian Institute of Technology Bombay, "Design of Electronic Control Unit (ECU) for Automobiles—Electronic Engine Management system", dated Jul. 2004 (51 pages).

National Instruments paper, "ECU Designing and Testing using National Instruments Products", published Nov. 7, 2009 (9 pages).

Brochure by Sensor-Technik Wiedemann Gmbh entitled "Control System Electronics", dated Mar. 4, 2011 GB (20 pages).

Data Sheet Document No. MPC5748G Rev. 2 entitled: "MPC5748 Microcontroller Datasheet", Freescale Semiconductor, Inc. (headquartered in Tokyo, Japan) May 2014 (67 pages).

EBook authored by Gustavo Alessandro Andrade Santana, "Data Center Virtualization Fundamentals", published 2014 by Cisco Systems, Inc. (Cisco Press) [ISBN-13: 978-1-58714-324-3] (1406 pages).

IBM RedBook entitled: "IBM PowerVM Virtualization—Introduction and Configuration" published by IBM Corporation Jun. 2013 (790 pages).

IBM Corporation, "Power Systems—Introduction to virtualization", published 2009 (54 pages).

Chapter 20: "Wireless Technologies" of the publication No. 1-587005-001-3 by Cisco Systems, Inc. (7/99) "Internetworking Technologies Handbook" (42 pages).

Telecom Regulatory Authority, entitled: "WiFi Technology", Jul. 2003 (60 pages).

Book published 2005 by Pearson Education, Inc. William Stallings [ISBN: 0-13-191835-4] "Wireless Communications and Networks—second Edition" (569 pages).

Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi: 10.3390/s120211734] (20 pages).

Bluetooth SIG standard Covered Core Package version: 4.2, entitled: "Master Table of Contents & Compliance Requirements—Specification vol. 0", published Dec. 2, 2014 (2,772 pages).

Yunxin (Jeff) Li, "An Overview of the DSRC/WAVE Technology", (Eveleigh, NSW 2015, Australia) downloaded from the Internet on Jul. 2017 (15 pages).

(56) References Cited

OTHER PUBLICATIONS

ARIB STD—T75 Version 1.0, "Dedicated Short-Range Communication System—ARIB Standard Version 1.0", published Sep. 2001 by Association of Radio Industries and Businesses Kasumigaseki, Chiyoda-ku, Tokyo 100-0013, Japan (469 pages).

Christopher Nowakowski, Paul Green and Omer Tsimhoni, "Common Automotive Navigation System Usability Problems and a Standard Test Protocol to Identify Them" [doi=10.1.1.458.1475] (downloaded from the Internet on Oct. 2017) (16 pages).

Society of Automotive Engineers, Inc. (SAE) standard J2365, "Calculation of the Time to Complete In-Vehicle Navigation and Route Guidance Tasks", (issued May 2002) (23 pages).

DocID022930 Rev. 6 dated Apr. 2015 entitled: "SPBT2632C1A—Bluetooth® technology class-1 module" (27 pages).

Hui Liu, Houshang Darabi, Pat Banerjee, and Jing Liu , "Survey of Wireless Indoor Positioning Techniques and Systems", published in IEEE Transactions on Systems, Man, and Cybernetics—Part C: Applications and Reviews, vol. 37, No. 6, Nov. 2007 [1094-6977/ $25.00 © 2007 IEEE (14 pages).

Sinan Gezici, "A Survey on Wireless Position Estimation", Published Oct. 2, 2007 by Springer Science+Business Media, LLC [Wireless Pers Commun (2008) 44:263-282, DOI 10.1007/s11277-007-9375-z] (21 pages).

Siddhesh Doiphode, J.W. Bakal, and Madhuri Gedam, "Survey of Indoor Positioning Measurements, Methods and Techniques", published in International Journal of Computer Applications (0975 - 8887) vol. 140—No. 7, Apr. 2016 (4 pages).

Santosh Pandey and Prathima Agrawal, "A Survey on Localization Techniques for Wireless Networks", published in the Journal of the Chinese Institute of Engineers, vol. 29, No. 7, pp. 1125-1148 (2006), (25 pages).

Information Systems Audit and Control Association (ISACA) 2011 white paper, "Geolocation: Risk, Issues and Strategies" (13 pages).

Yong Wang et al., "Towards Street-Level Client-Independent IP Geolocation", downloaded from the Internet on Jul. 2014 (14 pages).

U.S. Department of Defense (DoD) entitled: "Global Positioning System—Standard Positioning Service Performance Standard", 4th Edition, Sep. 2008 (160 pages).

* cited by examiner

| SAE level | Name | Narrative Definition | Execution of Steering and Acceleration/De celeration | Monitoring of Driving Environment | Fallback Performance of Dynamic Driving Task | System Capability (Driving Modes) |
|---|---|---|---|---|---|---|
| Human driver monitors the driving environment | | | | | | |
| 0 | No Automation | the full-time performance by the human driver of all aspects of the dynamic driving task, even when enhanced by warning or intervention systems | Human driver | Human driver | Human driver | n/a |
| 1 | Driver Assistance | the driving mode-specific execution by a driver assistance system of either steering or acceleration/deceleration using information about the driving environment and with the expectation that the human driver perform all remaining aspects of the dynamic driving task | Human driver and system | Human driver | Human driver | Some driving modes |
| 2 | Partial Automation | the driving mode-specific execution by one or more driver assistance systems of both steering or acceleration/deceleration using information about the driving environment and with the expectation that the human driver perform all remaining aspects of the dynamic driving task | System | Human driver | Human driver | Some driving modes |
| Automated driving system ("system") monitors the driving environment | | | | | | |
| 3 | Conditional Automation | the driving mode-specific performance by an automated driving system of all the aspects of the dynamic driving task with the expectation that the human driver will respond appropriately to a request to intervene | System | System | Human driver | Some driving modes |
| 4 | High Automation | the driving mode-specific performance by an automated driving system of all the aspects of the dynamic driving task, even if a human driver does not respond appropriately to a request to intervene | System | System | System | Some driving modes |
| 5 | Full Automation | the full-time performance by an automated driving system of all the aspects of the dynamic driving task under all roadway and environmental conditions that can be managed by a human driver | System | System | System | All driving modes |

FIG. 2a (Prior Art) ⌐20a

| SAE J1772 (2017) levels | | | |
|---|---|---|---|
| Method | Maximum supply | | |
| | Current (A) | Voltage (V) | Power (kW) |
| AC Level 1 | 12 | 120 | 1.44 |
| AC Level 2 | 16 | 120 | 1.92 |
| DC Level 1 | 80 | 208–240 | 19.2 |
| DC Level 2 | 80 | 50–1000 | 80 |
| | 400 | 50–1000 | 400 |

40a

| IEC 61851-1 modes | | Maximum supply | | |
|---|---|---|---|---|
| Mode | Type | Current (A) | Voltage (V) | Power (kW) |
| 1 | 1Φ AC | 16 | 250 | 4 |
|   | 3Φ AC | 16 | 480 | 11 |
| 2 | 1Φ AC | 32 | 250 | 7.4 |
|   | 3Φ AC | 32 | 480 | 22 |
| 3 | 1Φ AC | 63 | 250 | 14.5 |
|   | 3Φ AC | 63 | 480 | 43.5 |
| 4 | DC | 200 | 400 | 80 |

50

100

| Environmental Factors | | |
| Time / Trip Sensitive | Non Time / Trip Sensitive | |
| Roads | - Condition<br>- Traffic | - Maps<br>- Emission Zone<br>- Speed limit<br>- Slope |
| Charging Stations | - Price<br>- Hours<br>- Availability | - Location |
| Weather | - Temperature<br>- Wind<br>- Humidity<br>- Precipitation | |

Figure 10A:
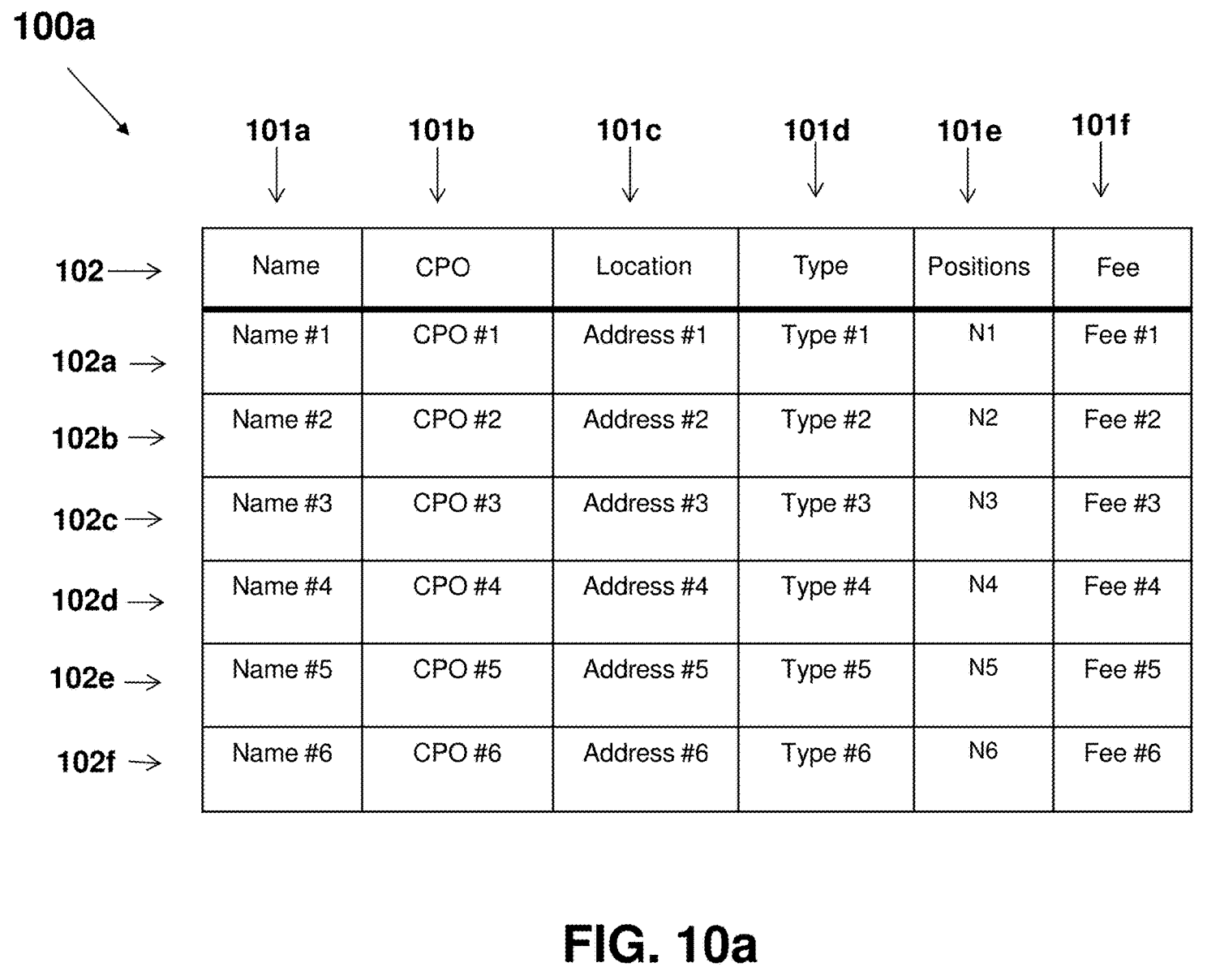

| Name | CPO | Location | Type | Positions | Fee |
|------|-----|----------|------|-----------|-----|
| Name #1 | CPO #1 | Address #1 | Type #1 | N1 | Fee #1 |
| Name #2 | CPO #2 | Address #2 | Type #2 | N2 | Fee #2 |
| Name #3 | CPO #3 | Address #3 | Type #3 | N3 | Fee #3 |
| Name #4 | CPO #4 | Address #4 | Type #4 | N4 | Fee #4 |
| Name #5 | CPO #5 | Address #5 | Type #5 | N5 | Fee #5 |
| Name #6 | CPO #6 | Address #6 | Type #6 | N6 | Fee #6 |

| Store Name | Address | Opening Hours |
|---|---|---|
| Store #1 | Address #1 | Address #1 |
| Store #2 | Address #2 | Address #2 |
| Store #3 | Address #3 | Address #3 |
| Store #4 | Address #4 | Address #4 |
| Store #5 | Address #5 | Address #5 |

Eli Cohen St 9-11,
Tel Aviv-Yafo, Israel

Start Point

14:32

50%

3:49 Driving hours

Add charging station

Eilat, Israel
Eilat, Israel

Destination

18:21

-132%

130d

Scatter Plot of Dataset With Clusters Identified Using Affinity Propagation

METHOD AND APPARATUS FOR PLANNING AN ELECTRIC CAR TRIP

RELATED APPLICATION

The present application is a continuation application of International Application PCT/IL2023/0505626, with an international filing date of Jun. 15, 2023, which claims priority from U.S. Provisional Application Ser. No. 63/390, 378 that was filed on Jul. 19, 2022, which are hereby incorporated herein by reference in their entirety.

TECHNICAL FIELD

This disclosure relates generally to an apparatus and method for optimal navigation route planning for an electric car, and in particular using environmental, car, and driver factors when planning the optimal route according to a defined objective.

BACKGROUND

Unless otherwise indicated herein, the materials described in this section are not prior art to the claims in this application and are not admitted to be prior art by inclusion in this section.

FIG. 1 shows a block diagram that illustrates a system 10 including a computer system 11, and an associated Internet 22 connection. Such configuration is typically used for computers (hosts) connected to the Internet 22 and executing a server, or a client (or a combination) software. The computer system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), any other handheld or fixed location computing devices, or a combination of any of these devices. Note that while FIG. 1 illustrates various components of the computer system 11, it is not intended to represent any particular architecture or manner of interconnecting the components.

Network computers, handheld computers, cell phones and other data processing systems that have fewer or more components, may also be used. For example, the computer system 11 of FIG. 1 may be an Apple Macintosh computer, a Power Book, or an IBM compatible PC. The computer system 11 may include a bus 13, an interconnect, or other communication mechanism for communicating information, and a processor 12, commonly in the form of an integrated circuit, coupled to the bus 13 for processing information, and for executing the computer executable instructions. The computer system 11 may also include a main memory 15a, such as a Random Access Memory (RAM), or other dynamic storage device, coupled to the bus 13 for storing information and instructions to be executed by the processor 12. The main memory 15a also may be used for storing temporary variables or other intermediate information during execution of instructions to be executed by the processor 12.

The computer system 11 further includes a Read Only Memory (ROM) 15b (or other non-volatile memory) or other static storage device coupled to the bus 13 for storing static information and instructions for the processor 12. A storage device 15c, that may be a magnetic disk or optical disk, such as a hard disk drive (HDD) for reading from and writing to a hard disk, a magnetic disk drive for reading from and writing to a magnetic disk, and/or an optical disk drive (such as DVD) for reading from and writing to a removable optical disk, is coupled to the bus 13 for storing information and instructions. The hard disk drive, magnetic disk drive, and optical disk drive may be connected to the system bus 13 by a hard disk drive interface, a magnetic disk drive interface, and an optical disk drive interface, respectively. The drives and their associated computer-readable media provide non-volatile storage of computer readable instructions, data structures, program modules and other data for the general-purpose computing devices.

Typically, the computer system 11 includes an Operating System (OS) stored in a non-volatile storage 15b for managing the computer resources and provides the applications and programs with access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display 17 may be connected via a video adapter for supporting the display. The display 17 allows a user to view, enter, and/or edit information that is relevant to the operation of the system 10. An input device 18, including alphanumeric and other keys, is coupled to the bus 13 for communicating information and command selections to the processor 12. Another type of user input device is a cursor control 18a, such as a mouse, a trackball, or cursor direction keys for communicating direction information and command selections to the processor 12 and for controlling cursor movement on the display 17. This cursor control 18a typically has two degrees of freedom in two axes, a first axis (e.g., x) and a second axis (e.g., y), that allows the device to specify positions in a plane.

The computer system 11 may be used for implementing the methods and techniques described herein. According to one embodiment, these methods and techniques are performed by the computer system 11 in response to the processor 12 executing one or more sequences of one or more instructions contained in the main memory 15a. Such instructions may be read into the main memory 15a from another computer-readable medium, such as the storage device 15c. Execution of the sequences of instructions contained in the main memory 15a causes the processor 12 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "processor" is used herein to include, but not limited to, any integrated circuit or any other electronic device (or collection of electronic devices) capable of performing an operation on at least one instruction, including, without limitation, a microprocessor (μP), a microcontroller (μC), a Digital Signal Processor (DSP), or any combination thereof. A processor, such as the processor 12, may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor 12 may be integrated onto a single substrate (e.g., silicon "die"), or distributed among two or more substrates. Furthermore, various functional aspects of the processor 12 may be implemented solely as a software (or firmware) associated with the processor 12.

A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in the form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD).

Various forms of computer-readable media may be involved in carrying one or more sequences of one or more instructions to the processor 12 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal, and appropriate circuitry may place the data on the bus 13. The bus 13 carries the data to the main memory 15a, from which the processor 12 retrieves and executes the instructions. The instructions received by the main memory 15a may optionally be stored on the storage device 15c either before or after execution by the processor 12.

The computer system 11 commonly includes a communication interface 9 coupled to the bus 13. The communication interface 9 provides a two-way data communication coupling to a network link 8 that is connected to a Local Area Network (LAN) 14. For example, the communication interface 9 may be an Integrated Services Digital Network (ISDN) card or a modem to provide a data communication connection to a corresponding type of telephone line. As another non-limiting example, the communication interface 9 may be a Local Area Network (LAN) card to provide a data communication connection to a compatible LAN. For example, Ethernet-based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002 as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "*Internetworking Technologies Handbook*", Chapter 7: "Ethernet Technologies", pages 7-1 to 7-38, which is incorporated in its entirety for all purposes as if fully set forth herein. In such a case, the communication interface 9 typically includes a LAN transceiver or a modem, such as a Standard Microsystems Corporation (SMSC) LAN91C111 10/100 Ethernet transceiver, described in the Standard Microsystems Corporation (SMSC) data-sheet "LAN91C111 10/100 Non-PCI Ethernet Single Chip MAC+PHY" Data-Sheet, Rev. 15 (Feb. 20, 2004), which is incorporated in its entirety for all purposes as if fully set forth herein.

An Internet Service Provider (ISP) 16 is an organization that provides services for accessing, using, or participating in the Internet 22. The Internet Service Provider 16 may be organized in various forms, such as commercial, community-owned, non-profit, or otherwise privately owned. Internet services, typically provided by ISPs, include Internet access, Internet transit, domain name registration, web hosting, and collocation. ISPs may engage in peering, where multiple ISPs interconnect at peering points or Internet exchange points (IXs), allowing routing of data between each network, without charging one another for the data transmitted-data that would otherwise have passed through a third upstream ISP, incurring charges from the upstream ISP. ISPs requiring no upstream and having only customers (end customers and/or peer ISPs) are referred to as Tier 1 ISPs.

An arrangement 10a of a computer system connected to the Internet 22 is shown in FIG. 1a. A computer system or a workstation 7 includes a main unit box 6 with an enclosed motherboard that has the processor 12 and the memories 15a, 15b, and 15c are mounted. The workstation 7 may include a keyboard 2 (corresponding to the input device 18), a printer 4, a computer mouse 3 (corresponding to the cursor control 18a), and a display 5 (corresponding to the display 17). FIG. 1a further illustrates various devices connected via the Internet 22, such as a client device #1 24, a client device #2 24a, a data server #1 23a, a data server #2 23b, and the workstation 7, connected to the Internet 22 over a LAN 14 and via the router or gateway 19 and the ISP 16.

The client device #1 24 and the client device #2 24a may communicate over the Internet 22 for exchanging or obtaining data from the data server #1 23a and the data server #2 23b. In one example, the servers are HTTP servers, sometimes known as web servers.

The term "computer-readable medium" (or "machine-readable medium") is used herein to include, but not limited to, any medium or any memory, that participates in providing instructions to a processor, (such as the processor 12) for execution, or any mechanism for storing or transmitting information in a form readable by a machine (e.g., a computer). Such a medium may store computer-executable instructions to be executed by a processing element and/or control logic and data, which is manipulated by a processing element and/or control logic, and may take many forms, including but not limited to, non-volatile medium, volatile medium, and transmission medium. Transmission media includes coaxial cables, copper wire, and fiber optics, including the wires that comprise the bus 13. Transmission media may also take the form of acoustic or light waves, such as those generated during radio-wave and infra-red data communications, or other form of propagating signals (e.g., carrier waves, infrared signals, digital signals, etc.). Common forms of computer-readable media include a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer may read.

Various forms of computer-readable media may be involved in carrying one or more sequences of one or more instructions to the processor 12 for execution. For example, the instructions may initially be carried on a magnetic disk of a remote computer. The remote computer may load the instructions into its dynamic memory and send the instructions over a telephone line using a modem. A modem local to the computer system 11 can receive the data on the telephone line, using an infrared transmitter to convert the data to an infrared signal. An infrared detector can receive the data carried in the infrared signal and appropriate circuitry may place the data on the bus 13. The bus 13 carries the data to the main memory 15a, from which the processor 12 retrieves and executes the instructions. The instructions received by the main memory 15a may optionally be stored on the storage device 15c either before or after execution by the processor 12.

The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routers are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Internet Protocol is responsible for addressing hosts and routing datagrams (packets) from a source host to the destination host across one or more IP networks. For this purpose, the Internet Protocol defines an addressing system that has two functions: Identifying hosts addresses and providing a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The Hypertext Transfer Protocol (HTTP) is an application protocol for distributed, collaborative, hypermedia information systems, commonly used for communication over the Internet. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230-HTTP/1.1: Message Syntax and Routing, RFC 7231-HTTP/1.1: Semantics and Content, RFC 7232-HTTP/1.1: Conditional Requests, RFC 7233-HTTP/1.1: Range Requests, RFC 7234-HTTP/1.1: Caching, and RFC 7235-HTTP/1.1: Authentication. HTTP functions as a request-response protocol in the client-server computing model. A web browser, for example, may be the client and an application running on a computer hosting a website may be the server. The client submits an HTTP request message to the server. The server, which provides resources such as HTML files and other content, or performs other functions on behalf of the client, returns a response message to the client. The response contains completion status information about the request and may further contain a requested content in its message body. A web browser is an example of a User Agent (UA). Other types of user agent include the indexing software used by search providers (web crawlers), voice browsers, mobile apps and other software that accesses, consumes, or displays web content.

User. The term "user" is used herein to include, but not limited to, the principal using a client to interactively retrieve and render resources or resource manifestation, such as a person using a web browser, a person using an e-mail reader, or a person using a display such as the display 17.

The term 'client' typically refers to an application (or a device executing the application) used for retrieving or rendering resources, or resource manifestations, such as a web browser, an e-mail reader, or a Usenet reader, while the term 'server' typically refers to an application (or a device executing the application) used for supplying resources or resource manifestations, and typically offers (or hosts) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

A mobile operating system (also referred to as mobile OS), is an operating system that operates a smartphone, tablet, PDA, or another mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently, the popular mobile OSs include Android, Symbian, Apple iOS, BlackBerry, MeeGo, Windows Phone, and Bada. Mobile devices with mobile communications capabilities (e.g. smartphones) typically contain two mobile operating systems: a main user-facing software platform is supplemented by a second low-level proprietary real-time operating system that operates the radio and other hardware.

Android is a Linux-based, open source mobile operating system (OS) based on the Linux kernel that is currently offered by Google. With a user interface based on direct manipulation, Android is designed primarily for touchscreen mobile devices such as smartphones and tablet computers with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions. For example, adjusting the screen from portrait to landscape depending on the device orientation, or allowing the user to steer a vehicle in a racing game by rotating the device, a process that simulates control of a steering wheel.

Android devices boot to the homescreen, the primary navigation and information point on the device, which is similar to the desktop found on PCs. The homescreens on Android are typically made up of app icons and widgets. App icons launch the associated app, whereas widgets display live, auto-updating content such as the weather forecast, the user's email inbox, or a news ticker directly on the homescreen. A homescreen may be made up of several pages that the user can swipe back and forth between pages. A heavily-customizable Android homescreen interface allows the user to adjust the look and feel of the device to their liking. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command), or rotating it in three dimensions (one common result is switching from portrait to landscape mode). The iOS is described in a publication entitled: "*IOS Tutorial*", downloaded from tutorialspoint-.com on July 2014, which is incorporated in its entirety for all purposes as if fully set forth herein.

Cloud. The term "Cloud" or "Cloud computing" as used herein is defined as a technology infrastructure facilitating supplement, consumption and delivery of IT services, and generally refers to any group of networked computers capable of delivering computing services (such as computations, applications, data access, and data management and storage resources) to end users. This disclosure does not limit the type (such as public or private) of the cloud as well as the underlying system architecture used by the cloud. The IT services are internet based and may involve elastic provisioning of dynamically scalable and time virtualized resources. Although such virtualization environments can be privately deployed and used within local area or wide area networks owned by an enterprise, a number of "cloud service providers" host virtualization environments accessible through the public internet (the "public cloud") that is generally open to anyone, or through private TP or other type of network accessible only by entities given access to it (a "private cloud."). Using a cloud-based control server or using the system above may allow for reduced capital or operational expenditures. The users may further access the system using a web browser regardless of their location or what device they are using, and the virtualization technology allows servers and storage devices to be shared and utilization be increased. Examples of public cloud providers include Amazon AWS, Microsoft Azure and Google GCP. Comparison of service features such as computation, storage, and infrastructure of the three cloud service providers (AWS, Microsoft Azure, GCP) is disclosed in an article entitled: "*Highlight the Features of AWS, GCP and Microsoft Azure that Have an Impact when Choosing a Cloud Service Provider*" by Muhammad Ayoub Kamal, Hafiz Wahab Raza, Muhammad Mansoor Alam, and Mazliham Mohd Su'ud, published January 2020 in 'International Journal of Recent Technology and Engineering (IJRTE)' ISSN: 2277-3878, Volume-8 by Blue Eyes Intelligence Engineering & Sciences Publication [DOI:10.35940/ijrte.D8573.018520], which is incorporated in its entirety for all purposes as if fully set forth herein.

The term "Software as a Service (SaaS)" as used herein in this application, is defined as a model of software deployment whereby a provider licenses a Software Application (SA) to customers for use as a service on demand. Similarly, an "Infrastructure as a Service" (IaaS) allows enterprises to access virtualized computing systems through the public Internet. The term "customer" as used herein in this application, is defined as a business entity that is served by an SA, provided on the SaaS platform. A customer may be a person or an organization and may be represented by a user that responsible for the administration of the application in aspects of permissions configuration, user related configuration, and data security policy. The service is supplied and consumed over the Internet, thus eliminating requirements to install and run applications locally on a site of a customer as well as simplifying maintenance and support. Particularly it is advantageous in massive business applications. Licensing is a common form of billing for the service and it is paid periodically. SaaS is becoming ever more common as a form of SA delivery over the Internet and is being facilitated in a technology infrastructure called "Cloud Computing". In this form of SA delivery, where the SA is controlled by a service provider, a customer may experience stability and data security issues. In many cases, the customer is a business organization that is using the SaaS for business purposes such as business software; hence, stability and data security are primary requirements. As part of a cloud service arrangement, any computer system may also be emulated using software running on a hardware computer system. This virtualization allows for multiple instances of a computer system, each referred to as virtual machine, to run on a single machine. Each virtual machine behaves like a computer system running directly on hardware. It is isolated from the other virtual machines, as would two hardware computers. Each virtual machine comprises an instance of an operating system (the "guest operating system"). There is a host operating system running directly on the hardware that supports the software that emulates the hardware, and the emulation software is referred to as a hypervisor.

The term "cloud-based" generally refers to a hosted service that is remotely located from a data source and configured to receive, store and process data delivered by the data source over a network. Cloud-based systems may be configured to operate as a public cloud-based service, a private cloud-based service or a hybrid cloud-based service. A "public cloud-based service" may include a third-party provider that supplies one or more servers to host multitenant services. Examples of a public cloud-based service include Amazon Web Services® (AWS®), Microsoft® Azure™, and Google® Compute Engine™ (GCP) as examples. In contrast, a "private" cloud-based service may include one or more servers that host services provided to a single subscriber (enterprise) and a hybrid cloud-based service may be a combination of certain functionality from a public cloud-based service and a private cloud-based service.

Cloud computing and virtualization is described in a book entitled "*Cloud Computing and Virtualization*" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Server. The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

A server device (in server/client architecture) typically offers information resources, services, and applications to clients, using a server dedicated or oriented operating system. A server device may consist of, be based on, include, or be included in a work-station. Current popular server operating systems are based on Microsoft Windows (by Microsoft Corporation, headquartered in Redmond, Washington, U.S.A.), Unix, and Linux-based solutions, such as the 'Windows Server 2012' server operating system, which is a part of the Microsoft 'Windows Server' OS family, that was released by Microsoft in 2012. 'Windows Server 2012' provides enterprise-class datacenter and hybrid cloud solutions that are simple to deploy, cost-effective, application-specific, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix operating system is widely used in servers. It is a multitasking, multiuser computer operating system that exists in many variants, and is characterized by a modular design that is sometimes called the "Unix philosophy", meaning the OS provides a set of simple tools, which each performs a limited, well-defined function, with a unified filesystem as the primary means of communication, and a shell scripting and command language to combine the tools to perform complex workflows. Unix was designed to be portable, multi-tasking and multi-user in a time-sharing configuration, and Unix systems are characterized by various concepts: the use of plain text for storing data, a hierarchical file system, treating devices and certain types of Inter-Process Communication (IPC) as files, the use of a large number of software tools, and small programs that can be strung together through a command line interpreter using pipes, as opposed to using a single monolithic program that includes all of the same functionality. Unix operating system consists of many utilities along with the master control program, the kernel. The kernel provides services to start and stop programs, handles the file system and other common "low level" tasks that most programs share, and schedules access to avoid conflicts when programs try to access the same resource, or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

Client. The term 'client' typically refers to an application (or a device executing the application) used for retrieving or rendering resources, or resource manifestations, such as a web browser, an e-mail reader, or a Usenet reader, while the term 'server' typically refers to an application (or a device executing the application) used for supplying resources or resource manifestations, and typically offers (or hosts) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

A client device (in server/client architecture) typically receives information resources, services, and applications from servers, and is using a client dedicated or oriented operating system. The client device may consist of, be based on, include, or be included in, the a workstation or a computer system. Current popular client operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part* 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8-An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE*" published 2011, which is incorporated in its entirety for all purposes as if fully set forth herein.

RTOS. A Real-Time Operating System (RTOS) is an Operating System (OS) intended to serve real-time applications that process data as it comes in, typically without buffer delays. Processing time requirements (including any OS delay) are typically measured in tenths of seconds or shorter increments of time, and is a time bound system which has well defined fixed time constraints. Processing is commonly to be done within the defined constraints, or the system will fail. They either are event driven or time sharing, where event driven systems switch between tasks based on their priorities while time sharing systems switch the task based on clock interrupts. A key characteristic of an RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. An RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where task are switched on a regular clocked interrupt, and on events; called round robin. Time sharing designs switch tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an Application Note No. RES05B00008-0100/Rec. 1.00 published January 2010 by Renesas Technology Corp. entitled: "*R8C Family—General RTOS Concepts*", in JAJA Technology Review article published February 2007 [1535-5535/ $32.00] by The Association for Laboratory Automation [doi:10.1016/j.jala.2006.10.016] entitled: "*An Overview of Real-Time Operating Systems*", and in Chapter 2 entitled: "*Basic Concepts of Real Time Operating Systems*" of a book published 2009 [ISBN—978-1-4020-9435-4] by Springer Science+Business Media B.V. entitled: "*Hardware-Dependent Software—Principles and Practice*", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is ⅟₁₀₀₀ of a second to ⅟₁₀₀ of a second, via an interrupt from a hardware timer, but this interval is often changed to suit a particular application. FreeRTOS™ is described in a paper by Nicolas Melot (downloaded July 2015) entitled: "*Study of an operating system: FreeRTOS— Operating systems for embedded devices*", in a paper (dated Sep. 23, 2013) by Dr. Richard Wall entitled: "*Carebot PIC32 MX7ck implementation of Free RTOS*", FreeRTOS™ modules are described in web pages entitled: "*FreeRTOS™ Modules*" published in the www.freertos.org web-site dated 26 Nov. 2006, and FreeRTOS kernel is described in a paper published 1 Apr. 2007 by Rich Goyette of Carleton University as part of 'SYSC5701: Operating System Methods for Real-Time Applications', entitled: "*An Analysis and Description of the Inner Workings of the FreeRTOS Kernel*", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weakness with respect to user misuse and hardware failure within the functional model and API were identified and resolved. Both SafeRTOS and FreeRTOS share the same scheduling algorithm, have similar APIs, and are otherwise very similar, but they were developed with differing objectives. SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

VxWorks. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. VxWorks supports Intel architecture, POWER architecture, and ARM architectures. The VxWorks may be used in multicore asymmetric multiprocessing (AMP), symmetric multiprocessing (SMP), and mixed modes and multi-OS (via Type 1 hypervisor) designs on 32—and 64-bit processors. VxWorks comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

μC/OS. Micro-Controller Operating Systems (MicroC/OS, stylized as μC/OS) is a real-time operating system (RTOS) that is a priority-based preemptive real-time kernel for microprocessors, written mostly in the programming language C, and is intended for use in embedded systems. MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

A server device (in server/client architecture) typically offers information resources, services, and applications to clients, using a server dedicated or oriented operating system. A server device may consist of, be based on, include, or be included in the work-station 7, the computer system 10, or the computer 11. Current popular server operating systems are based on Microsoft Windows (by Microsoft Corporation, headquartered in Redmond, Washington, U.S.A.), Unix, and Linux-based solutions, such as the 'Windows Server 2012' server operating system, which is a part of the Microsoft 'Windows Server' OS family, that was released by Microsoft in 2012. 'Windows Server 2012' provides enterprise-class datacenter and hybrid cloud solutions that are simple to deploy, cost-effective, application-specific, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix operating system is widely used in servers. It is a multitasking, multiuser computer operating system that exists in many variants, and is characterized by a modular design that is sometimes called the "Unix philosophy", meaning the OS provides a set of simple tools, which each performs a limited, well-defined function, with a unified filesystem as the primary means of communication, and a shell scripting and command language to combine the tools to perform complex workflows. Unix was designed to be portable, multi-tasking and multi-user in a time-sharing configuration, and Unix systems are characterized by various concepts: the use of plain text for storing data, a hierarchical file system, treating devices and certain types of Inter-Process Communication (IPC) as files, the use of a large number of software tools, and small programs that can be strung together through a command line interpreter using pipes, as opposed to using a single monolithic program that includes all of the same functionality. Unix operating system consists of many utilities along with the master control program, the kernel. The kernel provides services to start and stop programs, handles the file system and other common "low level" tasks that most programs share, and schedules access to avoid conflicts when programs try to access the same resource, or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

A client device (in server/client architecture) typically receives information resources, services, and applications from servers, and is using a client dedicated or oriented operating system. The client device may consist of, be based on, include, or be included in, the workstation 7, the computer system 10 or the computer 11. Current popular client operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part 1*" and "*Windows Internals—Part 2*", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Profession-als*" by Jerry Honeycutt, which is incorporated in its entirety for all purposes as if fully set forth herein.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, in fluids, or be airborne, such as bicycle, car, automobile, motorcycle, train, ship, boat, submarine, airplane, scooter, bus, subway, train, or spacecraft. A vehicle may consist of, or may comprise, a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

Any vehicle herein may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

A vehicle may include a hood (a.k.a. bonnet), which is the hinged cover over the engine of motor vehicles that allows access to the engine compartment (or trunk on rear-engine and some mid-engine vehicles) for maintenance and repair.

A vehicle may include a bumper, which is a structure attached, or integrated to, the front and rear of an automobile to absorb impact in a minor collision, ideally minimizing repair costs. Bumpers also have two safety functions: minimizing height mismatches between vehicles and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

The lighting system of a motor vehicle consists of lighting and signaling devices mounted or integrated to the front, rear, sides, and in some cases, the top of a motor vehicle. This lights the roadway for the driver and increases the conspicuity of the vehicle, allowing other drivers and pedestrians to see a vehicle's presence, position, size, direction of travel, and the driver's intentions regarding direction and speed of travel. Emergency vehicles usually carry distinctive lighting equipment to warn drivers and indicate priority of movement in traffic. A headlamp is a lamp attached to the front of a vehicle to light the road ahead. A chassis consists of an internal framework that supports a manmade object in its construction and use. An example of a chassis is the underpart of a motor vehicle, consisting of the frame (on which the body is mounted).

Autonomous car. An autonomous car (also known as a driverless car, self-driving car, or robotic car) is a vehicle that is capable of sensing its environment and navigating without human input. Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination. Among the potential benefits of autonomous cars is a significant reduction in traffic collisions; the resulting injuries; and related costs, including a lower need for insurance. Autonomous cars are also predicted to offer major increases in traffic flow; enhanced mobility for children, the elderly, disabled and poor people; the relief of travelers from driving and navigation chores; lower fuel consumption; significantly reduced needs for parking space in cities; a reduction in crime; and the facilitation of different business models for mobility as a service, especially those involved in the sharing economy.

Modern self-driving cars generally use Bayesian Simultaneous Localization And Mapping (SLAM) algorithms, which fuse data from multiple sensors and an off-line map into current location estimates and map updates. SLAM with Detection and Tracking of other Moving Objects (DATMO), which also handles things such as cars and pedestrians, is a variant being developed by research at Google. Simpler systems may use roadside Real-Time Locating System (RTLS) beacon systems to aid localization. Typical sensors include LIDAR and stereo vision, GPS and IMU. Visual object recognition uses machine vision including neural networks.

The term 'Dynamic driving task' includes the operational (steering, braking, accelerating, monitoring the vehicle and roadway) and tactical (responding to events, determining when to change lanes, turn, use signals, etc.) aspects of the driving task, but not the strategic (determining destinations and waypoints) aspect of the driving task. The term 'Driving mode' refers to a type of driving scenario with characteristic dynamic driving task requirements (e.g., expressway merging, high speed, cruising, low speed traffic jam, closed-campus operations, etc.). The term 'Request to intervene' refers to notification by the automated driving system to a human driver that s/he should promptly begin or resume performance of the dynamic driving task.

The SAE International standard J3016, entitled: "*Taxonomy and Definitions for Terms Related to On-Road Motor Vehicle Automated Driving Systems*" [Revised 2016-09], which is incorporated in its entirety for all purposes as if fully set forth herein, describes six different levels (ranging from none to fully automated systems), based on the amount of driver intervention and attentiveness required, rather than the vehicle capabilities. The levels are further described in a table 20a in FIG. 2a. Level 0 refers to automated system issues warnings but has no vehicle control, while Level 1 (also referred to as "hands on") refers to driver and automated system that shares control over the vehicle. An example would be Adaptive Cruise Control (ACC) where the driver controls steering and the automated system controls speed. Using Parking Assistance, steering is automated while speed is manual. The driver must be ready to retake full control at any time. Lane Keeping Assistance (LKA) Type II is a further example of level 1 self-driving.

In Level 2 (also referred to as "hands off"), the automated system takes full control of the vehicle (accelerating, braking, and steering). The driver must monitor the driving and be prepared to immediately intervene at any time if the automated system fails to respond properly. In Level 3 (also referred to as "eyes off"), the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. A key distinction is between level 2, where the human driver performs part of the dynamic driving task, and level 3, where the automated driving system performs the entire dynamic driving task. Level 4 (also referred to as "mind off") is similar to level 3, but no driver attention is ever required for safety, i.e., the driver may safely go to sleep or leave the driver's seat. Self-driving is supported only in limited areas (geofenced) or under special circumstances, such as traffic jams. Outside of these areas or circumstances, the vehicle must be able to safely abort the trip, i.e., park the car, if the driver does not retake control. In Level 5 (also referred to as "wheel optional"), no human intervention is required. An example would be a robotic taxi.

An autonomous vehicle and systems having an interface for payloads that allows integration of various payloads with relative ease are disclosed in U.S. Patent Application Publication No. 2007/0198144 to Norris et al. entitled: "*Networked multi-role robotic vehicle*", which is incorporated in its entirety for all purposes as if fully set forth herein. There is a vehicle control system for controlling an autonomous vehicle, receiving data, and transmitting a control signal on at least one network. A payload is adapted to detachably connect to the autonomous vehicle, the payload comprising a network interface configured to receive the control signal from the vehicle control system over the at least one network. The vehicle control system may encapsulate payload data and transmit the payload data over the at least one network, including Ethernet or CAN networks. The payload may be a laser scanner, a radio, a chemical detection system, or a Global Positioning System unit. In certain embodiments, the payload is a camera mast unit, where the camera communicates with the autonomous vehicle control system to detect and avoid obstacles. The camera mast unit may be interchangeable, and may include structures for receiving additional payload components.

Automotive electronics. Automotive electronics involves any electrically-generated systems used in vehicles, such as ground vehicles. Automotive electronics commonly involves multiple modular ECUs (Electronic Control Unit) connected over a network such as Engine Control Modules (ECM) or Transmission Control Modules (TCM). Automotive electronics or automotive embedded systems are distributed systems, and according to different domains in the automotive field, they can be classified into Engine electronics, Transmission electronics, Chassis electronics, Active safety, Driver assistance, Passenger comfort, and Entertainment (or infotainment) systems.

One of the most demanding electronic parts of an automobile is the Engine Control Unit. Engine controls demand one of the highest real time deadlines, as the engine itself is a very fast and complex part of the automobile. The computing power of the engine control unit is commonly the highest, typically a 32-bit processor, that typically controls in real-time in a diesel engine the Fuel injection rate, Emission control, NOx control, Regeneration of oxidation catalytic converter, Turbocharger control, Throttle control, and Cooling system control. In a gasoline engine, the engine control typically involves Lambda control, OBD (On-Board Diagnostics), Cooling system control, Ignition system control, Lubrication system control, Fuel injection rate control, and Throttle control.

An engine ECU typically connects to, or includes, sensors that actively monitor in real-time engine parameters such as pressure, temperature, flow, engine speed, oxygen level and NOx level, plus other parameters at different points within the engine. All these sensor signals are analyzed by the ECU, which has the logic circuits to do the actual controlling. The ECU output is commonly connected to different actuators for the throttle valve, EGR valve, rack (in VGTs), fuel injector (using a pulse-width modulated signal), dosing injector, and more.

Transmission electronics involves control of the transmission system, mainly the shifting of the gears for better shift comfort and to lower torque interrupt while shifting. Automatic transmissions use controls for their operation, and many semi-automatic transmissions having a fully automatic clutch or a semi-auto clutch (declutching only). The engine control unit and the transmission control typically exchange messages, sensor signals and control signals for their operation. Chassis electronics typically includes many sub-systems that monitor various parameters and are actively controlled, such as ABS—Anti-lock Braking System, TCS—Traction Control System, EBD—Electronic Brake Distribution, and ESP—Electronic Stability Program. Active safety systems involve modules that are ready-to-act when there is a collision in progress, or used to prevent it when it senses a dangerous situation, such as Air bags, Hill descent control, and Emergency brake assist system. Passenger comfort systems involve, for example, Automatic climate control, Electronic seat adjustment with memory, Automatic wipers, Automatic headlamps—adjusts beam automatically, and Automatic cooling—temperature adjustment. Infotainment systems include systems such as Navigation system, Vehicle audio, and Information access.

Automotive electric and electronic technologies and systems are described in a book published by Robert Bosch GmbH (5$^{th}$ Edition, July 2007) entitled: "*Bosch Automotive Electric and Automotive Electronics*" [ISBN—978-3-658-01783-5], which is incorporated in its entirety for all purposes as if fully set forth herein.

ADAS. Advanced Driver Assistance Systems, or ADAS, are automotive electronic systems to help the driver in the driving process, such as to increase car safety and more generally, road safety using a safe Human-Machine Interface (HMI). Advanced driver assistance systems (ADAS) are developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. ADAS technology can be based upon, or use, vision/camera systems, sensor technology, car data networks, Vehicle-to-vehicle (V2V), or Vehicle-to-Infrastructure systems (V2I), and leverage wireless network connectivity to offer improved value by using car-to-car and car-to-infrastructure data. ADAS technologies or applications comprise: Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system (such as Precrash system), Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

ADAS is further described in Intel Corporation 2015 Technical White Paper (0115/MW/HBD/PDF 331817-00US) by Meiyuan Zhao of Security & Privacy Research, Intel Labs entitled: "*Advanced Driver Assistant System—Threats, Requirements, Security Solutions*", and in a PhD Thesis by Alexandre Dugarry submitted on June 2004 to the Cranfield University, School of Engineering, Applied Mathematics and Computing Group, entitled: "*Advanced Driver Assistance Systems—Information Management and Presentation*", which are both incorporated in their entirety for all purposes as if fully set forth herein.

ACC. Autonomous cruise control (ACC; also referred to as 'adaptive cruise control' or 'radar cruise control') is an optional cruise control system for road vehicles that automatically adjusts the vehicle speed to maintain a safe distance from vehicles ahead. It makes no use of satellite or roadside infrastructures or of any cooperative support from other vehicles. The vehicle control is imposed based on sensor information from on-board sensors only. Cooperative Adaptive Cruise Control (CACC) further extends the automation of navigation by using information gathered from fixed infrastructure such as satellites and roadside beacons, or mobile infrastructure such as reflectors or transmitters on the back of other vehicles. These systems use either a radar or laser sensor setup allowing the vehicle to slow when approaching another vehicle ahead and accelerate again to the preset speed when traffic allows. ACC technology is widely regarded as a key component of any future generations of intelligent cars. The impact is equally on driver safety as on economizing capacity of roads by adjusting the distance between vehicles according to the conditions. Radar-based ACC often feature a pre-crash system, which warns the driver and/or provides brake support if there is a high risk of a collision. In certain cars it is incorporated with a lane maintaining system which provides power steering assist to reduce steering input burden in corners when the cruise control system is activated.

Adaptive High Beam. Adaptive High Beam Assist is Mercedes-Benz' marketing name for a headlight control strategy that continuously automatically tailors the headlamp range so the beam just reaches other vehicles ahead, thus always ensuring maximum possible seeing range without glaring other road users. It provides a continuous range of beam reach from a low-aimed low beam to a high-aimed high beam, rather than the traditional binary choice between low and high beams. The range of the beam can vary between 65 and 300 meters, depending on traffic conditions. In traffic, the low beam cutoff position is adjusted vertically to maximize seeing range while keeping glare out of leading and oncoming drivers' eyes. When no traffic is close enough for glare to be a problem, the system provides full high beam. Headlamps are adjusted every 40 milliseconds by a camera on the inside of the front windscreen which can determine distance to other vehicles. The adaptive high beam may be realized with LED headlamps.

Automatic parking. Automatic parking is an autonomous car-maneuvering system that moves a vehicle from a traffic lane into a parking spot to perform parallel, perpendicular or angle parking. The automatic parking system aims to enhance the comfort and safety of driving in constrained environments where much attention and experience is required to steer the car. The parking maneuver is achieved by means of coordinated control of the steering angle and speed, which takes into account the actual situation in the environment to ensure collision-free motion within the available space. The car is an example of a non-holonomic system where the number of control commands available is less than the number of coordinates that represent its position and orientation.

Automotive night vision. An automotive night vision system uses a thermographic camera to increase a driver's perception and seeing distance in darkness or poor weather beyond the reach of the vehicle's headlights. Active systems use an infrared light source built into the car to illuminate the road ahead with light that is invisible to humans. There are two kinds of active systems: gated and non-gated. The gated system uses a pulsed light source and a synchronized camera that enable long ranges (250 m) and high performance in rain and snow. Passive infrared systems do not use an infrared light source, instead they capture thermal radiation already emitted by the objects, using a thermographic camera.

Blind spot monitor. The blind spot monitor is a vehicle-based sensor device that detects other vehicles located to the driver's side and rear. Warnings can be visual, audible, vibrating or tactile. Blind spot monitors may include more than monitoring the sides of the vehicle, such as 'Cross Traffic Alert', which alerts drivers backing out of a parking space when traffic is approaching from the sides. BLIS is an acronym for Blind Spot Information System, a system of protection developed by Volvo, and produced a visible alert when a car entered the blind spot while a driver was switching lanes, using two door mounted lenses to check the blind spot area for an impending collision.

Collision avoidance system. A collision avoidance system (a.k.a. Precrash system) is an automobile safety system designed to reduce the severity of an accident. Such forward collision warning system or collision mitigating system typically uses radar (all-weather) and sometimes laser and camera (both sensor types are ineffective during bad weather) to detect an imminent crash. Once the detection is done, these systems either provide a warning to the driver when there is an imminent collision or take action autonomously without any driver input (by braking or steering or both). Collision avoidance by braking is appropriate at low vehicle speeds (e.g. below 50 km/h), while collision avoidance by steering is appropriate at higher vehicle speeds. Cars with collision avoidance may also be equipped with adaptive cruise control, and use the same forward-looking sensors.

Intersection assistant. Intersection assistant is an advanced driver assistance system for city junctions that are a major accident blackspot. The collisions here can mostly be put down to driver distraction or mis-judgement. While humans often react too slowly, assistance systems are immune to that brief moment of shock. The system monitors cross traffic in an intersection/road junction. If this anticipatory system detects a hazardous situation of this type, it prompts the driver to start emergency braking by activating visual and acoustic warnings and automatically engaging brakes.

Lane Departure Warning system. A lane departure warning system is a mechanism designed to warn the driver when the vehicle begins to move out of its lane (unless a turn signal is on in that direction) on freeways and arterial roads. These systems are designed to minimize accidents by addressing the main causes of collisions: driver error, distractions, and drowsiness. There are two main types of systems: Systems which warn the driver (lane departure warning, LDW) if the vehicle is leaving its lane (visual, audible, and/or vibration warnings), and systems which warn the driver and, if no action is taken, automatically take steps to ensure the vehicle stays in its lane (Lane Keeping System, LKS). Lane warning/keeping systems are based on video sensors in the visual domain (mounted behind the windshield, typically integrated beside the rear mirror), laser sensors (mounted on the front of the vehicle), or Infrared sensors (mounted either behind the windshield or under the vehicle).

ADASIS. The Advanced Driver Assistance System Interface Specification (ADASIS) forum was established in May 2001 by a group of car manufacturers, in-vehicle system developers and map data companies with the primary goal of developing a standardized map data interface between stored map data and ADAS applications. Main objectives of the ADASIS Forum are to define an open standardized data model and structure to represent map data in the vicinity of the vehicle position (i.e. the ADAS Horizon), in which map data is delivered by a navigation system or a general map data server, and to define an open standardized interface specification to provide ADAS horizon data (especially on a vehicle CAN bus) and enable ADAS applications to access the ADAS Horizon and position-related data of the vehicle. Using ADASIS, the available map data may not only be used for routing purposes but also to enable advanced in-vehicle applications. The area of potential features reaches from headlight control up to active safety applications (ADAS). With the ongoing development of navigation based ADAS features the interface to access the so-called ADAS Horizon is of rising importance. The ADASIS protocol is described in ADASIS Forum publication 200v2.0.3-D2.2-ADASIS_v2_Specification.0 dated December 2013 and entitled: "*ADASIS v2 Protocol—Version* 2.0.3.0", which is incorporated in its entirety for all purposes as if fully set forth herein. Built-in vehicle sensors may be used to capture the vehicle's environment are limited to a relatively short range. However, the available digital map data can be used as a virtual sensor to look more forward on the path of the vehicle. The digital map contains attributes attached to the road segments, such as road geometry, functional road class, number of lanes, speed limits, traffic signs, etc. The "road ahead" concept is basically called Most Probable Path (or Most Likely Path) derived from the ADAS Horizon. For each street segment, the probability of driving through this segment is assigned and given by the ADASIS protocol.

Automotive navigation system. A navigation system generally compares the determined position with a digital map and uses this map to calculate the optimal route to a specified destination. An automotive navigation system is part of the automobile (or vehicle) controls or a third party add-on used to find direction in an automobile (or vehicle). It typically uses a satellite navigation device to get its position data, which is then correlated to a position on a road. When directions are needed, routing can be calculated, and on-the-fly traffic information can be used to adjust the route. Dead reckoning may be used, using distance data from sensors attached to the drivetrain, together with a gyroscope and an accelerometer can be used for greater reliability. Mathematically, automotive navigation is based on the shortest path problem, within graph theory, which examines how to identify the path that best meets some criteria (shortest, cheapest, fastest, etc.) between two points in a large network. Compared with portable devices, permanently installed navigation devices in a vehicle provides better positioning quality and thus better route-guidance quality, since additional sensors for distance and direction signals (such as wheel-speed and yaw sensors) can be evaluated and the antenna can be mounted in a more favorable place for satellite reception. As original equipment, networking with other components is also common, i.e. integration in the operating concept of the vehicle is possible. Voice outputs can be issued via the audio system, and may be muted for telephone calls. The route guidance information may be displayed in the instrument cluster or in the head-up display and thus in the driver's primary field of vision. An example of a navigation system is the iGO navigation application (app), described in a user manual UK English ver. 1.0 dated August 2016 entitled: "*User Manual—iGO Navigation app—Navigation software for the iGO Navigation app*", which is incorporated in its entirety for all purposes as if fully set forth herein.

In-car positioning and navigation has been a killer application for Global Positioning System (GPS) receivers, and a variety of electronics for consumers and professionals have been launched on a large scale. Positioning technologies based on stand-alone GPS receivers are vulnerable and, thus, have to be supported by additional information sources to obtain the desired accuracy, integrity, availability, and continuity of service. A survey of the information sources and information fusion technologies used in current in-car navigation systems is presented in a paper authored by Isaac Skog and Peter Handel Published in IEEE Transactions on Intelligent Transportation Systems (Volume: 10, Issue: 1, March 2009) entitled: "*In-car positioning and navigation technologies—a survey*", which is incorporated in its entirety for all purposes as if fully set forth herein.

The road database is typically provided as a vector map, and street names or numbers and house numbers, as well as points of interest (waypoints), are encoded as geographic coordinates. This enables users to find a desired destination by street address or as geographic coordinates. A GPS device is typically used in most automobile navigation systems, and may be used in a number of contexts, including: Maps, including street maps, displayed in human readable format via text or in a graphical format, turn-by-turn navigation directions to a human in charge of a vehicle or vessel via text or speech, directions fed directly to an autonomous vehicle such as a robotic probe, traffic congestion maps (depicting either historical or real time data), and suggested alternative directions, information on nearby amenities such as restaurants, fueling stations, and tourist attractions. Further, GPS devices may be able to indicate the roads or paths available, traffic congestion and alternative routes, roads or paths that might be taken to get to the destination, if some roads are busy (now or historically) the best route to take. The location of food, banks, hotels, fuel, airports or other places of interests, the shortest route between the two locations, and the different options to drive on highway or back roads.

Most navigation systems rely on three primary guidance display screens to communicate navigation information to drivers: (1) maps, (2) maneuver lists with sequenced turn directions, and (3) turn-by-turn guidance displays which generally "pop up" in advance of a turn. The overall utility of each depends on the particular task being performed. Maps, for example, can be effectively used to plan a route since they provide a pictorial representation of an area or region, while ordered lists of directions can limit information processing and lead to fast and accurate navigation performance. Systems tend to use or make available all three types of information displays. While some navigation guidance displays offer very small monochrome screens, most of the systems provided some form of color map display. Typically, it is perceived that drivers will use map-based information not only for trip planning purposes, but also during en-route navigation. Map displays contained the most information (an average of over ten items), and generally served as the default guidance view (the one driver would see first when operating the system) despite the fact that they rely heavily on spatial processing capabilities of the driver. Most systems, however, provided supplemental turn-by-turn guidance displays. Systems also enabled drivers to change the default view, and/or access alternative views directly (often via a single button press).

Some systems also allowed the display screen to be blanked-out while driving, allowing drivers to receive audio guidance only. Although turn-by-turn guidance displays generally contained fewer information items than map displays, they still presented a considerable amount of information. General types of information on these displays tended to include turn arrows, countdown bars to indicate the distance to the next maneuver, an indication of the current and next turn street name, and an abbreviated map depicting the intersection roadway geometry at the next maneuver point. One design adopted by several systems was to integrate display elements such as the turn arrow, countdown bar, map, and vehicle position indicator. This arrangement allows drivers to focus on a single overall graphic representation rather than several individual display elements to extract the information (exercising Gestalt principles). Another characteristic common to turn-by-turn displays was the redundant audio component announcing the upcoming maneuver. Some systems only announced the direction and distance of the next turn, rather than the specific street name.

ECU. In automotive electronics, an Electronic Control Unit (ECU) is a generic term for any embedded system that controls one or more of the electrical system or subsystems in a vehicle such as a motor vehicle. Types of ECU include Electronic/engine Control Module (ECM) (sometimes referred to as Engine Control Unit—ECU, which is distinct from the generic ECU—Electronic Control Unit), Airbag Control Unit (ACU), Powertrain Control Module (PCM), Transmission Control Module (TCM), Central Control Module (CCM), Central Timing Module (CTM), Convenience Control Unit (CCU), General Electronic Module (GEM), Body Control Module (BCM), Suspension Control Module (SCM), Door Control Unit (DCU), Powertrain Control Module (PCM), Electric Power Steering Control Unit (PSCU), Seat Control Unit, Speed Control Unit (SCU), Suspension Control Module (SCM), Telematic Control Unit (TCU), Telephone Control Unit (TCU), Transmission Control Unit (TCU), Brake Control Module (BCM or EBCM; such as ABS or ESC), Battery management system, control unit, or control module.

A microprocessor or a microcontroller serves as a core of an ECU, and uses a memory such as SRAM, EEPROM, and Flash. An ECU is power fed by a supply voltage, and includes or connects to sensors using analog and digital inputs. In addition to a communication interface, an ECU typically includes a relay, H-Bridge, injector, or logic drivers, or outputs for connecting to various actuators.

ECU technology and applications is described in the M. Tech. Project first stage report (EE696) by Vineet P. Aras of the Department of Electrical Engineering, Indian Institute of Technology Bombay, dated July 2004, entitled: "*Design of Electronic Control Unit (ECU) for Automobiles—Electronic Engine Management system*", and in National Instruments paper published Nov. 7, 2009 entitled: "*ECU Designing and Testing using National Instruments Products*", which are both incorporated in their entirety for all purposes as if fully set forth herein. ECU examples are described in a brochure by Sensor-Technik Wiedemann Gmbh (headquartered in Kaufbeuren, Germany) dated 20110304 GB entitled "*Control System Electronics*", which is incorporated in its entirety for all purposes as if fully set forth herein. An ECU or an interface to a vehicle bus may use a processor such as the MPC5748G controller available from Freescale Semiconductor, Inc. (headquartered in Tokyo, Japan, and described in a data sheet Document Number MPC5748G Rev. 2, May 2014 entitled: "MPC5748 Microcontroller Datasheet", which is incorporated in its entirety for all purposes as if fully set forth herein.

Electric car. An Electric Vehicle (EV) is a vehicle that uses one or more electric motors for propulsion, and is powered by a collector system, with electricity from extravehicular sources, or it can be powered autonomously by a battery (sometimes charged by solar panels, or by converting fuel to electricity using fuel cells or a generator). EVs include, but are not limited to, road and rail vehicles, surface and underwater vessels, electric aircraft, and electric spacecraft. For road vehicles, together with other emerging automotive technologies such as autonomous driving, connected vehicles, and shared mobility, EVs form a future mobility vision called Connected, Autonomous, Shared, and Electric (CASE) Mobility. Fundamentals, theoretical bases, and design methodologies of conventional Internal Combustion Engines (ICE) vehicles, Electric Vehicles (EV), Hybrid Electric Vehicles (HEV), and Fuel Cell Vehicles (FCV), as well as vehicle performance characteristics, configurations, control strategies, design methodologies, modeling, and simulation for modern vehicles are described in book published 2018 by Taylor & Francis Group, LLC, authored by Mehrdad Ehsani; Yimin Gao; Stefano Longo; and Kambiz M. Ebrahimi and entitled: "*Modern Electric, Hybrid Electric, and Fuel Cell Vehicles Third Edition*" [ISBN— 13: 978-1-4987-6177-2], which is incorporated in its entirety for all purposes as if fully set forth herein.

As used herein, the term "electric car" typically refers specifically to Battery Electric Vehicles (BEVs) or all-electric cars, a type of Electric Vehicle (EV) that has an onboard rechargeable battery pack that can be plugged in and charged from the electric grid, and the electricity stored on the vehicle is the only energy source that provide propulsion for the wheels. Such electric car includes highway-capable automobiles, as well as any low-speed electric vehicle with limitations in terms of weight, power and maximum speed that are allowed to travel on public roads. The latter are classified as Neighborhood Electric Vehicles (NEVs) in the United States, and as electric motorized quadricycles in Europe. Such electric car, battery electric car, or all-electric car, is typically an automobile that is propelled by one or more electric motors, using only energy stored in batteries. Compared to Internal Combustion Engine (ICE) vehicles, electric cars are quieter, have no exhaust emissions, and lower emissions overall. Charging an electric car can be done at a variety of charging stations; these charging stations can be installed in both houses and public areas.

An example of a typical power train configuration of an electric car 30 is shown in FIG. 3. The Internal Combustion Engine (ICEV) and the fuel tank are replaced with an electric motor 35 that is mechanically attached to a transmission system 36 for rotating the four wheels that include four tires 37*a*, 37*b*, 37*c*, and 37*d*. The electric motor 35 is electrically powered from a battery 33 via a power converter 34. The battery 33 is charged by a battery charger 32 that is externally power fed using an electric power plug 31. The battery 33 may use a Lithium-ion-based batteries for their high power and energy density. Batteries with different chemical compositions are becoming more widely used, such as lithium iron phosphate, which is not dependent on nickel and cobalt so can be used to make cheaper batteries and thus cheaper cars. A theory behind electric vehicles and insight on the factors motivating the global adoption of these technologies are described in book published 2018 by John Wiley & Sons Ltd, authored by John G. Hayes and G. Abas Goodarzi, entitled: "*Energy Systems, Power Electronics and Drives for Hybrid, Electric and Fuel Cell Vehicles*" [ISBN—9781119063667], which is incorporated in its entirety for all purposes as if fully set forth herein.

Most electric cars use a wired connection to supply electricity for recharging. Electric vehicle charging plugs are not universal throughout the world. However, vehicles using one type of plug are generally able to charge at other types of charging stations through the use of plug adapters. The Type 2 connector is the most common type of plug, but different versions are used in China and Europe. The Type 1 (also called SAE J1772) connector is common in North America but rare elsewhere, as it does not support three-phase charging. Electric cars are usually charged overnight from a home charging station; sometimes known as a charging point, wallbox charger, or simply a charger; in a garage or on the outside of a house.

The electric motor 35 is typically a series wound DC motor, a form of brushed DC electric motor, as well as separately excited and permanent magnet DC motor. Some electric vehicles have made use of a variety of AC motor types, as these are simpler to build and have no brushes that can wear out. These are usually induction motors or brushless AC electric motors which use permanent magnets. There are several variations of the permanent magnet motor which offer simpler drive schemes and/or lower cost including the brushless DC electric motor. Once electric power is supplied to the motor (from the controller), the magnetic field interaction inside the motor will turn the drive shaft and ultimately the vehicle's wheels as part of the transmission 36.

The electric battery 33 typically consists of electrochemical cells with external connections in order to provide power to the vehicle. The battery 33 typically includes a battery pack, which is a group of multiple battery modules and cells. In many cases, lithium-ion batteries are used. In one example, the Tesla Model S battery pack has up to 7,104 cells, split into 16 modules with 6 groups of 74 cells in each. Each cell has a nominal voltage of 3-4 volts, depending on its chemical composition.

SoH. A State of health (SoH) is a figure of merit of the condition of a battery (or a cell, or a battery pack), compared to its ideal conditions. The units of SoH are percent points (100%=the battery's conditions match the battery's specifications). Typically, a battery's SoH will be 100% at the time of manufacture and will decrease over time and use. However, a battery's performance at the time of manufacture may not meet its specifications, in which case its initial SoH will be less than 100%. The biggest factors that contribute to battery degradation are driver patterns, driver aggression, climate, cabin thermal dynamics, and infrastructure, with driver patterns and climate being the biggest. Typically, a Battery Management System (BMS) evaluates the SoH of the battery under its management and reports it. Then, the SoH is compared to a threshold (typically done by the application in which the battery is used), to determine the suitability of the battery to a given application. Knowing the SoH of a given battery and the SoH threshold of a given application, allows for a determination can be made whether the present battery conditions make it suitable for that application, and an estimate can be made of the battery's useful lifetime in that application Any of the following parameters (singly or in combination) may be used to derive an arbitrary value for the SoH: Internal resistance/impedance/conductance; Capacity; Voltage; Self-discharge; Ability to accept a charge; Number of charge-discharge cycles; Age of the battery; Temperature of battery during its previous uses; and Total energy charged and discharged; In addition, the battery management system may define an arbitrary weight for each of the parameter's contribution to the SoH value. The definition of how SoH is evaluated can be a trade secret.

SoC. A State of Charge (SOC) is defined as the available capacity expressed as a percentage of some reference, sometimes its rated capacity but more likely its current (i.e., at the latest charge-discharge cycle) capacity. It may further be defined using an absolute measure in Coulombs, kWh or Ah of the energy left in the battery. Knowing the amount of energy left in a battery compared with the energy it had when it was full gives the user an indication of how much longer a battery will continue to perform before it needs recharging. It is a measure of the short-term capability of the battery. Using the analogy of a fuel tank in a car, State of Charge (SoC) estimation is often called the "Gas Gauge" or "Fuel Gauge" function.

In an electric car such as a Battery Electric Vehicle (BEV), a Hybrid Vehicle (HV), or a Plug-in Hybrid electric vehicle (PHEV), SoC for the battery pack is the equivalent of a fuel gauge. The SoC (State of Charge) may be presented as a gauge or percentage value on the vehicle dashboard. Typically, SoC may be estimated from direct measurement variables in two ways: offline and online. In offline techniques, the battery desires to be charged and discharged in constant rate such as Coulomb-counting. This method gives precise estimation of battery SoC, but they are protracted, costly, and interrupt main battery performance. In general there are five methods to determine SoC indirectly, including chemical, voltage, current integration, Kalman filtering, and pressure.

PEV. A Plug-in Electric Vehicle (PEV) is any road vehicle that can utilize an external source of electricity (such as a wall socket that connects to the power grid) to store electrical energy within its onboard rechargeable battery packs, to power an electric motor and help propelling the wheels.

PEV is a subset of electric vehicles, and includes all-electric/battery electric vehicles (BEVs) and plug-in hybrid electric vehicles (PHEVs). A PEV typically is a motor vehicle with rechargeable battery packs that can be charged from the electric grid, and the electricity stored on board drives or contributes to drive the wheels for propulsion. Plug-in electric vehicles are also sometimes referred to as Grid-Enabled Vehicles (GEV), and the European Automobile Manufacturers Association (ACEA) refers to such vehicles as Electrically Chargeable Vehicles (ECV). PEV is a subcategory of electric vehicles that includes battery electric vehicles (BEVs), plug-in hybrid vehicles (PHEVs), and electric vehicle conversions of hybrid electric vehicles and conventional internal combustion engine vehicles. There are several other types of plug-in electric vehicle, including battery electric multiple units, electric motorcycles and scooters, neighborhood electric vehicles or microcars, city cars, vans, buses, electric trucks or lorries, and military vehicle BEV. A Battery Electric Vehicle (BEV) uses chemical energy stored in rechargeable battery packs as its only source for propulsion. BEVs use electric motors and motor controllers instead of Internal Combustion Engines (ICEs) for propulsion. A plug-in hybrid operates as an all-electric vehicle or BEV when operating in charge-depleting mode, but it switches to charge-sustaining mode after the battery has reached its minimum State Of Charge (SOC) threshold, exhausting the vehicle's all-electric range (AER). BEVs are all-electric vehicles that use only electricity to power the motor, with no internal combustion engine. The energy stored in the rechargeable battery pack is used to power the electric motor, which propels the vehicle. BEVs have no tailpipe emissions and can be charged by plugging into a charging station or using a home charging system. BEVs are known for their quiet operation, instant torque, and smooth ride, and are also more environmentally friendly than traditional gasoline-powered vehicles. However, the range of a BEV is limited by the size of its battery, so it may not be suitable for long-distance travel.

PHV. A Plug-in Hybrid Electric Vehicle (PHEV or PHV), also known as a plug-in hybrid, is a hybrid electric vehicle with rechargeable batteries that can be restored to full charge by connecting a plug to an external electric power source. A plug-in hybrid shares the characteristics of both a conventional hybrid electric vehicle and an all-electric vehicle: it uses a gasoline engine and an electric motor for propulsion, but a PHEV has a larger battery pack that can be recharged, allowing operation in all-electric mode until the battery is depleted. PHEVs are a hybrid between a traditional gasoline-powered vehicle and an all-electric vehicle. They have both an internal combustion engine and an electric motor powered by a rechargeable battery pack. PHEVs operate as all-electric vehicles when the battery has a sufficient charge, and switch to gasoline power when the battery is depleted. PHVs provide a longer driving range compared to a pure electric vehicle, as the gasoline engine acts as a range extender, and can be charged by plugging into a charging station or using a home charging system.

Charging station. A charging station, also known as a charge point or Electric Vehicle Supply Equipment (EVSE), is a piece of equipment that supplies electrical power for charging plug-in electric vehicles (including electric cars, electric trucks, electric buses, neighborhood electric vehicles, and plug-in hybrids). There are two main types: AC charging stations and DC charging stations. While batteries can only be charged with Direct Current (DC) electric power, most electricity is delivered from the power grid as Alternating Current (AC). For this reason, most electric vehicles have a built-in AC-to-DC converter, commonly known as the "onboard charger". At an AC charging station, AC power from the grid is supplied to this onboard charger, which produces DC power to charge the battery. DC chargers facilitate higher power charging (which requires much larger AC-to-DC converters) by building the converter into the charging station instead of the vehicle to avoid size and weight restrictions. The station then supplies DC power to the vehicle directly, bypassing the onboard converter. Most fully electric car models can accept both AC and DC power. Charging stations provide connectors that conform to a variety of international standards. DC charging stations are commonly equipped with multiple connectors to be able to charge a wide variety of vehicles that utilize competing standards. Public charging stations are typically found street-side or at retail shopping centers, government facilities, and other parking areas. Private charging stations are typically found at residences, workplaces, and hotels.

A schematic configuration of an electric car 30a connected by a cable 42 to be charged from a charging station 41 is shown in shown in an arrangement 40 in FIG. 4. The charging station 41 includes a socket outlet 41a for supplying power for charging of the electric car 30a. A plug 41b at the end of the charging flexible cable 42 interfaces with the socket outlet 41a. In North America, the socket 41a and the plug 41b are commonly not used as the cable 42 is permanently attached to the charging station 41. The electric car 30a is power fed via an inlet 41d, that is connectable to a connector 41c at the end of the cable 42. While the charging station 41 is shown in the arrangement 40 to include a single socket outlet 41a for charging a single electric car 30a, a charging station 41 may have multiple charging points, each connected to charge a different electric car 30a.

A charging station (EVSE) 41 is classified into categories may use Alternating current (AC) or Direct current (DC) charging. Alternating current (AC) charging is typically used for people to charge their electric vehicles overnight at home. In that case, the EV has an on-board charger charging the battery, so the speed of charging depends on its speed. Typical maximum speeds of AC charge points are 7.4 KWh, 11 KWh and 22 KWh. AC charging uses a lower voltage, either Level 1 (120 volts or standard household current) or Level 2 (240 volts). Though the low voltage levels mean a slower charge, AC charging can be easily installed in most households, providing a solution for residential, workplace, multi-unit dwellings, and other longer-term parking locations like hotels, train station, and airport parking garages. AC charging stations connect the vehicle's onboard charging circuitry directly to the AC supply. Two types are defined, designated as Levels 1 and 2. AC Level 1 refers to connecting directly to a standard residential/commercial electrical 120 V North American outlet; capable of supplying 6-16 A (0.7-1.92 kilowatts or "kW") depending on the capacity of a dedicated circuit, while AC Level 2 utilizes 240 V (single-phase) or 208 V (three-phase) power to supply between 6 and 80 A (1.4-19.2 kW) and provides a significant charging speed increase over AC Level 1 charging.

The AC Level 1 charging involves single-phase AC power that is typically found in most homes and some businesses, and uses standard 2 or 3 pin plug sockets. Such a single-phase electricity supply can power a dedicated charge point up to 7 kW. AC Level 2 requires a three-phase power that is often found on commercial and industrial sites, this provides three alternating currents and allows for 22 kW AC charging. As compared to a single-phase AC power supply that uses two conductors (phase and neutral), a three-phase supply with no neutral and the same phase-to-ground voltage and current capacity per phase can transmit three times as much power using just 1.5 times as many wires (i.e., three instead of two). Direct current (DC) charging for electric vehicles allows for higher charging speeds since DC can be supplied directly to the electric vehicle's battery at power levels usually higher than AC charging. The higher the DC power supplied, the faster the electric vehicle can be charged—provided the EV is designed to handle such power. DC chargers can reach up to 350 KWh on ultra-fast DC charging. However, the most common speeds are 50 KWh and high-power DC in the range of 100 KWh to 150 KWh.

The general physical, electrical, communication, and performance requirements for EV charging systems used in North America are defined by the Society of Automotive Engineers (SAE International) as part of standard SAE J1772, initially developed in 2001. As shown in table 40a in FIG. 4a, SAE J1772 defines four levels of charging, two levels each for AC and DC supplies; the differences between levels are based upon the power distribution type, standards and maximum power. Additional standards released by SAE for charging include SAE J3068 (three-phase AC charging, using the Type 2 connector defined in IEC 62196-2) and SAE J3105 (automated connection of DC charging devices). The International Electrotechnical Commission (IEC) adopted a majority of the SAE J1772 standard under IEC 62196-1 for international implementation.

As shown in table 50 in FIG. 5, the IEC alternatively defines charging in modes (IEC 61851-1), where Mode 1 refers to a slow charging from a regular electrical socket (single- or three-phase AC), Mode 2 refers to slow charging from a regular AC socket but with some EV-specific protection arrangement (i.e., the Park & Charge or the PARVE systems), Mode 3 refers to slow or fast AC charging using a specific EV multi-pin socket with control and protection functions (i.e. SAE J1772 and IEC 62196-2), and Mode 4 refers to DC fast charging using a specific charging interface (i.e. IEC 62196-3, such as CHAdeMO). The connection between the electric grid and "charger" (electric vehicle supply equipment) is defined by three cases (IEC 61851-1): Case A—any charger connected to the mains (the mains supply cable is usually attached to the charger) usually associated with modes 1 or 2. Case B—an on-board vehicle charger with a mains supply cable that can be detached from both the supply and the vehicle—usually mode 3, and Case C-DC dedicated charging station. The mains supply cable may be permanently attached to the charge station as in mode 4.

CPO. Charge Point Operator (CPO) is an entity that builds EV charging sites, installs hardware from a variety of Electric Vehicle Supply Equipment (EVSE) vendors, and ensures optimal ongoing EV charging operations. CPOs provide the charging network infrastructure, managing the backend technologies as well as the communications between the backend system and the chargers, to deliver reliable and consistent EV charging. CPOs typically guarantee that EV chargers are always available and stable, operating 24/7 without fail. Systems need to be in place to notify them any time a problem arises with the chargers—or automatically fix it where possible, reducing operating costs and minimizing impact on EV drivers.

An E-Mobility Service Provider (EMSP) is a company offering an EV charging service to drivers of electric vehicles. An EMSP can support a granting of access to a huge number of charging stations around a certain area. If you decide to use the service of an EMSP, you will be registered into the EMSP's system, and then you can use the charging infrastructure via a charging card or app. The EMSP will take care of the billing as well. EMSPs depend on CPOs to maintain availability of the entire operational infrastructure, so all hardware needs to be monitored in real-time to discover and fix issues before the customer—or even the CPO—is aware of them. Self-healing reduces costs by circumventing the need to send technicians to the field. Furthermore, automated provisioning ensures that the chargers are instantly "online" without any intervention.

TPMS. A Tire-Pressure Monitoring System (TPMS) monitors the air pressure inside the pneumatic tires on vehicles. A TPMS reports real-time tire-pressure information to the driver, using either a gauge, a pictogram display, or a simple low-pressure warning light. TPMS can be divided into two different types—direct (dTPMS) and indirect (iTPMS). TPMS are installed either when the vehicle is made or after the vehicle is put to use. The goal of a TPMS is avoiding traffic accidents, poor fuel economy, and increased tire wear due to under-inflated tires through early recognition of a hazardous state of the tires. Aftermarket valve cap-based dTPMS systems, which require a smartphone and an app or portable display unit, are also available for bicycles, automobiles, and trailers.

The dynamic behavior of a pneumatic tire is closely connected to its inflation pressure. Key factors like braking distance and lateral stability require the inflation pressures to be adjusted and kept as specified by the vehicle manufacturer. Extreme under-inflation can even lead to thermal and mechanical overload caused by overheating and subsequent, sudden destruction of the tire itself. Additionally, fuel efficiency and tire wear are severely affected by under-inflation. Tires do not only leak air if punctured, they also leak air naturally, and over a year, even a typical new, properly mounted tire can lose from to 60 kPa (3 to 9 psi), roughly 10% or even more of its initial pressure.

Some advantages of TPMS may include:

(i) Fuel savings: According to the GITI, for every 10% of under-inflation on each tire on a vehicle, a 1% reduction in fuel economy will occur. In the United States alone, the Department of Transportation estimates that under inflated tires waste 2 billion US gallons (7,600, 000 m3) of fuel each year.

(ii) Extended tire life: Under inflated tires are the number one cause of tire failure and contribute to tire disintegration, heat buildup, ply separation and sidewall/casing breakdowns. Further, a difference of 10 pounds per square inch (69 kPa; 0.69 bar) in pressure on a set of duals literally drags the lower pressured tire 2.5 metres per kilometre (13 feet per mile). Moreover, running a tire even briefly on inadequate pressure breaks down the casing and prevents the ability to retread. Structural damages caused, for example, by hitting sharp curbs or potholes, can also lead to sudden tire failures, even a certain time after the damaging incident.

(iii) Improved safety: Under-inflated tires lead to tread separation and tire failure, resulting in many accidents and injuries. Further, tires properly inflated add greater stability, handling and braking efficiencies and provide greater safety for the driver, the vehicle, the loads and others on the road.

(iv) Environmental efficiency: Under-inflated tires, as estimated by the US Department of Transportation, release over 26 billion kilograms (57.5 billion pounds) of unnecessary carbon-monoxide pollutants into the atmosphere each year in the United States alone.

Indirect TPMS (iTPMS) systems do not use physical pressure sensors; they measure air pressures using software-based systems, which by evaluating and combining existing sensor signals such as wheel speeds, accelerometers, and driveline data to estimate and monitor the tire pressure without physical pressure sensors in the wheels. First-generation iTPMS systems are based on the principle that under-inflated tires have a slightly smaller diameter (and hence higher angular velocity) than a correctly inflated one. These differences are measurable through the wheel speed sensors of ABS/ESC systems. Second generation iTPMS can also detect simultaneous under-inflation in up to all four tires using spectrum analysis of individual wheels, which can be realized in software using advanced signal processing techniques.

iTPMS cannot measure or display absolute pressure values; they are relative by nature and have to be reset by the driver once the tires are checked and all pressures adjusted correctly. The reset is normally done either by a physical button or in a menu of the on-board computer. iTPMS are, compared to dTPMS, more sensitive to the influences of different tires and external influences like road surfaces and driving speed or style. The reset procedure, followed by an automatic learning phase of typically 20 to 60 minutes of driving under which the iTPMS learns and stores the reference parameters before it becomes fully active, cancels out many, but not all of these. As iTPMS do not involve any additional hardware, spare parts, electronic/toxic waste, or service (beyond the regular reset), they are regarded as easy to handle and customer friendly. As mentioned however, the sensors must be reset every time changes are done to the tire setup, and some consumers do not wish to have this added responsibility. iTPMS are regarded as less accurate by some due to their nature, given that simple ambient temperature variations can lead to pressure variations of the same magnitude as the legal detection thresholds, but many vehicle manufacturers and customers value the ease of use.

Direct TPMS, or direct tire pressure monitoring systems (direct sensor TPMS) refers to the use of a pressure sensor directly mounted on the wheels or tires of a vehicle. The pressure inside the tire is measured using a pressure transducer with the pressure information being subsequently sent to the vehicle to warn the driver of under or over inflation of a tire. The pressure information is commonly transmitted to the vehicle using radio frequency (RF) technology, though systems using mechanical, electrical or magnetic methods have been used over recent years. Direct TPMS (dTPMS) directly measures tire pressure using hardware sensors. In each wheel, most often on the inside of the valve, there is a battery-driven pressure sensor which transfers pressure information to a central control unit which reports it to the vehicle's onboard computer. Some units also measure and alert temperatures of the tire as well. These systems can identify under-inflation for each individual tire. Although the systems vary in transmitting options, many TPMS products (both OEM and aftermarket) can display real-time, individual tire pressures whether the vehicle is moving or parked. There are many different solutions, but all of them have to face the problems of exposure to hostile environments. The majority are powered by batteries which limit their useful life. Some sensors utilise a wireless power system similar to that used in RFID tag reading which solves the problem of limited battery life. This also increases the frequency of data transmission up to 40 Hz and reduces the sensor weight which can be important in motorsport applications. If the sensors are mounted on the outside of the wheel, as are some aftermarket systems, they are subject to mechanical damage, aggressive fluids, as well as theft. When mounted on the inside of the rim, they are no longer easily accessible for battery change and the RF link must overcome the attenuating effects of the tire which increases the energy need.

A direct TPMS sensor consists of the following main functions requiring only a few external components, e.g., battery, housing, PCB, to get the sensor module that is mounted to the valve stem inside the tire: pressure sensor; analog-digital converter; microcontroller; system controller; oscillator; radio frequency transmitter; low frequency receiver, and voltage regulator (battery management). Most originally fitted dTPMS have the sensor mounted on the inside of the rim and the batteries are not exchangeable. A discharged battery means that the tire must be dismounted in order to replace it, so long battery life is desirable. To save energy and prolong battery life, many dTPMS sensors do not transmit information when parked (which eliminates spare tire monitoring) or apply a more power expensive two-way communication which enables wake-up of the sensor. For OEM auto dTPMS units to work properly, they need to recognize the sensor positions and must ignore the signals from other vehicles. Aftermarket dTPMS units not only transmit while vehicles are moving or parked, but also provide users with some advanced monitoring options including data logging, remote monitoring options and more. They are available for all types of vehicles, from motorcycles to heavy equipment, and can monitor up to 64 tires at a time, which is important for commercial vehicles. Many aftermarket dTPMS units do not require specialized tools to program or reset, making them much simpler to use.

In most designs of direct TPMS, a small electronic assembly which is rugged enough to be mounted inside a tire, measures the pressure using a microelectromechanical system (MEMS) pressure sensor and then transmits this and other information to one or more vehicle receivers. Other information can include a serial number, temperature, acceleration, direction of rotation and the status of the complete tire pressure monitoring system. The purpose of the serial number is to allow the vehicle to ignore transmissions from other vehicles and operate with a unique data field. A typical direct TPMS comprises the following components on a vehicle: A direct TPM sensor fitted to the back of the valve stem on each wheel; A TPM Warning Light; and Unique identifier (IDs) for which tire is providing the data including speed and the direction of rotation; A tire pressure monitor Electronic Control Unit (ECU) may include an antenna(s), controller for periodic measurements, source of power, and diagnostics and wake up system.

Most direct TPMS systems use Ultra-High Frequency (UHF) radio in one of the 'unlicensed' ISM bands (industrial, scientific and medical) for transmitting the data, often around 433 MHz in Europe and 315 MHz in much of the rest of the world. On some systems there is a separate receiver or antenna near each wheel whilst more commonly there is a single receiver which receives data from all of the wheels on the vehicle. Commonly this receiver is also used for Remote Keyless Entry system (RKE) as this also usually uses UHF radio transmissions. TPM sensors can be fitted to the wheels in a number of ways. They can be mounted on the back of the tire's valve stem or attached using adhesive or to a band which is then securely wrapped around the rim inside the tire, usually in the drop zone.

The TPM sensors fitted to high volume production cars worldwide are battery-powered, self-contained units which periodically measure tire pressure, and often temperature and acceleration. The sensor is equipped with an RF transmitter circuit which is used to broadcast the measured pressure etc. within the tire. The TPM is designed to use as little power as possible to give maximum battery life. This is done by using very low power circuitry and transmitting the data as infrequently as possible and with as low power as possible. The UHF transmitter in a TPM typically transmits around 250 W (1 W is equal to one millionth (10-6) of a watt). TPMs do not have UHF receivers built in due to the relatively high-power requirements of this technology. This means that they can't tell that they are transmitting at the same time as another TPM. Most TPMs do have LF receivers as this uses little or no power.

The pressure, temperature and acceleration sensors generate analog signals which are converted to their digital equivalents using analog to digital converters. The acceleration sensor measures the centrifugal force generated when the wheel rotates. This force is proportional to the rotational speed. The acceleration sensor may be a simple switch rather than an analog transducer (accelerometer). This is usually referred to as a roll switch. The acceleration sensor allows the TPM to be placed in a low-power communication device mode, when the vehicle is stationary which can extend the battery life. The advantage of a roll switch over an accelerometer is that the switch is purely mechanical and doesn't use any power to take a measurement. When the vehicle is stationary, the TPM may periodically transmit to the vehicle. This allows (as long as the vehicle receiver is always on) the driver or vehicle operator to be warned of low pressure as soon as the Ignition system is switched on rather than having to wait until the vehicle is moving.

The Tyre Pressure Monitoring System indicates only whether the air pressure in any of the tyres is below a particular level of safety. This avoidable signal has made it possible for the statistical death rate to come up to 650 deaths per year. A project for displaying values through continuous monitoring that propose a method to cumulate the various factors of the tyre and to display it to the driver for a safer experience is described in an article entitled: "*Tyre Pressure Monitoring System*" by Amogha Abbi and T. Ramakrishnaiah, published 2021 by IOP Publishing in ICMLSC 2020 IOP Conf. Series: Materials Science and Engineering 1042 (2021) 012024 [doi:10.1088/1757-899X/1042/1/012024], which is incorporated in its entirety for all purposes as if fully set forth herein. The proposed TPMS has an electronic device unit that is attached to the tyre and transmits the values of the pressure, temperature, and the wheel alignment to the unit to be placed inside the vehicle, observable to the driver. This unit includes pressure sensors, microcontrollers, RF transmission, and batteries. An alert is introduced which indicates if the pressure exceeds the maximum or minimum safe pressure level. Several experiments have been carried out to analyze the proposed system. The integrated TPMS has proven to be an effective alternative to maintain the tyres and aims to improve the comfort and safety of the driver.

Typical Tire Pressure Monitoring System (TPMS) only monitors the condition of a tire pressure. However, there are no particular reactions taking place after the value of its tire pressure is discovered. In fact, the value of a tire pressure determines driving comfort and safety. A method to integrate a TPMS and a Pressure Sensor Base (PSB) with a particular reaction required to fulfill tires automatically is described in an article entitled: "*DESIGN OF TIRE PRESSURE MONITORING SYSTEM USING A PRESSURE SENSOR BASE*" by Lukman Medriavin Silalahi, Mudrik Alaydrus, Agus Dendi Rochendi, and Muhtar Muhtar, published in SINERGI Vol. 23, No. 1, February 2019: 70-78 [http://doi.org/

10.22441/sinergi.2019.1.010], which is incorporated in its entirety for all purposes as if fully set forth herein. The proposed TPMS has an electronic device unit directly attached to a tire's valve. This unit includes pressure sensors, microcontrollers, Bluetooth transmitters and batteries. An alert system is generated whenever tire pressure exceeds the maximum or minimum safe pressure level. Moreover, if the pressure measured is below the lowest level of the desired pressure, it will automatically activate the compressor. Several experiments have been carried out to analyze the proposed system. The integrated TPMS has proven to be able to be an alternative tool for the automotive sector to keep maintaining the tires and to improve a driving comfort and safety.

Automobile puncture is one of the major hidden dangers of frequent traffic accidents. Accurate and real-time monitoring of tire pressure of automobile tires is of great significance for improving vehicle safety and improving traffic status. A paper entitled "*Automobile tire pressure monitoring technology and development trend*" by Quan Xin, Gong Jingfeng, Guan Junjie, Bai ri, You Mingxing, and Zou Pian, published 2019 by IOP Publishing in IOP Conf. Series: *Journal of Physics*: Conf. Series 1314 (2019) 012100 [doi: 10.1088/1742-6596/1314/1/012100], which is incorporated in its entirety for all purposes as if fully set forth herein, first summarizes and analyzes the published technical methods of automobile tire pressure detection, and analyzes the advantages and disadvantages of related detection methods in combination with previous research results. Finally, this paper proposes a development direction of the tire pressure system. The tire pressure and tire temperature signals obtained by the tire pressure monitoring system are used as the correction amount of the ABS system control signal, and the tire pressure and the tire temperature can always be controlled within a safe range. It can also reduce the chance of tire's bursting due to sudden braking and improve the reliability of the ABS system.

Drag. As used herein, drag (also referred to as air resistance or fluid resistance) refers to forces that oppose the relative motion of an object through a fluid (a liquid or gas). Drag forces act in a direction opposite to the velocity of the vehicle. Unlike other resistive forces such as dry friction, which is nearly independent of velocity, aerodynamic drag forces are dependent on the square of the velocity. For a solid object moving through a fluid, the drag is the component of the net aerodynamic or hydrodynamic force acting opposite to the direction of the movement. Therefore, drag opposes the motion of the object, and in a powered vehicle it is overcome by thrust provided by the engine through the vehicle's drive train. The drag coefficient is a common measure in automotive design as it pertains to aerodynamics. Drag is a force that acts parallel to and in the same direction as the airflow. The drag coefficient of an automobile measures the way the automobile passes through the surrounding air. Aerodynamic drag increases with the square of speed; therefore, it becomes critically important at higher speeds. Reducing the drag coefficient in an automobile improves the performance of the vehicle as it pertains to speed and fuel efficiency. There are many different ways to reduce the drag of a vehicle. A common way to measure the drag of the vehicle is through the drag area.

The reduction of drag in road vehicles has led to increases in the top speed of the vehicle and the vehicle's fuel efficiency, as well as many other performance characteristics, such as handling and acceleration. The two main factors that impact drag are the frontal area of the vehicle and the drag coefficient. The drag coefficient is a unit-less value that denotes how much an object resists movement through a fluid such as water or air. A potential complication of altering a vehicle's aerodynamics is that it may cause the vehicle to get too much lift. Lift is an aerodynamic force that acts perpendicular to the airflow around the body of the vehicle. Too much lift can cause the vehicle to lose road traction which can be very unsafe. Lowering the drag coefficient comes from streamlining the exterior body of the vehicle. Streamlining the body requires assumptions about the surrounding airspeed and characteristic use of the vehicle. The average modem automobile achieves a drag coefficient of between 0.25 and 0.3. Sport Utility Vehicles (SUVs), with their typically boxy shapes, typically achieve a Cd=0.35-0.45. The drag coefficient of a vehicle is affected by the shape of body of the vehicle. Various other characteristics affect the coefficient of drag as well, and are taken into account in these examples. Some sports cars have a surprisingly high drag coefficient (such as the Ariel Atom at 0.40), but this is to compensate for the amount of lift the vehicle generates, while others use aerodynamics to their advantage to gain speed and as a result have much lower drag coefficients.

A method and system of determining a vehicle's driving characteristics such as the vehicle mass, drag force coefficients, and driving surface inclination, is described in U.S. Pat. No. 9,395,233 to Dourra et al. entitled: "Mass, drag coefficient and inclination determination using accelerometer sensor", which is incorporated in its entirety for all purposes as if fully set forth herein. The vehicle's mass, drag force coefficients and inclination are determined using signals input from the vehicle's accelerometer.

An aerodynamic system for a vehicle having a plurality of heat exchangers can include a front assembly, a pair of front fenders, a hood, a ducting assembly, and a rear assembly, is disclosed in U.S. Pat. No. 10,351,181 to MCKILLEN et al. entitled: "Apparatus and methods for manipulating airflow around and through a vehicle", which is incorporated in its entirety for all purposes as if fully set forth herein. The front assembly can include air inlets. The air inlets can be in fluid communication with at least one of the heat exchangers. The pair of front fenders can include fender outlets in fluid communication with at least one of the heat exchangers. The ducting assembly can be in fluid communication with at least one of the plurality of heat exchangers. The rear assembly can include raised C-pillars, air inlets adjacent the pair of raised C-pillars, a rear spoiler, a rear diffuser, and rear slot assemblies adjacent the rear spoiler.

Virtualization. The term virtualization typically refers to the technology that allows for the creation of software-based virtual machines that can run multiple operating systems from a single physical machine. In one example, virtual machines can be used to consolidate the workloads of several under-utilized servers to fewer machines, perhaps a single machine (server consolidation), providing benefits (perceived or real, but often cited by vendors) such as savings on hardware, environmental costs, management, and administration of the server infrastructure. Virtualization scheme allows for the creation of substitutes for real resources, that is, substitutes that have the same functions and external interfaces as their counterparts, but that differ in attributes, such as size, performance, and cost. These substitutes are called virtual resources, and their users are typically unaware of the substitution.

Virtualization is commonly applied to physical hardware resources by combining multiple physical resources into shared pools from which users receive virtual resources. With virtualization, you can make one physical resource look like multiple virtual resources. Virtual resources can have functions or features that are not available in their underlying physical resources. Virtualization can provide the benefits of consolidation to reduce hardware cost, such as to efficiently access and manage resources to reduce operations and systems management costs while maintaining needed capacity, and to have a single server function as multiple virtual servers. In addition, virtualization can provide optimization of workloads, such as to respond dynamically to the application needs of its users, and to increase the use of existing resources by enabling dynamic sharing of resource pools. Further, virtualization may be used for IT flexibility and responsiveness, such as by having a single, consolidated view of, and easy access to, all available resources in the network, regardless of location, and reducing the management of your environment by providing emulation for compatibility and improved interoperability.

Virtual machine (VM). Virtual machine is a representation of a real machine using software that provides an operating environment which can run or host a guest operating system. In one example, a virtual machine may include a self-contained software emulation of a machine, which does not physically exist, but shares resources of an underlying physical machine. Like a physical computer, a virtual machine runs an operating system and applications. Multiple virtual machines can operate concurrently on a single host system. There are different kinds of virtual machines, each with different functions: System virtual machines (also termed full virtualization VMs) provide a substitute for a real machine. They provide functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host CPUs. Process virtual machines are designed to execute computer programs in a platform-independent environment. Some virtual machines, such as QEMU, are designed to also emulate different architectures and allow execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

Guest Operating System. A guest operating system is an operating system running in a virtual machine environment that would otherwise run directly on a separate physical system. Operating-system-level virtualization, also known as containerization, refers to an operating system feature in which the kernel allows the existence of multiple isolated user-space instances. Such instances, called containers, partitions, Virtualization Engines (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container. In addition to isolation mechanisms, the kernel often provides resource-management features to limit the impact of one container's activities on other containers. With operating-system-virtualization, or containerization, it is possible to run programs within containers, to which only parts of these resources are allocated. A program expecting to see the whole computer, once run inside a container, can only see the allocated resources and believes them to be all that is available. Several containers can be created on each operating system, to each of which a subset of the computer's resources is allocated. Each container may contain any number of computer programs. These programs may run concurrently or separately, even interact with each other.

Hypervisor. Hypervisor commonly refers to a thin layer of software that generally provides virtual partitioning capabilities which runs directly on hardware, but underneath higher-level virtualization services. The hypervisor typically manages virtual machines, allowing them to interact directly with the underlying hardware. System virtualization creates many virtual systems within a single physical system. Virtual systems are independent operating environments that use virtual resources. System virtualization can be approached through hardware partitioning or hypervisor technology. Hardware partitioning subdivides a physical server into fractions, each of which can run an operating system. These fractions are typically created with coarse units of allocation, such as whole processors or physical boards. This type of virtualization allows for hardware consolidation, but does not have the full benefits of resource sharing and emulation offered by hypervisors. Hypervisors use a thin layer of code in software or firmware to achieve fine-grained, dynamic resource sharing. Because hypervisors provide the greatest level of flexibility in how virtual resources are defined and managed, they are the primary technology for system virtualization.

Virtual Machine Monitor. A Virtual Machine Monitor (VMM) is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (usually called containers) must share a single kernel, though the guest operating systems can differ in user space, such as different Linux distributions with the same kernel. Typically, a VMM refers to a software that runs in a layer between a hypervisor or host operating system and one or more virtual machines that provides the virtual machines abstraction to the guest operating systems. With full virtualization, the VMM exports a virtual machine abstraction identical to the physical machine, so the standard operating system can run just as they would on physical hardware.

Hardware virtualization or platform virtualization refers to the creation of a virtual machine that acts like a real computer with an operating system. Software executed on these virtual machines is separated from the underlying hardware resources. In hardware virtualization, the host machine is the actual machine on which the virtualization takes place, and the guest machine is the virtual machine. The words host and guest are used to distinguish the software that runs on the physical machine from the software that runs on the virtual machine. The software or firmware that creates a virtual machine on the host hardware is called a hypervisor or Virtual Machine Manager. Different types of hardware virtualization include full-virtualization, where almost complete simulation of the actual hardware to allow software, which typically consists of a guest operating system, to run unmodified, and Para-virtualization, where a hardware environment is not simulated; however, the guest programs are executed in their own isolated domains, as if they are running on a separate system. Guest programs need to be specifically modified to run in this environment.

Hardware-assisted virtualization is a way of improving overall efficiency of virtualization. It involves CPUs that provide support for virtualization in hardware, and other hardware components that help improve the performance of a guest environment. Hardware virtualization can be viewed as part of an overall trend in enterprise IT that includes autonomic computing, a scenario in which the IT environment will be able to manage itself based on perceived activity, and utility computing, in which computer processing power is seen as a utility that clients can pay for only as needed. The usual goal of virtualization is to centralize administrative tasks while improving scalability and overall hardware-resource utilization. With virtualization, several operating systems can be run in parallel on a single Central Processing Unit (CPU). This parallelism tends to reduce overhead costs and differs from multitasking, which involves running several programs on the same OS. Using virtualization, an enterprise can better manage updates and rapid changes to the operating system and applications without disrupting the user.

Server Virtualization. Server virtualization is a virtualization technique that involves partitioning a physical server into a number of small, virtual servers with the help of virtualization software. In server virtualization, each virtual server runs multiple operating system instances at the same time. A Virtual Private Server (VPS) is a virtual machine sold as a service by an Internet hosting service, that runs its own copy of an Operating System (OS), and customers may have superuser-level access to that operating system instance, so they can install almost any software that runs on that OS. For many purposes they are functionally equivalent to a dedicated physical server, and being software-defined, are able to be much more easily created and configured. They are typically priced much lower than an equivalent physical server. However, as they share the underlying physical hardware with other VPS's, performance may be lower, depending on the workload of any other executing virtual machines. Dedicated Servers may also be more efficient with CPU dependent processes such as hashing algorithms.

Application Virtualization. Application virtualization is software technology that encapsulates computer programs from the underlying operating system on which it is executed. A fully virtualized application is not installed in the traditional sense, although it is still executed as if it were. The application behaves at runtime like it is directly interfacing with the original operating system and all the resources managed by it, but can be isolated or sandboxed to varying degrees. Application virtualization is layered on top of other virtualization technologies, allowing computing resources to be distributed dynamically in real-time. In this context, the term "virtualization" commonly refers to the artifact being encapsulated (application), which is quite different from its meaning in hardware virtualization, where it refers to the artifact being abstracted (physical hardware).

Network Virtualization. Network Virtualization refers to the process of combining hardware and software network resources to create a single pool of resources that make up a virtual network that can be accessed without regard to the physical component. Network virtualization typically involves combining hardware and software network resources and network functionality into a single, software-based administrative entity, a virtual network. Network virtualization involves platform virtualization, often combined with resource virtualization. Network virtualization is categorized as either external virtualization, combining many networks or parts of networks into a virtual unit, or internal virtualization, providing network-like functionality to software containers on a single network server.

Storage Virtualization. Storage virtualization refers to the process of consolidating the physical storage from multiple network storage devices so that it appears to be a single storage unit. Within the context of a storage system, there are two primary types of virtualization that can occur: Block virtualization used in this context refers to the abstraction (separation) of logical storage (partition) from physical storage so that it may be accessed without regard to physical storage or heterogeneous structure. This separation allows the administrators of the storage system greater flexibility in how they manage storage for end users. File virtualization addresses the NAS challenges by eliminating the dependencies between the data accessed at the file level and the location where the files are physically stored. This provides opportunities to optimize storage use and server consolidation and to perform non-disruptive file migrations.

Desktop Virtualization. Desktop virtualization refers to the process of virtualizing desktop computers using virtualization software, such that the desktop computer and the associated operating system and applications are separated from the physical client device that is used to access it. Desktop virtualization is software technology that separates the desktop environment and associated application software from the physical client device that is used to access it.

Desktop virtualization can be used in conjunction with application virtualization and user profile management systems, now termed "user virtualization," to provide a comprehensive desktop environment management system. In this mode, all the components of the desktop are virtualized, which allows for a highly flexible and much more secure desktop delivery model. In addition, this approach supports a more complete desktop disaster recovery strategy as all components are essentially saved in the data center and backed up through traditional redundant maintenance systems. If a user's device or hardware is lost, the restore is straightforward and simple, because the components will be present at login from another device. In addition, because no data is saved to the user's device, if that device is lost, there is much less chance that any critical data can be retrieved and compromised. Virtual Desktop Infrastructure (VDI)— The practice of hosting a desktop environment within a virtual machine that runs on a centralized or remote server.

An example of a virtualization architecture 900 is shown in FIG. 2b, where three virtual machines are exemplified. A Virtual Machine (VM) #1 910a provides virtualization for the application 901a that uses the guest OS 902a, which in turn interfaces with the virtual hardware 903a that emulates the actual hardware. Similarly, a Virtual Machine (VM) #2 910b provides virtualization for the application 901b that uses the guest OS 902b, which in turn interfaces with the virtual hardware 903b that emulates the associated actual hardware, and a Virtual Machine (VM) #3 910c provides virtualization for the application 901c that uses the guest OS 902c, which in turn interfaces with the virtual hardware 903c that emulates the associated actual hardware. The abstraction layer is provided by VMM 904, allowing of hardware-independence of operating system and applications, provisioning on any single physical system, and managing the applications and the OSs as a single encapsulated unit.

A hosted architecture 900a for virtualization is shown in FIG. 2c, where a wide range of actual host hardware 906 may be used by implementing a host operating system 905 layer between the actual hardware 906 and the VMM 904. Such configuration relies on the host OS 905 for device support and physical resource management. In contrast, a bare-metal architecture 900b is shown in FIG. 2d, where a hypervisor layer (in addition to, or as part of, the VMM 904) is used as the first layer, allowing the VMM 904 to have direct access to the hardware resources, hence providing more efficient, and greater scalability, robustness, and performance.

Cloud computing and virtualization is described in a book entitled "*Cloud Computing and Virtualization*" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Extending this further, virtualization creates "location freedom" enabling virtual machines to become portable across an ever-increasing geographical distance. As cloud architectures and multi-tenancy capabilities continue to develop and mature, there is an economy of scale that can be realized by aggregating resources across applications, business units, and separate corporations to a common shared, yet segmented, infrastructure. Elasticity, mobility, automation, and density of virtual machines demand new network architectures focusing on high performance, addressing portability, and the innate understanding of the virtual machine as the new building block of the data center. Consistent network-supported and virtualization-driven policy and controls are necessary for visibility to virtual machines' state and location as they are created and moved across a virtualized infrastructure.

Virtualization technologies in data center environments are described in a eBook authored by Gustavo Alessandro Andrade Santana and published 2014 by Cisco Systems, Inc. (Cisco Press) [ISBN-13: 978-1-58714-324-3] entitled:

"*Data Center Virtualization Fundamentals*", which is incorporated in its entirety for all purposes as if fully set forth herein. PowerVM technology for virtualization is described in IBM RedBook entitled: "*IBM PowerVM Virtualization—Introduction and Configuration*" published by IBM Corporation June 2013, and virtualization basics is described in a paper by IBM Corporation published 2009 entitled: "*Power Systems—Introduction to virtualization*", which are both incorporated in their entirety for all purposes as if fully set forth herein.

Wireless. Any embodiment herein may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "Wireless Technologies" of the publication number 1-587005-001-3 by Cisco Systems, Inc. (July 1999) entitled: "*Internetworking Technologies Handbook*", which is incorporated in its entirety for all purposes as if fully set forth herein. Wireless technologies and networks are further described in a book published 2005 by Pearson Education, Inc. William Stallings [ISBN: 0-13-191835-4] entitled: "*Wireless Communications and Networks—second Edition*", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

ISM. The Industrial, Scientific and Medical (ISM) radio bands are radio bands (portions of the radio spectrum) reserved internationally for the use of radio frequency (RF) energy for industrial, scientific and medical purposes other than telecommunications. In general, communications equipment operating in these bands must tolerate any interference generated by ISM equipment, and users have no regulatory protection from ISM device operation. The ISM bands are defined by the ITU-R in 5.138, 5.150, and 5.280 of the Radio Regulations. Individual countries use of the bands designated in these sections may differ due to variations in national radio regulations. Because communication devices using the ISM bands must tolerate any interference from ISM equipment, unlicensed operations are typically permitted to use these bands, since unlicensed operation typically needs to be tolerant of interference from other devices anyway. The ISM bands share allocations with unlicensed and licensed operations; however, due to the high likelihood of harmful interference, licensed use of the bands is typically low. In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Commonly used ISM bands include a 2.45 GHz band (also known as 2.4 GHz band) that includes the frequency band between 2.400 GHz and 2.500 GHz, a 5.8 GHz band that includes the frequency band 5.725-5.875 GHz, a 24 GHz band that includes the frequency band 24.000-24.250 GHz, a 61 GHz band that includes the frequency band 61.000-61.500 GHz, a 122 GHz band that includes the frequency band 122.000-123.000 GHz, and a 244 GHz band that includes the frequency band 244.000-246.000 GHz.

ZigBee. ZigBee is a standard for a suite of high-level communication protocols using small, low-power digital radios based on an IEEE 802 standard for Personal Area Network (PAN). Applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus the average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirement, may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wifi.org). IEEE 802.11b describes a communication using the 2.4 GHz frequency band and supporting communication rate of 11 Mb/s, IEEE 802.11a uses the GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "*Master Table of Contents & Compliance Requirements—Specification Volume 0*", and in an article published 2012 in Sensors [ISSN 1424-8220] by Carles Gomez et al. [Sensors 2012, 12, 11734-11753; doi:10.3390/s120211734] entitled: "*Overview and Evaluation of Bluetooth Low Energy: An Emerging*

*Low-Power Wireless Technology*", which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

DSRC. Dedicated Short-Range Communication (DSRC) is a one-way or two-way short-range to medium-range wireless communication channels specifically designed for automotive use and a corresponding set of protocols and standards. DSRC is a two-way short-to-medium range wireless communications capability that permits very high data transmission critical in communications-based active safety applications. In Report and Order FCC-03-324, the Federal Communications Commission (FCC) allocated 75 MHz of spectrum in the 5.9 GHz band for use by intelligent transportations systems (ITS) vehicle safety and mobility applications. DSRC serves a short to medium range (1000 meters) communications service and supports both public safety and private operations in roadside-to-vehicle and vehicle-to-vehicle communication environments by providing very high data transfer rates where minimizing latency in the communication link and isolating relatively small communication zones is important. DSRC transportation applications for Public Safety and Traffic Management include Blind spot warnings, Forward collision warnings, Sudden braking ahead warnings, Do not pass warnings, Intersection collision avoidance and movement assistance, Approaching emergency vehicle warning, Vehicle safety inspection, Transit or emergency vehicle signal priority, Electronic parking and toll payments, Commercial vehicle clearance and safety inspections, In-vehicle signing, Rollover warning, and Traffic and travel condition data to improve traveler information and maintenance services.

The European standardization organization European Committee for Standardization (CEN), sometimes in co-operation with the International Organization for Standardization (ISO) developed some DSRC standards: EN 12253: 2004 Dedicated Short-Range Communication—Physical layer using microwave at 5.8 GHz (review), EN 12795:2002 Dedicated Short-Range Communication (DSRC)—DSRC Data link layer: Medium Access and Logical Link Control (review), EN 12834:2002 Dedicated Short-Range Communication—Application layer (review), EN 13372:2004 Dedicated Short-Range Communication (DSRC)—DSRC profiles for RTTT applications (review), and EN ISO 14906: 2004 Electronic Fee Collection—Application interface. An overview of the DSRC/WAVE technologies is described in a paper by Yunxin (Jeff) Li (Eveleigh, N S W 2015, Australia) downloaded from the Internet on July 2017, entitled: "*An Overview of the DSRC/WAVE Technology*", and the DSRC is further standardized as ARIB STD—T75 VERSION 1.0, published September 2001 by Association of Radio Industries and Businesses Kasumigaseki, Chiyoda-ku, Tokyo 100-0013, Japan, entitled: "*DEDICATED SHORT-RANGE COMMUNICATION SYSTEM—ARIB STANDARD Version 1.0*", which are both incorporated in their entirety for all purposes as if fully set forth herein.

IEEE 802.11p. The IEEE 802.11p standard is an example of DSRC and is a published standard entitled: "Part 11: Wireless LAN Medium Access Control (MAC) and Physical Layer (PHY) Specifications Amendment 6: Wireless Access in Vehicular Environments", that adds wireless access in vehicular environments (WAVE), a vehicular communication system, for supporting Intelligent Transportation Systems (ITS) applications. It includes data exchange between high-speed vehicles and between the vehicles and the roadside infrastructure, so called V2X communication, in the licensed ITS band of 5.9 GHz (5.85-5.925 GHz). IEEE 1609 is a higher layer standard based on the IEEE 802.11p, and is also the base of a European standard for vehicular communication known as ETSI ITS-G5.2. The Wireless Access in Vehicular Environments (WAVE/DSRC) architecture and services necessary for multi-channel DSRC/WAVE devices to communicate in a mobile vehicular environment is described in the family of IEEE 1609 standards, such as IEEE 1609.1-2006 Resource Manager, IEEE Std 1609.2 Security Services for Applications and Management Messages, IEEE Std 1609.3 Networking Services, IEEE Std 1609.4 Multi-Channel Operation IEEE Std 1609.5 Communications Manager, as well as IEEE P802.1ip Amendment: "*Wireless Access in Vehicular Environments*".

As the communication link between the vehicles and the roadside infrastructure might exist for only a short amount of time, the IEEE 802.11p amendment defines a way to exchange data through that link without the need to establish a Basic Service Set (BSS), and thus, without the need to wait for the association and authentication procedures to complete before exchanging data. For that purpose, IEEE 802.11p enabled stations use the wildcard BSSID (a value of all Is) in the header of the frames they exchange, and may start sending and receiving data frames as soon as they arrive on the communication channel. Because such stations are neither associated nor authenticated, the authentication and data confidentiality mechanisms provided by the IEEE 802.11 standard (and its amendments) cannot be used. These kinds of functionality must then be provided by higher network layers. IEEE 802.11p standard uses channels within the 75 MHz bandwidth in the 5.9 GHz band (5.850-5.925 GHz). This is half the bandwidth, or double the transmission time for a specific data symbol, as used in 802.11a. This allows the receiver to better cope with the characteristics of the radio channel in vehicular communications environments, e.g., the signal echoes reflected from other cars or houses.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi, and mobile broadband access. In addition to telephony, the Smartphones may support a wide variety of other services such as text messaging, MMS, email, Internet access, short-range wireless communications (infrared, Bluetooth), business applications, gaming and photography.

Android is an open source and Linux-based mobile oper-ating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example, adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the home-screen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publi-cation entitled: "*Android Tutorial*", downloaded from tuto-rialspoint.com on July 2014, which is incorporated in its entirety for all purposes as if fully set forth herein.

iOS (previously iPhone OS) from Apple Inc. (headquar-tered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interac-tion with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: "*IOS Tutorial*", downloaded from tutorialspoint-.com on July 2014, which is incorporated in its entirety for all purposes as if fully set forth herein.

A diagrammatic representation of an example of a smart-phone or another machine that may include the computing device 65 within which a set of instructions, for causing the machine to perform any one or more of the methods dis-cussed herein, may be executed. An example of the device 65 that may be used with any of the steps, methods, or flow-charts herein is schematically described as part of an arrangement 60 shown in FIG. 6. The components in the device 65 communicate over a bus 62, which may corre-spond with the bus 13 in the computer 11. The computing device 65 may include a mobile phone, a smart phone, a netbook computer, a rackmount server, a router computer, a server computer, a personal computer, a mainframe com-puter, a laptop computer, a tablet computer, a desktop computer etc., within which a set of instructions, for causing the machine to perform any one or more of the methods discussed herein, may be executed. In alternative embodi-ments, the machine may be connected (e.g., networked) to other machines in an LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The device 65 may also include an interface bus for facilitating communication from various interface devices (for example, one or more output components 64, one or more peripheral interfaces, and one or more communication components such as the wireless transceiver 28) to the basic configuration via the bus/interface controller that controls the bus 62. Some of the exampled output components include a graphics processing unit and an audio processing unit, which may be configured to communicate to various external devices such as a display or speakers via one or more A/V ports. One or more example peripheral interfaces may include a serial interface controller or a parallel inter-face controller, which may be configured to communicate with external devices such as input components (for example, keyboard, mouse, pen, voice input device, touch input device, etc.) or other peripheral output devices (for example, printer, scanner, etc.) via one or more I/O ports.

The device 65 may be part of, may include, or may be integrated with, a general-purpose computing device, arranged in accordance with at least some embodiments described herein. In an example basic configuration, the device 65 may include one or more processors 12 and one or more memories or any other computer readable media. A dedicated memory bus may be used to communicate between the processor 12 and the device memories, such as the ROM 15$b$, the main memory 15$a$, and a storage 63. Depending on the desired configuration, the processor 12 may be of any type, including but not limited to a micro-processor (μP), a microcontroller (μC), a digital signal processor (DSP), or any combination thereof. The processor 12 may include one or more levels of caching, such as a cache memory, a processor core, and registers. The example processor core may include an arithmetic logic unit (ALU), a floating-point unit (FPU), a digital signal processing core (DSP Core), or any combination thereof. An example memory controller may also be used with the processor 12, or in some implementations, the memory controller may be an internal part of the processor 12.

Depending on the desired configuration, the device memories may be of any type including but not limited to volatile memory (such as RAM), non-volatile memory (such as ROM, flash memory, etc.) or any combination thereof. The storage 63 may correspond to the storage device 15c, and may be part of, may comprise, or may be integrated with the ROM 15b and the main memory 15a. The storage 63 may include an operating system 67c, instruction set 67b that may include steps or part or whole of the flow-charts described herein, and a database 67a. The storage 63 may further include a control module, and program data, which may include path data. Any of the memories or storages of the device 65 may include read-only memory (ROM), such as ROM 15b, flash memory, Dynamic Random Access Memory (DRAM) such as synchronous DRAM (SDRAM), a static memory (e.g., flash memory, Static Random Access Memory (SRAM)) and a data storage device, which communicate with each other via the bus 62.

The device 65 may further comprise a sensor 69 connected to the bus 62. The device 65 may have additional features or functionality, and additional interfaces to facilitate communications between the basic configuration shown in FIG. 6 and any desired devices and interfaces. For example, a bus/interface controller may be used to facilitate communications between the basic configuration and one or more data storage devices via a storage interface bus. The data storage devices may be one or more removable storage devices, one or more non-removable storage devices, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The device 65 may receive inputs from a user 66 via an input component 68, which may correspond with the input device 18 or cursor control 18a shown as part of the computer 11 in FIG. 1, or may correspond with the pointing device 3 or the keyboard 2 shown as part of the computer system 7 in FIG. 1a. The device 65 notifies or outputs information to the user 66 using an output component 64, which may correspond to the display 17 shown as part of the computer 11 in FIG. 1, or may correspond with the printer 4 or the screen 5 shown as part of the computer system 7 in FIG. 1a.

The interface with the user 66 may be based on the input component 68 and the output component 64. Such user 66 interface may be according to, or based on, a paper authored by Christopher Nowakowski (of California PATH, University of California, Berkeley), and Paul Green and Omer Tsimhoni (both of University of Michigan Transportation Research Institute (UMTRI)) entitled: "Common Automotive Navigation System Usability Problems and a Standard Test Protocol to Identify Them" [doi=10.1.1.458.1475] (downloaded from the Internet on October 2017), or may be according to, or based on, Society of Automotive Engineers, Inc. (SAE) standard J2365 (issued May 2002) and entitled:

"Calculation of the Time to Complete In-Vehicle Navigation and Route Guidance Tasks", which are both incorporated in their entirety for all purposes as if fully set forth herein. Further, the user 66 interface may be according to, or based on, SAE standard J2364 (Document No. J2364_201506 published and stabilized 2015-06-18 entitled: "Navigation and Route Guidance Function Accessibility While Driving".

The input component 68 may be a piece of computer hardware equipment used to provide data and control signals to an information processing system such as a computer or information appliance. Such input component 68 may be an integrated or a peripheral input device (e.g., hard/soft keyboard, mouse, resistive or capacitive touch display, etc.). Examples of input components include keyboards, mouse, scanners, digital cameras and joysticks. Input components 68 can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input components used to specify a position in space, can further be classified according to whether the input is direct or indirect. With direct input, the input space coincides with the display space, i.e., pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned.

The output component 64 may include a color display for displaying screen elements or for organizing on-screen items and controls for data entry. Further, the device may support the display of split-screen views (e.g., map view and turn-by-turn, map view and turn list, etc.), as is common in many navigation systems. The input component 68 may include dedicated hard controls for frequently used/accessed functions (e.g., repeat system message). Many systems used re-configurable keys/buttons whose function change depending on the application. Typically, a switch is used to activate the voice recognition system and it may increase system reliability. The input component 68 and the output component 64 may further cooperate to provide both auditory and visual feedback to confirm driver inputs and availability of the speech command. Further, a strategy to alert drivers through auditory tones/beeps in advance of the presentation of information, and/or changes in display status, may be used. This may limit the need for drivers to continuously monitor the system, or repeat system messages.

The device 65 may serve as a client device and may access data, such as retrieving data from, or sending data to, the server 23a over the Internet 22, such as via the ISP 16 as described in FIG. 1 above. The communication with the server 23a may be via a wireless network 39, by using the antenna 29 and the wireless transceiver 28 in the device 65.

In the case of wireless networking, the wireless network 39 may use any type of modulation, such as Amplitude Modulation (AM), a Frequency Modulation (FM), or a Phase Modulation (PM). Further, the wireless network 39 may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in a wireless transceiver is SPBT2632C1A Bluetooth module available from STMicroelectronics NV and described in the data sheet DocID022930 Rev. 6 dated April 2015 entitled: "*SPBT2632C1A—Bluetooth® technology class-*1 *module*", which is incorporated in its entirety for all purposes as if fully set forth herein.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on, or may be compatible with, wireless technologies that are described in Chapter 20: "Wireless Technologies" of the publication number 1-587005-001-3 by Cisco Systems, Inc. (July 1999) entitled: "*Internetworking Technologies Handbook*", which is incorporated in its entirety for all purposes as if fully set forth herein.

Alternatively or in addition, the networking or the communication with the of the wireless-capable device 65 with the server 23*a* over the wireless network 39 may be using, may be according to, may be compatible with, or may be based on, Near Field Communication (NFC) using passive or active communication mode, and may use the 13.56 MHz frequency band, and data rate may be 106 Kb/s, 212 Kb/s, or 424 Kb/s, and the modulation may be Amplitude-Shift-Keying (ASK), and may be according to, may be compatible with, or based on, ISO/IEC 18092, ECMA-340, ISO/IEC 21481, or ECMA-352. In such a case, the wireless transceiver 28 may be an NFC transceiver and the respective antenna 29 may be an NFC antenna.

Alternatively or in addition, the networking or the communication with the of the wireless-capable device 65 with the server 23*a* over the wireless network 39 may be using, may be according to, may be compatible with, or may be based on, a Wireless Personal Area Network (WPAN) that may be according to, may be compatible with, or based on, Bluetooth™ or IEEE 802.15.1-2005 standards, and the wireless transceiver 28 may be a WPAN modem, and the respective antenna 29 may be a WPAN antenna. The WPAN may be a wireless control network according to, may be compatible with, or based on, ZigBee™ or Z-Wave™ standards, such as IEEE 802.15.4-2003.

Alternatively or in addition, the networking or the communication with the of the wireless-capable device 65 with the server 23*a* over the wireless network 39 may be using, may be according to, may be compatible with, or may be based on, a Wireless Local Area Network (WLAN) that may be according to, may be compatible with, or based on, IEEE 802.11a, IEEE 802.11b, IEEE 802.11g, IEEE 802.11n, or IEEE 802.11ac standards, and the wireless transceiver 28 may be a WLAN modem, and the respective antenna 29 may be a WLAN antenna.

Alternatively or in addition, the networking or the communication with the of the wireless-capable device 65 with the server 23*a* over the wireless network 39 may be using, may be according to, may be compatible with, or may be based on, a wireless broadband network or a Wireless Wide Area Network (WWAN), and the wireless transceiver 28 may be a WWAN modem, and the respective antenna 29 may be a WWAN antenna. The WWAN may be a WiMAX network such as according to, may be compatible with, or based on, IEEE 802.16-2009, and the wireless transceiver 28 may be a WiMAX modem, and the respective antenna 29 may be a WiMAX antenna. Alternatively or in addition, the WWAN may be a cellular telephone network and the wireless transceiver 28 may be a cellular modem, and the respective antenna 29 may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on, or may be compatible with, IEEE 802.20-2008. Alternatively or in addition, the WWAN may be a satellite network, and the wireless transceiver 28 may be a satellite modem, and the respective antenna 29 may be a satellite antenna.

Alternatively or in addition, the networking or the communication with the of the wireless-capable device 65 with the server 23*a* over the wireless network 39 may be using, may be according to, may be compatible with, or may be based on, a licensed or an unlicensed radio frequency band, such as the Industrial, Scientific and Medical (ISM) radio band. For example, an unlicensed radio frequency band may be used that may be about 60 GHz, may be based on beamforming, and may support a data rate of above 7 Gb/s, such as according to, may be compatible with, or based on, WiGig™, IEEE 802.11ad, WirelessHD™ or IEEE 802.15.3c-2009, and may be operative to carry uncompressed video data, and may be according to, may be compatible with, or based on, WHDI™. Alternatively or in addition, the wireless network may use a white space spectrum that may be an analog television channel consisting of a 6 MHz, 7 MHz or 8 MHz frequency band, and allocated in the 54-806 MHz band. The wireless network may be operative for channel bonding, and may use two or more analog television channels, and may be based on Wireless Regional Area Network (WRAN) standard using OFDMA modulation. Further, the wireless communication may be based on geographically-based cognitive radio, and may be according to, may be compatible with, or based on, IEEE 802.22 or IEEE 802.11af standards.

Alternatively or in addition, the wireless network 39 may use a Dedicated Short-Range Communication (DSRC), that may be according to, compatible with, or based on, European Committee for Standardization (CEN) EN 12253:2004, EN 12795:2002, EN 12834:2002, EN 13372:2004, or EN ISO 14906:2004 standard, or may be according to, compatible with, or based on, IEEE 802.11p, IEEE 1609.1-2006, IEEE 1609.2, IEEE 1609.3, IEEE 1609.4, or IEEE1609.5. In such a case, the wireless transceiver 28 may be a DSRC modem, and the respective antenna 29 may be a DSRC antenna.

A mobile application on a mobile device communicates with a head-unit of a navigation system is disclosed in U.S. Pat. No. 8,762,059 to Balogh entitled: "Navigation system application for mobile device", which is incorporated in its entirety for all purposes as if fully set forth herein. The mobile application may retrieve data such as map data, user input data, and other data and communicate the updates to the head unit. By retrieving map data through the mobile application, the head unit may be updated much easier than systems of the prior art. The data may be retrieved through cellular networks, Wi-Fi networks, or other networks which accessible to a user and compatible with the mobile device. Updates may be stored in the mobile device and automatically uploaded to the navigation system head unit when the user is in the vicinity of the head unit. The mobile application may establish a logical connection with one or more head units. The logical connection bounds the mobile application to the head unit and allows for data sharing and synchronization.

Systems and methods for promoting connectivity between a mobile communication device having a touch screen and a vehicle touch screen installed in a vehicle are disclosed in U.S. Pat. No. 9,535,602 to Gutentag et al. entitled: "System and method for promoting connectivity between a mobile communication device and a vehicle touch screen", which is incorporated in its entirety for all purposes as if fully set forth herein. According to an embodiment, a system may include a controller configured to: connect to the mobile communication device and to the vehicle touch screen. The controller may also be configured to receive video signal of a current screen video image shown on the touch screen of the mobile communication device and transmit the current video image to the vehicle touch screen, causing a corresponding video image of the current screen video image to be displayed on the vehicle touch screen. The controller may further be configured to receive a signal indicative of a touch action that was performed on the vehicle touch screen, and cause the mobile communication device to respond as if a touch action corresponding to the touch action that was performed on the vehicle touch screen was performed on the touch screen of the mobile communication device.

A system and method for connection management between a consumer device and a vehicle is disclosed in U.S. Patent Application Publication No. 2013/0106750 to Kurosawa entitled: "Connecting Touch Screen Phones in a Vehicle", which is incorporated in its entirety for all purposes as if fully set forth herein. The connection management is performed automatically using a computing device, e.g., an application executing on a smartphone. The system and method configure the vehicle and consumer device in a manner that the screen display of the consumer device is mirrored on a touch panel of the in-vehicle computer system and the consumer device is controlled remotely by the user using the touch panel of the in-vehicle computer system.

A multi-screen display device and program of the same is disclosed in U.S. Patent Application Publication No. 2009/0171529 to Hayatoma entitled: "Multi-screen display device and program of the same", which is incorporated in its entirety for all purposes as if fully set forth herein. Any navigation device herein may be based on, or may comprise, the navigation system described therein. The multi display screen is constituted of a wide-screen displaying simultaneously two or more of a navigation search control screen setting necessary requirements to search for a route from a place of departure to a destination of a vehicle, a navigation map screen displaying the position of the vehicle on a map, a night vision screen recognizing an object on a road at night by infrared, a back guide monitor screen for recognizing a rear side of the vehicle, a blind corner monitor screen for recognizing an orthogonal direction of the vehicle, and a hands-free transmission/reception screen of a car phone. Screens to be displayed on the multi-display screen constituted of the wide screen is selected according to a vehicle driving state detected in a vehicle driving state detecting unit, and a display on the multi-display screen of a "screen 1", a "screen 2", and a "screen 3" constituted of the wide screen is determined according to the vehicle driving state detected in the vehicle driving state detecting unit.

An engine control device and method for use in a vehicle incorporating an internal combustion engine and a motor that are capable of transmitting motive power to an axle is disclosed in U.S. Patent Application Publication No. 2010/0280737 to Ewert et al. entitled: "Engine Control Device and Method for a Hybrid Vehicle", which is incorporated in its entirety for all purposes as if fully set forth herein. The device has an engine utilization reduction portion configured to reduce the power supplied by the engine when a requested engine power is above a predefined engine power minimum value when the device is in a hybrid mode thereby increasing power provided by the electric motor. The device also may have a computer readable engine off portion configured to prevent the engine from starting or consuming fuel thereby causing the vehicle to be directionally powered by the electric motor only. The device may also have a warm up portion configured to operate the engine in warmup mode and limit the power supplied by the engine when the engine temperature is below a predefined engine operating temperature thereby reducing emissions during engine warmup.

A handsfree apparatus is disclosed in U.S. Patent Application Publication No. 2010/0210315 to Miyake entitled: "Handsfree Apparatus", which is incorporated in its entirety for all purposes as if fully set forth herein. The apparatus notifies a user of the reception of a mail if the reception of the mail by a cellular phone happens during a call, and stores an unread history of the received mail in a memory unit if a mail content display operation is not performed. Further, the handsfree apparatus notifies the user of the unread history of the received mail when Bluetooth connection link to the cellular phone having received the mail is disconnected, thereby enabling the received mail to be recognized by the user.

A system and method for implementing cross-network synchronization of nodes on a vehicle bus is disclosed in U.S. Patent Application Publication No. 2012/0278507 to Menon et al. entitled: "Cross-network synchronization of application s/w execution using flexray global time", which is incorporated in its entirety for all purposes as if fully set forth herein. The system and method include periodically sampling a notion of time from a first network, transmitting a message from the first network to a node on a second network, wherein the message includes the notion of time, and updating a local clock on the second network node based on the notion of time in the message.

Methods and devices supporting the management of a plurality of electronic devices and processing of update information for updating software and/or firmware in the electronic devices are disclosed in U.S. Patent Application Publication No. 2012/0210315 to Kapadekar et al. entitled: "Device management in a network", which is incorporated in its entirety for all purposes as if fully set forth herein. Prompting of users may be made using a language associated with the electronic device, and authorization to update an electronic device may be secured using a subscriber identity module An in-car information system that includes a portable information terminal and an in-car device is disclosed in U.S. Patent Application Publication No. 2013/0298052 to NARA et al. entitled: "In-Car Information System, Information Terminal, And Application Execution Method", which is incorporated in its entirety for all purposes as if fully set forth herein. The information terminal identifies a specific application being executed in the foreground and transmits restriction information pertaining to the particular application to the in-car device. The in-car device either allows or disallows, based upon the restriction information transmitted from the information terminal, image display corresponding to the application being executed in the foreground and transmission of operation information corresponding to an input operation.

A vehicle control system that includes a display device located in a vehicle. The display device displays a plurality of display icons with one of the display icons representing an active display icon is disclosed in U.S. Patent Application Publication No. 2015/0378598 to Takeshi entitled: "Touch control panel for vehicle control system", which is incorporated in its entirety for all purposes as if fully set forth herein. A touchpad is located in the vehicle remote from the display device. The touchpad provides virtual buttons corresponding to the display icons that have relative orientations corresponding to the display icons. The touchpad establishes a home location on the touchpad based on a location where a user of the vehicle touches the touchpad. The home location corresponds to the active display icon such that the virtual button representing the active display icon is located at the home location and the other virtual buttons are oriented about the home location.

A WiFi wireless rear view parking system comprises a main body, a camera sensor, a Wifi transmission module, a mobile personal electronics device, is disclosed in U.S. Patent Application Publication No. 2016/0127693 to Chung entitled: "WiFi Wireless Rear View Parking System", which is incorporated in its entirety for all purposes as if fully set forth herein. The main body is installed at a license plate of an automobile. The camera sensor is provided in the main body for sensing images and video of rear regions of the automobile and generating images and video data. The Wifi transmission module transmits the image and video data from the camera. The mobile personal electronic device is for receiving image and video data transmitted by the Wifi transmission module and displaying them. The WiFi wireless rear view parking system provides rear view of the automobile to a driver. The mobile personal electronic device includes a smartphone.

An image display device, which detects image characteristic information from an image of a screen provided by a mobile terminal, is disclosed in U.S. Patent Application Publication No. 2012/0242687 to CHOI entitled: "Image processing apparatus and image processing method", which is incorporated in its entirety for all purposes as if fully set forth herein. The device extracts a characteristic area based on the image characteristic information, and automatically magnifies or reduces the extracted characteristic area and displays the same, to thereby allow a user to conveniently and effectively view the image provided from the mobile terminal in a vehicle. The image display device includes: a communication unit configured to receive an image from a mobile terminal; a controller configured to detect image characteristic information of the received image, extract a first area on the basis of the detected image characteristic information, determine an image processing scheme with respect to the extracted first area, and process an image corresponding to the extracted first area according to the determined image processing scheme; and a display unit configured to display the processed image.

A system and method in a building or vehicle for an actuator operation in response to a sensor according to a control logic are disclosed in U.S. Patent Application Publication No. 2013/0201316 to Binder et al. entitled: "System and method for server based control", which is incorporated in its entirety for all purposes as if fully set forth herein. The system comprising a router or a gateway communicating with a device associated with the sensor and a device associated with the actuator over in-building or in-vehicle networks, and an external Internet-connected control server associated with the control logic implementing a PID closed linear control loop and communicating with the router over external network for controlling the in-building or in-vehicle phenomenon. The sensor may be a microphone or a camera, and the system may include voice or image processing as part of the control logic. A redundancy is used by using multiple sensors or actuators, or by using multiple data paths over the building or vehicle internal or external communication. The networks may be wired or wireless, and may be BAN, PAN, LAN, WAN, or home networks.

A system that includes a database that stores an expert knowledgebase, and one or more servers configured to implement an expert system, is disclosed in U.S. Pat. No. 8,600,831 to Xiao et al. entitled: "Automated automobile maintenance using a centralized expert system", which is incorporated in its entirety for all purposes as if fully set forth herein. The one or more servers receive sensor data associated with sensors from automobile maintenance systems associated with respective ones of multiple automobiles, and analyze the sensor data, using the expert system and the expert knowledgebase, to diagnose whether the multiple automobiles require maintenance and/or repair. The one or more servers send, via a network, results of the analysis of the sensor data to service stations for scheduling maintenance and/or repair of the multiple automobiles.

The Wireless Integrated Network Sensor Next Generation (WINS NG) nodes provide distributed network and Internet access to sensors, controls, and processors that are deeply embedded in equipment, facilities, and the environment, and are disclosed in U.S. Patent Application Publication No. 2015/0046582 to Gelvin et al. entitled: "Apparatus for internetworked wireless integrated network sensors (wins)", which is incorporated in its entirety for all purposes as if fully set forth herein. The WINS NG network is a new monitoring and control capability for applications in transportation, manufacturing, health care, environmental monitoring, and safety and security. The WINS NG nodes combine microsensor technology, low power distributed signal processing, low power computation, and low power, low cost wireless and/or wired networking capability in a compact system. The WINS NG networks provide sensing, local control, remote reconfigurability, and embedded intelligent systems in structures, materials, and environments.

Geolocation. Geolocation is the identification or estimation of the real-world geographic location of an object, such as a mobile phone or an Internet-connected computer terminal. Typically, geolocation involves the generation of a set of geographic coordinates that may be used to determine a meaningful location, such as a street address. For either geolocating or positioning, the locating engine often uses Radio-Frequency (RF) location methods, for example Time-Difference-Of-Arrival (TDOA) for precision, where the TDOA often utilizes mapping displays or other geographic information system. When a GPS signal is unavailable, geolocation applications can use information from cell towers to triangulate the approximate position.

Internet and computer geolocation can be performed by associating a geographic location with the Internet Protocol (IP) address, MAC address, RFID, hardware embedded article/production number, embedded software number (such as UUID, Exif/IPTC/XMP or modern steganography), invoice, Wi-Fi positioning system, device fingerprint, canvas fingerprinting, or device GPS coordinates. Geolocation may work by automatically looking up an IP address on a WHOIS service and retrieving the registrant's physical address. IP address location data can include information such as country, region, city, postal/zip code, latitude, longitude, and timezone.

Location may further be determined by one or more ranging or angulating methods, such as Angle of arrival (AoA), Line-of-Sight (LoS), Time of arrival (ToA), Multi-lateration (Time difference of arrival) (TDoA), Time-of-flight (ToF), Two-way ranging (TWR), Symmetrical Double Sided—Two Way Ranging (SDS-TWR), or Near-field electromagnetic ranging (NFER).

An Angle-of-Arrival (AoA) method may be used for determining the direction of propagation of a Radio-Frequency (RF) wave incident on an antenna array. AoA determines the direction by measuring the Time-Difference-of-Arrival (TDOA) at individual elements of the array, and the AoA is calculated based on these delays. Line-of-Sight (LoS) propagation is a characteristic of electromagnetic radiation or acoustic wave propagation, which means waves that travel in a direct path from the source to the receiver. Electromagnetic transmission includes light emissions traveling in a straight line. The rays or waves may be diffracted, refracted, reflected, or absorbed by atmosphere and obstructions with material and generally cannot travel over the horizon or behind obstacles. Time-of-Arrival (TOA or ToA) (also referred to as Time-of-Flight (ToF), is the travel time of a radio signal from a single transmitter to a remote single receiver. Compared to the TDOA technique, time-of-arrival uses the absolute time of arrival at a certain base station rather than the measured time difference between departing from one and arriving at the other station. The distance can be directly calculated from the time of arrival as signals travel with a known velocity. Time of arrival data from two base stations will narrow a position to a position circle; data from a third base station is required to resolve the precise position to a single point.

Time-of-Flight (TOF) describes a variety of methods that measure the time that it takes for an object, particle or acoustic, electromagnetic or other wave to travel a distance through a medium. This measurement can be used for a time standard (such as an atomic fountain), as a way to measure velocity or path length through a given medium, or as a way to learn about the particle or medium (such as composition or flow rate). The traveling object may be detected directly (e.g., ion detector in mass spectrometry) or indirectly (e.g., light scattered from an object in laser Doppler velocimetry). Symmetrical Double-Sided Two-Way Ranging (SDS-TWR) is a ranging method that uses two delays that naturally occur in signal transmission to determine the range between two stations, using a signal propagation delay between two wireless devices and processing delay of acknowledgements within a wireless device. Near-Field Electromagnetic Ranging (NFER) refers to any radio technology employing the near-field properties of radio waves as a Real Time Location System (RTLS). Near-field Electromagnetic Ranging employs transmitter tags and one or more receiving units. Operating within a half-wavelength of a receiver, transmitter tags must use relatively low frequencies (less than 30 MHz) to achieve significant ranging. Depending on the choice of frequency, NFER has the potential for range resolution of 30 cm (1 ft) and ranges up to 300 m (1,000 ft).

A localization in wireless environment may use triangulation, trilateration, or multilateration. Triangulation, which uses the measurement of absolute angles, is the process of determining the location of a point by forming triangles to it from known points. Specifically in surveying, triangulation per se involves only angle measurements, rather than measuring distances to the point directly as in trilateration; the use of both angles and distance measurements is referred to as triangulateration. Trilateration is the process of determining absolute or relative locations of points by measurement of distances, using the geometry of circles, spheres or triangles. Trilateration typically uses distances or absolute measurements of time-of-flight from three or more sites, and does have practical applications in surveying and navigation, including global positioning systems (GPS). In contrast to triangulation, it does not involve the measurement of angles. In two-dimensional geometry, it is known that if a point lies on two circles, then the circle centers and the two radii provide sufficient information to narrow the possible locations down to two. Additional information may narrow the possibilities down to one unique location. In three-dimensional geometry, when it is known that a point lies on the surfaces of three spheres, then the centers of the three spheres along with their radii provide sufficient information to narrow the possible locations down to no more than two (unless the centers lie on a straight line).

Multilateration (MLAT) is a surveillance technique based on the measurement of the difference in distance to two stations at known locations by broadcast signals at known times. Unlike measurements of absolute distance or angle, measuring the difference in distance between two stations results in an infinite number of locations that satisfy the measurement. When these possible locations are plotted, they form a hyperbolic curve. To locate the exact location along that curve, multilateration relies on multiple measurements: a second measurement taken to a different pair of stations will produce a second curve, which intersects with the first. When the two curves are compared, a small number of possible locations are revealed, producing a "fix". Multilateration is a common technique in radio navigation systems, where it is known as hyperbolic navigation. These systems are relatively easy to construct as there is no need for a common clock, and the difference in the signal timing can be measured visibly using an oscilloscope.

Wireless indoor positioning systems are described in a paper by Hui Liu (Student Member, IEEE), Houshang Darabi (Member, IEEE), Pat Banerjee, and Jing Liu published in IEEE TRANSACTIONS ON SYSTEMS, MAN, AND CYBERNETICS-PART C: APPLICATIONS AND REVIEWS, VOL. 37, NO. 6, November 2007 [1094-6977/$25.00 © 2007 IEEE] entitled: "*Survey of Wireless Indoor Positioning Techniques and Systems*", which is incorporated in its entirety for all purposes as if fully set forth herein. The paper describes systems that have been successfully used in many applications such as asset tracking and inventory management, and provides an overview of the existing wireless indoor positioning solutions and attempts to classify different techniques and systems. Three typical location estimation schemes of triangulation, scene analysis, and proximity are described. The paper further discusses location fingerprinting in detail, since it is used in most current system or solutions. A set of properties is examined by which location systems are evaluated, and this evaluation method is used to survey a number of existing systems. Comprehensive performance comparisons including accuracy, precision, complexity, scalability, robustness, and cost are presented.

An overview of various algorithms for wireless position estimation is presented in a paper by Sinan Gezici Published 2 Oct. 2007 by Springer Science+Business Media, LLC [Wireless Pers Commun (2008) 44:263-282, DOI 10.1007/s11277-007-9375-z]entitled: "A Survey on Wireless Position Estimation", which is incorporated in its entirety for all purposes as if fully set forth herein. Although the position of a node in a wireless network can be estimated directly from the signals traveling between that node and a number of reference nodes, it is more practical to estimate a set of signal parameters first, and then to obtain the final position estimation using those estimated parameters. In the first step of such a two-step positioning algorithm, various signal parameters such as time of arrival, angle of arrival or signal strength are estimated. In the second step, mapping, geometric or statistical approaches are commonly employed. In addition to various positioning algorithms, theoretical limits on their estimation accuracy are also presented in terms of Cramer-Rao lower bounds.

For outdoor positioning service the Global Positioning Systems (GPS) are the earliest widely used modern systems. In GPS technology Satellite signals cannot penetrate in indoor environment since they are blocked by building obstructions thus satellite signal cannot provide good accuracy in indoor environments due to lack of LoS (Line Of Sight). Indoor positioning techniques are described in a paper by Siddhesh Doiphode, J. W. Bakal, and Madhuri Gedam, published in International Journal of Computer Applications (0975 8887) Volume 140—No. 7, April 2016, entitled: "Survey of Indoor Positioning Measurements, Methods and Techniques", which is incorporated in its entirety for all purposes as if fully set forth herein. The paper describes a large variety of technologies that have been designed for dealing with the problem since the indoor environments are very difficult to track. The paper also provide brief description on various indoor wireless tracking measurements, methodologies and technologies. The paper illustrates the theoretical points, the main tools, and the most promising technologies for indoor tracking infrastructure.

Various localization techniques are described in a paper by Santosh Pandey and Prathima Agrawal, and published in the Journal of the Chinese Institute of Engineers, Vol. 29, No. 7, pp. 1125-1148 (2006), entitled: "A SURVEY ON LOCALIZATION TECHNIQUES FOR WIRELESS NETWORKS", which is incorporated in its entirety for all purposes as if fully set forth herein. Wireless networks have displaced the well-established and widely deployed wired communication networks of the past. Tetherless access and new services offered to mobile users contribute to the popularity of these networks, thus users have access from many locations and can roam ubiquitously. The knowledge of the physical location of mobile user devices, such as phones, laptops and PDAs, is important in several applications such as network planning, location based services, law enforcement and for improving network performance. A device's location is usually estimated by monitoring a distance dependent parameter such as wireless signal strength from a base station whose location is known. In practical deployments, signal strength varies with time and its relationship to distance is not well defined. This makes location estimation difficult. Many location estimation or localization schemes have been proposed for networks adopting a variety of wireless technologies. This paper reviews a broad class of localization schemes that are differentiated by the fundamental techniques adopted for distance estimation, indoor vs. outdoor environments, relative cost and accuracy of the resulting estimates and ease of deployment.

IP-Based Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, Language, proxies, company name, US DMA/MSA, NAICS codes, and home/business classification. The geolocation is further described in the publication entitled: "Towards Street-Level Client-Independent IP Geolocation" by Yong Wang et al., downloaded from the Internet on July 2014, and in an Information Systems Audit and Control Association (ISACA) 2011 white paper entitled: "Geolocation: Risk, Issues and Strategies", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating web-site http://ipinfodb-.com, and by Max Mind, Inc., based in Waltham, Massachusetts, U.S.A., operating the web-site www.maxmind-.com/en/home.

Further, the W3C Geolocation API is an effort by the World Wide Web Consortium (W3C) to standardize an interface to retrieve the geographical location information for a client-side device. It defines a set of objects, ECMA Script standard compliant, executing in the client application, give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al. entitled: "Geolocation-based Addressing Method for IPv6 Addresses", and in U.S. Pat. No. 6,236,652 to Preston et al. entitled: "Geo-spacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

GPS. The Global Positioning System (GPS) is a space-based radio navigation system owned by the United States government and operated by the United States Air Force. It is a global navigation satellite system that provides geolocation and time information to a GPS receiver anywhere on or near the Earth where there is an unobstructed line of sight to four or more GPS satellites. The GPS system does not require the user to transmit any data, and it operates independently of any telephonic or internet reception, though these technologies can enhance the usefulness of the GPS positioning information. The GPS system provides critical positioning capabilities to military, civil, and commercial users around the world. The United States government created the system, maintains it, and makes it freely accessible to anyone with a GPS receiver. In addition to GPS, other systems are in use or under development, mainly because of a potential denial of access by the US government. The Russian Global Navigation Satellite System (GLONASS) was developed contemporaneously with GPS, but suffered from incomplete coverage of the globe until the mid-2000s. GLONASS can be added to GPS devices, making more satellites available and enabling positions to be fixed more quickly and accurately, to within two meters. There are also the European Union Galileo positioning system, China's BeiDou Navigation Satellite System and India's NAVIC.

The Indian Regional Navigation Satellite System (IRNSS) with an operational name of NAVIC ("sailor" or "navigator" in Sanskrit, Hindi and many other Indian languages, which also stands for NAVigation with Indian Constellation) is an autonomous regional satellite navigation system, that provides accurate real-time positioning and timing services. It covers India and a region extending 1,500 km (930 mi) around it, with plans for further extension. NAVIC signals will consist of a Standard Positioning Service and a Precision Service. Both will be carried on L5 (1176.45 MHz) and S band (2492.028 MHz). The SPS signal will be modulated by a 1 MHz BPSK signal. The Precision Service will use BOC(5,2). The navigation signals themselves would be transmitted in the S-band frequency (2-4 GHz) and broadcast through a phased array antenna to maintain required coverage and signal strength. The satellites would weigh approximately 1,330 kg and their solar panels generate 1,400 watts. A messaging interface is embedded in the NavIC system. This feature allows the command center to send warnings to a specific geographic area. For example, fishermen using the system can be warned about a cyclone.

The GPS concept is based on time and the known position of specialized satellites, which carry very stable atomic clocks that are synchronized with one another and to ground clocks, and any drift from true time maintained on the ground is corrected daily. The satellite locations are known with great precision. GPS receivers have clocks as well; however, they are usually not synchronized with true time, and are less stable. GPS satellites continuously transmit their current time and position, and a GPS receiver monitors multiple satellites and solves equations to determine the precise position of the receiver and its deviation from true time. At a minimum, four satellites must be in view of the receiver for it to compute four unknown quantities (three position coordinates and clock deviation from satellite time).

Each GPS satellite continually broadcasts a signal (carrier wave with modulation) that includes: (a) A pseudorandom code (sequence of ones and zeros) that is known to the receiver. By time-aligning a receiver-generated version and the receiver-measured version of the code, the Time-of-Arrival (TOA) of a defined point in the code sequence, called an epoch, can be found in the receiver clock time scale. (b) A message that includes the Time-of-Transmission (TOT) of the code epoch (in GPS system time scale) and the satellite position at that time. Conceptually, the receiver measures the TOAs (according to its own clock) of four satellite signals. From the TOAs and the TOTs, the receiver forms four Time-Of-Flight (TOF) values, which are (given the speed of light) approximately equivalent to receiver-satellite range differences. The receiver then computes its three-dimensional position and clock deviation from the four TOFs. In practice, the receiver position (in three dimensional Cartesian coordinates with origin at the Earth's center) and the offset of the receiver clock relative to the GPS time are computed simultaneously, using the navigation equations to process the TOFs. The receiver's Earth-centered solution location is usually converted to latitude, longitude and height relative to an ellipsoidal Earth model. The height may then be further converted to height relative to the geoid (e.g., EGM96) (essentially, mean sea level). These coordinates may be displayed, e.g., on a moving map display, and/or recorded and/or used by some other system (e.g., a vehicle guidance system).

Although usually not formed explicitly in the receiver processing, the conceptual Time-Differences-of-Arrival (TDOAs) define the measurement geometry. Each TDOA corresponds to a hyperboloid of revolution. The line connecting the two satellites involved (and its extensions) forms the axis of the hyperboloid. The receiver is located at the point where three hyperboloids intersect.

In typical GPS operation as a navigator, four or more satellites must be visible to obtain an accurate result. The solution of the navigation equations gives the position of the receiver along with the difference between the time kept by the receiver's on-board clock and the true time-of-day, thereby eliminating the need for a more precise and possibly impractical receiver based clock. Applications for GPS such as time transfer, traffic signal timing, and synchronization of cell phone base stations, make use of this cheap and highly accurate timing. Some GPS applications use this time for display, or, other than for the basic position calculations, do not use it at all. Although four satellites are required for normal operation, fewer apply in special cases. If one variable is already known, a receiver can determine its position using only three satellites. For example, a ship or aircraft may have known elevation. Some GPS receivers may use additional clues or assumptions such as reusing the last known altitude, dead reckoning, inertial navigation, or including information from the vehicle computer, to give a (possibly degraded) position when fewer than four satellites are visible.

The GPS level of performance is described in a 4th Edition of a document published September 2008 by U.S. Department of Defense (DoD) entitled: "*GLOBAL POSITIONING SYSTEM—STANDARD POSITIONING SERVICE PERFORMANCE STANDARD*", which is incorporated in its entirety for all purposes as if fully set forth herein. The GPS is described in a book by Jean-Marie_Zogg (dated 26 Mar. 2002) published by u-blox AG (of CH-8800 Thalwil, Switzerland) [Doc Id GPS-X-02007] entitled: "*GPS Basics—Introduction to the system—Application overview*", and in a book by El-Rabbany, Ahmed published 2002 by ARTECH HOUSE, INC. [ISBN 1-58053-183-1] entitled: "*Introduction to GPS: the Global Positioning System*", which are both incorporated in their entirety for all purposes as if fully set forth herein. Methods and systems for enhancing line records with Global Positioning System coordinates are disclosed in in U.S. Pat. No. 7,932,857 to Ingman et al., entitled: "GPS for communications facility records", which is incorporated in its entirety for all purposes as if fully set forth herein. Global Positioning System information is acquired and a line record is assembled for an address using the Global Positioning System information.

GNSS stands for Global Navigation Satellite System, and is the standard generic term for satellite navigation systems that provide autonomous geo-spatial positioning with global coverage. The GPS in an example of GNSS. GNSS-1 is the first generation system and is the combination of existing satellite navigation systems (GPS and GLONASS), with Satellite Based Augmentation Systems (SBAS) or Ground Based Augmentation Systems (GBAS). In the United States, the satellite based component is the Wide Area Augmentation System (WAAS), in Europe it is the European Geostationary Navigation Overlay Service (EGNOS), and in Japan it is the Multi-Functional Satellite Augmentation System (MSAS). Ground based augmentation is provided by systems like the Local Area Augmentation System (LAAS). GNSS-2 is the second generation of systems that independently provides a full civilian satellite navigation system, exemplified by the European Galileo positioning system. These systems will provide the accuracy and integrity monitoring necessary for civil navigation; including aircraft. This system consists of L1 and L2 frequencies (in the L band of the radio spectrum) for civil use and L5 for system integrity. Development is also in progress to provide GPS with civil use L2 and L5 frequencies, making it a GNSS-2 system.

An example of global GNSS-2 is the GLONASS (GLObal NAvigation Satellite System) operated and provided by the formerly Soviet, and now Russia, and is a space-based satellite navigation system that provides a civilian radio-navigation-satellite service and is also used by the Russian Aerospace Defence Forces. The full orbital constellation of 24 GLONASS satellites enables full global coverage. Other core GNSS are Galileo (European Union) and Compass (China). The Galileo positioning system is operated by The European Union and European Space Agency. Galileo became operational on 15 Dec. 2016 (global Early Operational Capability (EOC), and the system of 30 MEO satellites was originally scheduled to be operational in 2010. Galileo is expected to be compatible with the modernized GPS system. The receivers will be able to combine the signals from both Galileo and GPS satellites to greatly increase the accuracy. Galileo is expected to be in full service in 2020 and at a substantially higher cost. The main modulation used in Galileo Open Service signal is the Composite Binary Offset Carrier (CBOC) modulation. An example of regional GNSS is China's Beidou. China has indicated they plan to complete the entire second generation Beidou Navigation Satellite System (BDS or BeiDou-2, formerly known as COMPASS), by expanding current regional (Asia-Pacific) service into global coverage by 2020. The BeiDou-2 system is proposed to consist of 30 MEO satellites and five geostationary satellites.

Mobile phone tracking is the ascertaining of the position or location of a mobile phone, whether stationary or moving. Localization may occur either via multilateration of radio signals between (several) cell towers of the network and the phone. To locate a mobile phone using multilateration of radio signals, it must emit at least the roaming signal to contact the next nearby antenna tower, but the process does not require an active call. The Global System for Mobile Communications (GSM) is based on the phone's signal strength to nearby antenna masts. The technology of locating is commonly based on measuring power levels and antenna patterns and uses the concept that a powered mobile phone always communicates wirelessly with one of the closest base stations, so knowledge of the location of the base station implies the cell phone is nearby. Advanced systems determine the sector in which the mobile phone is located and roughly further estimates the distance to the base station. Further approximation use interpolating signals between adjacent antenna towers. Qualified services may achieve a precision of down to 50 meters in urban areas where mobile traffic and density of antenna towers (base stations) is sufficiently high. Rural and desolate areas may see miles between base stations and therefore determine locations less precisely. The location of a mobile phone can be determined by using network-based, handset-based, or SIM-based methods.

The location of a mobile phone can be determined using the service provider's network infrastructure. The advantage of network-based techniques, from a service provider's point of view, is that they can be implemented non-intrusively without affecting handsets. The accuracy of network-based techniques varies, with cell identification as the least accurate and triangulation as moderately accurate, and newer "advanced forward link trilateration" timing methods as the most accurate. The accuracy of network-based techniques is both dependent on the concentration of cell base stations, with urban environments achieving the highest possible accuracy because of the higher number of cell towers, and the implementation of the most current timing methods.

The location of a mobile phone can be determined using client software installed on the handset. This technique determines the location of the handset by putting its location by cell identification, signal strengths of the home and neighboring cells, which is continuously sent to the carrier. In addition, if the handset is also equipped with GPS then significantly more precise location information can be then sent from the handset to the carrier. Another approach is to use a fingerprinting-based technique, where the "signature" of the home and neighboring cells signal strengths at different points in the area of interest is recorded by wardriving and matched in real-time to determine the handset location.

Using the Subscriber Identity Module (SIM) in GSM and Universal Mobile Telecommunications System (UMTS) handsets, it is possible to obtain raw radio measurements from the handset. Available measurements include the serving Cell ID, round-trip time, and signal strength. The type of information obtained via the SIM can differ from that which is available from the handset. For example, it may not be possible to obtain any raw measurements from the handset directly, yet still obtain measurements via the SIM.

In order to route calls to a phone, the cell towers listen for a signal sent from the phone and negotiate which tower is best able to communicate with the phone. As the phone changes location, the antenna towers monitor the signal, and the phone is "roamed" to an adjacent tower as appropriate. By comparing the relative signal strength from multiple antenna towers, a general location of a phone can be roughly determined. Other means make use of the antenna pattern, which supports angular determination and phase discrimination.

Various location technologies are described in a presentation by Shu Wang, Jungwon Min and Byung K. Yi, in the IEEE International Conference on Communication (ICC) 2008, Beijing, China, entitled: "Location Based Services for Mobiles: Technologies and Standards", which is incorporated in its entirety for all purposes as if fully set forth herein. An overview of Cellular Positioning Techniques is described in a paper by Balaram Singh, Soumya Pallai, and Susil Kumar published as conference Paper on September 2012, entitled: "*A Survey of Cellular Positioning Techniques in GSM Networks*", which is incorporated in its entirety for all purposes as if fully set forth herein. Various methods for estimation of the location of a Mobile Station accurately are described, as a key requirement to effectively provide a wide range of Location Based Services over mobile networks. Applications requiring positioning in mobile networks gained importance in recent years. This gives rise to the various location-based services (LBS), hence developing cellular positioning techniques has been a key research problem, with numerous localization solutions been proposed. There are several methods present to find the location, where the main objective is to find the location information more accurately without much modification in existing infrastructure, which ensures low cost.

Several methods are presented for finding the location are described in an article by Balaram Singh, Santosh Kumar Sahoo, and Soumya Ranjan Pradhan (all of JVCCE, B. B. Mahavidyalaya, Utkal University, Odisha, India) published January 2014 in the Journal of Telecommunication, Switching Systems and Networks Volume 1, Issue 1 entitled: *"Analysis of Cellular Positioning Techniques in UMTS Networks"*, which is incorporated in its entirety for all purposes as if fully set forth herein. The main objective is to find the location information more accurately without much modification in existing infrastructure which ensures low cost. This paper presents a review of location estimation techniques in UMTS Networks in terms of range accuracy in both urban and rural Sectors.

Wi-Fi positioning system (WPS) (or WiPS/WFPS) is commonly used where GPS (or GLONASS) are inadequate due to various causes including multipath and signal blockage indoors, such as in indoor positioning systems. The most common and widespread localization technique used for positioning with wireless access points is based on measuring the intensity of the received signal (Received Signal Strength Indication or RSSI) and the method of "fingerprinting". Typical parameters useful to geolocate the Wi-Fi hotspot or wireless access point include the SSID and the MAC address of the access point. The accuracy depends on the number of positions that have been entered into the database. The Wi-Fi hotspot database gets filled by correlating mobile device GPS location data with Wi-Fi hotspot MAC addresses. The possible signal fluctuations that may occur can increase errors and inaccuracies in the path of the user. To minimize fluctuations in the received signal, there are certain techniques that can be applied to filter the noise. Accurate indoor localization is becoming more important for Wi-Fi based devices due to the increased use of augmented reality, social networking, health care monitoring, personal tracking, inventory control and other indoor location-aware applications.

The problem of Wi-Fi based indoor localization of a device consists in determining the position of client devices with respect to access points. Many techniques exist to accomplish this, and these may be classified into four main types: received signal strength indication (RSSI), fingerprinting, angle of arrival (AoA) and time of flight (ToF) based techniques. In most cases, the first step to determine a device's position is to determine the distance between the target client device and a few access points. With the known distances between the target device and access points, trilateration algorithms may be used to determine the relative position of the target device, using the known position of access points as a reference. Alternatively, the angle of arriving signals at a target client device can be employed to determine the device's location based on triangulation algorithms.

RSSI. RSSI localization techniques are based on measuring signal strength from a client device to several different access points, and then combining this information with a propagation model to determine the distance between the client device and the access points. Trilateration (sometimes called multilateration) techniques can be used to calculate the estimated client device position relative to the known position of access points.

Fingerprinting. Traditional fingerprinting is also RSSI-based, but it simply relies on the recording of the signal strength from several access points in range and storing this information in a database along with the known coordinates of the client device in an offline phase. This information can be deterministic or probabilistic. During the online tracking phase, the current RSSI vector at an unknown location is compared to those stored in the fingerprint and the closest match is returned as the estimated user location.

Angle of Arrival (AoA). Linear array of antennas are used for receiving a signal, and the phase-shift difference of the received signal arriving at antennas equally separated by a "d" distance is used to compute the angle of arrival of the signal. With the advent of MIMO WiFi interfaces, which use multiple antennas, it is possible to estimate the AoA of the multipath signals received at the antenna arrays in the access points, and apply triangulation to calculate the location of client devices.

Time of Flight (ToF). This localization approach takes timestamps provided by the wireless interfaces to calculate the ToF of signals and then use this information to estimate the distance and relative position of one client device with respect to access points. The granularity of such time measurements is in the order of nanoseconds and systems which use this technique have reported localization errors in the order of 2 m. The time measurements taken at the wireless interfaces are based on the fact that RF waves travel close to the speed of light, which remains nearly constant in most propagation media in indoor environments. Therefore, the signal propagation speed (and consequently the ToF) is not affected so much by the environment as the RSSI measurements are. As in the RSSI approach, the ToF is used only to estimate the distance between the client device and access points. Then a trilateration technique can be used to calculate the estimated position of the device relative to the access points. The greatest challenges in the ToF approach consist in dealing with clock synchronization issues, noise, sampling artifacts and multipath channel effects. Some techniques use mathematical approaches to remove the need for clock synchronization.

WiFi localization is described in a guide published May 20, 2008 by Cisco Systems, Inc. (headquartered in 170 West Tasman Drive San Jose, CA 95134-1706 USA) entitled: *"Wi-Fi Location-Based Services* 4.1 *Design Guide"* [Text Part Number: OL-11612-01], which is incorporated in its entirety for all purposes as if fully set forth herein. The accuracy of various WiFi positioning and the optimal area of their applications are described in a paper by Robin Henniges presented on TU-Berlin, 2012 as part of SERVICE-CENTRIC NETWORKING—SEMINAR WS2011/2012, entitled: *"Current approaches of Wifi Positioning"*, which is incorporated in its entirety for all purposes as if fully set forth herein. It will make use of existing WiFi infrastructure, although this was never designed to do so. Methods that were used for other positioning technologies can be adopted for WiFi.

A system built using probabilistic techniques that allows for remarkably accurate localization across our entire office building using nothing more than the built-in signal intensity meter supplied by standard 802.11 cards is described in a paper by Andreas Haeberlen, Eliot Flannery, Andrew M. Ladd, Algis Rudys, Dan S. Wallach, and Lydia E. Kavraki (all of Rice University) published by ACM 2004 in Mobi-Com'04, Sep. 26-Oct. 1, 2004, Philadelphia, Pennsylvania, USA [1-58113-868-7/04/0009 . . . $5.00], entitled: "*Practical Robust Localization over Large-Scale* 802.11 *Wireless Networks*", which is incorporated in its entirety for all purposes as if fully set forth herein. While prior systems have required significant investments of human labor to build a detailed signal map, we can train our system by spending less than one minute per office or region, walking around with a laptop and recording the observed signal intensities of our building's unmodified base stations. We actually collected over two minutes of data per office or region, about 28 man-hours of effort. Using less than half of this data to train the localizer, we can localize a user to the precise, correct location in over 95% of our attempts, across the entire building. Even in the most pathological cases, we almost never localize a user any more distant than to the neighboring office. A user can obtain this level of accuracy with only two or three signal intensity measurements, allowing for a high frame rate of localization results. Furthermore, with a brief calibration period, our system can be adapted to work with previously unknown user hardware. We present results demonstrating the robustness of our system against a variety of untrained time-varying phenomena, including the presence or absence of people in the building across the day. Our system is sufficiently robust to enable a variety of location aware applications without requiring special-purpose hardware or complicated training and calibration procedures.

Geolocation may be used by any network element. The peer devices described above as storing a content (chunks) that is required by a client device, and thus the client device fetches the content from the peer devices rather than directly from the web server (or in addition to it). In some cases, multiple devices are available storing unknown content which may be the content required by a client device. The geolocation may be used to determine which available devices may be, or are expected to be, storing the content that is requested. In this context, two Internet-connected devices, each identified by a respective IP address, for example, are considered as being 'close' if there is a likelihood that the same content is stored in both, or that both devices fetched the same content from a data server. Similarly, two devices are considered closer than the other two devices if there is a higher likelihood that they store the same content (from the same data server).

In one example, the selection is based only on the obtained the geographical location. In one example, such selection may be based on the physical geographical location of the requesting device (obtained locally at the requesting device or by using a geolocation), a physical geographical location of the data server storing a content that is requested (obtained locally or by using geolocation), or relating to physical geographical location of TP addressable, Internet connected device. In one example, the devices may be selected based on being in the same location, such as in the same continent, country, region, city, street, or timezone. The devices may be selected from the list based on the physical geographical distance, where 'closeness' is defined as based on actual geographical distance between devices, where shorter distance indicates closer devices. For example, is the case where the latitude and the longitude are obtained, the physical distance between each device in the list and the requesting device (or the data server or another device) may be calculated, and the nearest device will be first selected, then the second nearest device, and so on. Alternatively or in addition, devices in the same city (or street) as the requesting device are considered as the closest and may be first selected, then the devices that are in the same region or country may be considered as close and may be selected next.

A software and hardware system capable of operating on a signal controller platform is disclosed in U.S. Patent Application Publication No. 2006/0287807 to Teffer entitled: "Method for incorporating individual vehicle data collection, detection and recording of traffic violations in a traffic signal", which is incorporated in its entirety for all purposes as if fully set forth herein. The signal controller platform detects and records individual vehicle data including but not limited to dangerous driving behavior such as red light running and speeding. The disclosure teaches sharing of the computing platform and infrastructure of the traffic control system. The disclosure also teaches receiving, interpreting, and organizing data collected through the traffic control system's vehicle detection infrastructure, and driving cameras, video, or other recording devices to provide additional evidence of an individual vehicle's behavior.

A method and apparatus for collecting, uploading and evaluating motor vehicle operation are disclosed in U.S. Pat. No. 6,931,309 to Phelan et al. entitled: "Motor vehicle operating data collection and analysis", which is incorporated in its entirety for all purposes as if fully set forth herein. The method and apparatus are utilizing on-board diagnostic components (OBDII) and ground positioning satellite (GPS) systems, whereby operator identifiable behavior can be rated for driving safety and other characteristics.

An on-board intelligent vehicle system is disclosed in U.S. Pat. No. 7,421,334 to Dahlgren et al. entitled: "Centralized facility and intelligent on-board vehicle platform for collecting, analyzing and distributing information relating to transportation infrastructure and conditions", which is incorporated in its entirety for all purposes as if fully set forth herein. The system includes a sensor assembly to collect data and a processor to process the data to determine the occurrence of at least one event. The data may be collected from existing standard equipment such as the vehicle communication bus or add-on sensors. The data may be indicative of conditions relating to the vehicle, roadway infrastructure, and roadway utilization, such as vehicle performance, roadway design, roadway conditions, and traffic levels. The detection of an event may signify abnormal, substandard, or unacceptable conditions prevailing in the roadway, vehicle, or traffic. The vehicle transmits an event indicator and correlated vehicle location data to a central facility for further management of the information. The central facility sends communications reflecting event occurrence to various relevant or interested users. The user population can include other vehicle subscribers (e.g., to provide rerouting data based on location-relevant roadway or traffic events), roadway maintenance crews, vehicle manufacturers, and governmental agencies (e.g., transportation authorities, law enforcement, and legislative bodies).

Systems, methods and computer readable media for determining compliance with recommendations are disclosed in U.S. Patent Application Publication No. 2014/0279707 to Joshua et al. entitled: "System and method for vehicle data analysis", which is incorporated in its entirety for all purposes as if fully set forth herein. The systems and methods may involve generating a vehicle recommendation; transmitting the vehicle recommendation to at least one output device, wherein the at least one output device communicates the vehicle recommendation to one or more users; collecting vehicle telemetry data from a vehicle sensor device located in a vehicle, wherein the vehicle sensor device is coupled to one or more vehicle sensors; and determining compliance data based on the vehicle recommendation and the vehicle telemetry data, wherein the compliance data indicates compliance with the recommended vehicle action. The compliance data may be used to determine service rates and/or service level coverage for users.

A system for monitoring and reporting incidences of traffic violations at a traffic location is disclosed in U.S. Pat. No. 6,546,119 to Ciolli et al. entitled: "Automated traffic violation monitoring and reporting system", which is incorporated in its entirety for all purposes as if fully set forth herein. The system comprises a digital camera system deployed at a traffic location. The camera system is remotely coupled to a data processing system. The data processing system comprises an image processor for compiling vehicle and scene images produced by the digital camera system, a verification process for verifying the validity of the vehicle images, an image processing system for identifying driver information from the vehicle images, and a notification process for transmitting potential violation information to one or more law enforcement agencies.

A distributed individual vehicle information capture method for capturing individual vehicle data at traffic intersections and transmitting the data to a central station for storage and processing is disclosed in U.S. Patent Application Publication No. 2005/0122235 to Teffer et al. entitled: "Method and system for collecting traffic data, monitoring traffic, and automated enforcement at a centralized station", which is incorporated in its entirety for all purposes as if fully set forth herein. The method includes capturing individual vehicle information at a plurality of intersections (122) and transmitting the individual vehicle information from the intersections to a central station (124). Consequently, the individual vehicle information is available to be stored and processed by a device at the central station (126). Traffic intersection equipment for capturing individual vehicle data at traffic intersections and transmitting the data to a central station for storage and processing is also disclosed. The equipment includes a traffic detection device (159) for capturing individual vehicle data at an intersection (158) and a network connection to a central station (174). The traffic detection device (159) is operably configured to transmit to the central station (174) the individual vehicle information.

A system and method for acquiring image evidence of traffic violations are disclosed in U.S. Patent Application Publication No. 2003/0189499 to Stricklin et al. entitled: "System and method for traffic", which is incorporated in its entirety for all purposes as if fully set forth herein. The system has a controller, an image acquisition system, and sensors. The controller acquires data from the sensors to determine the likelihood of a traffic violation. The controller determines a schedule for acquiring images associated with the violation. Multiple images may be acquired as evidence of the violation. The controller then directs the image acquisition to acquire images in compliance with the schedule. The controller may then package, encrypt, and authenticate data and images associated with the violation. The controller may then transfer the data to a remote location. The system may also determine a schedule to acquire images associated with multiple violations and/or traffic accidents.

A system for monitoring and reporting incidences of traffic violations at a traffic location is disclosed in U.S. Patent Application Publication No. 2004/0252193 to Higgins entitled: "Automated traffic violation monitoring and reporting system with combined video and still-image data", which is incorporated in its entirety for all purposes as if fully set forth herein. The system comprises one or more digital still cameras and one or more digital video cameras system deployed at a traffic location. The camera system is coupled to a data processing system, which comprises an image processor for compiling vehicle and scene images produced by the digital camera system, a verification process for verifying the validity of the vehicle images, an image processing system for identifying driver information from the vehicle images, and a notification process for transmitting potential violation information to one or more law enforcement agencies. The video camera system is configured to record footage both before and after the offense is detected. The video camera system includes a non-stop video capture buffer that records the preceding few seconds of violation. The buffer holds a number of seconds of video data in memory. When an offense is detected, a timer is started. At the end of the timer period a video clip of the current buffer contents is recorded. The resulting video clip is incorporated with the conventional evidence set comprising the digital still images of the offense with the identifying data of the car and driver.

An example of an electronics architecture in a vehicle 21 is illustrated in a schematic block diagram 20 shown in FIG. 2. The vehicle 21 comprises five ECUs: A Telematics ECU 22b, a Communication ECU 22a, an ECU #1 22c, an ECU #2 22d, and an ECU #3 22e. While five ECUs are shown, any number of ECUs may be employed. Each of the ECUs may comprises, may consists of, or may be part of, Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, and a control module. The ECUs communicates with each other over a vehicle bus 23, which may consist of, may comprise, or may be based on, Controller Area Network (CAN) standard (such as Flexible Data-Rate (CAN FD) protocol), Local Interconnect Network (LIN), FlexRay protocol, or Media Oriented Systems Transport (MOST) (such as MOST25, MOST50, or MOST150). In one example, the vehicle bus may consist of, may comprise, or may be based on, automotive Ethernet, may use only a single twisted pair, and may consist of, employ, use, may be based on, or may be compatible with, IEEE802.3 100BaseT1, IEEE802.3 1000BaseT1, BroadR-Reach®, or IEEE 802.3bw-2015 standard.

An ECU may connect to, or include, a sensor for sensing a phenomenon in the vehicle or in the vehicle environment. In the examplary vehicle 21 shown in the arrangement 20, a sensor 24b is connected to the ECU #1 22c, and an additional sensor 24a is connected to the ECU #3 22e. Further, an ECU may connect to, or include, an actuator for affecting, generating, or controlling a phenomenon in the vehicle or in the vehicle environment. In the examplary vehicle 21 shown in the arrangement 20, an actuator 25b is connected to the ECU #2 22d, and an additional actuator 25a is connected to the ECU #3 22e.

The vehicle 21 may communicate over a wireless network 39 with other vehicles or with stationary devices, directly or via the Internet. The communication with the wireless network 39 uses an antenna 29 and a wireless transceiver 28, which may part of the Communication ECU 22a. The wireless network 39 may be a Wireless Wide Area Network (WWAN), such as WiMAX network or a cellular telephone network (such as Third Generation (3G) or Fourth Generation (4G) network). Alternatively or in addition, the wireless network 39 may be a Wireless Personal Area Network (WPAN) that may be according to, may be compatible with, or may be based on, Bluetooth™ or IEEE 802.15.1-2005 standards, or may be according to, or may be based on, ZigBee™, IEEE 802.15.4-2003, or Z-Wave™ standard. Alternatively or in addition, the wireless network 39 may be a Wireless Local Area Network (WLAN) that may be according to, may be compatible with, or may be based on, IEEE 802.11-2012, IEEE 802.11a, IEEE 802.11b, IEEE 802.11g, IEEE 802.11n, or IEEE 802.11ac.

Alternatively or in addition, the wireless network 39 may use a Dedicated Short-Range Communication (DSRC), that may be according to, compatible with, or based on, European Committee for Standardization (CEN) EN 12253:2004, EN 12795:2002, EN 12834:2002, EN 13372:2004, or EN ISO 14906:2004 standard, or may be according to, compatible with, or based on, IEEE 802.11p, IEEE 1609.1-2006, IEEE 1609.2, IEEE 1609.3, IEEE 1609.4, or IEEE1609.5.

The vehicle 21 may include a GPS receiver for a localization, navigation, or tracking of the vehicle 21. In the examplary vehicle 21 shown in the arrangement 20, a GPS receiver 27 receives RF signals from the GPS satellites 38a and 38b, and is part of, or connected to, the Telematics ECU 22b. The Telematics ECU 22b may further include, or connect to, a dashboard display 26, (also known as instrument panel (TP), or fascia) that is a control panel located directly ahead, or in plain view, of a vehicle's driver or passenger, displaying instrumentation, infotainment, and controls for the vehicle's operation.

Automotive navigation system. A navigation system generally compares the determined position with a digital map and uses this map to calculate the optimal route to a specified destination. An automotive navigation system is part of the automobile (or vehicle) controls or a third party add-on used to find direction in an automobile (or vehicle). It typically uses a satellite navigation device to get its position data, which is then correlated to a position on a road. When directions are needed, routing can be calculated, and on-the-fly traffic information can be used to adjust the route. Dead reckoning may be used, using distance data from sensors attached to the drivetrain, together with a gyroscope and an accelerometer can be used for greater reliability. Mathematically, automotive navigation is based on the shortest path problem, within graph theory, which examines how to identify the path that best meets some criteria (shortest, cheapest, fastest, etc.) between two points in a large network. Compared with portable devices, permanently installed navigation devices in a vehicle provides better positioning quality and thus better route-guidance quality, since additional sensors for distance and direction signals (such as wheel-speed and yaw sensors) can be evaluated and the antenna can be mounted in a more favorable place for satellite reception. As original equipment, networking with other components is also common, i.e. integration in the operating concept of the vehicle is possible. Voice outputs can be issued via the audio system, and may be muted for telephone calls. The route guidance information may be displayed in the instrument cluster or in the head-up display and thus in the driver's primary field of vision. An example of a navigation system is the iGO navigation application (app), described in a user manual UK English ver. 1.0 dated August 2016 entitled: "*User Manual—iGO Navigation*

*app—Navigation software for the iGO Navigation app*", which is incorporated in its entirety for all purposes as if fully set forth herein.

In-car positioning and navigation has been a killer application for Global Positioning System (GPS) receivers, and a variety of electronics for consumers and professionals have been launched on a large scale. Positioning technologies based on stand-alone GPS receivers are vulnerable and, thus, have to be supported by additional information sources to obtain the desired accuracy, integrity, availability, and continuity of service. A survey of the information sources and information fusion technologies used in current in-car navigation systems is presented in a paper authored by Isaac Skog and Peter Handel Published in IEEE Transactions on Intelligent Transportation Systems (Volume: 10, Issue: 1, March 2009) entitled: "*In-car positioning and navigation technologies—a survey*", which is incorporated in its entirety for all purposes as if fully set forth herein.

The road database is typically provided as a vector map, and street names or numbers and house numbers, as well as points of interest (waypoints), are encoded as geographic coordinates. This enables users to find a desired destination by street address or as geographic coordinates. A GPS device is typically used in most automobile navigation systems, and may be used in a number of contexts, including: Maps, including street maps, displayed in human readable format via text or in a graphical format, turn-by-turn navigation directions to a human in charge of a vehicle or vessel via text or speech, directions fed directly to an autonomous vehicle such as a robotic probe, traffic congestion maps (depicting either historical or real time data), and suggested alternative directions, information on nearby amenities such as restaurants, fueling stations, and tourist attractions. Further, GPS devices may be able to indicate the roads or paths available, traffic congestion and alternative routes, roads or paths that might be taken to get to the destination, if some roads are busy (now or historically) the best route to take, The location of food, banks, hotels, fuel, airports or other places of interests, the shortest route between the two locations, and the different options to drive on highway or back roads.

Most navigation systems rely on three primary guidance display screens to communicate navigation information to drivers: (1) maps, (2) maneuver lists with sequenced turn directions, and (3) turn-by-turn guidance displays which generally "pop up" in advance of a turn. The overall utility of each depends on the particular task being performed. Maps, for example, can be effectively used to plan a route since they provide a pictorial representation of an area or region, while ordered lists of directions can limit information processing and lead to fast and accurate navigation performance. Systems tend to use or make available all three types of information displays. While some navigation guidance display have very small monochrome screens, most of the systems provided some form of color map display. Typically, it is perceived that drivers will use map-based information not only for trip planning purposes, but also during en-route navigation. Map displays contained the most information (an average of over ten items), and generally served as the default guidance view (the one drivers would see first when operating the system) despite the fact that they rely heavily on spatial processing capabilities of the driver. Most systems, however, provided supplemental turn-by-turn guidance displays. Systems also enabled drivers to change the default view, and/or access alternative views directly (often via a single button press).

Some systems also allowed the display screen to be blanked-out while driving, allowing drivers to receive audio guidance only. Although turn-by-turn guidance displays generally contained fewer information items than map displays, they still presented a considerable amount of information. General types of information on these displays tended to include turn arrows, countdown bars to indicate the distance to the next maneuver, an indication of the current and next turn street name, and an abbreviated map depicting the intersection roadway geometry at the next maneuver point. One design adopted by several systems was to integrate display elements such as the turn arrow, countdown bar, map, and vehicle position indicator. This arrangement allows drivers to focus on a single overall graphic representation rather than several individual display elements to extract the information (exercising Gestalt principles). Another characteristic common to turn-by-turn displays was the redundant audio component announcing the upcoming maneuver. Some systems only announced the direction and distance of the next turn, rather than the specific street name.

Location representation. When representing positions relative to the Earth, it is often most convenient to represent vertical position (height or depth) separately, and to use some other parameters to represent horizontal position. Latitude/Longitude, WGS 84, and UTM are common horizontal position representations. The horizontal position has two degrees of freedom, and thus two parameters are sufficient to uniquely describe such a position. The most common horizontal position representation is Latitude and Longitude. However, latitude and longitude should be used with care in mathematical expressions (including calculations in computer programs).

Latitude is a geographic coordinate that specifies the north-south position of a point on the Earth's surface, and is represented as an angle, which ranges from 0° at the Equator to 90° (North or South) at the poles. Lines of constant latitude, or parallels, run east-west as circles parallel to the equator. Latitude is used together with longitude to specify the precise location of features on the surface of the Earth. Longitude is a geographic coordinate that specifies the east-west position of a point on the Earth's surface, or the surface of a celestial body. It is an angular measurement, usually expressed in degrees and denoted by the Greek letter lambda ($\lambda$). Meridians (lines running from pole to pole) connect points with the same longitude. The prime meridian, which passes near the Royal Observatory, Greenwich, England, is defined as 0° longitude by convention. Positive longitudes are east of the prime meridian, and negative ones are west. A location's north-south position along a meridian is given by its latitude, which is approximately the angle between the local vertical and the equatorial plane.

UTM. The Universal Transverse Mercator (UTM) is a system for assigning coordinates to locations on the surface of the Earth, and is a horizontal position representation, which ignores altitude and treats the earth as a perfect ellipsoid. However, it differs from global latitude/longitude in that it divides earth into 60 zones and projects each to the plane as a basis for its coordinates. Specifying a location means specifying the zone and the x, y coordinate in that plane. The projection from spheroid to a UTM zone is some parameterization of the transverse Mercator projection. The parameters vary by nation or region or mapping system.

The UTM system divides the Earth into 60 zones, each 6° of longitude in width. Zone 1 covers longitude 180° to 174° W; zone numbering increases eastward to zone 60, which covers longitude 174° E to 180°. The polar regions of south of 80° S and north of 84° N are excluded. Each of the 60 zones uses a transverse Mercator projection that can map a region of large north-south extent with low distortion. By using narrow zones of 6° of longitude (up to 668 km) in width, and reducing the scale factor along the central meridian to 0.9996 (a reduction of 1:2500), the amount of distortion is held below 1 part in 1,000 inside each zone. Distortion of scale increases to 1.0010 at the zone boundaries along the equator. In each zone the scale factor of the central meridian reduces the diameter of the transverse cylinder to produce a secant projection with two standard lines, or lines of true scale, about 180 km on each side of, and about parallel to, the central meridian (Arc cos 0.9996=1.62° at the Equator). The scale is less than 1 inside the standard lines and greater than 1 outside them, but the overall distortion is minimized.

WGS 84. World Geodetic System (WGS) 84 is an Earth-centered, Earth-fixed terrestrial reference system and geodetic datum. WGS 84 is based on a consistent set of constants and model parameters that describe the Earth's size, shape, and gravity and geomagnetic fields. WGS 84 is the standard U.S. Department of Defense definition of a global reference system for geospatial information and is the reference system for the Global Positioning System (GPS). It is compatible with the International Terrestrial Reference System (ITRS). The World Geodetic System (WGS) is a standard for use in cartography, geodesy, and satellite navigation including GPS. This standard includes the definition of the coordinate system's fundamental and derived constants, the normal gravity Earth Gravitational Model (EGM), a description of the associated World Magnetic Model (WMM), and a current list of local datum transformations. The latest revision is WGS 84 (also known as WGS 1984 ensemble: EPSG:4326 for 2D coordinate reference system (CRS), EPSG:4979 for 3D CRS and EPSG:4978 for geocentric 3D CRS), established and maintained by the United States National Geospatial-Intelligence Agency since 1984, and last revised in January 2021 (G2139 frame realization). WGS 84 ensemble is static, while frame realizations have an epoch. Earlier schemes included WGS 72, WGS 66, and WGS 60. WGS 84 is the reference coordinate system used by the Global Positioning System. The coordinate origin of WGS 84 is meant to be located at the Earth's center of mass; the uncertainty is believed to be less than 2 cm.

GPS device. A GPS navigation device, GPS receiver, or simply GPS is a device that is capable of receiving information from GPS satellites and then to calculate the device's geographical position. Using suitable software, the device may display the position on a map, and it may offer directions. A GPS device can retrieve from the GPS system location and time information in all weather conditions, anywhere on or near the Earth. A GPS reception typically requires an unobstructed line of sight to four or more GPS satellites, and is subject to poor satellite signal conditions. In exceptionally poor signal conditions, for example in urban areas, satellite signals may exhibit multipath propagation where signals bounce off structures, or are weakened by meteorological conditions. Obstructed lines of sight may arise from a tree canopy or inside a structure, such as in a building, garage or tunnel. Today, most standalone GPS receivers are used in automobiles. The GPS capability of smartphones may use assisted GPS (A-GPS) technology, which can use the base station or cell towers to provide the device location tracking capability, especially when GPS signals are poor or unavailable. However, the mobile network part of the A-GPS technology would not be available when the smartphone is outside the range of the mobile reception network, while the GPS aspect would otherwise continue to be available.

Consumer GPS navigation devices include Dedicated GPS navigation devices, GPS modules that need to be connected to a computer to be used; and GPS loggers that record trip information for download. Such GPS tracking is useful for trailblazing, mapping by hikers and cyclists, and the production of geocoded photographs.

Converged devices, including GPS Phones and GPS cameras, in which GPS is a feature rather than the main purpose of the device. The majority of GPS devices are now converged devices, and may use assisted GPS or standalone (not network dependent) or both. The vulnerability of consumer GPS to radio frequency interference from planned wireless data services is controversial.

Dedicated devices have various degrees of mobility. Hand-held, outdoor, or sport receivers have replaceable batteries that can run them for several hours, making them suitable for hiking, bicycle touring and other activities far from an electric power source. Their screens are small, and some do not show color, in part to save power. Some use transflective liquid-crystal displays, allowing use in bright sunlight. Cases are rugged and some are water resistant. Other receivers, often called mobile are intended primarily for use in a car, but have a small rechargeable internal battery that can power them for an hour or two away from the car. Special purpose devices for use in a car may be permanently installed and depend entirely on the automotive electrical system. POI. A Point-Of-Interest, or POI, is a specific point location that someone may find useful or interesting. An example is a point on the Earth representing the location of the Space Needle, or a point on Mars representing the location of the mountain, Olympus Mons. Most consumers use the term when referring to hotels, campsites, fuel stations or any other categories used in modern (automotive) navigation systems. Users of a mobile devices can be provided with geolocation and time aware POI service, that recommends geolocations nearby and with a temporal relevance (e.g., POI to special services in a Ski resort are available only in winter). A GPS point of interest specifies, at minimum, the latitude and longitude of the POI, assuming a certain map datum. A name or description for the POI is usually included, and other information such as altitude or a telephone number may also be attached. GPS applications typically use icons to represent different categories of POI on a map graphically. Typically, POIs are divided up by category, such as dining, lodging, gas stations, parking areas, emergency services, local attractions, sports venues, and so on. Usually, some categories are subdivided even further, such as different types of restaurants depending on the fare. Sometimes a phone number is included with the name and address information.

Digital maps for modern GPS devices typically include a basic selection of POI for the map area. However, websites exist that specialize in the collection, verification, management and distribution of POI which end-users can load onto their devices to replace or supplement the existing POT. While some of these websites are generic, and will collect and categorize POI for any interest, others are more specialized in a particular category (such as speed cameras) or GPS device (e.g. TomTom/Garmin). End-users also have the ability to create their own custom collections.

As GPS-enabled devices as well as software applications that use digital maps become more available, so too the applications for POI are also expanding. Newer digital cameras for example can automatically tag a photograph using Exif with the GPS location where a picture was taken; these pictures can then be overlaid as POI on a digital map or satellite image such as Google Earth. Geocaching applications are built around POI collections. In common vehicle tracking systems, POIs are used to mark destination points and/or offices so that users of GPS tracking software would easily monitor position of vehicles according to POIs.

Many different file formats, including proprietary formats, are used to store point of interest data, even where the same underlying WGS84 system is used. Some of the file formats used by different vendors and devices to exchange POI (and in some cases, also navigation tracks), are: ASCII Text (.asc .txt .csv .plt), Topografix GPX (.gpx), Garmin Mapsource (.gdb), Google Earth Keyhole Markup Language (.kml .kmz), Pocket Street Pushpins (.psp), Maptech Marks (.msf), Maptech Waypoint (.mxf), Microsoft MapPoint Pushpin (.csv), OziExplorer (.wpt), TomTom Overlay (.ov2) and TomTom plain text format (.asc), and OpenStreetMap data (.osm). Furthermore, many applications will support the generic ASCII text file format, although this format is more prone to error due to its loose structure as well as the many ways in which GPS co-ordinates can be represented (e.g., decimal vs degree/minute/second).

Transportation costs are minimized with a novel system for optimizing a route for a service vehicle that is disclosed in U.S. Pat. No. 7,778,773 to Yaqub et al. entitled: "Optimum route planning for service vehicles", which is incorporated in its entirety for all purposes as if fully set forth herein. For example, a service vehicle may be a package delivery van. Based upon static and dynamic information, a computer on board the service vehicle determines an optimum route for the vehicle to travel between multiple locations. The computer on board the service vehicle communicates wirelessly to receive any pertinent dynamic information, which has changed (e.g., traffic congestion, the presence of a customer at a deliver location, or a modification of location). The computer then recalculates the optimum route for the vehicle and guides the driver of the vehicle in accordance with the newly determined optimum route. The on board computer continues to check for any updates, and recalculates the optimum route throughout the day. Thus, the optimum route may be selected based upon the latest available information white avoiding heavy signal traffic on the wireless network.

A vehicle navigation system and method is disclosed in U.S. Pat. No. 7,330,786 to Odinak et al. entitled: "Vehicle navigation system and method", which is incorporated in its entirety for all purposes as if fully set forth herein. The system includes a unit located in a vehicle and coupled to a first network, a traffic information center coupled to a second network, and a server coupled to the first and second networks. A trip plan is generated according to navigation information, vehicle coordinates and trip request information received from the unit, and road information received from the traffic information center. The trip plan is sent to the unit for presentation. The trip plan includes trip overview information and voice prompts associated with one or more landmarks. A trip plan may be a tourist trip plan.

A route planning system and method for a navigation system, which allows the driver to intelligently plan the route when adding waypoints, is disclosed in U.S. Pat. No. 8,560,227 to Feng entitled: "Route planning apparatus and method for navigation system", which is incorporated in its entirety for all purposes as if fully set forth herein. The route planning navigation system includes a route planning processor which allows the driver to add and prioritize multiple POIs as waypoints. When one or more new waypoints are added, the driver is allowed to prioritize the waypoints if adding new waypoints does not significantly increase the cost of the route, and an optimized route is generated accordingly. In another aspect, if adding new waypoint significantly increases the cost of the route, a notifying message will be generated by the route planning processor so that the driver is able to make a decision whether to proceed to the new waypoint.

A navigation method and apparatus finds a location and a route to a plurality of destinations with the minimum number of stops or the shortest overall distance is disclosed in U.S. Pat. No. 7,239,960 to Yokota entitled: "Navigation method and system for visiting multiple destinations by minimum number of stops", which is incorporated in its entirety for all purposes as if fully set forth herein. The navigation method includes the steps of: specifying a plurality of destinations in a navigation system; searching a one-stop location where two or more specified destinations exist or searching a location of each destination; displaying results of search for prompting a user to decide whether recommended locations of the destinations in the search result is acceptable; repeating the above steps of searching locations and displaying the search results until the user accepts recommended locations of the destinations; and guiding the user to the destinations accepted by the user.

A system that provides personalized traffic information and route planning capabilities to users of the system is disclosed in U.S. Patent Application Publication No. 2003/0065442 to Touney entitled: "Navigation system and travel coordinator with dynamic traffic data", which is incorporated in its entirety for all purposes as if fully set forth herein. The system uses existing wireless personal telephone and communication systems that allow for the geo-location of users in the network. This system uses standard geo-location methods and telecommunication equipment to tri-angulate the position of a user and transfer data between them and the central system. This user information is collected and used to compute real-time system wide model of the street segments in the traffic network. This model can then be used to create individual routing information for any user of the system. This computed travel time information is used to determine the most efficient route for a user and can be transmitted to the user. As a user travels, their location is constantly obtained and their travel route information is updated and relayed to them.

An example for a vehicle navigation system is Maestro™ 4200 by Magellan® described in a User Manual Published 2007 [Document No. 604-0046-001 A], which is incorpo-rated in its entirety for all purposes as if fully set forth herein. Another example for a vehicle navigation system is nuvi 2707/2708 Series by Garmin described in an Owner Manual dated March 2013 [Document No. 190-01589-00_OA], which is incorporated in its entirety for all purposes as if fully set forth herein.

A method and system for dynamic and interactive navi-gation is presented in U.S. Pat. No. 6,484,092 to Seibel entitled: "Method and system for dynamic and interactive route finding", which is incorporated in its entirety for all purposes as if fully set forth herein. A navigation request is received from a user. The navigation request comprises an originating location description, a destination location description, and at least one criterion to be satisfied by a desired route. Dynamic condition information associated with at least one route between the originating location and the destination location is retrieved. Based on the dynamic condition information, a desired route between the originat-ing location and the destination location is determined.

Directory service results responsive to a request for a desired good or service provider may be provided based on one or more user-selected locations as described in in U.S.

Pat. No. 7,761,350 to Ridgeway entitled: "Biasing of search result clustering to ensure more effective point of interest (POI) targeting", which is incorporated in its entirety for all purposes as if fully set forth herein. The user may seek a desired good or service provider that is proximate to a location from which the user may begin traveling to the point of interest, referred to as a source location, and satisfies a beneficial objective held by the user. The beneficial objective may relate to, for example, a directional travel preference, avoiding rush hour traffic or proximity to a specific location or another type of good or service provider that differs from the user's desired good or service provider that is the subject of the user's request. A sequence of geometrical representations, such as, for example, Delauney Triangles, may be generated to provide directory service results that satisfy the user's request.

A computer-implemented method for identifying a route that is configured to travel through multiple points of interest is described in U.S. Pat. No. 8,467,959 to Nesbitt et al. entitled: "Identifying a route configured to travel through multiple points of interest", which is incorporated in its entirety for all purposes as if fully set forth herein. The method includes receiving a query that includes an origin location, a destination location, and at least a first point of interest and a second point of interest. The method also includes identifying a perimeter that surrounds the received origin and destination locations in response to the query. The perimeter is then used to identify a set of locations for each of the first and second points of interest.

Systems and methods of for providing various services, such as parking services, flight services, and fuel services, to a user using a satellite digital audio radio system are provided in U.S. Patent Application Publication No. 2010/0106514 to Cox entitled: "Travel related services via SDARS", which is incorporated in its entirety for all pur-poses as if fully set forth herein. Each data service can be provided independently or in any combination to a user, and each can be independently subscribed to by a user, in various exemplary business models. In exemplary embodiments of the present invention, a parking data service, providing, for example, information on parking garages near a certain location and the availability of parking spaces in parking garages can be provided. In exemplary embodiments of the present invention, a flight data services, providing, for example, information such as near real-time updates to changes in arrival and departure statuses of one or more commercial airline flights. In exemplary embodiments of the present invention, a fuel data service, providing, for example, information on fueling stations and the prices and fuel types available at fueling stations, can be provided. In exemplary embodiments of the present invention, such data services can be embedded in an SDARS data stream and made available to users on an SDARS receiver.

A navigation system-based optimal passing point selec-tion method with limited constraint conditions is described in Chinese Patent Application Publication No. CN107525513A entitled: "Existing navigation system-based optimal passing point selection method with limited constraint conditions", which is incorporated in its entirety for all purposes as if fully set forth herein. The method is technically characterized by comprising the following steps: after inputting a start position, a destination and traveling preference, setting passing points, and constraint conditions by using an optimal passing point selection module; auto-matically searching on an electronic map to find all passing point positions meeting requirements; according to the trav-elling preference of a user, planning all routes including the start position, the passing points and the destination; calculating the evaluation value of each route under the measurement criteria of the travelling preference and ranking according to the evaluation values; selecting the optimal route, so that the user drives according to an optimal passing point and the optimal route. The method disclosed by the invention can help the user to automatically select the optimal passing point that meets the traveling preference from a great number of passing points that satisfy the limited constraint conditions and plan the optimal route including the passing point, so as to save time, spent in selecting and comparing the passing points, of the user, greatly facilitate the travel of people, and realize practical significance and value.

A user that uses a portable electronic device to select an image representative of a brand is disclosed in U.S. Pat. No. 8,451,114 to Gold entitled: "Brand mapping", which is incorporated in its entirety for all purposes as if fully set forth herein. In response to the user's selection of the image representative of the brand, the device automatically presents the user with an image of a map that indicates a current location of the device and shows one or more images representative of brand purchase sites where the selected brand may be accessed by the user.

A Point of Interest (POI) icon display method in a navigation system that is described for displaying a POI icon at a POI point on a map is disclosed in U.S. Pat. No. 6,983,203 to Wako entitled: "POI icon display method and navigation system", which is incorporated in its entirety for all purposes as if fully set forth herein. For every POI in a POI category, the location point and type of POI are stored. Each POI is identified on the displayed map by the same POI icon, and when a POI icon of a POI is selected, the type of POI is displayed. Accordingly, it is possible to reduce the number of POI icons, recognize the type of POI, such as the type of food of a restaurant (classified by country, such as Japanese food, Chinese food, Italian food, and French food), and provide a guide route to a desired POI quickly.

A method and apparatus for a navigation system for generating a reminder message by applying predefined validation rule to display and/or voice announce the reminder message associated with a particular location, is disclosed in U.S. Pat. No. 7,889,101 to Yokota entitled: "Method and apparatus for generating location based reminder message for navigation system", which is incorporated in its entirety for all purposes as if fully set forth herein. The method includes the steps of creating reminder message data which include a reminder message, a primary location, a secondary location, and a validation rule; comparing a reference location with the primary location; applying the validation rule in the reminder message data to determine whether a relationship between the primary location and the reference location satisfies the condition in the validation rule; displaying the reminder message when the condition is satisfied; and conducting a route guidance operation to reach a location selected by the user.

A navigation system is described in U.S. Patent Application Publication No. 2006/0129314 to Gi Ryoong entitled: "Navigation system", which is incorporated in its entirety for all purposes as if fully set forth herein. The navigation system includes a path analyzer, a weight generator, an algorithm pre-processor, a genetic algorithm processor, and a path selector. The path analyzer combines a plurality of inputted intermediate point information to analyze movement path information, and the weigh generator generates weight information according to duration between the intermediated points. The algorithm pre-processor combines the intermediate point information to generate an initial solution group. The genetic algorithm processor generates a new candidate solution using a candidate solution contained in the initial solution group and replaces a candidate solution contained in the initial solution group by the new candidate solution depending on movement path information of the new candidate solution. The path selector selects a candidate solution having optimized movement path information from the candidate solutions contained in the solution group.

A navigation system and various methods of using the system are described in U.S. Pat. No. 9,043,148 to Bourque et al. entitled: "Navigation system and methods for generating enhanced search results", which is incorporated in its entirety for all purposes as if fully set forth herein. Search query results are refined by the system and are prioritized based at least in part upon sub-search categories selected during the searching process. Sub-searches can be represented by graphical icons displayed on the user interface.

An example of a vehicle navigation system is Sync Navigation System by Ford Motor Company, described in April 2010, Second Printing, Owner's Guide Supplement (Document No. BA5J 19A285 AB) entitled: "2011 *Centerstack (ng1) Supplement, 2nd Printing USA (fus)*", which is incorporated in its entirety for all purposes as if fully set forth herein. Another example of a vehicle navigation system is described in 2005 Pontiac Grand Prix Navigation Manual, published 2004 by General Motors Corporation [Part No. 10382568 A First Edition], which is incorporated in its entirety for all purposes as if fully set forth herein.

A system and method for searching and retrieving location information associated with one or more points of interests are described in U.S. Pat. No. 7,082,365 to Sheha et al. entitled: "Point of interest spatial rating search method and system", which is incorporated in its entirety for all purposes as if fully set forth herein. The search criteria can be dependent upon the location of a point of interest with respect to the real-time position of the user, and any preferences or search restrictions selected by the user, such as rating information about the point of interest. Upon selecting a point of interest from the search result, the user is then given further information regarding the selected point of interest, including but not limited to directions for traveling to the point of interest. Additionally, preferred embodiments of the present invention can provide to the user a proximity notification once the user is within a certain distance from the point interest. Finally, while at a point of interest, the user can provide to the system information regarding the point of interest, such as rating of the food of a restaurant, without having to specifically identify the point of interest as the system can self-identify the point of interest by using the position information of the user.

A method for navigation is described in U.S. Pat. No. 9,726,510 to Peri et al. entitled: "Route optimization including points of interest", which is incorporated in its entirety for all purposes as if fully set forth herein. The method includes receiving in a mobile computing device (24) a designation of an origin (32, 92) and a destination (34, 94) of an itinerary of a user of the device. An optimal primary route (96) is computed from the origin to the destination. Multiple points of interest (40, 98, 100) are identified in proximity to the optimal primary route. A respective first optimal sub-route (42) is computed between the origin and each of the points of interest, and a respective second optimal sub-route (44) is computed between the destination and each of the points of interest. One or more alternative routes (102, 104) from the origin to the destination via one or more of the points of interest are presented to the user on the mobile computing device, by combining the respective first and second optimal sub-routes computed for the one or more of the points of interest.

Method and device for calculating a navigation route is described in European Patent Office Patent Application Publication No. EP 2288872 A1 to Dayananda et al. entitled: "Method and device for calculating a navigation route to associated destinations", which is incorporated in its entirety for all purposes as if fully set forth herein. The invention relates to a method for calculating a navigation route to associated destinations (points of interest POI), comprising the following steps: definition of at least one reference position; definition of a quantity of at least two destination categories of POIs, a first POI destination category being first selected and at least one second POI destination category being selected; determination of the POIs of the first and second destination categories in close proximity to the reference position and calculation of a route, which from a starting position leads at least to one POI of the first category and/or one POI of the second category, the determination and route calculation being determined in accordance with a pre-definable optimization criterion. The method is characterized in that the optimized POI determination and route calculation uses at least one item of information that is assigned to each POI of a destination category and that has been stored in advance, said information containing details of at least one POI of another destination category in close proximity. The invention also relates to a navigation device for carrying out the aforementioned method. Further, an optimization of the order of fix points on the map is described in a Google article published Mar. 10, 2010 and entitled: "A good day for salesmen that travel on bicycles", which is incorporated in its entirety for all purposes as if fully set forth herein.

A method of selecting at least one trip from a plurality of possible trips, each of the plurality of possible trips being for travel from an origin location and comprising stops at a plurality of destinations, is described in U.S. Patent Application Publication No. 2011/0145025 to Jiang et al. entitled: "Multi-destination trip selection", which is incorporated in its entirety for all purposes as if fully set forth herein. The method is performed in computer apparatus configured to execute the method. The method comprises: determining a fare for each of a plurality of different leg options for each leg, each leg being between one of: the origin location and a destination; and two destinations; selecting a plurality of candidate leg options for each leg based on comparative amounts of the determined fares, the plurality of candidate leg options being fewer in number than the plurality of different leg options; and determining at least one trip based on the plurality of candidate leg options for each leg.

Linear Programming. In many practical applications, it is required to optimize (maximize or minimize) a linear objective function, subject to linear inequality (and sometimes also equality) constraints (also known as Linear Programming (LP)). Given a polytope and a real-value affixed function defined on this polytope, a linear programming method aims to find a point on the polytope where function has the smallest (or largest) value if such a point exists, by searching through the polytope vertices. Information about linear programming and related problems can be found in the publication by T. S. Ferguson, "*LINEAR PROGRAMMING, A Concise Introduction*", which is incorporated in its entirety for all purposes as if fully set forth herein Linear programming problems are commonly expressed in canonical form such as the standard maximum problem: Maximize $c^t x$ ($=c_1 x_1 + \ldots + c_n x_n$) subject to $Ax \leq b$, where x represents the vector of variables (to be determined), c and b are vectors of known coefficients and A is a known matrix (M×N) of coefficients defining the problem. The expression $c^t x$ is the objective function to be maximized. The set of inequalities constraints $Ax \leq b$ specifies a convex polytope over which the objective function is to be optimized, which implies that every local minimum is a global minimum. Similarly, a linear function is a concave function, thus every local maximum is a global maximum. Similarly, the standard minimum problem is to minimize $y^t b$ ($=y_1 b_1 + \ldots + y_m b_m$) subject to $y^t A \geq c^t$, where y represents the vector of variables (to be determined), c and b are vectors of known coefficients and A is a known matrix of coefficients defining the problem. The standard minimum problem is defined as the dual of the standard maximum problem, and solving one commonly result in the solution for the other, as $c^t x = y^t b$ at the optimal point (assuming both problems are feasible).

Linear programming can be applied to various fields, such as business and economics, as well as for engineering. Industries that use linear programming models include transportation, energy, telecommunications, and manufacturing. LP has been further proven useful in modeling diverse types of problems in planning, routing, scheduling, assignment, and design.

As part of solving the linear programming problem, and also in many practical problems, it is required to analyze the constraints set $Ax \leq b$, known as the constraints satisfaction problem. Such analysis is required in many problems of artificial intelligence and operation research. For example, it is required to find out if a constraint set is solvable or alternatively if it is infeasible and there is no feasible region. The problem of finding a feasible set to a system of linear inequalities can be formalized as a linear programming problem in which the objective function is the zero function. In another example, it may be useful to find out which of the constraints is not part of the polytope defined by the constraints set (and thus such constraints can be omitted without affecting the solution). Further, it may be useful to find the vertices of the polyhedra defined by the constraints set, since under the convexity assumptions the solution to a linear programming problem is likely to reside in such vertex.

Most current methods for solving constraints satisfaction and linear programming problems involves high complexity calculations, and may require the use of heuristic and combinatorial search methods. Few suggested solving algorithms (such as the simplex algorithm) require limiting the problem, such as requiring that the variables are non-negative or that the right-hand side constants b are non-negative. Further, some methods require a known starting feasible point. For example, the simplex algorithm created by the American mathematician George Dantzig is a popular method for solving LP problems, and it is based on the concept of simplex, which is a polytope of N+1 vertices in N dimensions. This boundary method algorithm uses walking along the edges of the polytope to vertices with higher objective function values, until either an optimum extreme point is found or an unbounded edge along which the objective function diverges is found. However, the simplex algorithm assumes that the variables x and the coefficients b are non-negative. Further, the simplex algorithm involves the complexity of inverting matrices of the size of the number of constraints. As such, the complexity is high in case of a large number of constraints.

TSP. The traveling salesman problem consists of a salesman and a set of cities. The salesman has to visit each one of the cities starting from a certain one (e.g., the hometown) and returning to the same city. The challenge of the problem is that the traveling salesman wants to minimize the total length of the trip. The Traveling Salesman Problem (TSP) can simply be stated as: if a traveling salesman wishes to visit exactly once each of a list of m cities (where the cost of traveling from city i to city j is cij) and then return to the home city, what is the least costly route the traveling salesman can take?. The TSP problem is a NP problem that is actually NP-Hard, and belongs in the class of such problems known as NP-complete. TSP is usually modeled using graphs. A graph is an ordered pair G=(V, E), where V is a set of vertices and E is a set of edges. Graphs can be drawn using points for vertices and lines for edges. In the case of TSP every city is a vertex and edges have weight which represents the length between two cities. For this problem all vertices are connected with each other, referred to as a complete graph. Having this property guarantees that the circle exists (with Hamiltonian Cycle you have to find if the circle exists).

TSP can be modelled as an undirected weighted graph, such that cities are the graph's vertices, paths are the graph's edges, and a path's distance is the edge's weight. It is a minimization problem starting and finishing at a specified vertex after having visited each other vertex exactly once. Often, the model is a complete graph (i.e., each pair of vertices is connected by an edge). If no path exists between two cities, adding an arbitrarily long edge will complete the graph without affecting the optimal tour.

A TSP may be asymmetric or symmetric. In the symmetric TSP, the distance between two cities is the same in each opposite direction, forming an undirected graph. This symmetry halves the number of possible solutions. In the asymmetric TSP, paths may not exist in both directions or the distances might be different, forming a directed graph. Traffic collisions, one-way streets, and airfares for cities with different departure and arrival fees are examples of how this symmetry could break down.

One way to sole a TSP is by devising exact algorithms, which work reasonably fast only for small problem sizes. The most direct solution would be to try all permutations (ordered combinations) and see which one is cheapest (using brute force search). Other approach for solving TSP is using "suboptimal" or heuristic algorithms, i.e., algorithms that deliver either seemingly or probably good solutions, but which could not be proved to be optimal. Heuristics are algorithms which try to do the best possible to find the solution, but there is no guarantee that the solution found is the best. Another approach involves finding special cases for the problem ("subproblems") for which either better or exact heuristics are possible. Various heuristics and approximation algorithms, which quickly yield good solutions have been devised. Modem methods can find solutions for extremely large problems (millions of cities) within a reasonable time which are with a high probability just 2-3% away from the optimal solution. Heuristics solutions may involve constructive heuristics, the Nearest Neighbour (NN) algorithm (a greedy algorithm) which lets the salesman choose the nearest unvisited city as his next move, and the Christofides' algorithm for the TSP that follows a similar outline but combines the minimum spanning tree with a solution of another problem, minimum-weight perfect matching, and the pairwise exchange or 2-opt technique that involves iteratively removing two edges and replacing these with two different edges that reconnect the fragments created by edge removal into a new and shorter tour.

An introduction to the Traveling Salesman Problem that includes current research is described in a paper entitled: "*THE TRAVELING SALESMAN PROBLEM*" by Corinne Brucato published 2013 by the University of Pittsburgh, which is incorporated in its entirety for all purposes as if fully set forth herein. Although a global solution for the Traveling Salesman Problem does not yet exist, there are algorithms for an existing local solution. There are also necessary and sufficient conditions to determine if a possible solution does exist when one is not given a complete graph. Additionally, the algorithms are used to and a route traveling through twenty US colleges. As well, we use the Geometric Algorithm to assign scouts for the Pittsburgh Pirates.

The Traveling Salesman Problem (TSP) has been an early proving ground for many approaches to combinatorial optimization, including classical local optimization techniques as well as many of the more recent variants on local optimization, such as simulated annealing, tabu search, neural networks, and genetic algorithms. A chapter entitled: "*The Traveling Salesman Problem: A Case Study in Local Optimization*" by David S. Johnson and Lyle A. McGeoch published Nov. 20, 1995, which is incorporated in its entirety for all purposes as if fully set forth herein, discusses how these various approaches have been adapted to the TSP and evaluates their relative success in this perhaps atypical domain from both a theoretical and an experimental point of view.

Solving a Traveling Salesman Problem (TSP) is described in U.S. Patent Application Publication No. 2003/0084011 to Shetty entitled: "Methods for solving the traveling salesman problem", which is incorporated in its entirety for all purposes as if fully set forth herein. The TSP solving is by selecting a set of locations to visit, selecting a starting point and an ending point from the set of locations, applying a search method to the set of locations, and providing a route as a solution to the TSP, where the search method is a combinatoric approach to a genetic search and the search method simultaneously minimizes distance and time. The route starts and ends in different locations and completes in polynomial time, such as O(n+k), where k is a constant. The solution to the TSP has many applications, including finding distribution chains to satisfy customer demand for an Internet enterprise.

Bayesian optimization. Bayesian optimization (or Bayesian network) is a sequential design strategy for global optimization of black-box functions that does not assume any functional forms. It is usually employed to optimize expensive-to-evaluate functions. Bayesian optimization is typically used on problems of the form Max[$f(x)$] where $x \in A$, where A is a set of points, which rely upon less than 20 dimensions. and whose membership can easily be evaluated. Bayesian optimization is particularly advantageous for problems where is difficult to evaluate due to its computational cost. The objective function $f(x)$ is continuous and takes the form of some unknown structure, referred to as a "black box". Upon its evaluation, only $f(x)$ is observed and its derivatives are not evaluated.

Since the objective function is unknown, the Bayesian strategy is to treat it as a random function and place a prior over it. The prior captures beliefs about the behavior of the function. After gathering the function evaluations, which are treated as data, the prior is updated to form the posterior distribution over the objective function. The posterior distribution, in turn, is used to construct an acquisition function (often also referred to as infill sampling criteria) that determines the next query point. There are several methods used to define the prior/posterior distribution over the objective function. The most common two methods use Gaussian processes in a method called kriging. Another less expensive method uses the Parzen-Tree Estimator to construct two distributions for 'high' and 'low' points, and then finds the location that maximizes the expected improvement.

Standard Bayesian optimization relies upon each x∈A, being easy to evaluate, and problems that deviate from this assumption are known as exotic Bayesian optimization problems. Optimization problems can become exotic if it is known that there is noise, the evaluations are being done in parallel, the quality of evaluations relies upon a trade-off between difficulty and accuracy, the presence of random environmental conditions, or if the evaluation involves derivatives. Examples of acquisition functions include probability of improvement; expected improvement; Bayesian expected losses; Upper Confidence Bounds (UCB) or lower confidence bounds; Thompson sampling, and hybrids of these. They all trade-off exploration and exploitation so as to minimize the number of function queries. As such, Bayesian optimization is well suited for functions that are expensive to evaluate.

A Bayesian network is a representation of a joint probability distribution of a set of random variables with a possible mutual causal relationship. The network consists of nodes representing the random variables, edges between pairs of nodes representing the causal relationship of these nodes, and a conditional probability distribution in each of the nodes. The main objective of the method is to model the posterior conditional probability distribution of outcome (often causal) variable(s) after observing new evidence. Bayesian networks may be constructed either manually with knowledge of the underlying domain, or automatically from a large dataset by appropriate software. Bayesian network methodology is a report published Apr. 18, 2014 by Boston University School of public health, authored by Michal Horny and entitled: "*Technical Report No. 5 Bayesian Networks*", which is incorporated in its entirety for all purposes as if fully set forth herein.

Bayesian optimization is a methodology for optimizing expensive objective functions that has proven success in the sciences, engineering, and beyond. This timely text provides a self-contained and comprehensive introduction to the subject, starting from scratch and carefully developing all the key ideas along the way. This bottom-up approach illuminates unifying themes in the design of Bayesian optimization algorithms and builds a solid theoretical foundation for approaching novel situations. The theoretical and practical aspects of Gaussian process modeling, the Bayesian approach to sequential decision making, and the realization and computation of practical and effective optimization policies, are described in a book by Roman Garnett published 2023 by Cambridge University Press [DOI: 10.1017/9781108348973; ISBN 978-1-108-42578-0] entitled: "Bayesian Optimization", which is incorporated in its entirety for all purposes as if fully set forth herein. The book further provides an overview of theoretical convergence results, a survey of notable extensions, a comprehensive history of Bayesian optimization, and an extensive annotated bibliography of applications.

Casual inference. Causal inference is the process of determining the independent, actual effect of a particular phenomenon that is a component of a larger system. The main difference between causal inference and inference of association is that causal inference analyzes the response of an effect variable when a cause of the effect variable is changed. Causal inference is said to provide the evidence of causality theorized by causal reasoning. Causal inference is widely studied across all sciences. Causal inference remains especially difficult where experimentation is difficult or impossible, which is common throughout most sciences.

Causal inference is conducted via the study of systems where the measure of one variable is suspected to affect the measure of another. Causal inference is conducted with regard to the scientific method. The first step of causal inference is to formulate a falsifiable null hypothesis, which is subsequently tested with statistical methods. Frequentist statistical inference is the use of statistical methods to determine the probability that the data occur under the null hypothesis by chance; Bayesian inference is used to determine the effect of an independent variable. Statistical inference is generally used to determine the difference between variations in the original data that are random variation or the effect of a well-specified causal mechanism. Notably, correlation does not imply causation, so the study of causality is as concerned with the study of potential causal mechanisms as it is with variation amongst the data. A frequently sought after standard of causal inference is an experiment wherein treatment is randomly assigned but all other confounding factors are held constant. Most of the efforts in causal inference are in the attempt to replicate experimental conditions. Common frameworks for causal inference include the causal pie model (component-cause), Pearl's structural causal model (causal diagram+do-calculus), structural equation modeling, and Rubin causal model (potential-outcome), which are often used in areas such as social sciences and epidemiology.

Experimental verification of causal mechanisms is possible using experimental methods. The main motivation behind an experiment is to hold other experimental variables constant while purposefully manipulating the variable of interest. If the experiment produces statistically significant effects as a result of only the treatment variable being manipulated, there is grounds to believe that a causal effect can be assigned to the treatment variable, assuming that other standards for experimental design have been met. Quasi-experimental verification of causal mechanisms is conducted when traditional experimental methods are unavailable. This may be the result of prohibitive costs of conducting an experiment, or the inherent infeasibility of conducting an experiment, especially experiments that are concerned with large systems such as economies of electoral systems, or for treatments that are considered to present a danger to the well-being of test subjects. Quasi-experiments may also occur where information is withheld for legal reasons.

Causal inference is a complex scientific task that relies on triangulating evidence from multiple sources and on the application of a variety of methodological approaches. causal inference without models (i.e., nonparametric identification of causal effects), P causal inference with models (i.e., estimation of causal effects with parametric models), and causal inference from complex longitudinal data (i.e., estimation of causal effects of time-varying treatments), are described in a book by Miguel A. Hernán and James M. Robins, published Oct. 1, 2019 by Boca Raton: Chapman & Hall/CRC, and entitled: "*Causal Inference: What If*", which is incorporated in its entirety for all purposes as if fully set forth herein. The book provides a cohesive presentation of concepts of, and methods for, causal inference that are currently scattered across journals in several disciplines.

Causal modeling tools, in particular, causal diagrams, and their associated logic are described in an article by Judea Pearl published 21 Feb. 2019 in Communications of the ACM Volume 62 Issue 3 pp 54-60 [https://doi.org/10.1145/3241036] and entitled: "*The Seven Tools of Causal Inference, with Reflections on Machine Learning*", which is incorporated in its entirety for all purposes as if fully set forth herein. The article describes a three-level hierarchy that restricts and governs inferences in causal reasoning, and the final section summarizes how traditional impediments are circumvented through modem tools of causal inference. Seven tasks are described, that are beyond the reach of "associational" learning systems, and have been (and can be) accomplished only through the tools of causal modeling.

K-Means Clustering. K-means clustering is a method of vector quantization, originally from signal processing, that aims to partition n observations into k clusters in which each observation belongs to the cluster with the nearest mean (cluster centers or cluster centroid), serving as a prototype of the cluster. This results in a partitioning of the data space into Voronoi cells. k-means clustering minimizes within-cluster variances (squared Euclidean distances), but not regular Euclidean distances, which would be the more difficult Weber problem: the mean optimizes squared errors, whereas only the geometric median minimizes Euclidean distances. For instance, better Euclidean solutions can be found using k-medians and k-medoids. The problem is computationally difficult (NP-hard); however, efficient heuristic algorithms converge quickly to a local optimum. These are usually similar to the expectation-maximization algorithm for mixtures of Gaussian distributions via an iterative refinement approach employed by both k-means and Gaussian mixture modeling. They both use cluster centers to model the data; however, k-means clustering tends to find clusters of comparable spatial extent, while the Gaussian mixture model allows clusters to have different shapes. The unsupervised K-means algorithm has a loose relationship to the K-nearest neighbor classifier, a popular supervised machine learning technique for classification that is often confused with k-means due to the name. Applying the 1-nearest neighbor classifier to the cluster centers obtained by k-means classifies new data into the existing clusters. This is known as nearest centroid classifier or Rocchio algorithm.

Using K-means algorithm involves picking K number of points for each cluster known as centroids. Each data point forms a cluster with the closest centroids i.e., K clusters are formed. The centroid of each cluster is defined based on existing cluster members. These steps are repeated to form additional centroids, by finding the closest distance for each data point from new centroids and get associated with new k-clusters. The process is repeated until convergence occurs, such as where the centroids do not change. In K-means, we have clusters and each cluster has its own centroid. Sum of squares of difference between the centroids of the respective clusters and the data points within each cluster that are within sum of square value for that cluster. When the sum of square values for all the clusters are added, it becomes total within the sum of square values for the cluster solution. As the number of clusters increases, this value keeps on decreasing until the sum of squared distance decreases sharply up to some value of k, and then much more slowly above this value, allowing for determining optimum number of clusters (K).

The purpose of clustering is organizing a set of data into clusters, such that the elements in each cluster are similar and different from those in other clusters. One of the most used clustering algorithms presently is K-means, because of its easiness for interpreting its results and implementation. The solution to the K-means clustering problem is NP-hard, which justifies the use of heuristic methods for its solution. Improvements to the algorithm are described in a paper by Joaquin Perez Ortega, Nelva Nely Almanza-Ortega, Andrea Vega-Villalobos, and Rodolfo Pazos-Rangel published April 2019 [DOI:10.5772/intechopen.85447] and entitled: "*The K-Means Algorithm Evolution*", which is incorporated in its entirety for all purposes as if fully set forth herein.

Clustering is a typical unsupervised learning method, and it is also very important in natural language processing. K-means is one of the classical algorithms in clustering. In K-means algorithm, the processing mode of abnormal data and the similarity calculation method will affect the clustering division. A new similarity calculation method, that is, a similarity calculation method based on weighted and Euclidean distance is proposed in a paper by YanPing Zhao and XiaoLai Zhou published April 2021 in Journal of Physics Conference Series 1873(1):012074 [DOI:10.1088/1742-6596/1873/1/012074] and entitled: "*K-means Clustering Algorithm and Its Improvement Research*", which is incorporated in its entirety for all purposes as if fully set forth herein. Experiments show that the new algorithm is superior to K-means algorithm in efficiency, correctness and stability.

Instant Messaging. Instant Messaging (IM) is a type of online chat, which offers real-time text transmission over the Internet. Short messages are typically transmitted bi-directionally between two parties, when each user chooses to complete a thought and select "send". Some IM applications can use push technology to provide real-time text, which transmits messages character by character, as they are composed. More advanced instant messaging can add file transfer, clickable hyperlinks, Voice over IP, or video chat. Instant messaging systems typically facilitate connections between specified known users (often using a contact list also known as a "buddy list" or "friend list"). Depending on the IM protocol, the technical architecture can be peer-to-peer (direct point-to-point transmission) or client-server (a central server retransmits messages from the sender to the communication device).

Instant messaging is a set of communication technologies used for text-based communication between two or more participants over the Internet or other types of networks. IM-chat happens in real-time. Of importance is that online chat and instant messaging differ from other technologies such as email due to the perceived quasi-synchrony of the communications by the users. Some systems permit messages to be sent to users not then 'logged on' (offline messages), thus removing some differences between IM and email (often done by sending the message to the associated email account). Various IP technologies are described in a thesis by Tim van Lokven (Jan. 23, 2011) entitled: "Review and Comparison of Instant Messaging Protocols", which is incorporated in its entirety for all purposes as if fully set forth herein.

Text Messaging. Text messaging, or texting, is the act of composing and sending brief, electronic messages between two or more mobile phones, or fixed or portable devices over a phone network. The term commonly refers to messages sent using the Short Message Service (SMS), but may include messages containing image, video, and sound content (known as MMS messages). The sender of a text message is known as a texter, while the service itself has different colloquialisms depending on the region. Text messages can be used to interact with automated systems, for example, to order products or services, or to participate in contests. Advertisers and service providers use direct text marketing to message mobile phone users about promotions, payment due dates, et cetera instead of using mail, e-mail or voicemail. In a straight and concise definition for the purposes of this English language article, text messaging by phones or mobile phones should include all 26 letters of the alphabet and 10 numerals, i.e., alpha-numeric messages, or text, to be sent by texter or received by the textee. SMS messaging gateway providers can provide gateway-to-mobile (Mobile Terminated—MT) services. Some suppliers can also supply mobile-to-gateway (text-in or Mobile Originated/MO services).

SMS. Short Message Service (SMS) is a text messaging service component of phone, Web, or mobile communication systems. It uses standardized communications protocols to allow fixed line or mobile phone devices to exchange short text messages. SMS as used on modern handsets as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS, as well as satellite and landline networks. The Short Message Service-Point to Point (SMS-PP) is standardized by the 3GPP as TS 23.040 and 3GPP TS 23.041, which define the Short Message Service-Cell Broadcast (SMS-CB), which allows messages (advertising, public information, etc.) to be broadcast to all mobile users in a specified geographical area.

Messages are sent to a Short Message Service Center (SMSC), which provides a "store and forward" mechanism. It attempts to send messages to the SMSC recipients, and if a recipient is not reachable, the SMSC queues the message for later retry. Some SMSCs also provide a "forward and forget" option where transmission is tried only once. Both Mobile Terminated (MT, for messages sent to a mobile handset) and Mobile Originating (MO, for those sent from the mobile handset) operations are supported, and the message delivery is "best effort" scheme, so there are no guarantees that a message will actually be delivered to its recipient, but delay or complete loss of a message is uncommon. SMS is a stateless communication protocol in which every SMS message is considered entirely independent of other messages. Enterprise applications using SMS as a communication channel for stateful dialogue (where an MO reply message is paired to a specific MT message) requires that session management be maintained external to the protocol through proprietary methods as Dynamic Dialogue Matrix (DDM).

The Short Message Service is realized by the use of the Mobile Application Part (MAP) of the SS #7 protocol, with Short Message protocol elements being transported across the network as fields within the MAP messages. These MAP messages may be transported using 'traditional' TDM based signaling, or over IP using SIGTRAN and an appropriate adaptation layer. The Short Message protocol itself is defined by 3GPP TS 23.040 for the Short Message Service-Point to Point (SMS-PP), and 3GPP TS 23.041 for the Cell Broadcast Service (CBS). SMS is further described in a 3 GPP Technical Specification 3GPP TS 22.011 (v143.0.0, 2015-09) entitled: "3rd Generation Partnership Project; Technical Specification Group Services and System Aspects; Service accessibility (Release 14)", which is incorporated in its entirety for all purposes as if fully set forth herein.

MMS. Multimedia Messaging Service (MMS) is an Open Mobile Alliance (OMA) standard way to send messages that include multimedia content to and from mobile phones over a cellular network. It extends the core SMS (Short Message Service) capability that allowed exchange of text messages only up to 160 characters in length. The most popular use is to send photographs from camera-equipped handsets, and is also used on a commercial basis by media companies as a method of delivering news and entertainment content and by retail brands as a tool for delivering scannable coupon codes, product images, videos and other information. Unlike text only SMS, commercial MMS can deliver a variety of media including up to forty seconds of video, one image, multiple images via slideshow, or audio plus unlimited characters.

MMS messages are delivered differently from SMS. The first step is for the sending device to encode the multimedia content in a fashion similar to sending a MIME e-mail (MIME content formats are defined in the MMS Message Encapsulation specification). The message is then forwarded to the carrier MMS store and forward server, known as the MMSC (Multimedia Messaging Service Centre). If the receiver is on another carrier, then the MMSC acts as a relay, and forwards the message to the MMSC of the recipient's carrier using the Internet.

Once the recipient MMSC has received a message, it first determines whether the receiver's handset is "MMS capable", that it supports the standards for receiving MMS. If so, the content is extracted and sent to a temporary storage server with an HTTP front-end. An SMS "control message" (ping) containing the URL of the content is then sent to the recipient's handset to trigger the receiver's WAP browser to open and receive the content from the embedded URL. Several other messages are exchanged to indicate status of the delivery attempt. Before delivering content, some MMSCs also include a conversion service known as "content adaptation" that will attempt to modify the multimedia content into a format suitable for the receiver. E-mail and web-based gateways to the MMS (and SMS) system are common. On the reception side, the content servers can typically receive service requests from both WAPs and normal HTTP browsers, so delivery via the web is simple. For sending from external sources to handsets, most carriers allow MIME encoded message to be sent to the receiver's phone number with a special domain. MMS is described in a 3GPP technical specification 3GPP TS 23.140 V6.16.0 (2009-03) entitled: "3rd Generation Partnership Project; Technical Specification Group Core Network and Terminals; Multimedia Messaging Service (MMS); Functional description; Stage 2 (Release 6)", which is incorporated in its entirety for all purposes as if fully set forth herein.

Facebook. Facebook Messenger is an instant messaging service and software application which provides text and voice communication. Integrated with Facebook web-based Chat feature and built on the open MQTT protocol, Messenger lets Facebook users chat with friends both on mobile and on the main website. Facebook is described in a guide by American Majority organization (retrieved October 2015 from http://cmrw.org/) entitled: "facebook—A Beginner's Guide", which is incorporated in its entirety for all purposes as if fully set forth herein.

Twitter. Twitter is an online social networking service by Twitter Inc. (headquartered in San Francisco) that enables users to send and read short 140-character messages called "tweets". Registered users can read and post tweets, but unregistered users can only read them. Users access Twitter through the website interface, SMS, or mobile device applications. Tweets are publicly visible by default, but senders can restrict message delivery to just their followers. Users can tweet via the Twitter website, compatible external applications (such as for smartphones), or by Short Message Service (SMS) available in certain countries. Retweeting is when users forward a tweet via Twitter. Both tweets and retweets can be tracked to see which ones are most popular. Users may subscribe to other users tweets—this is known as "following" and subscribers are known as "followers" or "tweeps", a portmanteau of Twitter and peeps. Users can check the people who are unsubscribing them on Twitter ("unfollowing") via various services. In addition, users can block those who have followed them.

As a social network, Twitter revolves around the principle of followers. When you choose to follow another Twitter user, that user's tweets appear in reverse chronological order on your main Twitter page. Individual tweets are registered under unique IDs using software called snowflake, and geolocation data is added using 'Rockdove'. The URL t.co then checks for a spam link and shortens the URL. Next, the tweets are stored in a MySQL database using Gizzard, and the user receives acknowledgement that the tweets were sent. Tweets are then sent to search engines via the Firehose API. The process itself is managed by FlockDB and takes an average of 350 ms, and the service's Application Programming Interface (API) allows other web services and applications to integrate with Twitter. Twitter is described in a guide (retrieved October 15 from https://g.twimg.com/business/pdfs/Twitter_Smallbiz_Guide.pdf) by Twitter, Inc., entitled: "*Twitter for Small Business—A GUIDE TO GET STARTED*", which is incorporated in its entirety for all purposes as if fully set forth herein.

WhatsApp. WhatsApp is an instant messaging app developed by WhatsApp Inc. (headquartered in Mountain View, California) for smartphones that operates under a subscription business model. The proprietary, cross-platform app uses the Internet to send text messages, images, video, user location and audio media messages. WhatsApp uses a customized version of the open standard Extensible Messaging and Presence Protocol (XMPP). Upon installation, it creates a user account using one's phone number as the username (Jabber ID: [phone number]@s.whatsapp.net) WhatsApp software automatically compares all the phone numbers from the device's address book with its central database of WhatsApp users to automatically add contacts to the user's WhatsApp contact list.

Multimedia messages are sent by uploading the image, audio or video to be sent to an HTTP server and then sending a link to the content along with its Base64 encoded thumbnail (if applicable). WhatsApp follows a 'store and forward' mechanism for exchanging messages between two users. When a user sends a message, it first travels to the WhatsApp server where it is stored. Then the server repeatedly requests the receiver acknowledge receipt of the message. As soon as the message is acknowledged, the server drops the message; it is no longer available in database of server. The WhatsApp service is described in an article published (Aug. 30, 2013) on MOBILE HCl 2013—COLLABORATION AND COMMUNICATION by Karen Church and Rodrigo de Oliveira (both of Telefonica Research) entitled: "What's up with WhatsApp? Comparing Mobile Instant—Messaging Behaviors with Traditional SMS", which is incorporated in its entirety for all purposes as if fully set forth herein.

Viber. Viber is an instant messaging and Voice over IP (VoIP) app for smartphones developed by Viber Media, where in addition to instant messaging, users can exchange images, video and audio media messages. Viber works on both 3G/4G and Wi-Fi networks. Viber includes text, picture and video messaging across all platforms, with voice calling available only to iPhone, Android and Microsoft's Windows Phone. The application user interface includes tab bar on the bottom, giving access to messages, recent calls, contact, the keypad and a button for accessing more options. Upon installation, it creates a user account using one's phone number as username. Viber synchronizes with the phone's address book, so users do not need to add contacts in a separate book. Since all users are registered with their phone number, the software returns all Viber users among the user contacts.

Mail Server. Mail server (a.k.a. Email server, Electronic Mail server, Mail Exchanger—MX) refer to a server operating as an electronic post office for email exchanging across networks, commonly performing the server-side of an MTA function. A Message Transfer Agent (or Mail Transfer Agent—MTA), or mail relay is a software that transfers electronic mail messages from one computer to another using a client-server application architecture. An MTA typically implements both the client (sending) and server (receiving) portions of the Simple Mail Transfer Protocol (SMTP). The Internet mail architecture is described in IETF RFC 5598 entitled: "*Internet Mail Architecture*", and the SMTP protocol is described in IETF RFC 5321 entitled: "*Simple Mail Transfer Protocol*" and in IETF RFC 7504 entitled: "*SMTP* 521 and 556 *Reply Codes*", which are all incorporated in their entirety for all purposes as if fully set forth herein.

The Domain Name System (DNS) typically associates a mail server to a domain with mail exchanger (MX) resource records, containing the domain name of a host providing MTA services. A message transfer agent receives mail either from another MTA, a Mail Submission Agent (MSA), or a Mail User Agent (MUA). The transmission details are specified by the Simple Mail Transfer Protocol (SMTP). When a recipient mailbox of a message is not hosted locally, the message is relayed, that is, forwarded to another MTA. Every time an MTA receives an email message, it adds a 'Received' trace header field to the top of the header of the message, thereby building a sequential record of MTAs handling the message. The process of choosing a target MTA for the next hop is also described in SMTP, but can usually be overridden by configuring the MTA software with specific routes. Internet mail schemes are described in IEEE Annals of the History of Computing paper published 2008 by the IEEE Computer Society [1058-6180/08], authored by Craig Partridge of BBN Technologies entitled: "The technical Development of Internet Mail", which is incorporated in its entirety for all purposes as if fully set forth herein.

A mail server infrastructure consists of several components that work together to send, relay, receive, store, and deliver email, and typically uses various Internet standard protocols for sending and retrieving email, such as the Internet standard protocol Simple Mail Transfer Protocol (SMTP) for sending email, the Internet standard protocols for retrieving email Post Office Protocol (POP), and Internet Message Access Protocol version 4 (IMAPv4). An example of a mail server software is 'Microsoft Exchange Server 2013' (available from Microsoft Corporation, headquartered in Redmond, Washington, U.S.A.), described in 'Pocket Consultant' book [ISBN: 978-O-7356-8168-2] published 2013 by Microsoft Press and entitled: "Microsoft Exchange Server 2013—Configuration & Clients", which is incorporated in its entirety for all purposes as if fully set forth herein.

The POP is specified in IETF RFC 1939 entitled: "Post Office Protocol", and updated specification with an extension mechanism is described in IETF RFC 2449 entitled: "POP3 Extension Mechanism", and an authentication mechanism is described in IETF RFC 1734 entitled: "POP3 AUTHentication command", which are all incorporated in their entirety for all purposes as if fully set forth herein. IMAP4 clients can create, rename, and/or delete mailboxes (usually presented to the user as folders) on the mail server, and copy messages between mailboxes, and this multiple mailbox support also allows servers to access shared and public folders. IMAP4 is described in IETF RFC 3501 entitled: "INTERNET MESSAGE ACCESS PROTO-COL—VERSION 4rev1", and the IMAP4 Access Control List (ACL) Extension may be used to regulate access rights, and is described in IETF RFC 4314 entitled: "IMAP4 Access Control List (ACL) Extension", which are both incorporated in their entirety for all purposes as if fully set forth herein.

Mail servers may be operated, or used by mailbox providers, and mail servers are described in U.S. Pat. No. 5,832,218 to Gibbs et al. entitled: "Client/server Electronic Mail System for Providing Off-Line Client Utilization and Seamless Server Resynchronization", in U.S. Pat. No. 6,081,832 to Gilchrist et al. entitled: "Object Oriented Mail Server Framework Mechanism", in U.S. Pat. No. 7,136,901 to Chung et al. entitled: "Electronic Mail Server", and in U.S. Pat. No. 7,818,383 to Kodama entitled: "E-Mail Server", which are all incorporated in their entirety for all purposes as if fully set forth herein.

XMPP. Extensible Messaging and Presence Protocol (XMPP) is an open standard communications protocol for message-oriented middleware based on XML (Extensible Markup Language) that enables the near-real-time exchange of structured yet extensible data between any two or more network entities. Designed to be extensible, the protocol has also been used for publish-subscribe systems, signaling for VoIP, video, file transfer, gaming, Internet of Things (IoT) applications such as the smart grid, and social networking services. The XMPP network uses a client-server architecture where clients do not talk directly to one another. The model is decentralized and anyone can run a server. By design, there is no central authoritative. Every user on the network has a unique XMPP address, called JID (for historical reasons, XMPP addresses are often called Jabber IDs). The JID is structured like an email address with a username and a domain name (or IP address) for the server where that user resides, separated by an at sign (@), such as username@example.com. Since a user may wish to log in from multiple locations, they may specify a resource. A resource identifies a particular client belonging to the user (for example home, work, or mobile). This may be included in the JID by appending a slash followed by the name of the resource. For example, the full JID of a user's mobile account could be username@example.com/mobile. Each resource may have specified a numerical value called priority. Messages simply sent to username@example.com will go to the client with highest priority, but those sent to username@example.com/mobile will go only to the mobile client. The highest priority is the one with largest numerical value. JIDs without a username part are also valid, and may be used for system messages and control of special features on the server. A resource remains optional for these JIDs as well. XMPP is described in IETF RFC 6120 entitled: "Extensible Messaging and Presence Protocol (XMPP): Core", which describes client-server messaging using two open-ended XML streams, in IETF RFC 6121 entitled: "Extensible Messaging and Presence Protocol (XMPP): Instant Messaging and Presence", which describes instant messaging (IM), the most common application of XMPP, and in IETF RFC 6122 entitled: "Extensible Messaging and Presence Protocol (XMPP): Address Format", which describes the rules for XMPP addresses, also called JabberIDs or JIDs.

SIMPLE. The Session Initiation Protocol (SIP) for Instant Messaging and Presence Leveraging Extensions (SIMPLE) is an open standard Instant Messaging (IM) and presence protocol suite based on Session Initiation Protocol (SIP) managed by the Internet Engineering Task Force. The SIMPLE presence use the core protocol machinery that provides the actual SIP extensions for subscriptions, notifications and publications. IETF RFC 6665 defines the SUB-SCRIBE and NOTIFY methods, where SUBSCRIBE allows to subscribe to an event on a server, and the server responds with NOTIFY whenever the event come up. IETF RFC 3856 defines how to make use of SUBSCRIBE/NOTIFY for presence. Two models are defined: an end-to-end model in which each User Agent handles presence subscriptions itself, and a centralized model. The message PUBLISH (IETF RFC 3903) allows User Agents to inform the presence server about their subscription states.

SIP defines two modes of instant messaging: The Page Mode makes use of the SIP method MESSAGE, as defined in IETF RFC 3428. This mode establishes no sessions, and the Session Mode. The Message Session Relay Protocol (RFC 4975, RFC 4976) is a text-based protocol for exchanging arbitrarily-sized content between users, at any time. An MSRP session is set up by exchanging certain information, such as an MSRP URI, within SIP and SDP signaling. SIMPLE is described in IETF RFC 6914 entitled: "SIMPLE Made Simple: An Overview of the IETF Specifications for Instant Messaging and Presence Using the Session Initiation Protocol (SIP)", which is incorporated in its entirety for all purposes as if fully set forth herein.

Any message herein may comprise the time of the message and the controlled switch status, and may be sent over the Internet via the wireless network to a client device using a peer-to-peer scheme. Alternatively or in addition, any message herein may be sent over the Internet via the wireless network to an Instant Messaging (IM) server for being sent to a client device as part of an IM service. The message or the communication with the IM server may use, or may be based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP). The message may be a text-based message and the IM service may be a text messaging service, and may be according to, or may be based on, a Short Message Service (SMS) message and the IM service may be a SMS service, the message may be according to, or based on, an electronic-mail (e-mail) message and the IM service may be an e-mail service, the message may be according to, or based on, WhatsApp message and the IM service may be a WhatsApp service, the message may be according to, or based on, an Twitter message and the IM service may be a Twitter service, or the message may be according to, or based on, a Viber message and the IM service may be a Viber service. Alternatively or in addition, the message may be a Multimedia Messaging Service (MMS) or an Enhanced Messaging Service (EMS) message that includes an audio or video data, and the IM service may respectively be a MMS or EMS service.

Database. A database is an organized collection of data, typically managed by a DataBase Management System (DBMS) that organizes the storage of data and performs other functions such as the creation, maintenance, and usage of the database storage structures. The data is typically organized to model aspects of reality in a way that supports processes requiring information. Databases commonly also provide users with a user interface and front-end that enables the users to query the database, often in complex manners that require processing and organization of the data. The term "database" is used herein to refer to a database, or to both a database and the DBMS used to manipulate it. Database management systems (DBMS) are typically computer software applications that interact with the user, other applications, and the database itself to capture and analyze data, typically providing various functions that allow entry, storage and retrieval of large quantities of information, as well as providing ways to manage how that information is organized. A general-purpose DBMS is designed to allow the definition, creation, querying, update, and administration of databases. Examples of DBMSs include MySQL, PostgreSQL, Microsoft SQL Server, Oracle, Sybase and IBM DB2. Database technology and application is described in a document published by Telemark University College entitled "Introduction to Database Systems", authored by Hans-Petter Halvorsen (dated 2014 Mar. 3), which is incorporated in its entirety for all purposes as if fully set forth herein.

SQL. Structured Query Language (SQL) is a widely-used programming language for working with relational databases, designed for managing data held in a relational database management system (RDBMS), or for stream processing in a relational data stream management system (RDSMS). SQL consists of a data definition language and a data manipulation language. The scope of SQL includes data insert, query, update and delete, schema creation and modification, and data access control. Although SQL is often described as, and largely is, a declarative language (4 GL), it also includes procedural elements. SQL is designed for querying data contained in a relational database, and is a set-based, declarative query language. The SQL is standardized as ISO/IEC 9075:2011 standard: "*Information technology—Database languages—SQL*". The ISO/IEC 9075 standard is complemented by ISO/IEC 13249 standard: "*SQL Multimedia andApplication Packages*" that defines interfaces and packages based on SQL. The aim is a unified access to typical database applications like text, pictures, data mining or spatial data. SQL is described in the tutorial entitled: "*Oracle/SQL Tutorial*" by Michael Gertz of the University of California, which is incorporated in its entirety for all purposes as if fully set forth herein.

NoSQL. A NoSQL (also referred to as "non-SQL" or "non-relational") database provides a mechanism for storage and retrieval of data that is modeled in means other than the tabular relations used in relational databases. Motivations for this approach include simplicity of design, simpler "horizontal" scaling to clusters of machines (which is a problem for relational databases), finer control over availability and limiting the object-relational impedance mismatch. The data structures used by NoSQL databases (e.g., key-value pair, wide column, graph, or document) are different from those used by default in relational databases, making some operations faster in NoSQL. The particular suitability of a given NoSQL database depends on the problem it must solve. Sometimes the data structures used by NoSQL databases are also viewed as "more flexible" than relational database tables.

Most NoSQL databases offer a concept of "eventual consistency", in which database changes are propagated to all nodes "eventually" (typically within milliseconds), so queries for data might not return updated data immediately or might result in reading data that is not accurate, a problem known as stale reads. Additionally, some NoSQL systems may exhibit lost writes and other forms of data loss. Some NoSQL systems provide concepts such as write-ahead logging to avoid data loss. For distributed transaction processing across multiple databases, data consistency is an even bigger challenge that is difficult for both NoSQL and relational databases.

MongoDB. MongoDB is a reliable, high-performance system that allows for almost infinite horizontal scalability, that is supported as an open-source database. MongoDB is a source-available cross-platform document-oriented database program. Classified as a NoSQL database program, MongoDB uses JSON-like documents with optional schemas. MongoDB is developed by MongoDB Inc. and licensed under the Server Side Public License (SSPL) which is deemed non-free by several distributions. A guidance for MongoDB is provided is a book by Kristina Chodorow and Michael Dirolf published September 2010 (First Edition) by O'Reilly Media, Inc. [ISBN: 978-1-449-38156-1], entitled: "*MongoDB: The Definitive Guide*", which is incorporated in its entirety for all purposes as if fully set forth herein. The book provides an overview of the concepts and use cases, and explains how to handle data as self-contained JSON-style documents, rather than as records in a relational database.

MongoDB supports field, range query, and regular-expression searches. Queries can return specific fields of documents and also include user-defined JavaScript functions. Queries can also be configured to return a random sample of results of a given size. Fields in a MongoDB document can be indexed with primary and secondary indices or index. MongoDB provides high availability with replica sets. A replica set consists of two or more copies of the data. Each replica-set member may act in the role of primary or secondary replica at any time. All writes and reads are done on the primary replica by default. Secondary replicas maintain a copy of the data of the primary using built-in replication. When a primary replica fails, the replica set automatically conducts an election process to determine which secondary should become the primary. Secondaries can optionally serve read operations, but that data is only eventually consistent by default. If the replicated MongoDB deployment only has a single secondary member, a separate daemon called an arbiter must be added to the set. It has a single responsibility, which is to resolve the election of the new primary. As a consequence, an idealized distributed MongoDB deployment requires at least three separate servers, even in the case of just one primary and one secondary.

MongoDB scales horizontally using sharding. The user chooses a shard key, which determines how the data in a collection will be distributed. The data is split into ranges (based on the shard key) and distributed across multiple shards. (A shard is a master with one or more replicas.) Alternatively, the shard key can be hashed to map to a shard—enabling an even data distribution. MongoDB can run over multiple servers, balancing the load or duplicating data to keep the system up and running in case of hardware failure. MongoDB can be used as a file system, called GridFS, with load balancing and data replication features over multiple machines for storing files. MongoDB provides three ways to perform aggregation: the aggregation pipeline, the map-reduce function, and single-purpose aggregation methods. Map-reduce can be used for batch processing of data and aggregation operations. But according to MongoDB's documentation, the Aggregation Pipeline provides better performance for most aggregation operations. The aggregation framework enables users to obtain the kind of results for which the SQL GROUP BY clause is used. Aggregation operators can be strung together to form a pipeline—analogous to Unix pipes. The aggregation framework includes the $lookup operator which can join documents from multiple collections, as well as statistical operators such as standard deviation. JavaScript can be used in queries, aggregation functions (such as MapReduce), and sent directly to the database to be executed. MongoDB supports fixed-size collections called capped collections. This type of collection maintains insertion order and, once the specified size has been reached, behaves like a circular queue.

Techniques for assessing road traffic conditions in various ways based on obtained traffic-related data, such as data samples from vehicles and other mobile data sources traveling on the roads and/or from one or more other sources (such as physical sensors near to or embedded in the roads), are described in U.S. Pat. No. 8,909,463 to Chapman et al. entitled: "Assessing road traffic speed using data from multiple data sources", which is incorporated in its entirety for all purposes as if fully set forth herein. The road traffic conditions assessment based on obtained data samples may include various filtering and/or conditioning of the data samples, and various inferences and probabilistic determinations of traffic-related characteristics of interest from the data samples. In some situations, the inferences include repeatedly determining current traffic flow characteristics and/or predicted future traffic flow characteristics for road segments of interest during time periods of interest, such as to determine average traffic speed, traffic volume and/or occupancy, and include weighting various data samples in various ways (e.g., based on a latency of the data samples and/or a source of the data samples).

Steps of collecting traffic information about each road segment is described in European Patent Application Publication No. EP 2551639 A1 to Fülöp entitled: "Routing method for road navigation devices with ranking of route alternatives and road navigation device", which is incorporated in its entirety for all purposes as if fully set forth herein. The steps of collecting traffic information about each road segment covered by the vehicle at each junction reached by the same vehicle; may be in accordance with at least one pre-selected navigation mode, defining the route alternatives containing the road segments starting from the next junction and leading to the destination; collecting traffic information about the route alternatives running from the next junction; based on the traffic information about the single route alternatives, assigning a Q-value to each route alternative running from the next junction; ranking the route alternatives according to their Q-value, and informing the user about the rank of the road segments running from the next junction.

A mobile application on a mobile device that communicates with a head-unit of a navigation system is described in U.S. Pat. No. 9,031,788 to Balogh entitled: "Navigation system application for mobile device", which is incorporated in its entirety for all purposes as if fully set forth herein. The mobile application may retrieve data such as map data, user input data, and other data and communicate the updates to the head unit. By retrieving map data through the mobile application, the head unit may be updated much easier than systems of the prior art. The data may be retrieved through cellular networks, Wi-Fi networks, or other networks which accessible to a user and compatible with the mobile device. Updates may be stored in the mobile device and automatically uploaded to the navigation system head unit when the user is in the vicinity of the head unit. The mobile application may establish a logical connection with one or more head units. The logical connection bounds the mobile application to the head unit and allows for data sharing and synchronization.

A road hazard, such as a traffic collision, traffic regulation violation, road surface damage, or any other traffic obstruction, is detected by a sensor in a vehicle, as described in U.S. Patent Application Publication No. 2020/0294401 to Kerecsen entitled: "A Method and Apparatus for Collecting and Using Sensor Data from a Vehicle", which is incorporated in its entirety for all purposes as if fully set forth herein. The sensor data is sent periodically, or upon detecting the anomaly, to a server over the Internet via a first wireless network, together with a vehicle identifier (Vehicle Identification Number (VIN) or the license plate number) and its GNSS or GPS geographic location. The server analyzes the sensor data, and in response sends a notification message to a client device, such as a smartphone, or to a group of vehicles in close vicinity to the first vehicle, via a wireless network over the Internet. The received message may be used by each of the vehicles in the group for controlling, limiting, activating, or otherwise affecting an actuator operation, or may be used for notifying the driver using a dashboard display.

A method for freeing an end user of a navigation system from the burden of selection concrete points by using optimal planning and guidance using GNSS or GPS geographic localization is described in U.S. Patent Application Publication No. 2021/0356279 to Szigeti entitled: "A Method and Apparatus for Optimal Navigation to Multiple Locations", which is incorporated in its entirety for all purposes as if fully set forth herein. Multiple items, such as products, services, or attributes such as category of venue (e.g., restaurant or bar), are input or selected by the user. Using a products and attributes database, the system identifies potential geographical locations where the required products or services are available, or where a venue of the specified category (such as bar) can be found. An optimal route to optimally arrive at all geographical locations required for the required products, services, or attributes, is calculated, and may include returning to the origin location or to a destination location defined by the user, and the selection may be based on estimated travel distance, estimated travel time, estimated fuel efficiency, or opening hours of stores.

Electric vehicles can become integral parts of a smart grid, since they are capable of providing valuable services to power systems other than just consuming power. On the transmission system level, electric vehicles are regarded as an important means of balancing the intermittent renewable energy resources such as wind power. This is because electric vehicles can be used to absorb the energy during the period of high electricity penetration and feed the electricity back into the grid when the demand is high or in situations of insufficient electricity generation. However, on the distribution system level, the extra loads created by the increasing number of electric vehicles may have adverse impacts on grid. These factors bring new challenges to the power system operators. To coordinate the interests and solve the conflicts, electric vehicle fleet operators are proposed both by academics and industries. A paper by Junjie Hu, Hugo Morais, Tiago Sousa, and Morten Lind published April 2016 in Renewable and Sustainable Energy Reviews 56:1207-1226 [DOI:10.1016/j.rser.2015.12.014] and entitled: "Electric vehicle fleet management in smart grids: a review of services, optimization and control aspects", which is incorporated in its entirety for all purposes as if fully set forth herein, presents a review and classification of methods for smart charging (including power to vehicle and vehicle-to-grid) of electric vehicles for fleet operators. The study firstly presents service relationships between fleet operators and other four actors in smart grids; then, modeling of battery dynamics and driving patterns of electric vehicles, charging and communications standards are introduced; after that, three control strategies and their commonly used algorithms are described; finally, conclusion and recommendations are made.

Enhancing adequacy of isolated systems with electric vehicle-based emergency strategy is described in an article by Ning Zhou Xu, Ka Wing Chan, Chi Yung Chung, and Ming Niu, published in IEEE Transactions on Intelligent Transportation Systems (Volume: 21, Issue: 8, August 2020) [DOI: 10.1109/TITS.2019.2929767] entitled: "*Enhancing Adequacy of Isolated Systems With Electric Vehicle-Based Emergency Strategy*" is incorporated in its entirety for all purposes as if fully set forth herein. Extreme events can extensively damage power systems, causing customers to experience long-lasting outages. During such events, an electric vehicle (EV) can be used to directly power a house, i.e., vehicle-to-home (V2H). Specifically, the EV serves as a mobile energy storage system-running errands to "transport" energy from other places. Vehicle-to-grid (V2G) further allows cooperation among houses. It enables EV fleets to take turns running the errands so that sustained power supply is possible. Moreover, autonomous driving technology can also benefit system adequacy because the charging errands of EVs can be scheduled flexibly without being bonded to human activities. An emergency power supply strategy featuring scheduled EV charging errands as introduced above is proposed. It answers the questions whether and to what extent a system can survive an extended period of outage with the use of EVs only. An optimization problem is formulated with the purpose of maximizing the supply adequacy of the isolated system during the outage period. Both V2H and V2G scenarios are considered in the problem formulation, as well as self-driving capability. The complex optimization problems are solved with genetic algorithm. It is significant to find from the case study that the proposed strategy is able to fully restoring an islanded system when V2G and self-driving EVs are implemented.

Accurate estimation of vehicles' energy consumption is a demanding task. It might not be so critical for conventional vehicles because of their high travel range; however, this is something important for electric vehicles (EVs). On the other hand, EVs with less energy on board need more accurate energy management systems. A study by Abbas Fotouhi, Neda Shateri, Dina Shona Laila, and Daniel J. Auger published 30 Oct. 2019 in International Journal of Sustainable Transportation, 15:1, 40-54 [DOI: 10.1080/15568318.2019.1681565] entitled: "*Electric vehicle energy consumption estimation for a fleet management system*", is incorporated in its entirety for all purposes as if fully set forth herein, focuses on the development of an energy consumption estimation model to be used in an EV fleet management system (FMS). The proposed estimator consists of a vehicle model, a driver model, and terrain models. It is demonstrated that a combination of these three parts can provide an accurate estimation of EV energy consumption on a particular route. As part of this study, a commercially available passenger car is modeled using MATLAB/Simulink. A number of specific routes are selected for EV road testing to be driven for simulation model verification. In the second part of this study, the impact of energy consumption estimation accuracy is investigated at a larger scale for a fleet of EVs. It is quantitatively demonstrated how much sensitive is the performance of a FMS to the accuracy of the energy estimator. Simulation results have shown that the total energy consumption of an EV fleet is decreased significantly by improving the estimation accuracy. It is also demonstrated how the uncertainties in EV energy consumption estimation limit the overall performance of a FMS.

An artificial intelligence-based system for management of electric vehicles fleet is described in U.S. Patent Application Publication No. 2022/0410750 to Mangal et al. entitled: "System and method for smart charging management of electric vehicle fleets", which is incorporated in its entirety for all purposes as if fully set forth herein. The system receives live data and historical data feeds from charging stations, fleet telematics, meteorological services, traffic management, mobile application, fleet dashboard, renewable source of energy, battery energy storage system, and the electric utility grid. The system utilizes machine learning algorithms to predict energy usage and optimize the charging schedule of electric vehicle. The system uses real time data to generate electric vehicle trip condition training feature for predicting the remaining driving range. The system predicts the vehicle's arrival time at the charging station based on telematics data of each vehicle collected from the fleet management system.

A system and method for managing energy consumption across a fleet of telematic devices in a computing environment are described in U.S. Patent Application Publication No. 2022/0363140 to Dayal et al. entitled: "System and method for managing energy consumption across electric vehicle fleets with telematic devices in a computing environment", which is incorporated in its entirety for all purposes as if fully set forth herein. The method includes receiving real time vehicle operation data from a fleet of telematic devices. The method further includes processing the received real time vehicle operation data using one or more artificial intelligence device integration models. Further, the method includes generating artificial intelligence-based energy management models for the fleet of telematic devices based on the real time vehicle operation data. Additionally, the method includes generating one or more energy management decisions for the fleet of telematic devices based on the generated one or more artificial intelligence-based energy management models. The method further includes managing the generated one or more energy management decisions for the fleet of telematic devices using a web application.

A system that preconditions a battery pack of a vehicle to support fast charging is described in U.S. Patent Application Publication No. 2022/0185135 to Langton et al. entitled: "Intelligent Preconditioning for High Voltage Electric Vehicle Batteries", which is incorporated in its entirety for all purposes as if fully set forth herein. The system detects a trigger that that indicates the vehicle will be traveling or the battery pack of the vehicle has been reduced to a predetermined capacity. The system collects a plurality of samples of location data of the vehicle. The system predicts a destination of the vehicle based on the samples. The system determines a propensity of a user to charge the vehicle based on previous charging behavior of the user. The system determines a confidence score of the predicted destination and the determined propensity. The system determines whether to schedule preconditioning of the battery pack based on the confidence score meeting a threshold.

A system and method of managing electrical energy consumption and generation of a vehicle are described in U.S. Patent Application Publication No. 2020/0393259 to Gantt et al. entitled: "Vehicle energy management", which is incorporated in its entirety for all purposes as if fully set forth herein. The method includes: determining a vehicle operation schedule for the vehicle, wherein the vehicle operation schedule includes one or more expected vehicle trips that each include a vehicle start location, a vehicle end location, and a time period; obtaining forecasted vehicle trip data based on the vehicle operation schedule; obtaining forecasted vehicle operation data pertaining to the vehicle operation schedule; determining a vehicle energy plan for the vehicle based on the forecasted vehicle trip data and the forecasted vehicle operation data; and causing the vehicle to carry out the vehicle energy plan during the vehicle operation schedule.

A method for predictive charging control for an electrical energy store of a motor vehicle, wherein an energy exchange between the energy store and an electrical energy source is controlled by a charging device is described in U.S. Patent Application Publication No. 2021/0387546 to Grubwinkler entitled: "Method and back-end device for predictively controlling a charging process for an electric energy store of a motor vehicle", which is incorporated in its entirety for all purposes as if fully set forth herein. This provides that a future time profile of a non-energy requirement resulting from a respective parking phase of the motor vehicle is predicted and, independently of an availability of a charging power of the energy source, a state of charge of the energy store is kept below a limit value by the charging device if the predicted time profile of the non-energy requirement satisfies a predetermined rest criterion for a predetermined next time interval.

A method and a device for generating a user-individualized recharging recommendation for a battery of an electric vehicle are described in Patent Cooperation Treaty (PCT) Publication WO 2022/218700 to Hanuschkin et al. entitled: "Method and device for generating a user-individualized recharging recommendation for a battery of an electric vehicle", which is incorporated in its entirety for all purposes as if fully set forth herein. The invention relates to a method for generating a user-individualized recharging recommendation for a battery of an electric vehicle in which at least one destination is determined, wherein a charging station is output as destination. In a method in which a recharging recommendation is output on a user-individualized basis, a recommendation to actuate the charging station given a physical and/or emotional state of the driver that is dependent on a state of charge (SOC) of the battery of the vehicle is output.

Techniques for activating charging stations for an EV driver are disclosed in U.S. Patent Application Publication No. 2022/0228877 to Feldman et al. entitled: "Electric vehicle charging systems, methods, and techniques", which is incorporated in its entirety for all purposes as if fully set forth herein. A charging station authorization system of an electric mobility service provider (eMSP) may receive information from an EV driver describing an electric vehicle (EV), preferences, constraints and trip information. The charging station authorization system may determine one or more routes for the trip that include use of charging stations owned or operated by Charge Point Operators (CPOs) during the trip and fit within the constraints. The charging station authorization system may order, based on costs of using charging stations, the routes, and/or recommend use of a route. Based on a EV driver selection and/or authorization, the charging station authorization system may send a request to one or more CPO computing systems to authorize charging by the EV driver of an EV at charging stations along the selected route.

An optimization system is described in U.S. Patent Application Publication No. 2021/0094435 to Kathrin Rechkemmer et al. entitled: "Optimization System and an Optimization Method", which is incorporated in its entirety for all purposes as if fully set forth herein. The optimization system includes a processor configured to receive one or more criteria for optimizing use of a power storage device in an application device, to receive data comprising at least one of user input(s), data from a cloud, and data regarding the application device, and to determine a charging/discharging profile for charging or discharging the power storage device from the received data based on the one or more criteria. The optimization system further includes an output configured to output the charging/discharging profile. The processor is configured to receive user feedback regarding the charging/discharging profile, machine learning data, big data, and/or a change regarding the optimization system and/or the application device, and to update the charging/discharging profile based on the received at least one of the user feedback regarding the charging/discharging profile, machine learning data, big data and the change regarding the optimization system and/or the application device.

A hybrid electric vehicle (HEV) and method of operation, which include a battery and a communication unit, which are configured to periodically respond to a charge signal, and to adjust a charge time and battery recharge profile, according to a charge time estimate received from a remote fleet server, are described in U.S. Patent Application Publication No. 2019/0118655 to Grimes et al. entitled: "Electric vehicle cloud-based charge estimation", which is incorporated in its entirety for all purposes as if fully set forth herein. The charge time estimate is received in response to periodic operating conditions that are generated and communicated to the server. The operating conditions include one or more of charge station, environment, and location data, vehicle data, and battery performance data, among other data. The controller further configured to respond to a charge complete signal, and to generate and store as one of the battery performance parameters, an estimate error as a difference between the charge time estimate and an actual charge time. The controller readjusts a charge time and battery recharge profile, responsive to the estimate error.

A system for determining an energy requirement of a vehicle for a journey is described in U.S. Patent Application Publication No. 2019/0195650 to James MATTHEWS et al. entitled: "System and method for determining the energy requirement of a vehicle for a journey", which is incorporated in its entirety for all purposes as if fully set forth herein. The system includes a predictor mechanism to predict, using an energy prediction algorithm, a vehicle energy requirement for the journey. The system includes an updater mechanism configured to refine the energy prediction algorithm for the vehicle by determining for each of a number of historical journeys undertaken by the vehicle, an error between an actual vehicle energy usage for the historical journey and a predicted energy usage derived using the energy prediction algorithm for the historical journey, each historical journey of the of the number of historical journeys being associated with a respective error of a set of errors. An aggregate error is calculated from the set of errors. The updater is arranged to adjust the energy prediction algorithm to reduce the aggregate error.

A system for estimating or predicting energy consumption for a trip of a personal includes a user facing portion and a back-end portion is described in U.S. Patent Application Publication No. 2018/0045526 to Trancik et al. entitled: "System and Method for Estimating and Predicting Vehicle Trip Energy Consumption", which is incorporated in its entirety for all purposes as if fully set forth herein. The user facing portion includes a display and a user interface hosting a real-time application configured to receive travel information and present a received energy distribution via the display. The back-end portion includes a back-end database and an energy processor configured to access the back-end database. The energy processor includes a demand model module configured to produce a set of possible velocity histories and a set of possible ambient temperatures. A vehicle model module is configured to receive the velocity histories and ambient temperatures to provide the energy distribution or a probabilistic prediction of future energy consumption to the user facing portion.

A method for trip planning is described in U.S. Patent Application Publication No. 2017/0030728 to Baglino et al. entitled: "Trip planning with energy constraint", which is incorporated in its entirety for all purposes as if fully set forth herein. The method includes: receiving information corresponding at least to (i) a state of charge of an energy storage of a vehicle, (ii) route information corresponding to a planned driving route for the vehicle, and (iii) a predicted driver characteristic; determining using the received information, and presenting to a driver of the vehicle, a first energy-versus-distance measure for the planned driving route; receiving a user input indicating a proposed change in at least the driver characteristics, and determining using the received information and the user input, and presenting to the driver, a second energy-versus-distance measure for the planned driving route that takes into account the proposed change.

A system that includes one or more processors configured to receive a route and receive power-usage-affecting variables is described in U.S. Patent Application Publication No. 2015/0158397 to Angel Soto et al. entitled: "Method and Apparatus for Predicting Electric Vehicle Energy Consumption", which is incorporated in its entirety for all purposes as if fully set forth herein. The processor(s) are further configured to break the route into a number of segments. For each segment, the processors are configured to lookup a predetermined power usage estimate, based on the received variables. Also, the processors are configured to present total estimated power usage over the route based on accumulated power usage estimates for each segment.

A communication and analysis system that can manage data operations with a vehicle centric system is described in U.S. Patent Application Publication No. 2013/0024060 to Mohamad Farid Sukkarié et al. entitled: "Vehicle communication, analysis and operation system", which is incorporated in its entirety for all purposes as if fully set forth herein. A vehicle that is in a communications link with a network can also manage its activities based on real-time, historical and predictive knowledge, without having this knowledge processing on-board. Such data processing includes the geo-spatial, internal functions and operator specific requirements. The rule-based system also incorporates the use patterns of a specific vehicle, or a specific user. A use pattern can be transferred from one operator to another or be shared to assist with navigation and operations. A vehicle operator or vehicle multiple operators can share or upload information that can assist with efficient operations, including fuel conservation and time management. Use patterns can be assigned to geospatial regions and be used for comparative analysis for such activities as efficient operation, safe travel and navigation.

An electric vehicle charging system that comprises one or more system power and control modules (SPCM) and vehicle charging stations (VCS) is described in U.S. Patent Application Publication No. 2012/0330494 to Hendrix et al. entitled: "Electric vehicle fleet charging system", which is incorporated in its entirety for all purposes as if fully set forth herein. The SPCM distributes power from a power source to the VCS, and the VCS distributes power to one or more electric vehicles. Another electric vehicle charging system comprises an SPCM, VCS, a fleet management system (FMS) for monitoring and controlling the charging system, and a communications network for sharing information. A system for managing a plurality of electric vehicles comprises a plug-in module configured to collect and store information from an on-board diagnostics system of at least one of the plurality of electric vehicles, management software, a communications network, and a smart device software application for displaying system information. A computer-readable medium having computer-executable instructions for supporting a management system for a plurality of electric vehicles to extract, organize, and display information from the management system.

An apparatus that includes a power management module configured to receive data associated with travel being proposed by an end user of an electric vehicle is described in U.S. Patent Application Publication No. 2010/0256846 to Shaffer entitled: "System and method for managing electric vehicle travel", which is incorporated in its entirety for all purposes as if fully set forth herein. The power management module is configured to suggest a starting time for the travel based on time of use (ToU) rates for electricity consumption and a current level of power in the electric vehicle. In more specific embodiments, the data associated with the travel includes a starting location, an ending location, and a proposed drive time. In other embodiments, the power management module is further configured to interface with a mapping tool in suggesting the starting time for the end user. The power management module can be configured to obtain the ToU rates from a utility, and the ToU rates are provided as a function of time.

A system and method for optimizing a plug-in vehicle fleet having a plurality of battery packs across the vehicle fleet is described in U.S. Patent Application Publication No. 2018/0086223 to Lindemann et al. entitled: "Adaptive system and method for optimizing a fleet of plug-in vehicles", which is incorporated in its entirety for all purposes as if fully set forth herein. Each vehicle includes a battery pack. The system includes sensors for measuring battery performance data and includes an open-circuit voltage, charging current, and/or temperature of the battery pack, a GPS receiver, a user interface, and a controller. The controller executes a method to monitor degradation of each battery pack using a variety of current and historical data points. The controller then controls a charging operation of each battery pack in a fleet via a charging control signal sent to a particular vehicle in the fleet. The controller also then determines the new location for each particular vehicle in a fleet.

An electric vehicle energy management method and system that includes obtaining, from a grid interface, grid data indicative of an energy purchase price, an energy re-sale price, and a plurality of charging locations, are described in Patent Cooperation Treaty (PCT) Publication WO 2022/214849 to DUTT entitled: "Energy management method for electric commercial vehicles", which is incorporated in its entirety for all purposes as if fully set forth herein. The data is obtained from a vehicle management controller, including vehicle data indicative of mission information, an energy requirement associated with the mission, and an estimated charging time based on the energy requirement and a stored energy amount stored by the electric vehicle. Based on the grid data and the vehicle data, a strategy for charging and energy re-sale is generated, including selecting at least one charging location of the plurality of charging locations, and selecting at least one charging time for charging the electric vehicle at the selected charging location.

An artificial intelligence platform for electrification of a fleet of vehicles and an energy distribution system are described in Patent Cooperation Treaty (PCT) Publication WO 2022/087716 to Arsenault et al. entitled: "Artificial intelligence platform for vehicle electrification", which is incorporated in its entirety for all purposes as if fully set forth herein. The energy distribution system comprises a number of electric energy storage devices associated with vehicles in the fleet, as well as charging points. The configuration of the electric energy storage devices and the charging points is determined using an artificial intelligence platform and vehicle positional and energy consumption information. The platform allows for the iterative implementation of the process of electrification in a simple and predictable manner, given specific constraints, and provides energy distribution systems for electrical vocational vehicles in a flexible and cost-effective manner.

Systems of an electrical vehicle and the operations thereof are provided in U.S. Patent Application Publication No. 2018/0188332 to Newman et al. entitled: "User interface for vehicle and/or battery life based on state of health", which is incorporated in its entirety for all purposes as if fully set forth herein. In particular, a vehicle is described with the ability to gather State of Charge (SOC) information as well as State of Health (SOH) information for one or more batteries in a vehicle and then display both SOC and SOH information to a driver of the vehicle as well as other interested parties. The displayed SOH information may be accompanied by suggestions to modify driving and/or charging behaviors that will improve or contribute to a slower degradation in the SOH of the batteries.

An electric vehicle routing system is described in U.S. Patent Application Publication No. 2019/0316924 to MORGAN-BROWN entitled: "Vehicle routing", which is incorporated in its entirety for all purposes as if fully set forth herein. The system comprising a route determination module configured to receive, via a graphical user interface (GUI) module, user input data defining, for a desired journey of a vehicle in which the vehicle routing system is installed, a start location in a road network, a destination location in the road network, and at least one waypoint in the road network. On the basis of the received user input data, data received from a vehicle battery status monitoring module, data retrieved from a road network storage database and data retrieved from a charging network storage database, the route determination module determines at least one route in the road network from the start location to the destination location via the at least one waypoint and transmits data associated with the at least one determined route to the GUI module.

A system that includes a computing device for receiving information representative of activities of an operating first vehicle that includes a propulsion system, is described in U.S. Pat. No. 9,390,062 to Ashton et al. entitled: "Managing vehicle information", which is incorporated in its entirety for all purposes as if fully set forth herein. The computing device is configured to produce one or more control parameters from the received information in combination with information received from other vehicles, and, provide the one or more control parameters to control operations of a second vehicle.

A system for charging electric vehicles is disclosed in U.S. Patent Application Publication No. 2022/0348105 to Sujan et al. entitled: "Charger peak power optimization for fleet depot", which is incorporated in its entirety for all purposes as if fully set forth herein. The system comprising: vehicle chargers coupled to an electric power grid; and a controller in communication with the chargers and vehicles and configured to execute software to cause the controller to: determine characteristics of each vehicle, the characteristics including a charge capacity of a battery system of each vehicle and a mission schedule; determine characteristics of each charger, the characteristics including a type of each charger and a charging capacity; process the characteristics of each vehicle and each charger to identify charging opportunities for each vehicle over the course of a time period; and perform a peak power optimization analysis to generate a vehicle charging profile configured to activate a minimum number of chargers simultaneously and to minimize downtimes of the plurality of chargers to thereby distribute the power demand from the electric power grid and result in an initial peak power demand.

A smart grid that provides value-added services to prosumers and other energy market stakeholders and may disrupt traditional electrical services in smart cities, is described in Indian Patent Application Publication No. IN 2022/41047393 entitled: "INTEGRATING ELECTRIC VEHICLES TO ACHIEVE SUSTAINABLE ENERGY AS A SERVICE BUSINESS MODEL IN SMART CITIES", which is incorporated in its entirety for all purposes as if fully set forth herein. The deployment of electric vehicles (EVs) challenges the smart grid's sustainability and supports its upgrade. EVs can promote the smart grid through Vehicle-to-Grid (V2G) and Grid-to-Vehicle (G2V) two-way communications (G2V). EVs reduce noise, pollution, and greenhouse gas emissions compared to hybrids and ICVs. The integration of EVs could bring significant changes to society by shifting economies away from petroleum and reducing $CO_2$ emissions from the transportation sector. Therefore, this study uses secondary data from the literature to analyze how EVs can accomplish sustainable energy as a service business model in smart cities. EV batteries offer an unexplored possibility to store electricity from renewable energy sources, according to this invention. The invention's implications explore EV integration in smart cities and make recommendations.

A battery optimization system and method for regulating and discharging a battery so as to optimize the use of the battery in accordance with the user's preference is provided in U.S. Patent Application Publication No. 2011/0313603 to Laberteaux et al. entitled: "System and method for optimizing use of a battery", which is incorporated in its entirety for all purposes as if fully set forth herein. The battery optimization system includes a power source, a charging/discharging station connecting the battery with the power source, and a controller in communication with the charging/discharging station. The battery optimization system further includes an input operable to provide the user's preferences. The controller is also in communication with the battery and is operable to process battery and power source information along with user input to calculate an optimal charging/discharging cycle. The charging/discharging cycle is configured to charge or discharge the battery so as to optimize the use of the battery based upon the end user's preference. For instance, the calculated optimal charging/discharging cycle may be based upon the user's desire to maximize the life of the battery, or to charge the battery as inexpensively as possible.

A system for idle reduction in a hybrid vehicle is described in U.S. Patent Application Publication No. 2013/0179007 to Thomas Dalum entitled: "System for and method of fuel optimization in a hybrid vehicle", which is incorporated in its entirety for all purposes as if fully set forth herein. The system includes a control system for causing the vehicle to operate in a charge depletion mode, or a charge accumulation mode in response to job site data; the job site data can include an estimate of the amount of energy required at the job site.

Methods, systems, and devices for controlling electric vehicle charging across multiple customers and multiple fleets of electric vehicles are provided in U.S. Patent Application Publication No. 2021/0086647 to Kiessling et al. entitled: "Real-time electric vehicle fleet management", which is incorporated in its entirety for all purposes as if fully set forth herein. These methods, systems, and devices may implement machine learning to determine distinct charging strategies for a plurality of charging depots. Scheduling methods systems, and devices disclosed herein do not require fixed electric vehicle arrival times but may instead update charging strategies in real time based on changes in a state of a system.

A method for controlling an exchange power between a charging infrastructure and an electricity supply grid is described in U.S. Patent Application Publication No. 2022/0173594 to Brombach entitled: "Method for controlling an exchange power between a charging infrastructure and an electricity supply grid", which is incorporated in its entirety for all purposes as if fully set forth herein. The method for controlling an exchange power between a charging infrastructure and an electricity supply grid, wherein multiple power units can be connected to the charging infrastructure for delivering or taking up electrical power, in order to exchange electrical power between the power units and the electricity supply grid via the charging infrastructure, and a number of the power units are in each case formed as electric vehicle, and so multiple electric vehicles can in each case be connected to the charging infrastructure in order to exchange electrical power between the electric vehicles and the electricity supply grid via the charging infrastructure and thereby charge or discharge the electric vehicles, each power unit has a variable state of charge, which can in each case be taken into consideration as an individual state of charge when the power unit is connected to the charging infrastructure, from the individual states of charge of the power units, an overall state of charge can be determined, for the overall state of charge, a flexibility range which spans a range, in dependence on time, in which the overall state of charge may occur can be predefined for a control time period, wherein the flexibility range is spanned by a progression over time of an upper limit of the overall state of charge and a progression over time of a lower limit of the overall state of charge for the control time period, and the flexibility range has range points which can in each case be defined by a value of the overall state of charge and a point in time in the control time period, a range point is in each case assigned an overall power interval, which predefines in relation to the point in time and in relation to the overall power of the range point a range to be maintained for an overall exchange power to be exchanged between the charging infrastructure and the electricity supply grid, and the overall power intervals of all of the range points span an overall power space over the flexibility range that is to be maintained for the overall exchange power, wherein the overall power interval of a range point depends on the individual states of charge of the power units on which the overall state of charge of the range point is based.

A method for optimizing the management of the charge of a set of electric batteries is described in U.S. Patent Application Publication No. 2022/0118875 to Astorg et al. entitled: "Method for optimally managing the charging of a fleet of electric vehicles", which is incorporated in its entirety for all purposes as if fully set forth herein. where each battery is recharged during a time interval during which it is connected to an electricity distribution network, according to a charge profile provided by a charge aggregator, by applying, under the control of a charge manager of the battery, a charging power level. The method involves determining, on the aggregator side, as a charge profile, a distribution curve of the charge per day over a given period of time, defined for all the batteries solely according to constraints specific to the network, transmitting the charge distribution curve to each charge manager and, on the charge manager side, adapting the received charge distribution curve to the time interval during which the battery is connected to the network and to the associated charging power level.

Techniques for scheduling the charging of electric vehicles (EVs) that protect the resources of local low voltage distribution networks are presented in U.S. Patent Application Publication No. 2022/0009372 to Bhargava et al. entitled: "Optimized charging of electric vehicles over distribution grid", which is incorporated in its entirety for all purposes as if fully set forth herein. From utilities, data on local low voltage distribution networks, such as the rating of a distribution transformer through which a group of EVs are supplied, is provided to a load manager application. Telematics information on vehicle usage is provided from the EVs, such as by way of the original equipment manufacturer. From these data, the load manager application determines schedules for charging the group of EVs through a shared low voltage distribution network so that the capabilities of the local low voltage distribution network are not exceeded while meeting the needs of the EV user. Charging schedules are then transmitted to the on-board control systems of the EVs for implementation.

An apparatus and method for charging a plurality of mobile energy storage and power consumption devices are described in U.S. Patent Application Publication No. 2020/0139842 to Logvinov et al. entitled: "Method And Apparatus For Charging A Battery Using Local Power Grid Topology Information", which is incorporated in its entirety for all purposes as if fully set forth herein. The apparatus and method may control determining a power charging schedule for charging a battery of at least one of the devices, in accordance with charger availability information, transactive energy information, the current location of the one device, mobile energy storage and power consumption device information and information indicating predetermined timing for providing a predetermined minimum charge level at the device, and transmitting a charging instruction signal for charging the battery of the at least one device using electric power supplied from a distribution power grid or an alternative power resource, according to the power charging schedule.

A method for providing electric exchange power for multiple electric vehicles of a fleet of electric vehicles is described in U.S. Patent Application Publication No. 2021/0331603 to Brombach et al. entitled: "Charging control of a fleet", which is incorporated in its entirety for all purposes as if fully set forth herein. The method may be for feeding into an electricity supply grid or drawing from the electricity supply grid by way of a charging infrastructure of the fleet, wherein a positive exchange power denotes an electric power drawn from the electricity supply grid by the fleet and a negative exchange power denotes an electric power fed into the electricity supply grid by the fleet, and wherein each electric vehicle has an electrical storage unit having a changeable state of charge, and the sum of the changeable states of charge of the electric vehicles of the fleet, and possibly further changeable states of charge of further storage units, forms a changeable sum state of charge, wherein a state of charge range is determined for a provision period, this state of charge range spanning an operating range that should contain the sum state of charge, wherein the state of charge range is characterized by a time-dependent upper limit that specifies maximum values that should not be exceeded for the sum state of charge in a time-dependent manner, and by a time-dependent lower limit that specifies minimum values that should not be dropped below for the sum state of charge in a time-dependent manner, and wherein the state of charge range is determined on the basis of the states of charge of the electric vehicles, and wherein the electric exchange power is controlled in the provision period such that the sum state of charge does not leave the state of charge range.

A method and corresponding system for distributing load on an electrical grid are described in Patent Cooperation Treaty (PCT) Publication WO 2021/069597 to Heinrich et al. entitled: "Method, central scheduler and vehicle to reduce data transfer volume in load optimization of distributed electric vehicle charging", which is incorporated in its entirety for all purposes as if fully set forth herein. The method and the corresponding system include determining which vehicles are participating in load distribution, establishing a time window for distributing the load, and sharing an electrical requirements profile for each vehicle via the charger interface. The method also includes providing a charging profile for each participating vehicle via the charger interface and charging each participating vehicle according to the charging profile during the time window.

Systems and methods for generating grid alerts for an electric grid are described in U.S. Patent Application Publication No. 2016/0332527 to North et al. entitled: "Managing electric vehicle loads on an electric grid", which is incorporated in its entirety for all purposes as if fully set forth herein. The systems and methods are further for performing actions in response to the grid alerts, such as shaping, shifting, or otherwise modifying a load applied to the grid, are described. In some embodiments, the systems and methods access information identifying states of charging events for one or more electric vehicles at one or more charging stations, the one or more charging stations coupled to an electric grid and providing charge to the one or more electric vehicles, determine that the information identifying the states of the charging events for the one or more electric vehicles at the one or more charging stations coupled to the electric grid indicates a condition of the electric grid that is outside threshold condition of the electric grid, and perform an action in response to determining the condition of the electric grid is outside the predetermined threshold condition of the electric grid.

A fleet management system that dispatches autonomous electric vehicles (AEVs) as on-demand power sources is described in U.S. Patent Application Publication No. 2021/0382501 to Cheung et al. entitled: "Centrally dispatched power supply using autonomous electric vehicle fleet", which is incorporated in its entirety for all purposes as if fully set forth herein. The fleet management system receives a request for a power source including a location and data describing the amount of power requested. The fleet management system selects an AEV of the fleet to service the request based on the relative locations of the AEVs to the requested location, and based on the amount of power requested. The fleet management system instructs the selected AEV to drive to the location and supply power. The fleet management system instructs the selected AEV to disconnect and return to the charging station, and may instruct another AEV to continue fulfilling the request if additional power is needed.

A fleet management system dispatches autonomous electric vehicles (AEVs) as on-demand power sources is described in U.S. Patent Application Publication No. 2014/0225564 to Cheung et al. entitled: "Centrally dispatched power supply using autonomous electric vehicle fleet", which is incorporated in its entirety for all purposes as if fully set forth herein. The fleet management system receives a request for a power source including a location and data describing the amount of power requested. The fleet management system selects an AEV of the fleet to service the request based on the relative locations of the AEVs to the requested location, and based on the amount of power requested. The fleet management system instructs the selected AEV to drive to the location and supply power. The fleet management system instructs the selected AEV to disconnect and return to the charging station, and may instruct another AEV to continue fulfilling the request if additional power is needed.

Vehicle control systems that can include one or more location sensors, an energy storage device, one or more charge sensors and one or more vehicle computing devices, is described in U.S. Patent Application Publication No. 2018/0201148 to Brian Donnelly et al. entitled: "Charge Control System for Mobile Energy Storage Fleet", which is incorporated in its entirety for all purposes as if fully set forth herein. The location sensor(s) can determine a current location of a vehicle, while the charge sensor(s) can determine a current state of charge of an energy storage device that can be located onboard the vehicle to provide operating power for one or more vehicle systems. The vehicle computing device(s) can communicate the current location of the vehicle and current state of charge of the energy storage device to a remote computing device, receive from the remote computing device a charging control signal determined, at least in part, from the current location of the vehicle and the current state of charge of the energy storage device, and control charging of the energy storage device in accordance with the charging control signal.

A computer-based method of forecasting total electric vehicle state of charge and total electric vehicle energy storage capacity in a parking area having parking bays with respective electrical vehicle charging and discharging facilities is provided in U.S. Patent Application Publication No. 2020/0369175 to RAJABALLY et al. entitled: "Forecast of electric vehicle state of charge and energy storage capacity", which is incorporated in its entirety for all purposes as if fully set forth herein. Electric vehicles occupying the bays can provide temporary energy storage capacity to an energy grid. The forecasting method includes: forecasting future occupation of the bays by electric vehicles based on expected arrival times and expected stay durations; obtaining expected charge and discharge capabilities of the vehicles; forecasting a total state of charge and total energy storage capacity in the parking area; recording actual arrivals and departures; and adjusting the forecast of future occupation and the forecast of total state of charge and total energy storage capacity in the parking area.

In consideration of the foregoing, it would be an advancement in the art to provide a method or a system for improving a convenience, a time saving, or planning such as route planning. Preferably, such methods or systems may be providing an improved, simple, adaptive, more convenient, automatic, secure, cost-effective, reliable, versatile, time-saving, easy to install, use or monitor, has a minimum part count, portable, handheld, enclosed in a small or portable housing or vehicular, minimum hardware, and/or using existing and available components, protocols, programs and applications, and providing a better user experience, for suggesting or recommending a multi-location route or satisfying a product or a service requirement for an electric car.

SUMMARY

A method may be used for planning an optimal route in an area of a trip that may start at a start time, by an electric car that may comprise a rechargeable battery, from an origin point to a final point via geographical locations of target places. The method may use time- or trip-sensitive data and non-time- or non-trip-sensitive data, and the method may comprise the steps of obtaining locations of origin and final points; obtaining a State of Charge (SoC) of the rechargeable battery at the origin point; obtaining a routes data that comprises a digital map of the area; obtaining charging stations data that comprises a first list of geographical locations of charging stations in the area; obtaining a weather data relating to the area and the time period that comprise a forecasted, estimated, or measured, temperature, a wind, a humidity, a precipitation, or any combination thereof; obtaining a car data relating to the specific electric car that comprises an estimated or nominal battery discharging rate in reference or ideal conditions, and drag data; obtaining an estimated or measured pressure of at least one of the tires in the car; obtaining the start time; obtaining target places data that comprises a second list of geographical locations of the target places; generating, using Machine Learning (ML), the optimal route that minimizes a cost function for travelling from the origin point to the final point while visiting at least one charging station location and all target places locations, based on the routes data, the charging stations data, the weather data, the car data, the estimated or measured pressure of at least one of the tires, the State of Charge (SoC) of the rechargeable battery at the origin point, and the start time; notifying a user of the generated optimal route or guiding the electric car to navigate according to the generated optimal route. Any obtaining of any drag data herein may comprise obtaining or estimating the drag data based on drag coefficient of the electric car.

The origin point and the final point may be different or may be the same point. The area may comprise a country, a state, a region, a county, a city, a neighborhood, a Zone Improvement Plan (ZIP)/postal code area, or any combination thereof. Any location herein, such as at least one of the geographical locations in the first or second list, may be represented as Latitude and Longitude values, according to World Geodetic System (WGS) 84 standard, according to Universal Transverse Mercator (UTM) zones, or any combination thereof. Alternatively or in addition, any location herein, such as at least one of the geographical locations in the first or second list, may be represented as a building or lot number, a street name, a city name, a country or region name, a state or country name, a Zone Improvement Plan (ZIP)/postal code, or any combination thereof. A non-transitory computer readable medium that may have computer executable instructions stored thereon, and the instructions may include the steps according to any method herein.

Any cost function herein may comprise a total optimal route travel distance, a total optimal route travel time, a total associated discharging of a battery in the electric car, a total cost associated with charging a battery in one or more charging stations, or any combination thereof.

Any generating herein may comprise, or may based on, using a Bayesian optimization or network methodology, that may comprise a first, second, and third vertices graph, and the first vertex may be associated with environmental factors, the second vertex may be associated with decision nodes, and the third vertex may be associated with the cost function. Alternatively or in addition, any generating herein may comprise, or may be based on, using a casual inference methodology or process, that may use, or may be based on, Bayesian inference, Frequentist statistical inference, or any combination thereof. Alternatively or in addition, any generating herein may comprise, or may be based on, using a casual inference methodology or process, that may use, or may be based on, a causal pie model (component-cause), a Pearl's structural causal model (causal diagram+do-calculus), a structural equation modeling, a Rubin causal model (potential-outcome), or any combination thereof. Alternatively or in addition, any generating herein may comprise, or may be based on, unsupervised clustering, such as K-Means clustering or algorithm. Alternatively or in addition, any generating herein may comprise, or may be based on, solving a Travelling Salesman Problem (TSP), that may be, or may use, a symmetric or asymmetric TSP, an exact or a heuristic algorithm, or any combination thereof. Further, any TSP problem definition herein may involve replacing cities with charging-stations locations and target locations. Alternatively or in addition, any generating herein may comprise, or may be based on, solving an integer Linear Programming (LP) problem, and the solving may comprise the simplex algorithm, or may use heuristic or combinatorial search method.

Alternatively or in addition, any generating herein may comprise, may satisfy, or may be based on, a restriction of a low-level threshold of the battery in an electric car, so that the battery charge along the optimal route may be above the defined low-level threshold, that may be at least 1%, 2%, 3%, 5%, 7%, 10%, 12%, 15%, 20%, 25%, or 30% of a maximum charge capacity of the battery, may be less than 2%, 3%, 5%, 7%, 10%, 12%, 15%, 20%, 25%, 30%, or 35% of the maximum charge capacity of the battery, or may be at least 1, 2, 3, 5, 7, 10, 12, 15, or 20 KwH. Alternatively or in addition, the low-level threshold may correspond to an estimated travel of at least 1, 2, 3, 5, 7, 10, 12, 15, or miles or Kilometers, or may correspond to an estimated travel of less than 2, 3, 5, 7, 10, 12, 15, 20, or 30 miles or Kilometers.

Any method herein may further comprise executing, such as by the electric car, any generated optimal route, for example by travelling along the generated optimal route or a part thereof. Alternatively or in addition, any method herein may further comprise obtaining or monitoring a battery data that comprises the State of Charge (SoC), the discharging rate, or a combination thereof, of the rechargeable battery, as part of, or in response to, any executing herein. Alternatively or in addition, any method herein may further comprise updating or adjusting any unsupervised clustering method herein as part of any Machine Learning (ML) scheme herein. Alternatively or in addition, any generating herein may further comprise generating estimated or expected battery data along the generated optimal route or a part thereof. Alternatively or in addition, any method herein may further comprise comparing the obtained or monitored battery data to the estimated or expected battery data, and any updating or adjusting herein may be in response to, or may be based on, the comparing.

Alternatively or in addition, any generating herein may further comprise in response to any executing or when executing of any executing: obtaining a location of the electric car; obtaining a weather data relating to the electric car location that comprise a forecasted, estimated, or measured, temperature, a wind, a humidity, a precipitation, or any combination thereof; obtaining a car data relating to the specific electric car that comprises an estimated or nominal battery discharging rate in reference or ideal conditions, and drag data; and obtaining an estimated or measured pressure of at least one of the tires in the car, wherein the updating or adjusting is based on the electric car location, the weather data, the car data, the estimated or measured pressure of at least one of the tires, and the State of Charge (SoC) of the rechargeable battery.

Any generating herein may comprise calculating an additional route that may minimize an additional cost function for travelling from the origin point to the final point via all the locations of the target places, where a cost may be associated between each of the target places and at least one other target place location or the origin or final points, and wherein the additional route may minimize the cumulative associated costs along the additional route. Any calculating herein, such as of the additional route, may use, or may be based on, a navigation algorithm, the Dijkstra algorithm, or any combination thereof. Any generating herein may further comprise calculating or estimating the State of Charge (SoC) of the rechargeable battery at the final point, and may further comprise comparing the calculated or estimated State of Charge (SoC) of the rechargeable battery at the final point to a threshold, such as 0%. Any generating herein may further comprise adding at least one location of a charging station along the additional route, in response to the calculated or estimated SoC being below the threshold.

Any method herein may further comprise obtaining a driver data, and wherein the generating is further based on the driver data, that may comprise an age, a gender, a number of years as a driver, of any combination thereof, or may be based on, or may use, data of former trips of the driver. Any car data herein may comprise a State of Health (SOH) of the battery, a total distance travelled by the electric car that may be obtained from an odometer or an odograph in the electric car, or an estimated or nominal battery discharging rate that may be is obtained using an identifier that may comprise a Vehicle Identification Number (VIN) (such as according to, or based on, ISO 3779), a license plate number, a model, a color, a make, a model year, weight, shape, structure, motor type, battery type, volume, or any combination thereof, of the electric car, or any combination thereof. Any method herein may further comprise obtaining a number of passengers in the electric car, and any generating herein may be further based on the obtained number of passengers. Alternatively or in addition, any method herein may further comprise obtaining a weight of a payload in the electric car, and any generating herein may further be based on the obtained payload weight.

Any electric car herein may comprise at least 2, 3, 4, 6, 8, 10, or 12 pneumatic tires, and any obtaining of the estimated or measured pressure herein may comprise obtaining of the estimated or measured pressure of two or more tires, or may comprise obtaining of the estimated or measured pressure of all the tires in the electric car. Any electric car herein may comprise a Tire-Pressure Monitoring System (TPMS), and any obtaining of the estimated or measured pressure herein may comprise obtaining of the estimated or measured pressure from the TPMS or obtaining of the estimated or measured pressure from a sensor that is part of, or connected to, the TPMS. Any TPMS herein may comprise a direct TPMS (dTPMS) or an indirect TPMS (iTPMS). Any obtaining of any estimated or measured pressure herein may comprise estimating pressure without using a physical pressure sensor, such as by comprises evaluating or using a wheel speed, an accelerometer output, a driveline data, or any combination thereof. Alternatively or in addition, any obtaining of any estimated or measured pressure herein may comprise measuring by a sensor, such as a pressure sensor, that may be in, or may be attached to, any tire.

Any sensor herein may comprise a temperature sensor, an acceleration sensor, a direction of rotation sensor, a magnetic sensor, an electric field sensor, a force sensor, an electric current sensor, or an electric voltage sensor, an angle sensor, a linear position sensor, a speed sensor, a motion sensor, a magnetic field flux density sensor, a field strength sensor, a field angle sensor, a field direction sensor, a field orientation sensor, or any combination thereof. Alternatively or in addition, any sensor herein may comprise, or may be based on, a microelectromechanical system (MEMS) sensor, a temperature sensor, an acceleration sensor, a Fluxgate sensor, a Superconducting Quantum Interference Device (SQUID) sensor, a Hall Effect sensor, a Magnetoresistive sensor, a Proton Precession sensor, an Optically Pumped sensor, or any combination thereof.

Any digital map herein may be in a format that may be ASCII Text (.asc .txt .csv .plt), Topografix GPX (.gpx), Garmin Mapsource (.gdb), Google Earth Keyhole Markup Language (.kml .kmz), Pocket Street Pushpins (.psp), Maptech Marks (.msf), Maptech Waypoint (.mxf), Microsoft MapPoint Pushpin (.csv), OziExplorer (.wpt), TomTom Overlay (.ov2) and TomTom plain text format (.asc), Open-StreetMap data (.osm), or any combination thereof. Alternatively or in addition, any digital map herein may be based on, may use, may be according to, or may be compatible with, the Navigation Data Standard (NDS), or may be obtained from the Navigation Data Standard (NDS) database. Alternatively or in addition, any digital map herein may be based on, may use, may be according to, or may be compatible with, Two-dimension (2D) format, perspective 2D (pseudo 3D) format, or a three-dimensions (3D) format.

Alternatively or in addition, any digital map herein may be based on, may use, may be according to, or may be compatible with, a Geographic Information System (GIS) that may comprise, may be based on, or may use, a United States Geological Survey's (USGS) survey reference points and georeferenced images, city public works databases, Continuously Operating Reference Stations (CORS), or any combination thereof. Alternatively or in addition, any digital map herein may be obtained as part of a service that may be Google Earth™ (by Google®), Virtual Earth™ (by Microsoft®), ArcGIS by Esri (Environmental Systems Research Institute), or TerraServer® (by TerraServer®). Any roads data herein may further comprise emission zones (such as Low-Emission Zones (LEZs) or Zero-Emission Zones (ZEZs), speed limits relating to roads or parts thereof, toll roads, slopes, or any combination thereof.

Any precipitation herein may comprise a drizzle, rain, sleet, snow, ice pellets, graupel, hail, fog, mist, or any combination thereof. Further, any weather data herein may be a combination of the forecasted, estimated, or measured, temperature, wind, humidity, precipitation, clouding, air pressure, Sun light intensity and angle, or any combination thereof.

Any charging stations data herein may comprise data associated with at least 1, 2, 3, 4, 5, 7, 10, 20, 50, 100, 200, 500, 1,000, 2,000, or 2,000 distinct stations. Alternatively or in addition, any charging stations data herein may further comprise, for each of the charging stations, a name or identification of the respective charging station, an identifier or name of the Charge Point Operator (CPO) that operates the respective charging station, a number of charging positions in the respective charging station, a charging capability of each of the charging positions, a fee to be charged for the charging in the respective charging station, or any combination thereof. A charging capability of at least one of the charging stations herein may be rated as AC Level 1, AC Level 2, DC Level 1, DC Level 2, or any combination thereof according to Society of Automotive Engineers, Inc. (SAE) J1772 (2017) standard. Alternatively or in addition, a charging capability of at least one of the charging stations herein may be rated as Mode 1, Mode 2, Mode 3, Mode 4, or any combination thereof according to International Electrotechnical Commission (IEC) 61851-1 standard.

Any start time herein may be a future time or a current time at the origin point, such as when obtaining the time. Alternatively or in addition, any start time herein may be a time when obtaining at least one of the routes data, the charging stations data, the weather data, the car data, the target places data, or any combination thereof. Any list herein, such as the second list, may comprise at least 1, 2, 3, 4, 5, 7, 10, 20, 50, 100, 200, 500, 1,000, or 2,000 distinct locations, or may comprise less than 2, 3, 4, 5, 7, 10, 20, 50, 100, 200, 500, 1,000, 2,000, or 5,000 distinct locations.

Any target places data herein may further comprise opening hours associated with each one of the target places. Any one of any target places herein may comprise a shop or a store that may provide a service or that may sell tangible products, such as Convenience goods, Shopping goods, Specialty goods, Unsought goods, groceries, household goods, consumer products, or any combination thereof. Any shop herein may comprise, or may be part of, a supermarket, a convenience store, a grocery store, a superstore, or any combination thereof.

Any method herein may further use an input component in any device, such as in a first device, for sensing action by a user, and any data or geographical locations associated with the origin and final points, the routes data, the charging stations data, the first list, the second list, the weather data, the car data, a driver-related data, target places data, or any combination thereof, may be obtained from the user via the input component. Any generating herein may be performed by any device, such as the first device or by an additional device such as a second device, that may communicate with the first device over the Internet. Any input component herein may consist of, or may comprise, a keyboard, a pointing device, a trackball, a touch-pad, a touch-screen, a scanner, a digital camera, a joystick, or any combination thereof.

Any data or any geographical locations herein that may be associated with the origin and final points, the routes data, the charging stations data, the first list, the second list, the weather data, the car data, a driver-related data, target places data, or any combination thereof, may be stored in any device, such as in a first device, and any generating herein may be performed by any device, such as a second device that may communicate with the first device over the Internet. Any obtaining of any data herein may comprise sending a request for the data by the second device to the first device over a first wireless network, and receiving the data by the second device from the first device over the Internet over a second wireless network in response to the sending of the request. Any device herein, such as the first device, may comprise the electric car, an additional electric car, a smartphone, a data server, or a service server. Further, any device herein, such as the first device, may comprise the electric car, an additional electric car, a smartphone, a data server, or a service server.

Any wireless network herein, such as the first or second wireless network, may comprise a Wireless Wide Area Network (WWAN), and any wireless transceiver herein may comprise a WWAN transceiver, and any antenna herein may comprise an WWAN antenna. Any WWAN herein may be a wireless broadband network. Any WWAN herein may be a WiMAX network, any antenna herein may be a WiMAX antenna, and any wireless transceiver herein may be a WiMAX modem. Any WiMAX network herein may be according to, compatible with, or based on, IEEE 802.16-2009.

Any network herein, such as any WWAN herein, may be a cellular telephone network, any antenna herein may be a cellular antenna, and any wireless transceiver herein may be a cellular modem. Any cellular telephone network herein may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution. Alternatively or in addition, any cellular telephone network herein may use a protocol that may be selected from the group consisting of a Fourth Generation (4G) network that uses HSPA+, Mobile WiMAX, LTE, LTE-Advanced, and MBWA, or may be based on IEEE 802.20-2008.

Any wireless network herein may comprise a Wireless Personal Area Network (WPAN), any wireless transceiver herein may comprise a WPAN transceiver, and any antenna herein may comprise an WPAN antenna. Any WPAN herein may be according to, may be compatible with, or may be based on, Bluetooth™, Bluetooth Low Energy (BLE), or IEEE 802.15.1-2005 standards. Alternatively or in addition, any WPAN herein may be a wireless control network that may be according to, or may be based on, Zigbee™, IEEE 802.15.4-2003, or Z-Wave™ standards.

Any wireless network herein may comprise Wireless Local Area Network (WLAN), any wireless transceiver herein may comprise a WLAN transceiver, and any antenna herein may comprise an WLAN antenna. Any WLAN herein may be according to, may be compatible with, or may be based on, IEEE 802.11-2012, IEEE 802.11a, IEEE 802.11b, IEEE 802.11g, IEEE 802.11n, IEEE 802.11ac standard, or any combination thereof. Alternatively or in addition, any wireless network herein may be is over a licensed or unlicensed radio frequency band, such as over the unlicensed radio frequency band that may be an Industrial, Scientific and Medical (ISM) radio band.

Alternatively or in addition, any wireless network herein may use, or may be based on, Dedicated Short-Range Communication (DSRC), which may be according to, may be compatible with, or may be based on, European Committee for Standardization (CEN) EN 12253:2004, EN 12795:2002, EN 12834:2002, EN 13372:2004, or EN ISO 14906:2004 standard, or may be according to, may be compatible with, or may be based on, IEEE 802.11p, IEEE 1609.1-2006, IEEE 1609.2, IEEE 1609.3, IEEE 1609.4, IEEE1609.5 standard, or any combination thereof.

Any method herein may further comprise estimating or calculating multiple distances between a plurality of locations along available routes in the obtained routes map; obtaining a value associated with an environmental factor, a car factor, or a driver factor; and updating the multiple distances according to a weighting function of the obtained value, and any generating herein may use, or may be based on, the updated distances. Any weighting function herein may be based on, may use, or may comprise, a look-up table, or a discrete, continuous, monotonic, non-monotonic, elementary, algebraic, linear, polynomial, quadratic, Cubic, Nth-root based, exponential, transcendental, quintic, quartic, logarithmic, hyperbolic, ortrigonometric function.

Any method herein may use a database that may store data or geographical locations associated with the origin and final points, the routes data, the charging stations data, the first list, the second list, the weather data, the car data, a driver-related data, target places data, and any obtaining of the respective data herein may comprise obtaining the data from a database. Any generating herein may be performed by a first device and any database herein may be stored in a second device, and any obtaining herein may comprise sending a request for the data by the second device to the first device over the Internet, and receiving the data by the second device from the first device over the Internet over the Internet in response to the sending of the request.

Any device herein, such as the first or second device, may comprise any electric car, an additional electric car, a smartphone, a data server, or a service server. Any first device herein may comprise any electric car, and any second device herein may comprise an additional electric car, a smartphone, a data server, a service server, or a combination thereof. Alternatively or in addition, any first device herein may comprise any smartphone, and any second device herein may comprise any electric car, an additional electric car, a smartphone, a data server, a service server, or a combination thereof. Alternatively or in addition, any first device herein may comprise a service server, and any second device herein may comprise any electric car, an additional electric car, a smartphone, a data server, or a combination thereof.

Any database herein may comprise, or may be based on, a non-relational database, an object-oriented database, an object database, an entity-relationship model database, an associative database, XML database, or any combination thereof. Alternatively or in addition, any database herein may comprise a relational database that may comprises, or may be based on, Structured Query Language (SQL) based database, such as SQL, PostgreSQL, MySQL, Oracle, DB2, Sybase, or any combination thereof. Alternatively or in addition, any database herein may comprise an Internet-based, web-based, cloud computing-based, or any combination thereof. Alternatively or in addition, any database herein may comprise a NoSQL database such as a MongoDB database.

Any electric car may comprise, or may consist of, a road or rail vehicle adapted to travel on land that may be propelled by any electric motor fed by any rechargeable battery, such as a Neighborhood Electric Vehicle (NEV), a Plug-in Electric Vehicle (PEV), a Battery Electric Vehicle (BEV), a Plug-in Hybrid Electric Vehicle (PHV or PHEV), an all-electric car, or any combination thereof. Alternatively or in addition, any electric car herein may comprise, or may consist of, a bicycle, a car, a motorcycle, a train, an electric scooter, a subway, a train, a trolleybus, or a tram. Any electric car herein may comprise an electric plug that may be connectable to an external charging station for receiving electrical power therefrom for charging the rechargeable battery, and any electric plug herein may comprise a Type 1 or Type 2 connector. Any electric car herein may be configured to be charged by single-phase Alternating current (AC), three-phase AC, Direct current (DC), or any combination thereof, such as being defined or configured to be charged by SAE J1772 (2017) AC Level 1, AC Level 2, DC Level 1, DC Level 2, or any combination thereof, or may be defined or configured to be charged by IEC 61851-1 mode 1, mode 2, mode 3, mode 4, or any combination thereof.

Any electric car herein may consist of, or may comprise, an autonomous electric car that may be according to levels 0, 1, 2, 3, 4, or 5 of the Society of Automotive Engineers (SAE) J3016 standard, and any method herein may further comprise causing or guiding the electric car to navigate according to, or along, the generated optimal route.

At least part of, or all of, any steps of any methods herein may be performed by a client device, and any method herein may further comprise storing, operating, or using, by the client device, a client operating system. Any client operating system herein may consist of, may comprise, or may be based on, Microsoft Windows 7, Microsoft Windows XP, Microsoft Windows 8, Microsoft Windows 8.1, Linux, or Google Chrome OS. Alternatively or in addition, any client operating system herein may be a mobile operating system that may comprise Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Alternatively or in addition, any client operating system herein may be is a Real-Time Operating System (RTOS), such as comprises FreeRTOS, SafeRTOS, QNX, VxWorks, or Micro-Controller Operating Systems (µC/OS).

Any device herein, such as any client device, may be housed in an enclosure that may comprise a hand-held enclosure or a portable enclosure. Any client device herein may consist of, may comprise, may be part of, or may be integrated with, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone that may comprise, or may be based on, an Apple iPhone 6 or a Samsung Galaxy S6.

At least part of, or all of, any steps of any methods herein may be performed by any electric car herein, such as by a navigation system in the electric car. Alternatively or in addition, at least part of, or all of, any steps of any methods herein may be performed by any server device, and any method herein may further perform storing, operating, or using, by the server device, a server operating system that may consist or, may comprise of, or may be based on, Microsoft Windows Server®, Linux, UNIX, Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™ Gentoo™, Linspire™, Mandriva, Red Hat® Linux, SuSE, and Ubuntu®, UNIX® variant Solaris™, AIX®, Mac™ OS X, FreeBSD®, OpenBSD, or NetBSD®.

Any server device herein may be a cloud-based device or service, and may be implemented as part of a public cloud-based service such as an Infrastructure as a Service (IaaS) or as a Software as a Service (SaaS), which may be provided by Amazon Web Services® (AWS®), Microsoft® Azure™, or Google® Compute Engine™ (GCP).

Any optimal route herein may comprise an image, file, or data of any optimal route overlayed over a map, may comprise a maneuvers list with sequenced turn directions, a turn-by-turn guidance, or any combination thereof, may comprise a trip total time along any optimal route, or a time of at least part of any optimal route, may comprise parking time, waiting in line time, or a charging time in at least one charging station locations, or any combination thereof. Any notifying herein may comprise signaling to any user that may include auditory signaling, visual signaling, haptic signaling, or any combination thereof.

Any generating herein may be performed by a first device, and any notifying or guiding herein may be performed by a second device, and any method herein may further comprise sending, by the first device via a first network over the Internet, to the second device, the optimal route; receiving, by the second device via a second network over the Internet, from the first device, the optimal route; and using, by the second device, the received optimal route. Any first device herein may comprise a smartphone, a server device, the electric car, or any combination thereof, and any second device herein may comprise a smartphone, a server device, the electric car, or any combination thereof. Any first or second network herein may comprise, may use, or may be based on, a wireless network, and any respective first or second device herein may respectively comprise an antenna and a wireless transceiver coupled to the antenna for communicating over the wireless network.

Any method herein may use in any device, such as a first device, a sensor that may output a value that may be responsive to a physical phenomenon, and the origin and final points, the routes data, the charging stations data, the first list, the second list, the weather data, the car data, a driver-related data, target places data, or any combination thereof may comprise the value, and any generating herein may be based on, or may use, the value. Any method herein may further comprise receiving the value from the first device over the Internet, and any first device herein may comprise, may be part of, or may be integrated with, any electric car or any a smartphone herein.

Any sensor herein may consist of, or may comprise, an occupancy sensor for detecting occupancy of a space by a human body by using electric effect, inductive coupling, capacitive coupling, triboelectric effect, piezoelectric effect, fiber optic transmission, or radar intrusion sensing, and any occupancy sensor herein may consist of, may comprise, or may be based on, an acoustic sensor, opacity, geomagnetism, magnetic sensors, magnetometer, reflection of transmitted energy, infrared laser radar, microwave radar, electromagnetic induction, or vibration. Alternatively or in addition, any occupancy sensor herein may consist of, may comprise, or may be based on, a motion sensor that may consist of, or may comprise, a mechanically actuated sensor, passive or active electronic sensor, ultrasonic sensor, microwave sensor, tomographic detector, passive infrared (PIR) sensor, laser optical detector, acoustical detector, or any combination thereof.

Any sensor herein may consist of, or may comprise, a photoelectric sensor that may respond to a visible or an invisible light, and the invisible light may be infrared, ultraviolet, X-rays, or gamma rays, and any photoelectric sensor herein may be based on the photoelectric or photovoltaic effect, and may consist of, or may comprise, a semiconductor component that may consist of, or may comprise, a photodiode, a phototransistor, a Charge-Coupled System (CCD), a Complementary Metal-Oxide Semiconductor (CMOS) component, or any combination thereof.

Any sensor herein may consist of, or may comprise, an electrochemical sensor that may respond to an object chemical structure, properties, composition, or reactions, and may consist of, or may comprise, a pH meter or a gas sensor that may respond to a presence of radon, hydrogen, oxygen, or Carbon-Monoxide (CO), a smoke, or a flame. Any sensor herein may consist of, or may comprise, a fire detector, or may be responsive to combustible, flammable, or toxic gas.

Any sensor herein may consist of, or may comprise, an electric sensor that may respond to an electrical characteristics or electrical phenomenon quantity in an electrical circuit or of any battery herein. Any electric sensor may be connected or coupled to respond to an electrical characteristics or electrical phenomenon quantity of a battery in the electric car. Any electrical sensor herein may be conductively coupled to any electrical circuit, or may be a non-contact sensor that may non-conductively couple to any electrical circuit. Any electrical sensor herein may be responsive to Alternating Current (AC) or Direct Current (DC), such as an ampermeter that may respond to electrical current passing through a conductor or wire. Any electrical sensor herein may consist of, or may comprise, an AC ampermeter connected to measure an AC current from an AC power source or via an AC load, such as a galvanometer, a hot-wire ampermeter, a current clamp, or a current probe.

Any electrical sensor herein may consist of, or may comprise, a voltmeter that may respond to an electrical voltage, such as an electrometer, a resistor, a potentiometer, or a bridge circuit. Any electrical sensor herein may consist of, or may comprise, a wattmeter that may respond to active electrical power, such as an AC power wattmeter that may be connected to measure an AC power source supplied power or an AC load consumed power, may be based on induction, or may be based on multiplying measured voltage and measured current. Any electrical sensor herein may consist of, or may comprise, an electricity meter that that may respond to electrical energy, or may be connected to measure an AC power source supplied electrical energy or an AC load consumed electrical energy.

Any sensor herein may consist of, or may comprise, a piezoelectric sensor that may include a single crystal material or a piezoelectric-ceramics and may use a transverse, longitudinal, or shear effect mode of the piezoelectric effect. Any sensor herein may consist of, or may comprise, a directional sensor array that may be operative to estimate the number, magnitude, frequency, Direction-Of-Arrival (DOA), distance, or speed of the phenomenon impinging the sensor array. Any sensor herein may consist of, or may comprise, a thermoelectric sensor that may respond to a temperature or to a temperature gradient of an object using conduction, convection, or radiation, and wherein the thermoelectric sensor consists of, or comprises, a Positive Temperature Coefficient (PTC) thermistor, a Negative Temperature Coefficient (NTC) thermistor, a thermocouple, a quartz crystal, or a Resistance Temperature Detector (RTD). Any sensor herein may consist of, or may comprise, a nanosensor, a crystal, or a semiconductor. Any sensor herein may consist of, or may comprise, an ultrasonic based, an eddy-current sensor, a proximity sensor, a bulk or surface acoustic sensor, or an atmospheric or an environmental sensor. Any sensor herein may consist of, or may comprise, a radiation sensor that may respond to radioactivity, nuclear radiation, alpha particles, beta particles, or gamma rays, and may be based on gas ionization. Any sensor herein may consist of, or may comprise, a photoelectric sensor that may respond to a visible or an invisible light, the invisible light may be infrared, ultraviolet, X-rays, or gamma rays. Any photoelectric sensor herein may consist of, may comprise, or may be based on the photoelectric or photovoltaic effect, and may consist of, or may comprise, a semiconductor component that may consist of, or may comprise, a photodiode, a phototransistor, a solar cell, a Charge-Coupled Device (CCD) element, a Complementary Metal-Oxide Semiconductor (CMOS) element, or any combination thereof.

Any sensor herein may consist of, or may comprise, a photosensitive image sensor array comprising multiple photoelectric sensors, for capturing an image and producing electronic image information representing the image, and any device herein may one or more optical lens for focusing the received light and to guide the image, and any image sensor herein may be disposed approximately at an image focal point plane of the one or more optical lens for properly capturing the image. Any method or system herein may use an image processor that may be coupled to any image sensor for providing a digital data video signal according to a digital video format, the digital video signal carrying digital data video based on the captured images, the digital video format may be based on TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standards.

Any sensor herein may consist of, or may comprise, an electrochemical sensor that may respond to an object chemical structure, properties, composition, or reactions, and wherein the electrochemical sensor consists of, or comprises, a pH meter or a gas sensor responding to a presence of radon, hydrogen, oxygen, or Carbon-Monoxide (CO). Any sensor herein may consist of, may comprise, or may be based on, an optical detection or on an ionization and may be a smoke, a flame, or a fire detector, or may be responsive to combustible, flammable, or toxic gas.

Any sensor herein may consist of, or may comprise, a physiological sensor that may respond to parameters associated with a live body, and may be external to the sensed body, implanted inside the sensed body, attached to the sensed body, or wearable on the sensed body. Any physiological sensor herein may be responsive to body electrical signals and may consist of, or may comprise, an EEG Electroencephalography (EEG) or an Electrocardiography (ECG) sensor. Any physiological sensor herein may respond to oxygen saturation, gas saturation, or a blood pressure in any sensed body.

Any sensor herein may consist of, or may comprise an electroacoustic sensor that may respond to an audible or inaudible sound that may consist of, or may comprise, an omnidirectional, unidirectional, or bidirectional microphone that may consist of, may comprise, or may be based on the sensing the incident sound-based motion of a diaphragm or a ribbon, and any microphone herein may consist of, or may comprise, a condenser, an electret, a dynamic, a ribbon, a carbon, or a piezoelectric microphone.

Any sensor herein may be operative for sensing fuel and air metering, ignition system, misfire, auxiliary emission control, vehicle speed and idle control, transmission, on-board computer, fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, a Vehicle Identification Number (VIN), or any combination thereof.

Any sensor herein may consist of, or may comprise, an angular position sensor for measuring angular setting or a change of an angle. Any sensor herein may consist of, or may comprise, a rotational-speed sensor for measuring rotational speeds, positions or angles in excess of 360°. Any sensor herein may consist of, or may comprise, a rotational-speed sensor that may be configured for measuring wheel-speed, engine speeds, engine positioning angle, steering-wheel angle, distance covered, or road curves/bends.

Any sensor herein may consist of, or may comprise, a spring-mass acceleration sensor for measuring changes in the electric car speed, and any spring-mass acceleration sensor herein may be configured for measuring vehicular acceleration and deceleration, such as part of the Anti-Breaking System (ABS) or the Traction Control System (TCS) of the electric car. Any sensor herein may consist of, or may comprise, a bending beam acceleration sensor for registering or detecting shock and vibration. Any sensor herein may consist of, or may comprise, a yaw sensor for measuring skidding movements, or for measuring yaw rate and lateral acceleration, of any electric car vehicle. Any yaw sensor herein may be configured for affecting a vehicle-dynamics control that is Electronic Stability Program (ESP). Any sensor herein may consist of, or may comprise, an absolute-pressure sensor for measuring ranges from 50% to 500% of the earth's atmospheric pressure. Any sensor herein may consist of, or may comprise a temperature sensor that is configured for displaying of outside and inside temperature, controlling of air conditioner or inside temperature, controlling of radiator or thermostat, measuring a battery temperature, measuring of lube-oil, coolant, or engine temperature.

Any obtaining herein of the origin and final points, the routes data, the charging stations data, the first list, the second list, the weather data, the car data, a driver-related data, target places data, or any combination thereof, may comprise receiving a notification message that includes the respective data, or the notifying of the user of the generated optimal route may comprise sending a notification message that comprises the optimal route of any part thereof.

Any sending or any receiving of any notification message herein may comprise respectively sending or receiving over the Internet via a wireless network to any user computer using a peer-to-peer scheme, or nay comprise sending to, or receiving from, over the Internet, using an Instant Messaging (IM) server as part of an IM service. Any communication herein with any IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), Hypertext Transfer Protocol (HTTP), or any combination thereof.

Any notification message herein may be a text-based message and any IM service herein may be a text messaging service. Alternatively or in addition, any notification message herein may be according to, or may be based on, a Short Message Service (SMS) message and the IM service may be a SMS service, an electronic-mail (e-mail) message and the IM service may be an e-mail service, a WhatsApp message and the IM service may be a WhatsApp service, a Twitter message and the IM service may be a Twitter service, a Viber message and the IM service may be a Viber service, or any combination thereof. Alternatively or in addition, any notification message herein may be according to, or may be based on, a Multimedia Messaging Service (MMS) or an Enhanced Messaging Service (EMS) message that may include audio or video, and any IM service herein may respectively be an NMS or EMS service.

Any method herein may be used with an Internet-connected server that stores, or is connected to, a database. Any database herein may comprise the products database, an opening-hours database, or a maps database, and any device herein may use the database. Any server herein may be storing, operating, or using, a server operating system, which may consist of, may comprise, or may be based on, one out of Microsoft Windows Server®, Linux, or UNIX, or may consist of, may comprise, or may be based on, one out of Microsoft Windows Server® 2003 R2, 2008, 2008 R2, 2012, or 2012 R2 variant, Linux™ or GNU/Linux-based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®.

Any method herein may use, or may be used, with a virtualization, and at least one of the steps herein may be executed as part of a virtualized application as part of a Virtual Machine (VM). Any device herein (such as a client device) or any part thereof, any server herein or any part thereof, may be implemented as virtual hardware. Any method herein may be used with a host computer that implements the VM, and any method herein may further comprise executing, by the host computer, a hypervisor or a Virtual Machine Monitor (VMM), and any virtualized application or hardware herein may use or interface virtual hardware. Any virtualization herein may include, may be based on, or may use, full virtualization, para-virtualization, or hardware assisted virtualization, and any device or server herein may be implemented as virtual hardware.

Any method herein may comprise storing, operating, or using, an operating system, and any operating system herein may be implemented as part of any device. Any method herein may be used with a virtualization, and any operating system herein may be executed as a guest operating system as part of a Virtual Machine (VM). Further, any method herein may be used with a host computer that may implement the VM, and may further comprise executing, by the host computer, a hypervisor or a Virtual Machine Monitor (VMM), and any guest operating system herein may use or may interface virtual hardware. Any virtualization herein may include, may be based on, or may use, full virtualization, para-virtualization, or hardware assisted virtualization.

Any method herein may comprise communicating, such as by the device, with an Internet-connected server. Any server herein may comprise a database, and any method herein may further comprise communicating with the server for using or accessing the database. Any communicating herein with the server may be via a wireless network that may use a wireless transceiver and an antenna in the device. Any method herein may further comprise sending, via the wireless network to the server, the identified items or the estimated current location of the device.

Any wireless network herein may comprise a Wireless Wide Area Network (WWAN), any wireless transceiver herein may comprise a WWAN transceiver, and any antenna herein may comprise a WWAN antenna, and any WWAN herein may be a wireless broadband network. Further, any WWAN herein may be a WiMAX network, any antenna herein may be a WiMAX antenna and any wireless transceiver herein may be a WiMAX modem, and any WiMAX network herein may be according to, may be compatible with, or may be based on, IEEE 802.16-2009. Alternatively or in addition, any WWAN herein may be a cellular telephone network, any antenna herein may be a cellular antenna, and any wireless transceiver herein may be a cellular modem. Any cellular telephone network herein may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or any cellular telephone network herein may use a protocol selected from the group consisting of a Fourth Generation (4G) network that uses HSPA+, Mobile WiMAX, LTE, LTE-Advanced, MBWA, or is based on IEEE 802.20-2008.

Alternatively or in addition, any wireless network herein may comprise a Wireless Personal Area Network (WPAN), any wireless transceiver herein may comprise a WPAN transceiver, and any antenna herein may comprise a WPAN antenna. Any WPAN herein may be according to, may be compatible with, or may be based on, Bluetooth™, Bluetooth Low Energy (BLE), or IEEE 802.15.1-2005standards, or any WPAN herein may be a wireless control network that may be according to, or based on, Zigbee™, IEEE 802.15.4-2003, or Z-Wave™ standards.

Alternatively or in addition, any wireless network herein may comprise a Wireless Local Area Network (WLAN), any wireless transceiver herein may comprise a WLAN transceiver, and any antenna herein may comprise a WLAN antenna. Any WLAN herein may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac. Any wireless network herein may be over a licensed or unlicensed radio frequency band. Any wireless network may be over the unlicensed radio frequency band that may be an Industrial, Scientific and Medical (ISM) radio band.

Alternatively or in addition, any wireless network herein may comprise a Dedicated Short-Range Communication (DSRC) that may be according to, may be compatible with, or may be based on, European Committee for Standardization (CEN) EN 12253:2004, EN 12795:2002, EN 12834: 2002, EN 13372:2004, or EN ISO 14906:2004 standard. Any DSRC herein may be according to, compatible with, or based on, IEEE 802.11p, IEEE 1609.1-2006, IEEE 1609.2, IEEE 1609.3, IEEE 1609.4, or IEEE1609.5.

Any method herein may use, or may be used with, a virtualization, and any communication herein, such as between the device and the server, may be executed as a virtualized network as part of a Virtual Machine (VM). Any method herein may use, or may be used with, a host computer that may implement the VM, and any method herein may further comprise executing, by the host computer, a hypervisor or a Virtual Machine Monitor (VMM), and any virtualized network herein may use or may interface virtual hardware, and the virtualization may include, may be based on, or may use, full virtualization, para-virtualization, or hardware assisted virtualization.

Any method herein may be used with a location sensor, and any estimating herein of any current geographical location may use the location sensor. Any method herein may be used with multiple RF signals transmitted by multiple sources, and any current location may be estimated by receiving the RF signals from the multiple sources via one or more antennas, and processing or comparing the received RF signals. Any multiple sources herein may comprise satellites that may be part of Global Navigation Satellite System (GNSS), and the GNSS may be the Global Positioning System (GPS), and any location sensor herein may comprise a GPS antenna coupled to a GPS receiver for receiving and analyzing the GPS signals. Alternatively or in addition, any GNSS may be the GLONASS (GLObal NAvigation Satellite System), the Beidou-1, the Beidou-2, the Galileo, or the IRNSS/VAVIC.

Any location estimation, calculating, processing, or comparing herein may comprise, or may be based on, performing TOA (Time-Of-Arrival) measurement, performing TDOA (Time Difference-Of-Arrival) measurement, performing an AoA (Angle-Of-Arrival) measurement, performing a Line-of-Sight (LoS) measurement, performing a Time-of-Flight (ToF) measurement, performing a Two-Way Ranging (TWR) measurement, performing a Symmetrical Double Sided—Two Way Ranging (SDS-TWR) measurement, performing a Near-field electromagnetic ranging (NFER) measurement, or performing triangulation, trilateration, or multilateration (MLAT).

Any RF signals herein may be part of the communication over a wireless network. And the wireless network may be a cellular telephone network, and the sources may be cellular towers or base-stations. Alternatively or in addition, the wireless network may be a WLAN, and the sources may be hotspots or Wireless Access Points (WAPs). Any geographical location herein may be estimated using, or based on, geolocation, and any geolocation may be based on W3C Geolocation Application Programming Interface (API). Any geographical location herein may consist of, or may comprise, at least one of a country, a region, a city, a street, a ZIP (or postal) code, a latitude, and a longitude.

Any method herein may be used with an automotive navigation system in a vehicle, and any device herein may be part of, or may comprise, automotive navigation system and is installable, or mountable, in a vehicle, and any user herein may be a driver, operator, or a passenger, in the vehicle. Any device herein may be mounted onto, may be attached to, may be part of, or may be integrated in, the vehicle. Any vehicle herein may be a ground vehicle adapted to travel on land, and may be selected from the group consisting of a bicycle, a car, a motorcycle, a train, an electric scooter, a subway, a train, a trolleybus, and a tram. Further, any ground vehicle herein may consist of, or may comprise, an autonomous car. Any autonomous car herein may be according to levels 0, 1, or 2 of the Society of Automotive Engineers (SAE) J3016 standard, or may be according to levels 3, 4, or 5 of the Society of Automotive Engineers (SAE) J3016 standard.

Any device herein may be housed in a single enclosure that may be a hand-held enclosure or a portable enclosure, or the single enclosure may be a surface mountable enclosure. Alternatively or in addition, any device herein may be further integrated with at least one of a wireless device, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Further, any device herein may be integrated with a smartphone that may comprise, or may be based on, an Apple iPhone 6 or a Samsung Galaxy S6. Any method herein may further comprise operating of an operating system that may be a mobile operating system. Any mobile operating system herein may comprise Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Any operating system herein may be a Real-Time Operating System (RTOS), such as FreeRTOS, SafeRTOS, QNX, VxWorks, or Micro-Controller Operating Systems (μC/OS).

Any server herein may be storing, operating, or using, a server operating system, that may consist of, may comprise, or may be based on, one out of Microsoft Windows Server®, Linux, or UNIX. Alternatively or in addition, the server operating system may consist of, may comprise, or may be based on, one out of Microsoft Windows Server®2003 R2, 2008, 2008 R2, 2012, or 2012 R2 variant, Linux™ or GNU/Linux-based Debian GNU/Linux, Debian GNU/kFreeBSD, Debian GNU/Hurd, Fedora™, Gentoo™ Linspire™, Mandriva, Red Hat® Linux, SuSE, and Ubuntu®, UNIX® variant Solaris™ AIX®, Mac™ OS X, FreeBSD®, OpenBSD, and NetBSD®.

Any wireless network herein may comprise a Wireless Wide Area Network (WWAN), any wireless transceiver herein may comprise a WWAN transceiver, and any antenna herein may comprise an WWAN antenna. Any WWAN herein may be a wireless broadband network. The WWAN may be a WiMAX network, the antenna may be a WiMAX antenna and the wireless transceiver may be a WiMAX modem, and the WiMAX network may be according to, compatible with, or based on, IEEE 802.16-2009. Alternatively or in addition, the WWAN may be a cellular telephone network, the antenna may be a cellular antenna, and the wireless transceiver may be a cellular modem, where the cellular telephone network may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or the cellular telephone network may use a protocol selected from the group consisting of a Fourth Generation (4G) network that use HSPA+, Mobile WiMAX, LTE, LTE-Advanced, MBWA, or may be based on IEEE 802.20-2008.

Any wireless network herein may comprise a Wireless Personal Area Network (WPAN), the wireless transceiver may comprise a WPAN transceiver, and the antenna may comprise an WPAN antenna. The WPAN may be according to, compatible with, or based on, Bluetooth™, Bluetooth Low Energy (BLE), or IEEE 802.15.1-2005standards, or the WPAN may be a wireless control network that may be according to, or may be based on, Zigbee™, IEEE 802.15.4-2003, or Z-Wave™ standards. Any wireless network herein may comprise a Wireless Local Area Network (WLAN), the wireless transceiver may comprise a WLAN transceiver, and the antenna may comprise an WLAN antenna. The WLAN may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac. Any wireless network herein may be over a licensed or unlicensed radio frequency band that may be an Industrial, Scientific and Medical (ISM) radio band.

Any wireless network herein may be using, or may be based on, Dedicated Short-Range Communication (DSRC) that may be according to, may be compatible with, or may be based on, European Committee for Standardization (CEN) EN 12253:2004, EN 12795:2002, EN 12834:2002, EN 13372:2004, or EN ISO 14906:2004 standard. Alternatively or in addition, the DSRC may be according to, may be compatible with, or may be based on, IEEE 802.11p, IEEE 1609.1-2006, IEEE 1609.2, IEEE 1609.3, IEEE 1609.4, or IEEE1609.5.

Any vehicle, apparatus, or device herein may be operative for estimating its geographical location. Such localization may be used with multiple RF signals transmitted by multiple sources, and the geographical location may be estimated by receiving the RF signals from the multiple sources via one or more antennas, and processing or comparing the received RF signals. The multiple sources may comprise satellites, that may be Global Positioning System (GPS), and the RF signals may be received using a GPS antenna coupled to a GPS receiver for receiving and analyzing the GPS signals. Alternatively or in addition, the multiple sources may comprise satellites that may be part of any Global Navigation Satellite System (GNSS), such as the GLO-NASS (GLObal NAvigation Satellite System), the Beidou-1, the Beidou-2, the Galileo, or the IRNSS/VAVIC.

Alternatively or in addition, the processing or comparing may comprise, or may be based on, performing TOA (Time-Of-Arrival) measurement, performing TDOA (Time Difference-Of-Arrival) measurement, performing an AoA (Angle-Of-Arrival) measurement, performing a Line-of-Sight (LoS) measurement, performing a Time-of-Flight (ToF) measurement, performing a Two-Way Ranging (TWR) measurement, performing a Symmetrical Double Sided—Two Way Ranging (SDS-TWR) measurement, performing a Near-field electromagnetic ranging (NFER) measurement, or performing triangulation, trilateration, or multilateration (MLAT). Alternatively or in addition, the RF signals may be part of the communication over a wireless network in which the vehicle, apparatus, or device may be communicating over. The wireless network may be a cellular telephone network, and the sources may be cellular towers or base-stations. Alternatively or in addition, the wireless network may be a WLAN, and the sources may be hotspots or Wireless Access Points (WAPs). Alternatively or in addition, the geographical location may be estimated using, or based on, geolocation, which may be may be based on W3C Geolocation API. Any geographical location herein may consist of, or may comprise, a country, a region, a city, a street, a ZIP (or postal) code, latitude, or longitude.

Any vehicle herein may be a ground vehicle adapted to travel on land, such as a bicycle, a car, a motorcycle, a train, an electric scooter, a subway, a train, a trolleybus, or a tram. Alternatively or in addition, the vehicle may be a buoyant or submerged watercraft adapted to travel on or in water, and the watercraft may be a ship, a boat, a hovercraft, a sailboat, a yacht, or a submarine. Any vehicle herein may be a ground vehicle that may consist of, or may comprise, an autonomous car, which may be according to levels 0, 1, 2, 3, 4, or 5 of the Society of Automotive Engineers (SAE) J3016 standard.

Any apparatus, device, sensor, or actuator herein, or any part thereof, may be mounted onto, may be attached to, may be part of, or may be integrated with, a rear or front view camera, chassis, lighting system, headlamp, door, car glass, windscreen, side or rear window, glass panel roof, hood, bumper, cowling, dashboard, fender, quarter panel, rocker, or a spoiler of a vehicle. Any vehicle herein may further comprise an Advanced Driver Assistance Systems (ADAS) functionality, system, or scheme, and any apparatus, device, sensor, or actuator herein may be part of, may be integrated with, may be communicating with, or may be coupled to, the ADAS functionality, system, or scheme. The ADAS functionality, system, or scheme may consist of, may comprise, or may use, Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system, Pre-crash system, Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

Any vehicle herein may further employ an Advanced Driver Assistance System Interface Specification (ADASIS) functionality, system, or scheme, and any sensor or actuator herein may be part of, integrated with, communicates with, or coupled to, the ADASIS functionality, system, or scheme. Further, any message herein may comprise a map data relating to the location of a respective vehicle.

Any single enclosure herein may be a hand-held enclosure or a portable enclosure, or may be a surface mountable enclosure. Any device or apparatus herein may further be integrated with at least one of a wireless device, a notebook computer, a laptop computer, a media player, a Digital Still Camera (DSC), a Digital video Camera (DVC or digital camcorder), a Personal Digital Assistant (PDA), a cellular telephone, a digital camera, a video recorder, a smartphone, or any combination thereof. The smartphone may consist of, comprise, or may be based on, Apple iPhone 6 or Samsung Galaxy S6.

Any software or firmware herein may comprise an operating system that may be a mobile operating system. The mobile operating system may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (µC/OS).

Any apparatus or device herein may be operative to connected to, coupled to, communicating with, automotive electronics in a vehicle, or may be part of, or may be integrated with, an automotive-electronics in a vehicle. The first vehicle may comprise an Electronic Control Unit (ECU) that may comprise, or may connect to, the sensor. Alternatively or in addition, the second vehicle may comprise an Electronic Control Unit (ECU) that may comprise, or may connect to, the actuator.

An Electronic Control Unit (ECU) may comprise, or may be part of, any apparatus or device herein. Alternatively or in addition, any apparatus or device herein may consist of, may be part of, may be integrated with, may be connectable to, or may be coupleable to, an Electronic Control Unit (ECU) in the vehicle. Any Electronic Control Unit (ECU) herein may be Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module. Alternatively or in addition, the Electronic Control Unit (ECU) may comprise, may use, may be based on, or may execute a software, an operating-system, or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard. Any software herein may comprise, may use, or may be based on, an operating-system or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard.

Any wireless network herein may be a Wireless Wide Area Network (WWAN), any wireless transceiver herein may be a WWAN transceiver, and any antenna herein may be a WWAN antenna. The WWAN may be a wireless broadband network, or may be a WiMAX network. Any antenna herein may be a WiMAX antenna, and any wireless transceiver herein may be a WiMAX modem, and the WiMAX network may be according to, may be compatible with, or may be based on, IEEE 802.16-2009. Alternatively or in addition, any wireless network herein may be a cellular telephone network, any antenna may be a cellular antenna, and any wireless transceiver may be a cellular modem. The cellular telephone network may be a Third Generation (3G) network that may use UMTS W-CDMA, UMTS HSPA, UMTS TDD, CDMA2000 1xRTT, CDMA2000 EV-DO, or GSM EDGE-Evolution, or the cellular telephone network may be a Fourth Generation (4G) network that uses HSPA+, Mobile WiMAX, LTE, LTE-Advanced, MBWA, or may be based on IEEE 802.20-2008.

Any wireless network herein may be a Wireless Personal Area Network (WPAN), any wireless transceiver may be a WPAN transceiver, and any antenna herein may be a WPAN antenna. The WPAN may be according to, may be compatible with, or may be based on, Bluetooth™ or IEEE 802.15.1-2005standards, or the WPAN may be a wireless control network that may be according to, or may be based on, ZigBee™, IEEE 802.15.4-2003, or Z-Wave™ standard.

Any wireless network herein may be a Wireless Local Area Network (WLAN), any wireless transceiver may be a WLAN transceiver, and any antenna herein may be a WLAN antenna. The WLAN may be according to, may be compatible with, or may be based on, IEEE 802.11-2012, IEEE 802.11a, IEEE 802.11b, IEEE 802.11g, IEEE 802.11n, or IEEE 802.11ac. Any wireless network herein may use a licensed or unlicensed radio frequency band, and the unlicensed radio frequency band may be an Industrial, Scientific and Medical (ISM) radio band.

Any network herein may be a wireless network, the first port may be an antenna for transmitting and receiving first Radio-Frequency (RF) signals over the air, and the first transceiver may be a wireless transceiver coupled to the antenna for wirelessly transmitting and receiving first data over the air using the wireless network. Alternatively or in addition, the network may be a wired network, the first port may be a connector for connecting to the network medium, and the first transceiver may be a wired transceiver coupled to the connector for transmitting and receiving first data over the wireless medium.

Any wireless network herein may use a Dedicated Short-Range Communication (DSRC), that may be according to, compatible with, or based on, European Committee for Standardization (CEN) EN 12253:2004, EN 12795:2002, EN 12834:2002, EN 13372:2004, or EN ISO 14906:2004 standard, or may be according to, compatible with, or based on, IEEE 802.11p, IEEE 1609.1-2006, IEEE 1609.2, IEEE 1609.3, IEEE 1609.4, or IEEE1609.5.

Any system, device, module, or circuit herein may be addressable in a wireless network (such as the Internet) using a digital address that may be a MAC layer address that may be MAC-48, EUI-48, or EUI-64 address type, or may be a layer 3 address and may be a static or dynamic IP address that may be of IPv4 or IPv6 type address. Any system, device, or module herein may be further configured as a wireless repeater, such as a WPAN, WLAN, or a WWAN repeater.

Any network herein may be a vehicle network, such as a vehicle bus or any other in-vehicle network. A connected element comprises a transceiver for transmitting to, and receiving from, the network. The physical connection typically involves a connector coupled to the transceiver. The vehicle bus may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

Any system or device herein may use a virtualization. Any system or device herein may further comprise a Virtual Machine (VM) executing a virtualized application. Any device herein may be implemented as virtual hardware as part of the VM. At least one of any action or any step herein by any device may be executed as part of the virtualized application.

Any network herein may be used with a virtualization, and any network herein may be executed as a virtualized network as part of a Virtual Machine (VM). The virtualization may be implemented by a host computer that may implement the VM, and any method herein may further comprise executing, by the host computer, a hypervisor or a Virtual Machine Monitor (VMM), and the virtualized may use or interface virtual hardware. Any virtualization herein may include, may be based on, or may use, full virtualization, para-virtualization, or hardware assisted virtualization. For example, any communication between two entities herein may be executed as a virtualized network as part of a Virtual Machine (VM).

Any method herein, any step herein, any flow-chart herein, or any part thereof, may be used with a virtualization, and at least one of the steps or methods herein may be executed as part of a virtualized application as part of a Virtual Machine (VM). Any device herein, such as the analyzer device, the first device, or any part thereof, may be implemented as virtual hardware. Any virtualization herein may be used with an host computer that implement the VM, and may further comprising executing, by the host computer, a hypervisor or a Virtual Machine Monitor (VMM). Any virtualized application herein or any or hardware virtualization herein may use or may interface virtual hardware. Any virtualization herein may include, may be based on, or may use, full virtualization, para-virtualization, or hardware assisted virtualization.

Any operating system herein may be used with a virtualization, and any operating system herein may be executed as a guest operating system as part of a Virtual Machine (VM). The virtualization may be implemented by a host computer that may implement the VM, and any method herein may further comprise executing, by the host computer, a hypervisor or a Virtual Machine Monitor (VMM), and the guest operating system may use or interface virtual hardware. Any such virtualization herein may include, may be based on, or may use, full virtualization, para-virtualization, or hardware assisted virtualization.

Any element or entity herein may be implemented as virtualized entity. Any virtualization may include, may be based on, or may use, desktop virtualization, network virtualization, storage virtualization, application virtualization, server virtualization, or any combination thereof. Further, any virtualization herein may include, may be based on, or may use, full virtualization, para-virtualization, or hardware assisted virtualization. Further, any virtualization herein may include, may be based on, or may use, a virtual machine (VM) on a host computer that executes a hypervisor or Virtual Machine Monitor (VMM), and the operating system may be a guest operating system that may use or interface a virtual hardware.

Any method herein may be used with a virtualization, where at least one of the steps may be executed as part of a virtualized application as part of a Virtual Machine (VM). Alternatively or in addition, any device or server herein may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices may be virtualized by the same host computer that implements the VM.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

Various aspects of the system and method are herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 2a illustrates a table of the various classification levels of autonomous car is according to the Society of Automotive Engineers (SAE) J3016 standard;

FIG. 10 depicts schematically a time/trip sensitive components and a non-time/trip-sensitive component examples of environmental factors of a planning an optimal route;

FIG. 10*a* illustrates schematically a table associating charging stations names to their respective locations and charging options and attributes;

FIG. 10*b* illustrates schematically a table associating store names to their respective addresses and opening hours;

DETAILED DESCRIPTION

Figure 1:
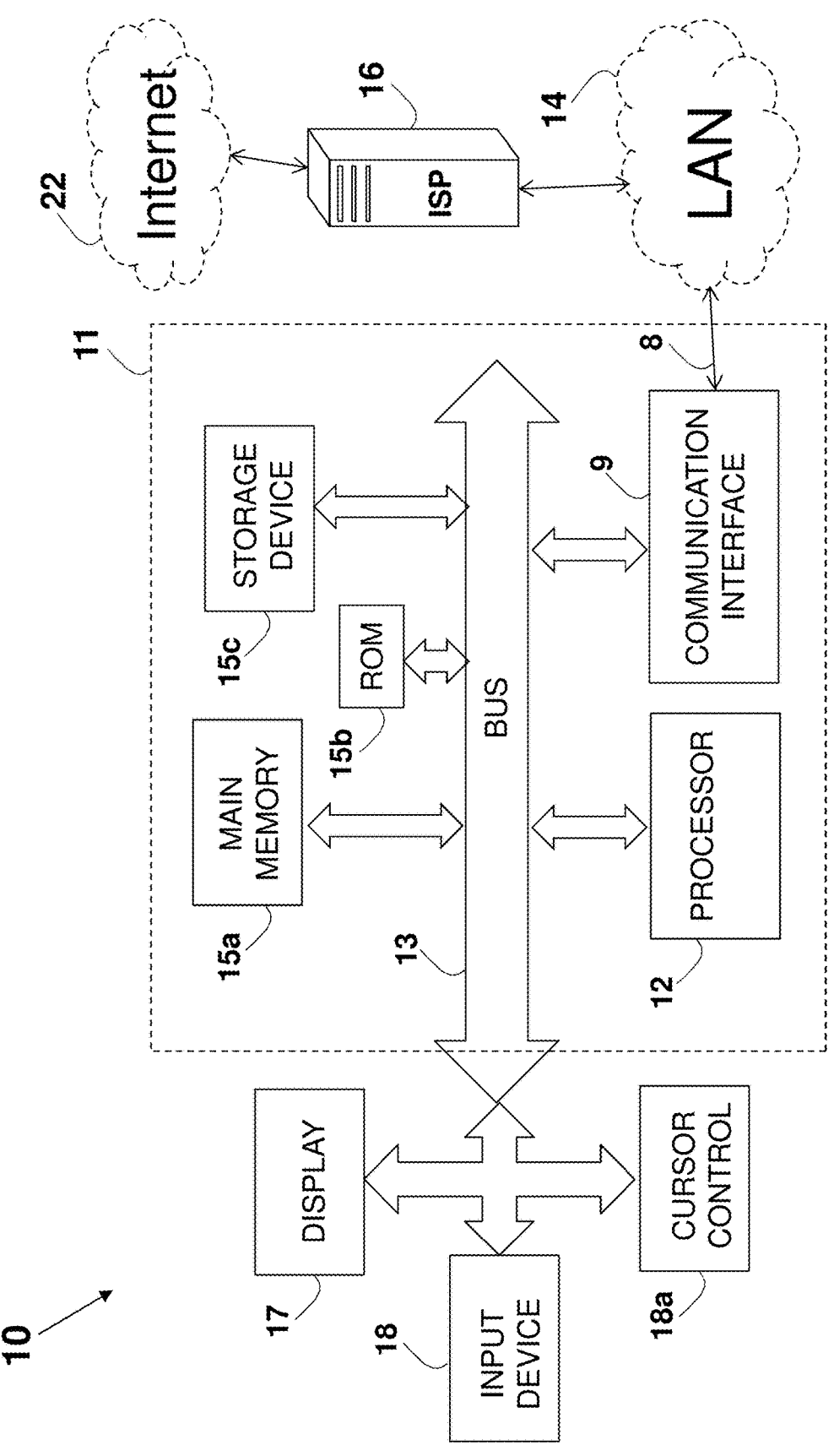
FIG. 1 illustrates schematically a block diagram of a prior-art computer connected to the Internet.
Figure 1A:
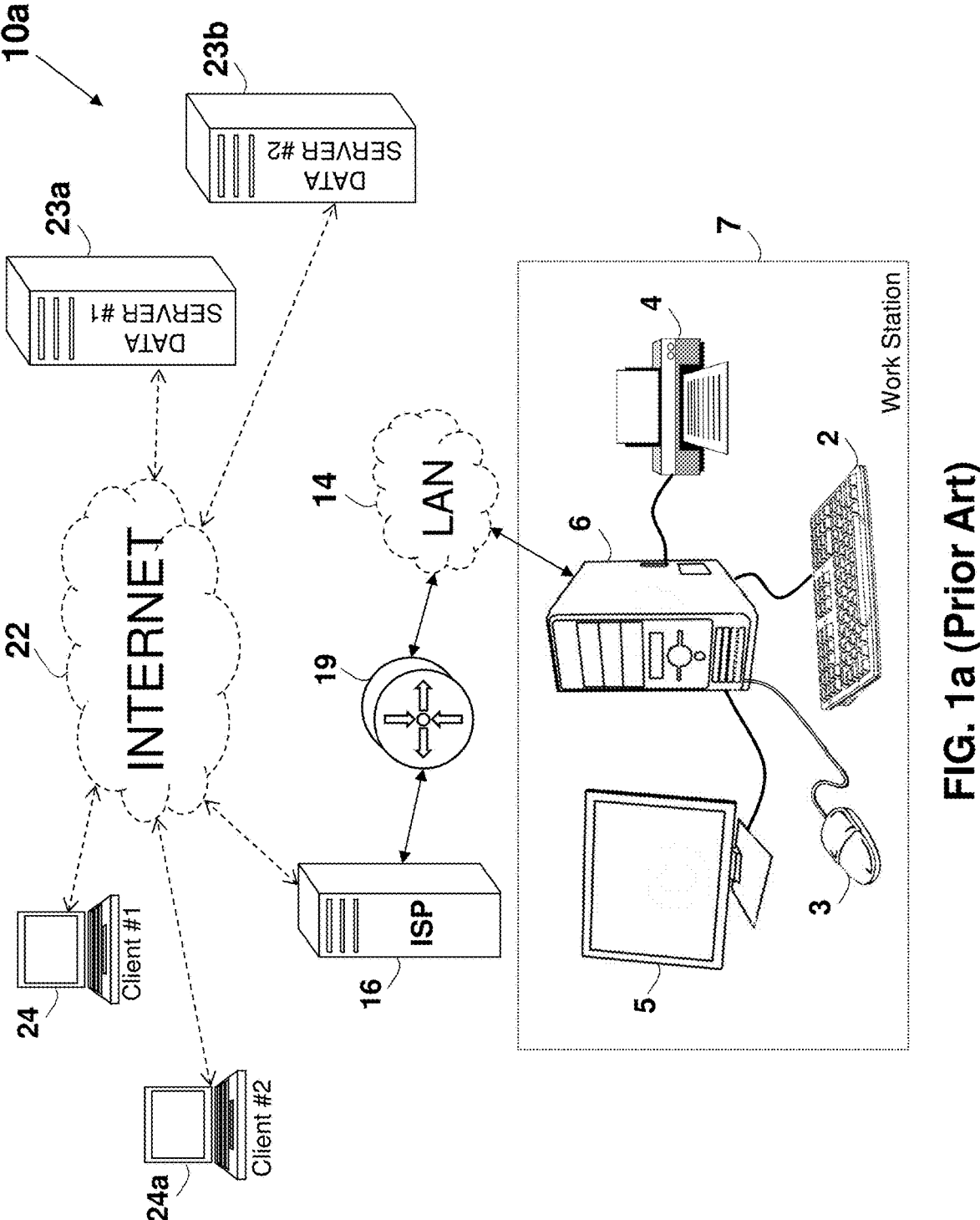
FIG. 1a illustrates schematically a prior-art arrangement of server devices, client devices, and a computer workstation connected via the Internet.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5*a*, 5*b* and 5*c*) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely the representative embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "right", left", "upper", "lower", "above", "front", "rear", "left", "right" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Any geographical location or position on Earth herein may be represented as Latitude and Longitude values, according to World Geodetic System (WGS) 84 standard, or may use Universal Transverse Mercator (UTM) zones. Alternatively or in addition, any one of the geographical location or position on Earth herein may be represented as an address, that is a collection of information, presented in a mostly fixed format, used to give the location of a building, apartment, or other structure or a plot of land, generally using political boundaries and street names as references, along with other identifiers such as house or apartment numbers and organization name. Some addresses also contain special codes, such as a postal code, to make identification easier and aid in the routing of mail. Addresses provide a means of physically locating a building. They are used in identifying buildings as the end points of a postal system and as parameters in statistics collection, especially in census-taking and the insurance industry. In one example, an address may comprise a building number in a street, the street name in a city, the city name in a county or region, and the county or region in a country, as well as associated ZIP (or postal) code.

Any electrical car 30 herein may be a ground Electric Vehicle (EV) adapted to travel on land, such as any automobile (such as any road or rail vehicle, such as a bicycle, a car, a motorcycle, a train, an electric scooter, a subway, a train, a trolleybus, or a tram) that is propelled by one or more electric motors, using only energy stored in batteries, and may further include autonomous driving, connected vehicle functionality, or shared mobility. Further, any electric car herein may be a Neighborhood Electric Vehicle (NEV), a Plug-in Electric Vehicle (PEV), a Battery Electric Vehicle (BEV), a Plug-in Hybrid Electric Vehicle (PHV or PHEV), or an all-electric car, and may be suitable to travel on public (such as highways) or private roads. Alternatively or in addition, any electrical car herein may be charged by Alternating current (AC) (and includes AC-to-DC converter), such as single phase or three-phase charging, or by Direct current (DC). Alternatively or in addition, any electrical car herein may be defined to be charged by SAE J1772 (2017) levels, such as AC Level 1, AC Level 2, DC Level 1, DC Level 2, or any combination thereof. Similarly, any electrical car herein may be defined to be charged by IEC 61851-1 modes, such as any of the modes 1-4, or any combination thereof. Further, any electrical car 30 herein may be an autonomous car, that may be according to levels 0, 1, 2, 3, 4, or 5 of the Society of Automotive Engineers (SAE) J3016 standard.

Any charging station herein may provide Alternating current (AC), which may be a single phase or three-phase, Direct current (DC), or any combination thereof. Further, any charger station herein may be defined to charge using SAE J1772 (2017) levels, such as AC Level 1, AC Level 2, DC Level 1, DC Level 2, or any combination thereof. Similarly, any charging station herein may be defined to charge using IEC 61851-1 modes, such as any of the modes 1-4, or any combination thereof.

Figure 6:
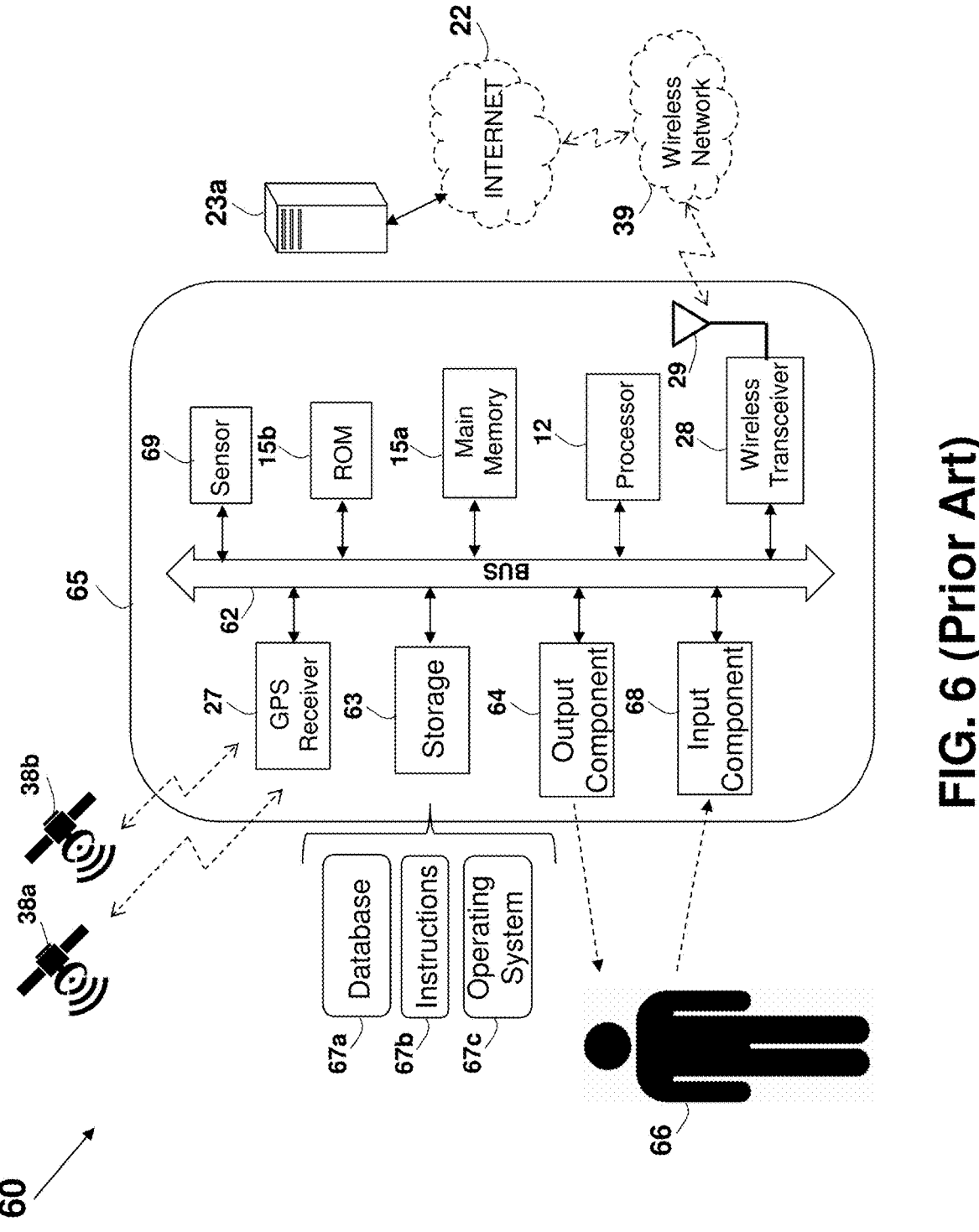
FIG. 6 illustrates schematically a block diagram of a prior-art arrangement that includes a device, such as a smartphone, connected to a server over the Internet.

In one example, part of, or all of, the steps, methods, or flow charts described herein are executed (independently or in cooperation) by a client device, or any device such as the device 65 shown in FIG. 6. Alternatively or in addition, part of, or all of, the steps, methods, or flow charts described herein are executed (independently or in cooperation) by a server device, such as server 23a shown as part on the arrangement 60 shown in FIG. 6. In one example, a client device (such as the device 65) and a server (such as the server 23a) cooperatively perform part of, or all of, the steps, methods, or flow charts described herein.

Figure 7:
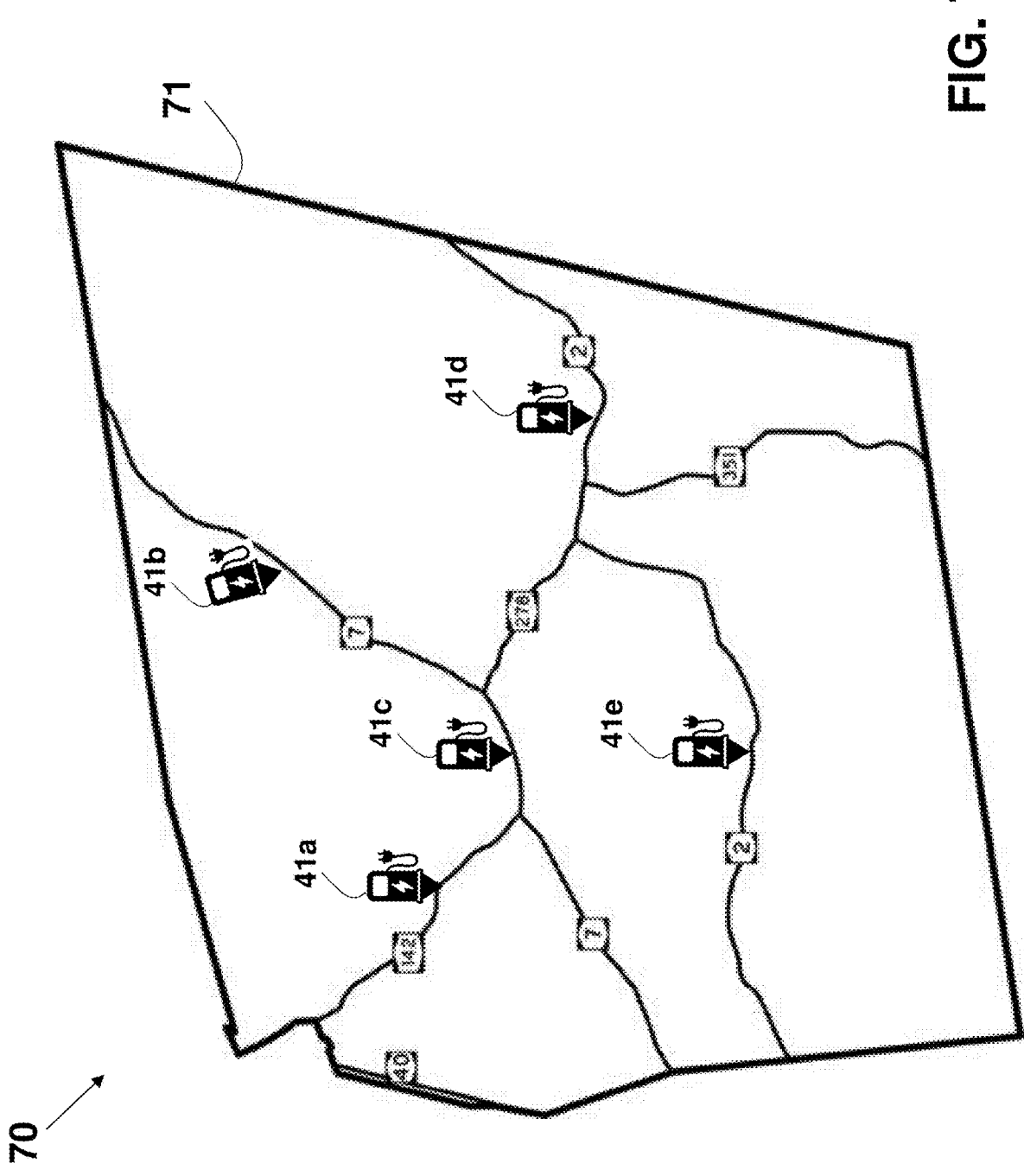
FIG. 7 depicts schematically a map with charging station location.

Various geographical locations of five charging stations 41a, 41b, 41c, 41d, and 41e are shown as part of an arrangement 70 on a routes map 71 in FIG. 7. For example, each of the charging stations 41a, 41b, 41c, and 41d may be operated by a different Charge Point Operator (CPO). Alternatively, two or more of the charging stations 41a, 41b, 41c, and 41d may be operated by the same CPO. In one example, the arrangement 70 is used for planning a route for an electric car from a starting point 72a to a final point 72b. While shown as different points, these start and end points may be the same point, such as a residence of a person looking to depart from his house and return to the house after completing objectives along the planned route. In an example of an arrangement 70a shown in FIG. 7a, the goal of the planned route is to visit various places, such as locations 73a, 73b, 73c, and 73d. The planned route should take into account the need for charging of the battery 33 of the electric car by one or more of charging stations available in the area, so that the battery 33 will not be fully discharged along the route forcing an unwanted stop in the road.

The routing problem may involve a planning of an optimal route that allows visiting multiple defined locations, such as multiple shops for buying groceries. While the minimum requirement is not to be stopped along a route due to the battery 33 being completely discharged, other objectives, target functions, or criterions may also be involved to arrive at an optimal route. For example, the optimal route may be selected based on visiting the target shops with a minimum time, a minimum distance driven, a minimum cost associated with payments to the charging stations, or any combination thereof. An example of an optimal planned route 74 is shown as part of a view 70b in FIG. 7b. The optimal route 74 includes driving from the initial location 72a to the charging station 41e for initial charging, then to another charging station 41d, followed by driving to the first required location 73a, and then to the second required location 73b. Afterwards, a charging is performed at the charging station 41c, followed by driving to the third required location 73c, from which the fourth required location 73d is reached. After charging at the charging station 41b, the route ends at the final point 72b.

Figure 8:
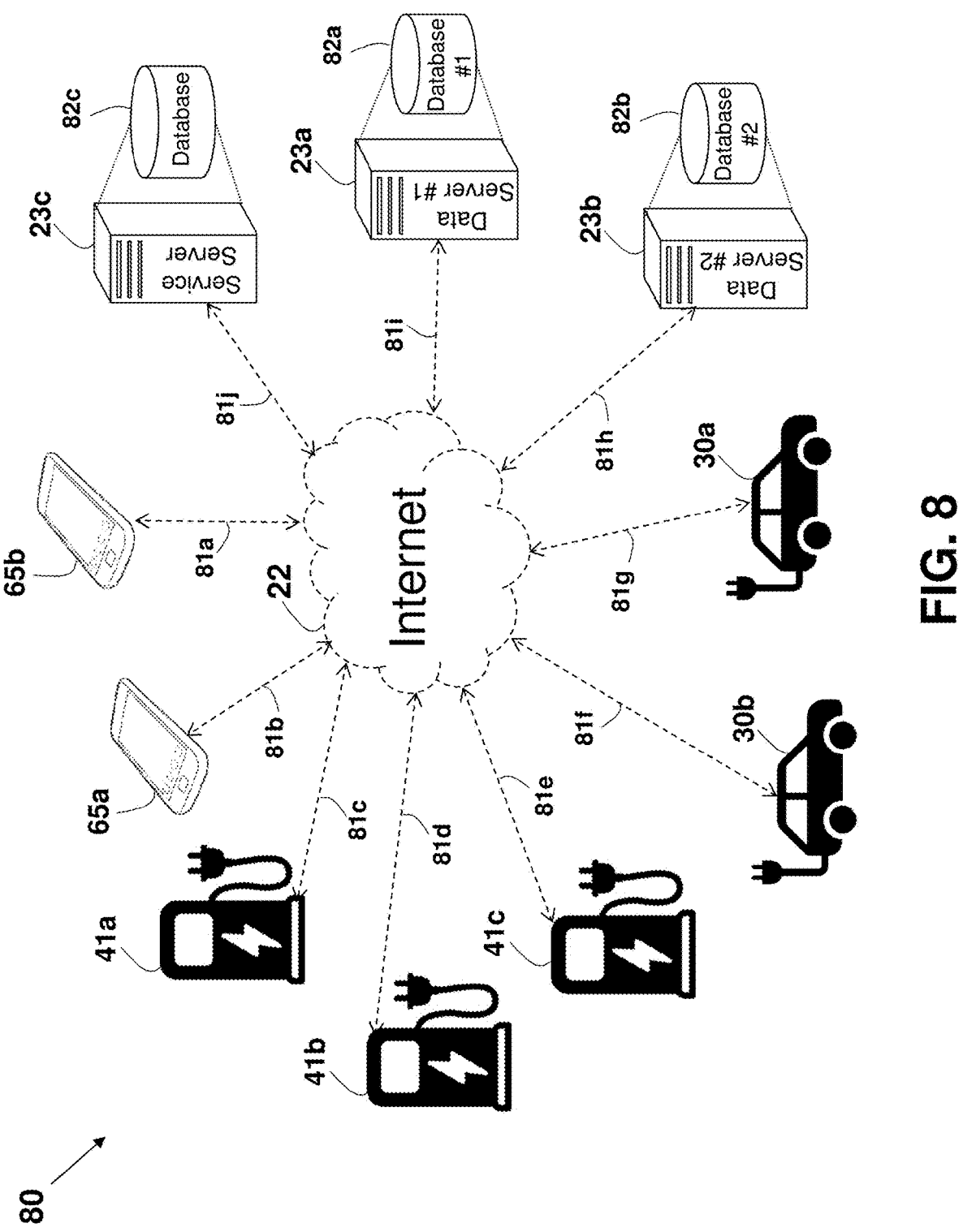
FIG. 8 illustrates schematically a block diagram of an arrangement of communication over the Internet between multiple smartphones, multiple charging stations, multiple electric cars, and multiple servers.

An arrangement 80 of an example of connectivity between various devices that may be involved in planning and executing an optimal route is shown in FIG. 8. The devices in the system 80 are shown as connecting via the Internet 22, however, any communication network, and any direct communication may be used for connectivity between any two or more devices in the arrangement 80. The charging station 41a connects to the Internet 22 over a wired or wireless connection or link (or network) 81c, the charging station 41b connects to the Internet 22 over a wired or wireless connection or link (or network) 81d, and the charging station 41c connects to the Internet 22 over a wired or wireless connection or link (or network) 81e. The electric car 30a connects to the Internet 22 over a wireless connection or link (or network) 81g, and the electric car 30b connects to the Internet 22 over a wireless connection or link (or network) 81f. A smartphone 65a connects to the Internet 22 over a wired or wireless connection or link (or network) 81b, and a smartphone 65b connects to the Internet 22 over a wired or wireless connection or link (or network) 81a. A service server 23c that connects to or comprises a database 82c, connects to the Internet 22 over a wireless connection or link (or network) 81j. A data server #1 23a, that comprises (or is connected to) a database #1 82a, connects to the Internet 22 over a wireless connection or link (or network) 81i, and a data server #2 23b, that comprises (or is connected to) a database #2 82b, connects to the Internet 22 over a wireless connection or link (or network) 81h. In one example, the data server #2 23b may be operated by, or used to provide a service by, an E-Mobility Service Provider (EMSP), that may support a usage of the charging stations 41a, 41b, and 41c.

While five charging stations 41a-e are shown as part of the view 70 in FIG. 7 and three charging stations 41a-c are shown as part of the arrangement 80 in FIG. 8, any of the methods or systems herein may equally employ or be used with any number of charging stations, such as at least 1, 2, 3, 4, 5, 7, 10, 15, 20, 25, 30, 50, 100, 150, 200, 250, 300, 500, or 1000 charging stations. Further, any of the of the methods or systems herein may equally employ or be used with less than 1, 2, 3, 4, 5, 7, 10, 15, 20, 25, 30, 50, 100, 150, 200, 250, 300, 500, or 1000 charging stations. Any two or more charging stations may be of identical to each other, may be of the same type, may be of similar types, or may be different from each other.

While two electric cars 30a and 30b are shown are shown as part of the arrangement 80 in FIG. 8, any of the methods or systems herein may equally employ or be used with any number of electric cars, that may be cooperatively operated, such as part of a centrally managed fleet, and may include at least 1, 2, 3, 4, 5, 7, 10, 15, 20, 25, 30, 50, 100, 150, 200, 250, 300, 500, or 1000 charging stations. Further, any of the of the methods or systems herein may equally employ or be used with less than 1, 2, 3, 4, 5, 7, 10, 15, 20, 25, 30, 50, 100, 150, 200, 250, 300, 500, or 1000 electric cars. Any two or more electric cars may be of identical to each other, may be of the same type, may be of similar types, or may be different from each other.

While two smartphones 65a and 65b are shown are shown as part of the arrangement 80 in FIG. 8, any of the methods or systems herein may equally employ or be used with any number of smartphones, that may be cooperatively operated, and may include at least 1, 2, 3, 4, 5, 7, 10, 15, 20, 25, 30, 50, 100, 150, 200, 250, 300, 500, or 1000 smartphones. Further, any of the of the methods or systems herein may equally employ or be used with less than 1, 2, 3, 4, 5, 7, 10, 15, 20, 25, 30, 50, 100, 150, 200, 250, 300, 500, or 1000 smartphones. Any two or more smartphones may be of identical to each other, may be of the same type, may be of similar types, or may be different from each other.

While three servers 23*a-c* are shown are shown as part of the arrangement 80 in FIG. 8, any of the methods or systems herein may equally employ or be used with any number of servers, that may be cooperatively operated, and may include at least 1, 2, 3, 4, 5, 7, 10, 15, 20, 25, 30, 50, 100, 150, 200, 250, 300, 500, or 1000 servers. Further, any of the of the methods or systems herein may equally employ or be used with less than 1, 2, 3, 4, 5, 7, 10, 15, 20, 25, 30, 50, 100, 150, 200, 250, 300, 500, or 1000 servers. Any two or more servers may be of identical to each other, may be of the same type, may be of similar types, or may be different from each other. In one example, the data server #1 23*a* and the corresponding database #1 82*a*, and the data server #2 23*b* and the corresponding database #2 82*b*, are publicly-available servers operated by various service providers that provides data (free or paid) from the respective databases to requesting client devices, such as web servers. In one example, the service server 23*c*, the database 82*c*, or any combination thereof, may be specific for implementing part of, or whole of, any method or process herein, such as a route planner 94 functionality described herein.

Any database herein, such as the database #1 82*a* that is associated with the server #1 23*a*, the database #2 82*b* that is associated with the server #2 23*b*, or the database 82*c* that is associated with the service server 23*c*, may be a relational database, a non-relational database, an object-oriented database, an object database, an entity-relationship model database, an associative database, XML database, or any combination thereof. Further non-limiting examples include SQL, PostgreSQL, MySQL, Oracle, DB2, and Sybase. In some embodiments, the database may be internet-based. Further, a database may be web-based, or a database may be a cloud computing-based. Alternatively or in addition, Any database herein, such as the database #1 82*a* that is associated with the server #1 23*a*, the database #2 82*b* that is associated with the server #2 23*b*, or the database 82*c* that is associated with the service server 23*c*, may be a NoSQL database, such as MongoDB. Further, any database herein may be accessed over the Internet, and may response to a query over the Internet for a data by providing the data over the Internet to the requesting device, such as a requesting client device.

Any one of the connections or links 81*a-j* may be a wireless connection or link over a wireless network, where the respective device (such as the smartphone 65*a*, the charging station 41*a*, or the electric car 30*a*) comprises a wireless transceiver and antenna for communication over the wireless network. Any wireless network herein may comprise a Wireless Wide Area Network (WWAN), any wireless transceiver herein may comprise a WWAN transceiver, and any antenna herein may comprise a WWAN antenna, and any WWAN herein may be a wireless broadband network. Further, any WWAN herein may be a WiMAX network, any antenna herein may be a WiMAX antenna and any wireless transceiver herein may be a WiMAX modem, and any WiMAX network herein may be according to, may be compatible with, or may be based on, IEEE 802.16-2009. Alternatively or in addition, any WWAN herein may be a cellular telephone network, any antenna herein may be a cellular antenna, and any wireless transceiver herein may be a cellular modem. Any cellular telephone network herein may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or any cellular telephone network herein may use a protocol selected from the group consisting of a Fourth Generation (4G) network that uses HSPA+, Mobile WiMAX, LTE, LTE-Advanced, MBWA, or is based on IEEE 802.20-2008.

Alternatively or in addition, any wireless network herein may comprise a Wireless Personal Area Network (WPAN), any wireless transceiver herein may comprise a WPAN transceiver, and any antenna herein may comprise a WPAN antenna. Any WPAN herein may be according to, may be compatible with, or may be based on, Bluetooth™, Bluetooth Low Energy (BLE), or IEEE 802.15.1-2005 standards, or any WPAN herein may be a wireless control network that may be according to, or based on, Zigbee™, IEEE 802.15.4-2003, or Z-Wave™ standards.

Alternatively or in addition, any wireless network herein may comprise a Wireless Local Area Network (WLAN), any wireless transceiver herein may comprise a WLAN transceiver, and any antenna herein may comprise a WLAN antenna. Any WLAN herein may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac. Any wireless network herein may be over a licensed or unlicensed radio frequency band. Any wireless network may be over the unlicensed radio frequency band that may be an Industrial, Scientific and Medical (ISM) radio band.

Alternatively or in addition, any wireless network herein may comprise a Dedicated Short-Range Communication (DSRC) that may be according to, may be compatible with, or may be based on, European Committee for Standardization (CEN) EN 12253:2004, EN 12795:2002, EN 12834:2002, EN 13372:2004, or EN ISO 14906:2004 standard. Any DSRC herein may be according to, compatible with, or based on, IEEE 802.11p, IEEE 1609.1-2006, IEEE 1609.2, IEEE 1609.3, IEEE 1609.4, or IEEE 1609.5.

Figure 8A:
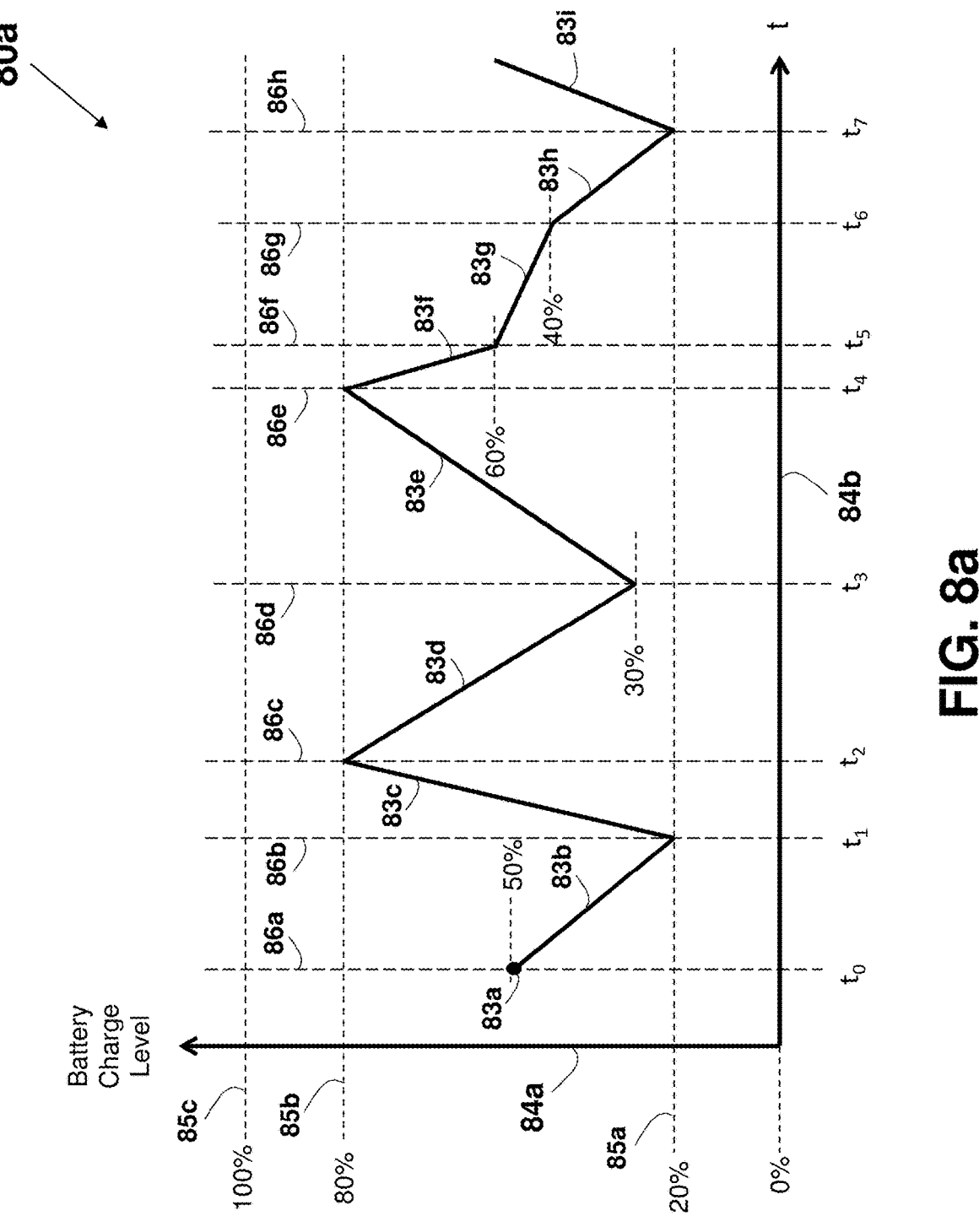
FIG. 8a illustrates schematically a graph of a battery charge level during operation.

A graph 80*a* of a charge level (such as SoC) of the battery 33 of the electric car 30 is shown in FIG. 8*a*. In one example, the battery full charge capacity 100% 85*c* is 40 KwH (Kilo-watt-Hour). The battery charge level (SoC) is shown on y-axis 84*a* over time (t) 84*b*. In the example shown, at a starting point at time t0 86*a*, it is assumed that the battery charge level is 50% 83*a*. Typically, while the battery 33 may be charged to 100% level, practically a lower maximum charge, such as 80% level 85*b* is used. For example, the charging after this high threshold may be slower or less effective, or may not be recommended by the battery 33 manufacturer. Similarly, the charging level of the battery 33 is typically kept above a low threshold, such as 20% 85*a*, for allowing some spare capacity for emergency where charging is not available or is not accessed, and for avoiding unplanned stop. Further, too low charge level may not be recommended by the battery 33 manufacturer.

From an initial time-point t0 86*a* to a time point t1 86*b* the connected car 30 is travelling by using the energy stored in the battery 33, draining the battery 33 until the 20% level 85*a*. The total power rate consumed is 50−20=30% that is 12 KwH, and the power consuming rate 83*b* is 12/(t1-t0) KwH/time (if time is measured in minutes, then the rate is in KwH/Minute units). Between a time point t1 86*b* to a time point t2 86*c* the battery 33 is charged until reaching 80% charge level 85*b*, such as by connecting to a charging station 41. The total charge is 80-20-60% that is 24 KwH, at a charging rate 83c of 24/(t2-t1) KwH/time. From the time point t2 86c to a time point t3 86d the connected car 30 is travelling by using the energy stored in the battery 33, draining the battery 33 until the 30% level. The total power rate consumed is 80–30=50% that is 20 KwH, and relating to a power consuming rate 83d is 20/(t3-t2) KwH/time (if time is measured in minutes, then the rate is in KwH/Minute units). It may be assumed that this consuming rate is a reference one, representing a reference travel—such as travelling at a reference speed on a reference road, at a reference environment conditions (such as a reference weather). Between the time point t3 86d to a time point t4 86e the battery 33 is charged until reaching 80% charge level 85b, such as by connecting to another charging station 41a. The total charge is 80-30-50% that is 20 KwH, at a charging rate 83e of 24/(t4-t3) KwH/time. As shown in the graph 80a, the charging during the period [t3, t4] is slower than the charging rate during the period [t1, t2], that may be due to using a different charging station 41a that is capable of providing less power.

From the time point t4 86e to a time point t5 86f the connected car 30 is travelling by using the energy stored in the battery 33, draining the battery 33 until the 60% level (Soc—60%). The total power rate consumed is 80–60=20% that is 8 KwH, at a power consuming rate 83f is 20/(t5-t4) KwH/time (if time is measured in minutes, then the rate is in KwH/Minute units). As shown in the graph 80a, the discharging rate 83f is higher than the reference discharging rate 83d. Such higher discharge rate may be due to travelling at non-optimal speed, a different weather (e.g., temperature, winds), worse than reference road conditions (such as going uphill), or any combination thereof. From the time point t5 86f to a time point t6 86g the connected car 30 is travelling by using the energy stored in the battery 33, draining the battery 33 until the 40% level. The total power rate consumed is 60–40=20% that is 8 KwH, at a power consuming rate 83g is 8/(t6-t5) KwH/time (if time is measured in minutes, then the rate is in KwH/Minute units). As shown in the graph 80a, the discharging rate 83g is lower than the reference discharging rate 83d. Such lower discharge rate may be due to travelling at better optimal speed, a different weather (e.g., temperature, winds), better than reference road conditions (such as going downhill), or any combination thereof.

From the time point t6 86g to a time point t7 86h the connected car 30 is travelling by using the energy stored in the battery 33, draining the battery 33 until the 40% level. The total power rate consumed is 60–40=20% that is 8 KwH, at a power consuming rate 83g is 8/(t5-t4) KwH/time (if time is measured in minutes, then the rate is in KwH/Minute units). As shown in the graph 80a, the discharging rate 83g may be the same as the reference discharge rate 83d, which may result from the same reference environment and conditions. From the time point t7 86h the battery 33 is charged, such as by another charging station.

Figure 9:
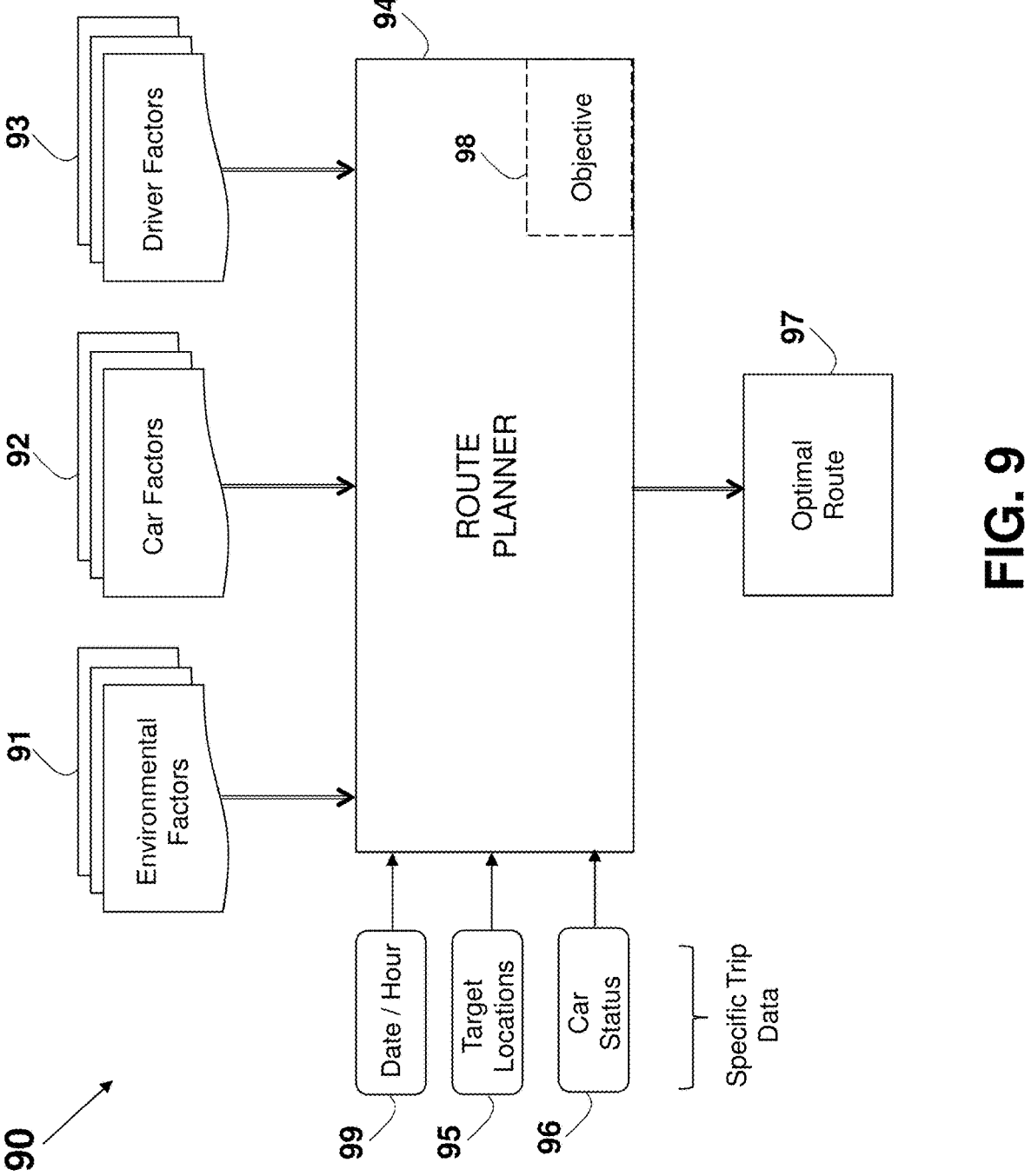
FIG. 9 depicts schematically a data flow for planning an optimal route.

An example of a data flow general arrangement 90 for planning an optimal route 97 is shown in FIG. 9. Three categories of input data are used by a route planning algorithm 94: Environmental factors 91, Car factors 92, and Driver factors 93. The environmental factors 91 involves any data that may affect the trip or the planned route which is not dependent of the electric car 30 or on the driver of the electric car. Such factors include, for example, data relating specifically to the area and the planned trip timing, such as a roads structure, a weather forecast, and charging station locations in the area. The car factors 92 involves any data that may affect the trip or the planned route that is responsive to the electric car type, model, make, or condition. The driver factors 93 involves any data that may affect the trip or the planned route that is responsive to a person that is the planned electric car driver (or owner).

The route planner may further use a specific trip data as an input, such as the timing input 99 of the start of the trip (such as day of the month, day of the week, time of day, or any combination thereof), target locations 95 that include the locations to be visited in the planned trip, and the current specific car status 96, associated with data involving the car that is expected to execute the planned optimal route 97. The route planner 94 provides the optimal route 97 is according to an objective 98, that is the goal, objective, or cost function that needs to be minimized or maximized. The objective 98 may involve minimizing the total travel time (from starting to ending points), minimizing the total distance to travel, minimizing the charging time at the charging station along the route, minimizing the cost of the charging, minimizing the total battery discharging along the route, or any combination thereof. The environmental factors 91 and the target locations 95 may be within a defined area, that may be a country, a state, a region, a county, a city, a neighborhood, or a ZIP (or postal) code area.

Figure 7A:
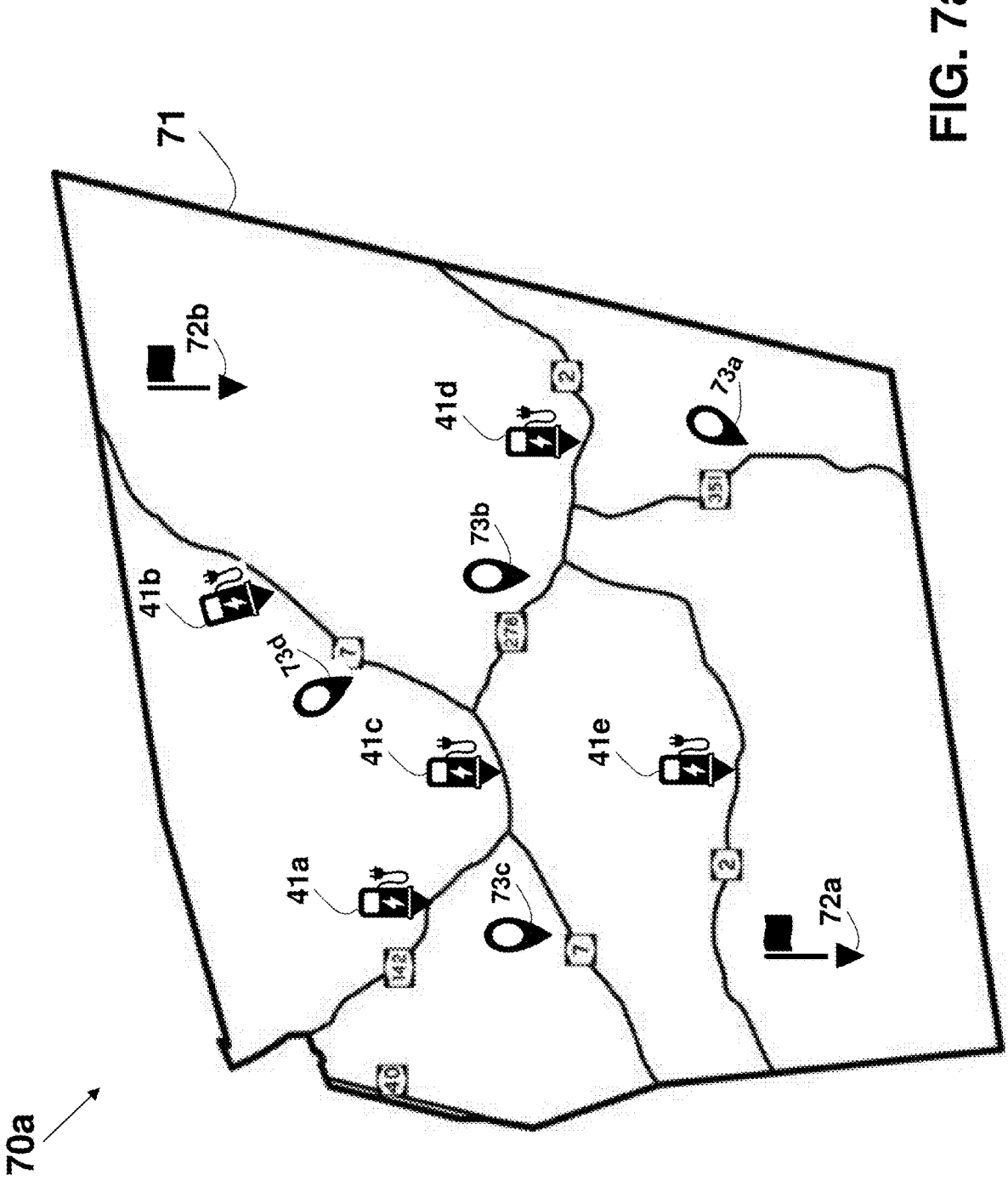
FIG. 7a depicts schematically a map with an origin and end points and multiple locations.
Figure 7B:
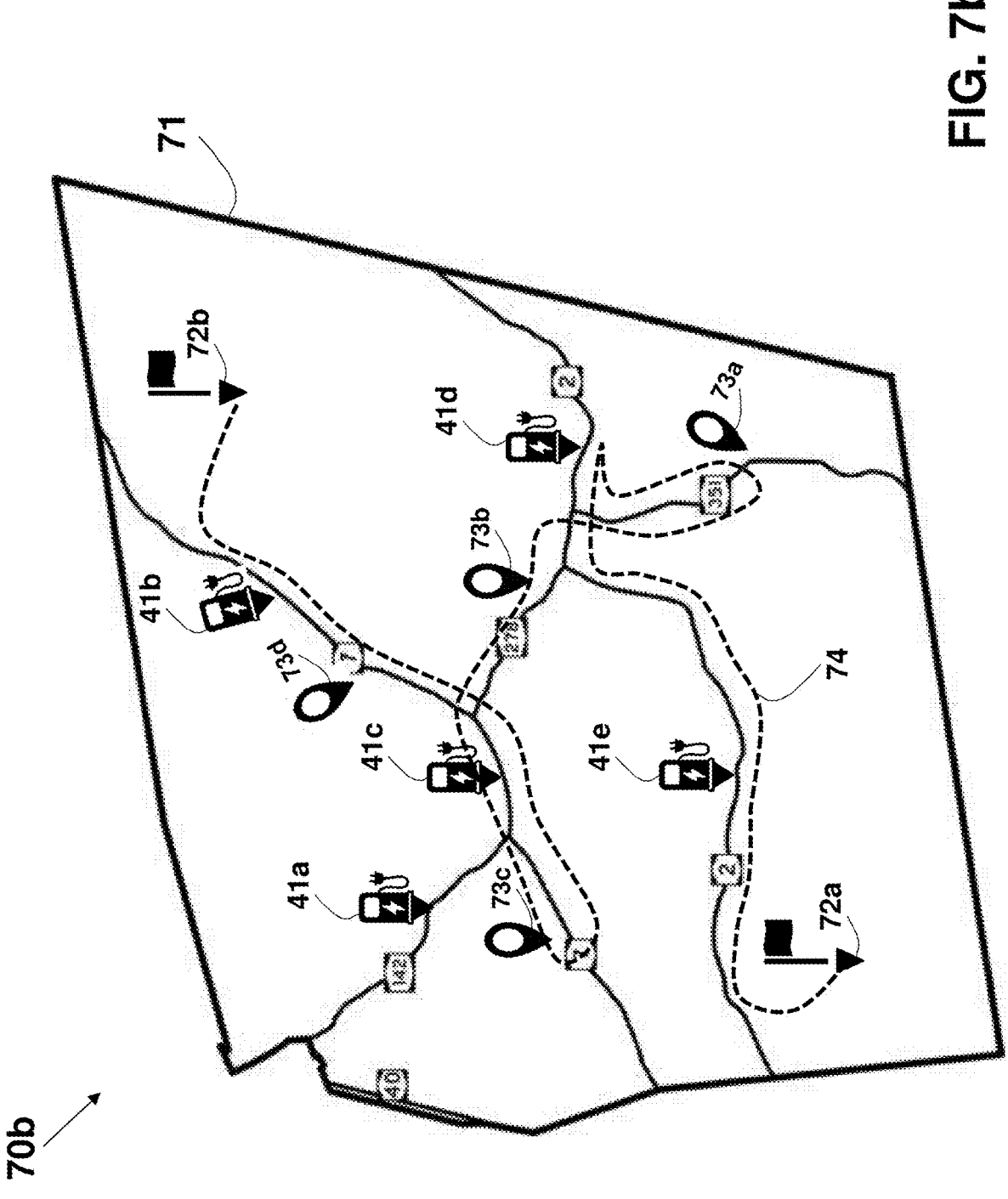
FIG. 7b depicts schematically a map with an optimal route from an origin point to an end point via multiple locations.

A map 91a of the area to be travelled, such as in the view 70a shown in FIG. 7a, may be used to estimate or calculate distances between points along routes that may be used for travel by the electric car 30. For example, the distance along shown routes 2 and 278 between the location point 73b and the charging station 41d location may be estimated or calculated to be 40 Kilometers. Assuming the electric car 30 is capable, under optimal reference conditions, such as at environment temperature of 25° C., to travel 160 Kilometers using a whole charging of a 40 KwH battery, that is translated to a discharge rate of 0.25 KwH per kilometer of travel, such trip segment between these points is expected to use, under the optimal conditions, 10 KwH, or 25% of the battery 33 full capacity.

However, in many cases the environmental conditions of a planned trip are not optimal. For example, the weather forecast (or measured temperature) may be 30° C. In such a case, the electric car 30 is expected to consume more electrical power, such as due to a reduced chemical activity of the battery 33 in high temperature or due to operating or air-conditioner in the electric car 30 by the driver. Assuming an additional 20% of consumed electrical power, the actual discharge rate may be increased from the 0.25 KwH per kilometer of the optimal conditions to 0.3 KwH per kilometer. Similarly, a reduced temperature of 0° C. may cause an increase in the discharge rate along the same route due to slower driving in view of the road conditions, such as a possible snow on the road. In one aspect, the 10% increase in the discharge rate may be represented as 'effective' 10% increase of the distance to be travelled. For example, the estimated or calculated 40 Kilometers distance between the location point 73b and the charging station 41d location may be represented as 44 Kilometers, effectively taking into account the 10% increase in the discharge rate.

Figure 9A:
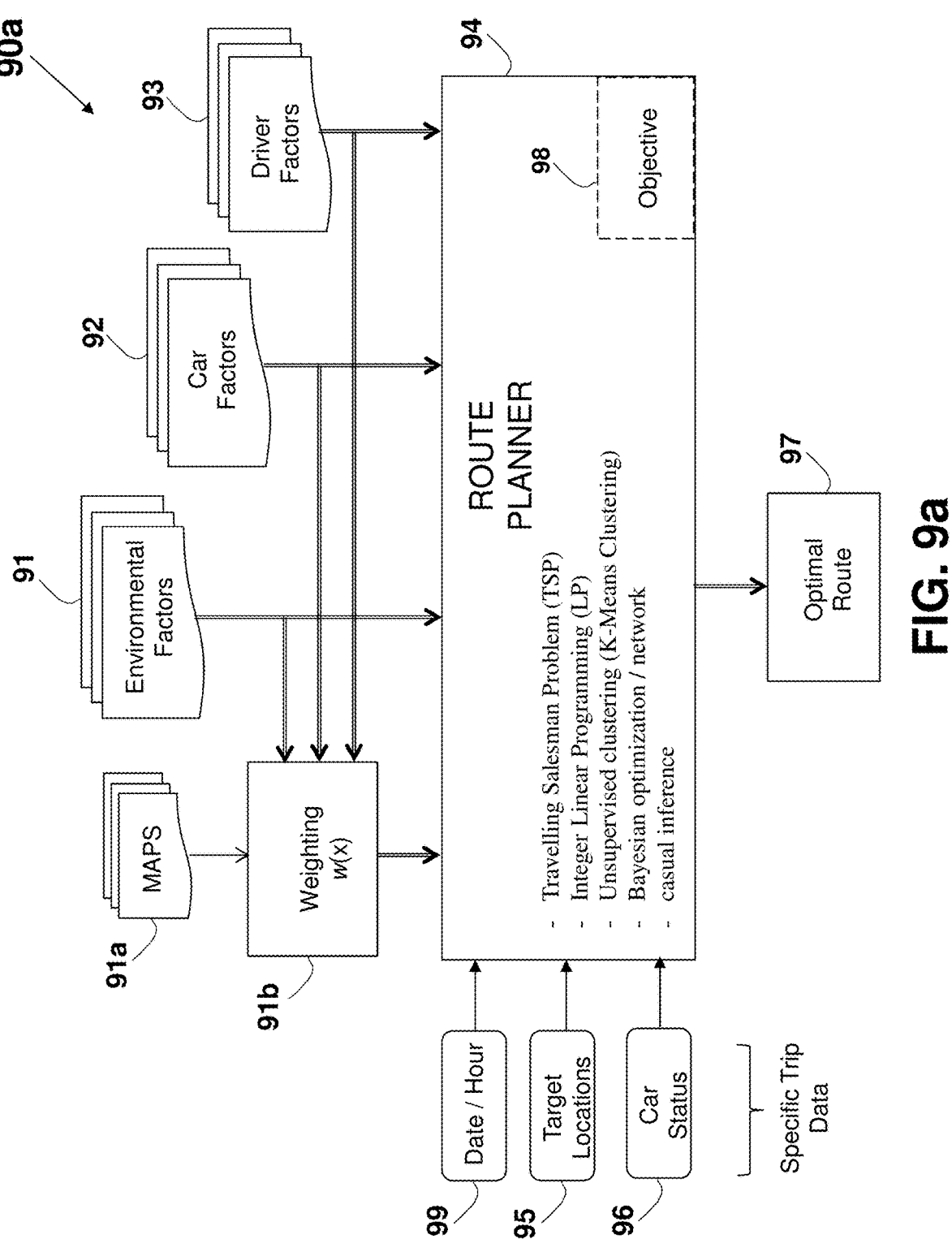
FIG. 9a depicts schematically a data flow that includes planning an optimal route.

While the weighting of distances extracted from the maps 91a was exampled regarding the temperature factor and its affect on the discharging rate, any other factor that affects the discharging rate, such as any factor included in the environmental factors 91, in the car factors 92, and in the driver factors 93, or any combination thereof, may be equally used, as shown in the data flow arrangement in FIG. 9a. The distances that are estimated or calculated based on the maps 91a are being weighted as part of a Weighting block 91b, using a weighting function w(x), where 'x' is a factor that is considered, and the w(x) is a weighting factor, so that any distance from the maps 91a is multiplied by the w(x). In case of no affect or optimal (or reference) conditions, then the w(x)=1, hence the distance is not affected. The weighted distances are used by the route planner 94 for taking into account the affect of the factor x on the optimal route planned.

Any function, discrete or continuous, monotonic or non-monotonic, may be used for the weighting function w(x) that maps the factor x for weighting the distances measured or estimated in reality. The function may be an elementary function that is built from basic operations (e.g. addition, exponentials, and logarithms) such as an Algebraic function that can be expressed as the solution of a polynomial equation with integer coefficients, Polynomials that may be addition, multiplication, and exponentiation, such as Linear function (First degree polynomial, graph is a straight line), Quadratic function (Second degree polynomial, graph is a parabola), Cubic function (Third degree polynomial), Quartic function (Fourth degree polynomial), Quintic function (Fifth degree polynomial), Sextic function (Sixth degree polynomial), or Rational functions (A ratio of two polynomials). Similarly, the function may be an Nth root based, such as a square root or a Cube root. Alternatively or in addition, a non-algebraic function may be used, such as a Transcendental function, that may be Exponential function that raises a fixed number to a variable power, Hyperbolic functions that uses trigonometric functions, Logarithmic function, or a Power function that raises a variable number to a fixed power. The function may be a periodic function such as a trigonometric functions, that may use or include sine, cosine, tangent, cotangent, secant, cosecant, exsecant, excosecant, versine, coversine, vercosine, covercosine, haversine, hacoversine, havercosine, or hacovercosine, typically used in geometry. Furthermore, the weighting function w(x) may be implemented by a look-up table.

Any factor or data item used by the route planner 94 for generating the optimal route 97 may be categorized as a time-sensitive data, where the data item changes over time, and thus is relevant or applicable only for a limited period of time, such as a minute, an hour, or a day. Further, any factor or data item used by the route planner 94 for generating the optimal route 97 may be categorized as a non-time-sensitive data, where the data item typically is not expected to change over time. Similarly, any factor or data item used by the route planner 94 for generating the optimal route 97 may be categorized as a trip-sensitive data, where the data item is expected to change from trip to trip, such as in consecutive trips, for example due to different times of the trip of travelling in different areas. Further, any factor or data item used by the route planner 94 for generating the optimal route 97 may be categorized as trip-sensitive data, where the data item is not expected to change from trip to trip, such as due to travelling in the same area.

A view 100 in FIG. 10 shows examples of various environmental factors or data items that may be used by the route planner 94 for generating the optimal route 97. Weather-related data items 105c may include temperature, wind, and precipitation in the area of the trip at the planned or expected time of the trip, and thus are categorized as time or trip sensitive data items. Weather is driven by air pressure, temperature, and moisture differences between one place and another. These differences can occur due to the Sun's angle at any particular spot, which varies with latitude. Weather systems in the middle latitudes, such as extratropical cyclones, are caused by instabilities of the jet stream-flow. Because Earth's axis is tilted relative to its orbital plane (called the ecliptic), sunlight is incident at different angles at different times of the year. On Earth's surface, temperatures usually range ±40° C. (−40° F. to 100° F.) annually.

For example, different air or surface temperatures, such as between day and night may affect the chemical processes in the battery 33, or may affect the use of the climate control or air conditioning system in the electric car 30, which may further consume electric power from the battery. Temperature is a physical property of matter that quantitatively expresses hot and cold. It is the manifestation of thermal energy, present in all matter, which is the source of the occurrence of heat, a flow of energy, when a body is in contact with another that is colder. The most common scales are the Celsius scale (formerly called centigrade, denoted ° C.), the Fahrenheit scale (denoted ° F.), and the Kelvin scale (denoted ° K), the last of which is predominantly used for scientific purposes by conventions of the International System of Units (SI). Many physical processes are related to temperature, such as the physical properties of materials including the phase (solid, liquid, gaseous or plasma), density, solubility, vapor pressure, electrical conductivity, the rate and extent to which chemical reactions occur, the amount and properties of thermal radiation emitted from the surface of an object, and the speed of sound which is a function of the square root of the absolute temperature. Atmospheric temperature is a measure of temperature at different levels of the Earth's atmosphere. It is governed by many factors, including incoming solar radiation, humidity and altitude.

Wind is the natural movement of air or other gases relative to a planet's surface. In one example, a tailwind, which is a wind that blows in the direction of travel of an object, may increase the electric car 30 speed and reduces the time required to reach its destination, thus reducing the battery 33 discharging rate, while a headwind blows against the direction of travel, and may have the opposite effect. Winds occur on a range of scales, from thunderstorm flows lasting tens of minutes, to local breezes generated by heating of land surfaces and lasting a few hours, to global winds resulting from the difference in absorption of solar energy between the climate zones on Earth. The two main causes of large-scale atmospheric circulation are the differential heating between the equator and the poles, and the rotation of the planet (Coriolis effect). Winds have various aspects: velocity (wind speed); the density of the gas involved; energy content, or wind energy. In meteorology, winds are often referred to according to their strength, and the direction from which the wind is blowing.

Alternatively or in addition, the battery 33 discharging rate may be affected by humidity, which relates to the concentration of water vapor present in the air. For example, the humidity may affect the drag of the electric car 30 movement, or may cause fog that limit the driver visibility forcing him to reduce the electric car 30 speed when travelling. Water vapor, the gaseous state of water, is generally invisible to the human eye. Humidity indicates the likelihood for precipitation, dew, or fog to be present. The amount of water vapor needed to achieve saturation increases as the temperature increases. As the temperature of a parcel of air decreases, it will eventually reach the saturation point without adding or losing water mass. The amount of water vapor contained within a parcel of air can vary significantly. For example, a parcel of air near saturation may contain 28 grams of water per cubic meter of air at 30° C., but only 8 grams of water per cubic meter of air at 8° C.

Three primary measurements of humidity are widely employed: absolute, relative and specific. Absolute humidity describes the water content of air and is expressed in either grams per cubic meter or grams per kilogram. Relative humidity, expressed as a percentage, indicates a present state of absolute humidity relative to a maximum humidity given the same temperature. Specific humidity is the ratio of water vapor mass to total moist air parcel mass, and humidity plays an important role for surface life.

Alternatively or in addition, the battery 33 discharging rate may be affected by precipitation, such as rain or snow expected in the travel area at the time of travel. For example, a heavy snow or rain may increase the drag of the electric car 30, or may force the driver, due to the limited visibility, to reduce speed or to activate front or rear fog light for better visibility, which consumes electrical power that may further discharge the battery 33. A precipitation is any product of the condensation of atmospheric water vapor that falls from clouds due to gravitational pull. The main forms of precipitation include drizzle, rain, sleet, snow, ice pellets, graupel and hail. Precipitation occurs when a portion of the atmosphere becomes saturated with water vapor (reaching 100% relative humidity), so that the water condenses and "precipitates" or falls. Thus, fog and mist are not precipitation but colloids, because the water vapor does not condense sufficiently to precipitate. Two processes, possibly acting together, can lead to air becoming saturated: cooling the air or adding water vapor to the air. Precipitation forms as smaller droplets coalesce via collision with other rain drops or ice crystals within a cloud. Short, intense periods of rain in scattered locations are called showers. Snow comprises individual ice crystals that grow while suspended in the atmosphere, usually within clouds, and then fall, accumulating on the ground where they undergo further changes. It consists of frozen crystalline water throughout its life cycle, starting when, under suitable conditions, the ice crystals form in the atmosphere, increase to millimeter size, precipitate and accumulate on surfaces, then metamorphose in place, and ultimately melt, slide or sublimate away.

While exampled above regarding temperature, wind, humidity, and precipitation (such as snow) affecting the travel, such as the discharge rate of the battery 33 of the electric car 30, any other weather-related phenomenon may equally be sought. Weather is the state of the atmosphere, describing for example the degree to which it is hot or cold, wet or dry, calm or stormy, clear or cloudy. Most weather phenomena occur in the lowest level of the planet's atmosphere, the troposphere, just below the stratosphere. Weather refers to day-to-day temperature and precipitation activity, whereas climate is the term for the averaging of atmospheric conditions over longer periods of time.

In one example, information regarding charging stations in the area is available in a database, that may be arranged as a table 100a shown in FIG. 10a. For example, the table 100a may include entries that relate to multiple charging stations. For each charging station 102, the table 100a may include a respective name or identifier 101a of the charging station associated with the respective entry, a name or identifier 101b of the CPO operating the charging station associated with the respective entry, a geographic location 101c of the charging station associated with the respective entry, a type 101d of charging capability associated with the respective entry, a number 101e of charging positions available in the charging station that is associated with the respective entry, and the fee 101f charging for the energy provided when charging in the charging station that is associated with the respective entry. The table 100a examples data for six charging stations, a first charging station 102a, a second charging station 102b, a third charging station 102c, a fourth charging station 102d, a fifth charging station 102e, and a sixth charging station 102f. For example, the first entry 102a may correspond to the charging station 41a in the arrangement 80 shown in FIG. 8 and in the view 70 shown in FIG. 7, the second entry 102b may correspond to the charging station 41b in the arrangement 80 shown in FIG. 8 and in the view 70 shown in FIG. 7, the third entry 102c may correspond to the charging station 41c in the arrangement 80 shown in FIG. 8 and in the view 70 shown in FIG. 7, the fourth entry 102d may correspond to the charging station 41d in the view 70 shown in FIG. 7, and the fifth entry 102e may correspond to the charging station 41e in the view 70 shown in FIG. 7.

Figure 4:
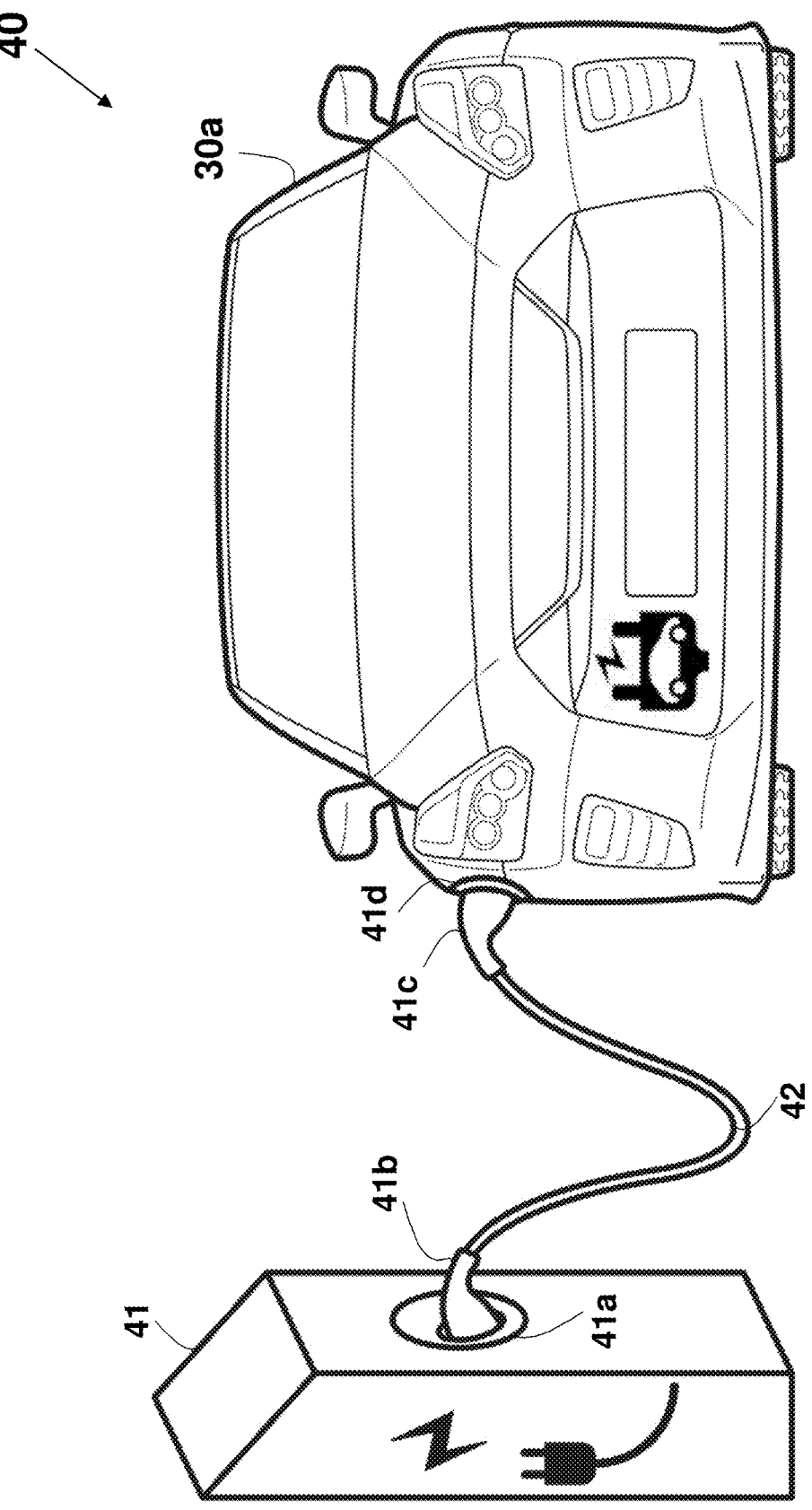
FIG. 4 depicts a simplified schematic arrangement of a prior-art electric car connected to be charged from a charging station.
Figure 4A:
FIG. 4a illustrates a table of the various charging levels according to Society of Automotive Engineers (SAE) J1772 (2017) standard.
Figure 5:
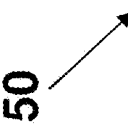
FIG. 5 illustrates a table of the various charging modes according IEC 61851-1 standard.

A name 101a of a charging station may correspond to a brand name or any other identification of the respective charging station. A CPO name 101b may correspond to a brand name or any other identification of the respective CPO that operates the respective charging station. While six different CPOs are shown, different one for each of the entries, a single CPO may be associated with two or more of the charging stations in the table 100a. An address 101c of the respective charging station may be using a building/street/city/country/state/country format, or may use a latitude and a longitude format. The associated type 101d refers to the charging capability and the physical connecting scheme, and may use the SAE J1772 level scheme that is shown as a table 40a in FIG. 4a. Each of the charging stations associated with the respective table entries may support an AC Level 1, AC Level 2, DC Level 1, DC Level 2, or any combination thereof. The positions column 101e provides an integer number that represents the number of charging positions at the respective charging station, relating to the number of electric cars that may be charged in parallel at this location. The fee column 101f describes the charging fee, such as in U.S. dollars ($$), such as per time of charging or per the total energy (KwH) charged.

An example of a charging station 102a may be a station in Massachusetts, USA, that is named "EVC-STATION-1+1/EVC-STATION-1+1" as the Name #1 101a, operated by a CPO named "ChargePoint Network" as the CPO #1 101b, located at 55 Elm St, Dedham, MA, USA (or 42° 13'58.4"N 71° 10'55.0"W) as the Address #1 101c, providing SAE J1772 16A current AC Level 1 as the Type #1 101d, capable of charging up to N1=4 101e cars simultaneously (N1=4), and charging a fee #1 101f of initial fee of initial fee of $1.50/hour for the first 4 hours, followed by $4.00/hour afterwards.

While 6 charging stations are shown as part of the database represented as the table 100a in FIG. 10a, any number of distinct charging stations may be used, such as over 1, 2, 3, 4, 5, 7, 10, 20, 50, 100, 200, 500, 1,000, 2,000, or 2,000 distinct stations.

Roads-related data items 105a involves information relating to roads that may be used for the trip by the electric car 30. A road is a linear way for the conveyance of traffic that mostly has an improved surface for use by the electric car 30 for travelling between locations. There are many types of roads, including parkways, avenues, controlled-access highways (freeways, motorways, and expressways), tollways, interstates, highways, thoroughfares, and local roads. The primary features of roads include lanes, sidewalks (pavement), roadways (carriageways), medians, shoulders, verges, bike paths (cycle paths), and shared-use paths. Roads may be identified using an identification system, such as identifying using numeric (or alphanumeric) designation assigned by a highway authority to a particular stretch of roadway to distinguish it from other routes and, in many cases, also to indicate its classification (e.g., motorway, primary route, regional road, etc.), general geographical location (in zonal numbering systems) and/or orientation (north-south v. east-west). The numbers chosen may be used solely for internal administrative purposes; however, in most cases they are also displayed on roadside signage and indicated on maps.

Non-trip or time sensitive data relating to roads include maps, emission zones, speed limits, tolls (fees charged for the use of a road), and slopes. A slope of a road, or a segment thereof, refers to the tangent of the angle of that surface to the horizontal. A zero slope is a special case of the slope, where zero indicates horizontality. A road slope may be estimated or calculated from 3D or topographic maps, or from road related information.

Emission zones includes zones, roads, or segments of roads, where there is a charge or restrictions for driving polluting vehicles. A Low-Emission Zone (LEZ) is a defined area where access by some polluting vehicles is restricted or deterred with the aim of improving air quality. This may favour vehicles such as bicycles, micromobility vehicles, (certain) alternative fuel vehicles, hybrid electric vehicles, plug-in hybrids, and zero-emission vehicles such as all-electric vehicles. A Zero-Emission Zone (ZEZ) is a LEZ where only zero-emissions vehicles (ZEVs) are allowed. In such areas, all internal combustion engine vehicles are banned; this includes any plug-in hybrid vehicles which cannot run zero-emission. Typically, only battery electric vehicles and hydrogen vehicles are allowed in a ZEZ, along with walking and cycling and fully electric public transport vehicles, e.g., trams, electric buses etc.

Speed limits on road traffic, as used in most countries, set the legal maximum speed at which vehicles may travel on a given stretch of road. Speed limits are generally indicated on a traffic sign reflecting the maximum permitted speed— expressed as Kilometres per hour (km/h) and/or miles per hour (mph). Speed limits are commonly set by the legislative bodies of national or provincial governments and enforced by national or regional police and judicial authorities. Speed limits may also be variable, or in some places nonexistent, such as on most of the Autobahns in Germany.

Maps are available in many different file formats, including proprietary formats, are used to store points of interest data, even where the same underlying WGS84 system is used. Some of the file formats used by different vendors and devices to exchange POI (and in some cases, also navigation tracks), are: ASCII Text (.asc .txt .csv .plt), Topografix GPX (.gpx), Garmin Mapsource (.gdb), Google Earth Keyhole Markup Language (.kml .kmz), Pocket Street Pushpins (.psp), Maptech Marks (.msf), Maptech Waypoint (.mxf), Microsoft MapPoint Pushpin (.csv), OziExplorer (.wpt), TomTom Overlay (.ov2) and TomTom plain text format (.asc), and OpenStreetMap data (.osm). Furthermore, many applications will support the generic ASCII text file format, although this format is more prone to error due to its loose structure as well as the many ways in which GPS co-ordinates can be represented (e.g., decimal vs degree/minute/second).

In one example, maps may be according to the Navigation Data Standard (NDS) described in the web-site nds-association.org (preceded by www.). The NDS is standardized format for automotive-grade navigation databases, jointly developed by automobile manufacturers and suppliers. NDS is an association registered in Germany. Members are automotive OEMs, map data providers, and navigation device/application providers. NDS aims to develop a standardized binary database format that allows the exchange of navigation data between different systems. NDS separates navigation software from navigation data, thus enhancing flexibility for creating various navigation products for end users. In addition to this interoperability, NDS databases support incremental updates, protection against illegal use, and compactness. NDS uses the SQLite Database File Format. An NDS database can consist of several product databases, and each product database may be divided further into update regions. This concept supports a flexible and consistent versioning concept for NDS databases and makes it possible to integrate databases from different database suppliers into one NDS database. The inner structure of databases complying with NDS is further characterized by building blocks, levels and the content itself. All navigation data in an NDS database belongs a specific building block. Each building block addresses specific functional aspects of navigation, such as names for location input, routing, or map display. To cover specific use cases, navigation systems and applications may be required to filter and aggregate data from different building blocks, e.g., from both Routing and Map Display in order to calculate a route and show it to the user. Each update region may contain data from multiple building blocks. Within a product database, which has several update regions, there may thus be several instances of the same building block. Example: In a Europe product database, there may be a Basic Map Display building block in the update region "France" and a Basic Map Display building block in the update region "Germany". Maps may use scales as of approximately 1:2,000 in 2D, perspective 2D (pseudo 3D), or read 3D. Such presentation is helpful for obtaining a general overview of the route in the immediate locality or over a wider area. may be used for presenting bodies of water, railroads, and forests for providing added orientation.

In one example, the maps are GIS based and may be obtained from many sources such as United States Geological Survey's (USGS) survey reference points and georeferenced images, city public works databases, and Continuously Operating Reference Stations (CORS). Further, such map repositories may be provided as a service over the Internet such as Google Earth™ (by Google®), Virtual Earth™ (by Microsoft®), TerraServer® (by TerraServer®), ArcGIS by Esri (Environmental Systems Research Institute), and the like. ArcGIS is a family of client software, server software, and online Geographic Information System (GIS) services developed and maintained by Esri (Environmental Systems Research Institute), headquartered in Redlands, California. ArcGIS Pro works in 2D and 3D for cartography and visualization, and includes Artificial Intelligence (AI). Esri also provides server side ArcGIS software for web maps, known as ArcGIS Server.

Any maps herein may comprise, may be based on, or may use, a Geographic Information System (GIS), that may be based on, or may use, a United States Geological Survey's (USGS) survey reference points and georeferenced images, city public works databases, Continuously Operating Reference Stations (CORS), or any combination thereof. Any maps herein may be stored in a database located externally to the ground station, and any method may further comprise receiving, over the Internet, part of, or all of, the maps, such part of a service that is Google Earth™ (by Google®), Virtual Earth™ (by Microsoft®), TerraServer® (by Terra-Server®), or ArcGIS by Esri (Environmental Systems Research Institute).

The car factors 92 involves data items that are specific to a particular electric car such as electric car 30a, and may not be relevant to another electric car, such as the electric car 30b illustrated in the arrangement 80 shown in FIG. 8. In one example, the car factors may include make and model of the electric car 30, or different data items relating to electric cars of the same make and model. In one example, the differences between two electric cars (being of different or same models), may directly affect the discharge rate of the respective battery 33, even under the same conditions. For example, the weight or shape of an electric car 30 may directly affect the drag when travelling, causing different discharging rate when travelling in the same conditions (such as on the same road at the same environmental factors 91. Further, different cars may use different batteries or different battery technologies, as well as different motor 35 or different efficiency factors. Further, makers of electric car 30 typically provide a discharge rate value under reference or ideal condition, that may be used by the route planner 94. In one example, the battery 33 discharge feature is defined as maximum distance travelled using the battery 33 full capacity (SoC 100%), such as travelling 200 Kilometers using a 40 KwH charged battery 33. In one example, the car factors 92 includes an identifier of a specific electric car 30. The identifier may be used, for example, to access the electric car 30 maker server or database to access other car-related data items. In one example, the car factors 92 include a battery 33 State of Health (SOH), which represents the long-term capability of the battery.

In one example, the car factors 92 include a total distance travelled by the specific electric car 30. Such total distance is typically measured by an odometer or an odograph, which is an instrument used for measuring the distance traveled by a vehicle. The device may be electronic, mechanical, or a combination of the two (electromechanical).

Further, the car factors 92 may include a drag value associated with the electric car 40. Such drag value may be based on, or use, a drag coefficient that may be obtained, for example, from a memory in the electric car 40 or from a server operated by the electric car manufacturer or vendor.

An electric car 30 may be identified using a vehicle registration plate. Countries typically employ registration of vehicle using a registration identifier that is a numeric or alphanumeric identity that uniquely identifies the vehicle (or vehicle owner) within the country issuing vehicle register. A vehicle registration plate, also known as a number plate or a license plate, is metal or plastic plate attached to a motor vehicle or trailer for official identification purposes, displaying the registration identifier. All countries require registration plates for road vehicles such as cars, trucks, and motorcycles. Some countries require a registration number and Vehicle registration plate for other vehicles, such as bicycles, boats, or tractors. Most governments require a registration plate to be attached to both the front and rear of a vehicle, although certain jurisdictions or vehicle types, such as motorboats, require only one plate, which is usually attached to the rear of the vehicle. National databases relate this number to other information describing the vehicle, such as the make, model, color, year of manufacture, engine size, type of fuel used, mileage recorded, Vehicle Identification (Chassis) Number, and the name and address of the vehicle's registered owner or keeper.

For a vehicle, the term "make" refers to either the name of its manufacturer or, if the manufacturer has more than one operating unit, the name of that unit. A "model" is a specific vehicle brand identified by a name or number (and which is usually further classified by trim or style level). The term "Vehicle type" refers to the type of vehicle class, examples of which are large cars, midsize cars, minivans, pickup trucks, small cars, special purpose vehicles, sports utility vehicles, station wagons and vans. The term "Model year" refers to the calendar year designation assigned by the manufacturer to the annual version of that model.

Alternatively or in addition, an electric car 30 may be identified using a vehicle registration plate Vehicle Identification Number (VIN). A vehicle identification number (VIN), also referred to as a chassis number, is a unique code, including a serial number, used by the automotive industry to identify individual motor vehicles, towed vehicles, motor-cycles, scooters and mopeds, as defined in International Organization for Standardization (ISO) 3833.

Modern VINs are based on two related standards, originally issued by the International Organization for Standardization (ISO) ISO 3780 and ISO 3779:2009 entitled: "Road vehicles—Vehicle identification number (VIN)—Content and structure". The first three characters in a VIN uniquely identify the manufacturer of the vehicle using the World Manufacturer Identifier or WMI code. Some manufacturers use the third character as a code for a vehicle category (e.g., bus or truck), a division within a manufacturer, or both. For example, within 1G (assigned to General Motors in the United States), 1G1 represents Chevrolet passenger cars; 1G2, Pontiac passenger cars; and 1GC, Chevrolet trucks. The Society of Automotive Engineers (SAE) in the U.S. assigns WMIs to countries and manufacturers. The fourth to eighth positions in the VIN are the Vehicle Descriptor Section or VDS. This is used, according to local regulations, to identify the vehicle type, and may include information on the automobile platform used, the model, and the body style. Each manufacturer has a unique system for using this field. Most manufacturers since the 1980s have used the eighth digit to identify the engine type whenever there is more than one engine choice for the vehicle. The 10th to 17th positions of the VIN are used as the 'Vehicle Identifier Section' (VIS). This is used by the manufacturer to identify the individual vehicle, and may include information on options installed or engine and transmission choices, but often is a simple sequential number. In North America, the last five digits must be numeric. One consistent element of the VIS is the 10th digit, which is required worldwide to encode the model year of the vehicle. Besides the three letters that are not allowed in the VIN itself (I, O and Q), the letters U and Z and the digit 0 are not used for the model year code. The year code is the model year for the vehicle. Compulsory in North America is the use of the 11th character to identify the factory at which the vehicle was built. Each manufacturer has its own set of plant codes. In the United States, the 12th to 17th digits are the vehicle's serial or production number. This is unique to each vehicle, and every manufacturer uses its own sequence.

Any vehicle identifier herein may comprise a set of characters or numbers uniquely identifying the vehicle, and any vehicle identifier herein may comprise a license plate number, or a Vehicle Identification Number (VIN) that is according to, or based on, ISO 3779. Alternatively or in addition, any vehicle identifier herein may comprise a code that identifies the first vehicle make, model, color, model year, engine size, or vehicle type. Alternatively or in addition, any vehicle identifier herein may comprise an address that uniquely identifies the vehicle in a digital network, in the Internet, or in the first or second networks, and the address may comprise an IP address (such as in IPv4 or IPv6 form), or a Medium Access Control (MAC) address.

The person that drives the electric car 30 (the 'driver') may further affect the discharging rate of the battery 33. Even under same condition (e.g., same electric car 30, same environmental condition, same route, etc.), two drivers may exhibit different discharging rate, that may need to be taken into account by the route planner 94, and may result in different optimal route 97. The style, habits, experience, aggressiveness, and skill of a driver may impact the battery discharging efficiency. Such attributes of a driver may be further attributed to the driver age, gender, years or experience, or any combination thereof.

For example, applying gentle acceleration by easing onto the accelerator pedal gently may be more energy efficient than aggressive or sharp acceleration changes. Similarly, gentle declaration may be more energy conserving than hard stopping. Further, maintaining a steady speed, avoiding speeding, and using air conditioning and other entertainment or auxiliary electrically consuming features may provide superior battery 33 discharging rate.

Taking into consideration the role of the transportation sector in terms of energy consumption and environmental impacts, the characterization of vehicle use and driver behavior opens new opportunities for energy and emissions savings. The use of information and communication technologies can potentially be a powerful driver to promote change in this sector. A research work to identify driving behavior patterns for several driving contexts (based on hierarchical street level and weather conditions) from real-world driving data and to assess their impacts on energy consumption, is described in an article authored by Marta V. Fariaa, Patricia C. Baptistab, and Tiago L. Fariasa, and published by Elsevier B. V, presented in the 20th EURO Working Group on Transportation Meeting, EWGT 2017 [4-6 Sep. 2017, Budapest, Hungary] entitled: "*Identifying driving behavior patterns and their impacts on fuel*", which is incorporated in its entirety for all purposes as if fully set forth herein. The case study for this work was the city of Lisbon, where driving data from 46 drivers were collected with on-board data loggers for at least 6 months. The analysis performed in this work provides an insight on the impacts of driving context on driving behavior and consequently on energy consumption. Both infrastructure characteristics and weather conditions were found to cause a speed reduction and an energy consumption increase. Rain intensity was found to increase energy consumption up to 16%, while regarding infrastructure characteristics, for level 4 streets, energy consumption is 54% higher than for level 1 streets. Results provide evidence that drivers tend to drive more calmly (lower speeds and acceleration patterns) for higher rain intensities compared with dry weather. However, more local streets (level 2, 3 and 4 streets) are the ones that present more aggressive driving patterns (in terms of acceleration).

Driving style concerns the way a driver chooses to drive, and depends on physical and emotional conditions of the driver while driving. A Structural Equation Modelling (SEM) aimed to investigate on the relationship between among driving style and drivers' characteristics such as somatic, behavioural and emotional conditions, is described in an article authored by Laura Eboli, Gabriella Mazzulla, and Giuseppe Pungillo, and published by Elsevier B. V, presented in the 20th EURO Working Group on Transportation Meeting, EWGT 2017 [4-6 Sep. 2017, Budapest, Hungary] entitled: "*How drivers' characteristics can affect driving style*", which is incorporated in its entirety for all purposes as if fully set forth herein. Drivers' conditions include tiredness, sleepiness, sickness, gloom, worry, nervousness, boredom, and anger. In the proposed model, driving style is considered as an endogenous latent construct, while drivers' characteristics were considered as exogenous. Driving style is defined by means of a judgement expressed by the driver on a scale ranged from aggressive to cautious. In addition, a more reliable definition of the driving style is determined through an objective measure derived from cinematic parameters. The article addressed to a sample of drivers a questionnaire aimed to collect information about their conditions while driving and the judgement about their driving style. Each driver registered the same path run in different days (more than thirty paths for each driver, in average), and complete the questionnaire for each path. This permits to observe the possible changes of drivers' driving style as a function of the different physical and emotional states that drivers present in different days.

As part of a 'Date/Hour' data item 99, which may include calendar date of a month, a day of a week, a hour in a day, a minute in a hour, or any combination thereof. the route planner 94 obtains a time at which a trip is to be initiated, such as the time point t0 86a in the graph 80a in FIG. 8a. In one example, the time point 99 is the current time, such as when the route planner 94 is activated at the start of the trip. Alternatively or in addition, the time 99 may be a future timing, such as when the trip is planned for a future and does not commence immediately.

The car status 96 data include car related data that may change from trip to trip. For example, the car status data 96 may include identification of the starting and end points locations (that may be the same location), the SoC of the battery 33 (such as 50% level 83a in the graph 80a), an expected or existing number of passengers, a current or expected payload weight (such as a weight of payload added to the electric car 30 weight), or any combination thereof.

Figure 3:
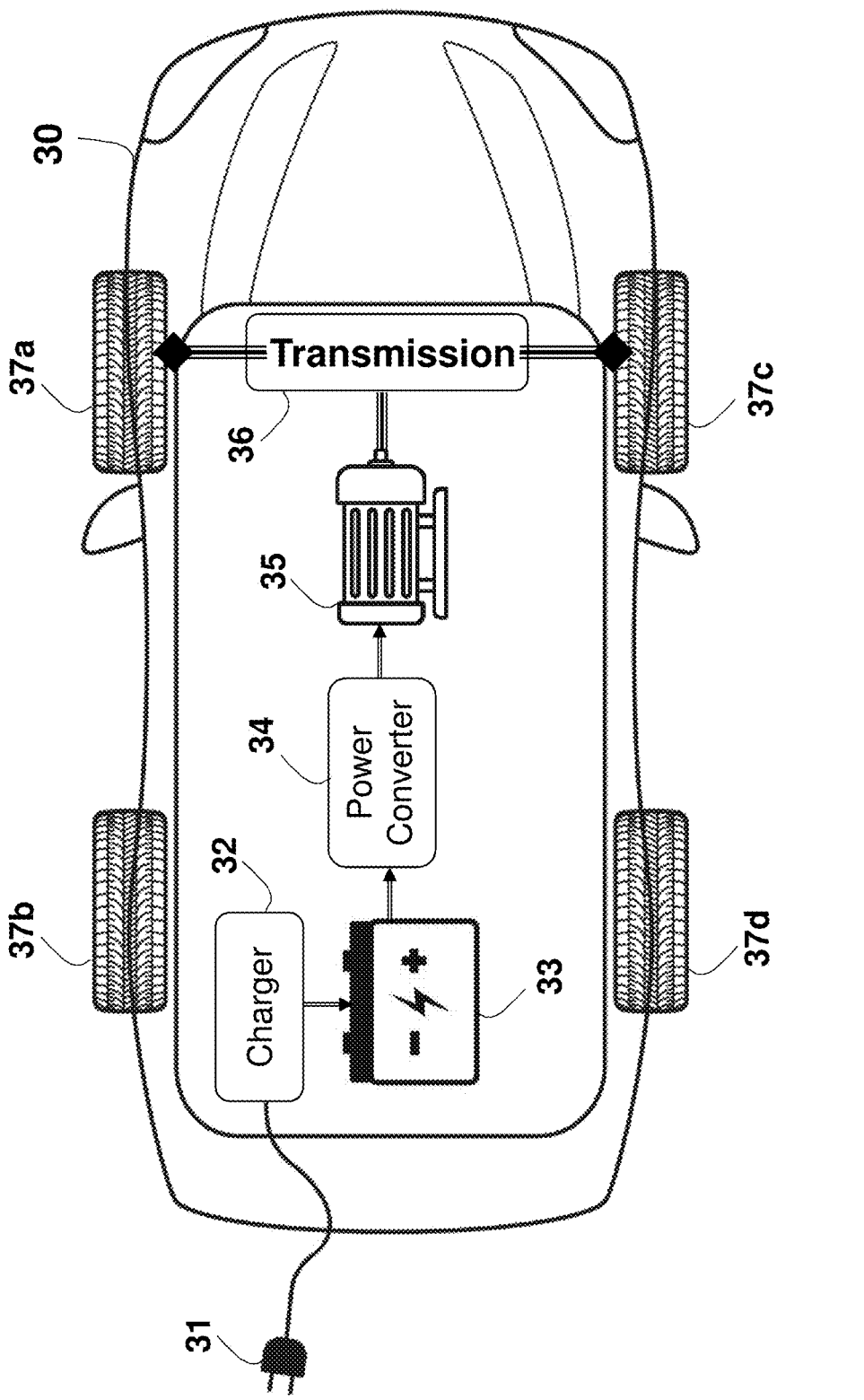
FIG. 3 depicts a simplified schematic of part of a typical prior-art power train configuration of an electric car.

In one example, the vehicle 40 may include a Tire-Pressure Monitoring System (TPMS) that monitors the air pressure inside the pneumatic tires 37a, 37b, 37c, 37d, or any combination thereof, of the vehicle 40. The TPMS may be direct (dTPMS) or indirect (iTPMS). For example, the ECU #1 22c shown in the arrangement 20 may include, or be part of, the TPMS system, using the sensor 24b for sensing (directly or indirectly) the real-time tire-pressure of one or the pneumatic tires 37a, 37b, 37c, and 37d. The dynamic behavior of is closely connected to its inflation pressure, so the sensed tire pressure by the TPMS or any sensor thein may be used as an additional factor to estimate the battery 33 discharge rate during the expected trip. While four tires are shown as part of the vehicle in FIG. 3, it is noted that any number of wheels and associated tires may be used, such as 2, 3, 5, 6, 8, 10, 12, or 14 tires, and the TPMS may be used to monitor or sense one of the tires, some of the tires, or all of the tires of the vehicle 40.

In one example, the TPMS comprises an indirect TPMS (iTPMS) system, that uses software (such as in the ECU #1 22c) to evaluate and combine existing sensor signals such as wheel speeds, accelerometers, and driveline data, to estimate and monitor the tire pressure without physical pressure sensors in the wheels. Such system may be based on the principle that under-inflated tires have a slightly smaller diameter (and hence higher angular velocity) than a correctly inflated one. Alternatively or in addition, the TPMS may comprise a Direct TPMS (dTPMS) and may use pressure sensors (such as a microelectromechanical system (MEMS) pressure sensors) that are directly mounted on the wheels or tires of a vehicle. Other sensors may include temperature, acceleration, direction of rotation sensors, a magnetic field (e.g., the earth's magnetic field), an electric field, a pressure, an acceleration, a temperature, a force, a current, or a voltage. Further, the sensor may be an angle sensor, a linear position sensor, a speed sensor, a motion sensor, a pressure sensor, an acceleration sensor, a temperature sensor, and the like. A magnetic field sensor includes, for example, one or more magnetic field sensor elements that measure one or more characteristics of a magnetic field (e.g., an amount of a magnetic field flux density, a field strength, a field angle, a field direction, a field orientation, etc.), in accordance with the detection and/or measurement the magnetic field pattern of an element that generates the magnetic field (e.g., a magnet, a current-carrying conductor (e.g., a wire), the earth or another magnetic field source).

Further, the sensor used for the TPMS system may include an encoded array of permanent magnets, or an encoded arrays of various field generating devices or mechanisms. Non-exhaustive examples of such include not only the permanent magnets previously mentioned but also electromagnets, both paired with appropriate sensors for detecting the generated magnetic or electromagnetic fields. Non-exhaustive examples of other appropriate sensors for detecting magnetic or electromagnetic fields include the following: Fluxgate, Superconducting Quantum Interference Device (SQUID), Hall Effect, Magnetoresistive, Proton Precession, and Optically Pumped sensors.

The destination locations (such as shops and/or POIs) to be visited during a planned trip along the optimal route 97 may be identified by a name or place. In such a case, a database, such as a database 100b shown as a table in FIG. 10b, associates the location or place name to the geographical physical address that is actually used by a navigation system for calculating the route to that destination. For example, the table 100b may include entries that relate to multiple stores.

In such a case, the table 100b may contain multiple entries (represented as rows in the table 100b), each for a store (or unique place, location, or POI), and includes a second column 'Address' 103b that includes the address (or geographical location) for each place, and a first column 'Store Name' 103a that uniquely identifies a specific store. An entry (or row) 104 for each store included in the table 100b includes its name and address, such as an Address #1 for Store #1 104a, an Address #2 for Store #2 104b, an Address #3 for Store #3 104c, an Address #4 for Store #4 104d, and an Address #5 for Store #5 100e. Each of the addresses 103b of the respective shop may be using a building/street/city/country/state/country format, or may use a latitude and a longitude format. A column 'Opening Hours' 103c details the opening hours of the respective store, such as 24/7 (continuously open) or 9.00-17.00. While 5 stores are shown as part of the database represented as the table 100b in FIG. 10b, any number of distinct stores may be used, such as over 1, 2, 3, 4, 5, 7, 10, 20, 50, 100, 200, 500, 1,000, 2,000, 5,000, 10,000, 20,000, 50,000, or 100,000 distinct stores.

While some stores, gas fueling stations, or other service providing establishments are open or available any time and, usually, every day, known as 24/7 service, many are available only for defined opening hours during a day. When planning a route to various stores or service providing locations, it may be optimal to use these opening hours information, so that a store is not arrived to when it is closed. For example, assuming a route is calculated so that a store is reached at 18.00, however if this store closes at 17.30, this calculated route is rendered useless. In one example, the opening hours of various stores (or other establishments) are available in a database, such as a table 100b shown in FIG. 10b.

Guiding a user in need for an optimal (e.g., nearest) store where a requested product is available is in particular useful in case where the user is not acquainted with the neighborhood, such as a tourist, a newcomer, or am immigrant. Further, many consumers perform concentrated large buying of groceries in a supermarket on a weekly, bi-weekly, or monthly basis. In such a case, where visiting a single shop is required, it is beneficial to get to the nearest or otherwise convenient shop for obtaining the product. In particular. For example, many groceries, such as food items and household products, are available from superstores/hypermarkets, supermarkets, grocery stores, and convenience stores. For example, a milk bottle is available is a superstore (such as Walmart—a chain by Wal-Mart Stores, Inc.), a convenience store (such a 7-Eleven), in a neighborhood supermarket or pharmacy store (such as local Walgreen store—a chain by Walgreen Company), and in a convenience store that is part of a gas/petrol station.

In one example, any of the shops 104a-e may provide Fast-moving consumer goods (FMCG) or Consumer Packaged Goods (CPG), which are products that are sold quickly and at relatively low cost. Examples include non-durable goods such as packaged foods, beverages, toiletries, over-the-counter drugs and many other consumables. In contrast, durable goods or major appliances such as kitchen appliances are generally replaced over a period of several years. Some FMCGs, such as meat, fruits and vegetables, dairy products, and baked goods, are highly perishable. Other goods, such as pre-packaged foods, soft drinks, chocolate, candies, toiletries, and cleaning products, have high turnover rates.

Alternatively or in addition, the items any of the shops 104a-e may be household goods, which are goods and products used within households. They are the tangible and movable personal property placed in the living rooms, dining rooms, kitchens, family rooms, great rooms, bedrooms, bathrooms, recreation rooms, hallways, attics, and basements and other rooms of a house. Examples of household goods include air conditioners, baby items, baking dishes, beds/bedframes, blankets, bedding, linens, towels, blenders, mixers, bookcases, books, bureaus, dressers, wardrobes, cabinets, can openers, chairs, clothes dryers, coffee makers, computers, cooking utensils, couches, sofas, love seats, sectionals, sofa beds, curtains, curtain rods, drapes, decorative items, desks, dishes, dishwashers, entertainment centers, fans, freezers, (drinking) glasses, hand tools, hutches, irons and ironing boards, lamps, lawn chairs, (table) linens, mattresses, (home) medical equipment, microwave ovens, mirrors, pillows, pots and pans, refrigerators, rugs, sewing machines and notions, silverware (flatware), sheets, sofas, sectionals, sofa beds/futons, space heaters, stereos and radios, tables toasters and toaster ovens, tools, towels, toys, televisions, vacuum cleaners, umbrellas, robotics, and washer/dryers.

Alternatively or in addition, the items sold in any of the shops 104a-e may be may be classified into the following categories, which are determined by the consumer's buying habits: Convenience goods, Shopping goods, Specialty goods, and Unsought goods. Convenience goods are goods that are regularly consumed and easily available. Generally, convenience goods come in the category of nondurable goods such as fast foods, cigarettes and tobacco with low value. Convenience goods are mostly sold by wholesalers or retailers, so as to make them available to the consumers in good or large volume. Convenience goods can further be categorized into: Staple convenience consumer goods, Impulse convenience consumer Goods, and Staple convenience consumer goods. The latter are those kinds of goods that come under the basic necessities of the consumer. These goods are easily available and in large quantity. Examples include milk, bread, sugar, etc. Impulse convenience consumer goods are the goods that do not belong to the priority list of the consumer. These goods are purchased without any prior planning, just on the basis of the impulse. Examples include potato wafers, candies, ice creams, cold drinks, etc.

Shopping consumer goods are the goods that take lot of time and proper planning before making purchase decision; in this case, the consumer does a lot of selection and comparison based on various parameters such as cost, brand, style, comfort etc., before buying an item. Shopping goods are costlier than convenience goods and are durable in nature. Consumer goods companies usually try to set up their shops and show rooms in active shopping area to attract customer attention and their main focus is to do lots of advertising and promotion so that to attract more customer. Examples include clothing items, televisions, radio, footwear, home furnishing, etc. Specialty goods are unique in nature; these are unusual and luxurious items available in the market. Specialty goods are mostly purchased by the upper class of the society as they are expensive in nature and difficult to be afforded by middle or lower-class people. Companies advertise their goods targeting the upper class. These goods do not fall under the category of necessity; rather they are purchased on the basis personal preference or desire. Brand name, uniqueness, and special features of an item are major attributes that attract customers and make them buy such products. Examples include antiques, jewelry, wedding dresses, cars, etc. Unsought goods neither belong to the necessity group of consumer goods list nor to specialty goods. They are always available in the market but are purchased by very few consumers, either based on their interest or their need for some specific reasons. The general public does not purchase such goods often. Examples include snowshoes, fire extinguishers, flood insurance, etc.

While example above regarding tangible products, any of the shops 104a-e may equally provide services, such as laundry service, package or mail sending services, repair service, or personal services such as massage or beauty services.

Alternatively or in addition, any of the shops 104a-e may correspond with a supermarket, a convenience store, a grocery store, or a superstore, and the items may comprise groceries, household goods, consumer products, Convenience goods, Shopping goods, Specialty goods, or Unsought goods. Alternatively or in addition, each of the multiple locations in the database may be a store that provides a service, and the items may comprise services.

In one example, the route planner 94 may use, or may be based on, a Bayesian optimization (or Bayesian network). In one example, the Bayesian network may be considered as a graph that consists of three types of vertices: vertices that describe environmental factors 91 (that may include events over which we have no control, such as weather conditions, or a traffic congestion in a particular route), vertices that describe decision nodes, such as which path to choose, or whether or not to charge the battery of the electric car, and vertices that describe the objective 98 representing the goal to be optimally achieved, such as reduced charging time or reduced travel time.

Alternatively or in addition, the route planner 94 may use, or may be based on, a casual inference methodology or process. The casual inference may use, or may be based on, Bayesian inference or Frequentist statistical inference. Further, The casual inference framework may use, or may be based on, a causal pie model (component-cause), a Pearl's structural causal model (causal diagram+do-calculus), a structural equation modeling, or a Rubin causal model (potential-outcome), which are often used in areas such as social sciences and epidemiology.

Alternatively or in addition, the route planner 94 may use, or may be based on, unsupervised clustering, such as the K-Means Clustering scheme. One or more of the environmental factors 91, one or more of the car factors 92, one or more of the driver factors 93 are used for the clustering, and are used for predict future factors or activity relating to the area or time involved in the planning. For example, the clustering may be used to predict a driver behavior, future traffic load, or waiting time.

Alternatively or in addition, the route planner 94 may use, or may be based on, a Travelling Salesman Problem (TSP). The TSP problem is applied herein by replacing the traditional cities with the relevant locations, such as the charging station locations and the target locations 95. Further, the TSP costs may correspond to distance to travel, the travel time, or fuel efficiency. The TSP used may be asymmetric or non-asymmetric, and may be solved using an exact algorithm or a heuristicone.

Alternatively or in addition, the route planner 94 may use, or may be based on, solving an integer Linear Programming (LP) problem, such as by using heuristic or combinatorial search method, or by using the simplex algorithm, In one example, a low-level threshold of the battery 33 is defined, and the route planner 94 is subject to a restriction of the optimal route 97 not reaching a charging level (SoC) that is below the defined level, such as the 20% level 85a of the full (100%) battery charge level 85c shown in the graph 80a in FIG. 8a. Such a low level threshold may be defined as at least 1%, 2%, 3%, 5%, 7%, 10%, 12%, 15%, 20%, 25%, or 30% of the maximum battery charge capacity. Alternatively or in addition, the low level threshold may be defined as less than 2%, 3%, 5%, 7%, 10%, 12%, 15%, 20%, 25%, 30%, or 35% of the maximum battery charge capacity. Alternatively or in addition, the low level threshold may be defined as absolute charging level, such as at least 1, 2, 3, 5, 7, 10, 12, 15, or 20 KwH. Alternatively or in addition, the low level threshold may be defined as less than 2, 3, 5, 7, 10, 12, 15, 20, or 30 KwH. In one example, the low-level threshold is calculated according to an estimated distance to travel based on the estimated or expected battery 33 charge discharging, such as at least 1, 2, 3, 5, 7, 10, 12, 15, or 20 miles or Kilometers, or less than 2, 3, 5, 7, 10, 12, 15, 20, or 30 miles or Kilometers.

Figure 11:
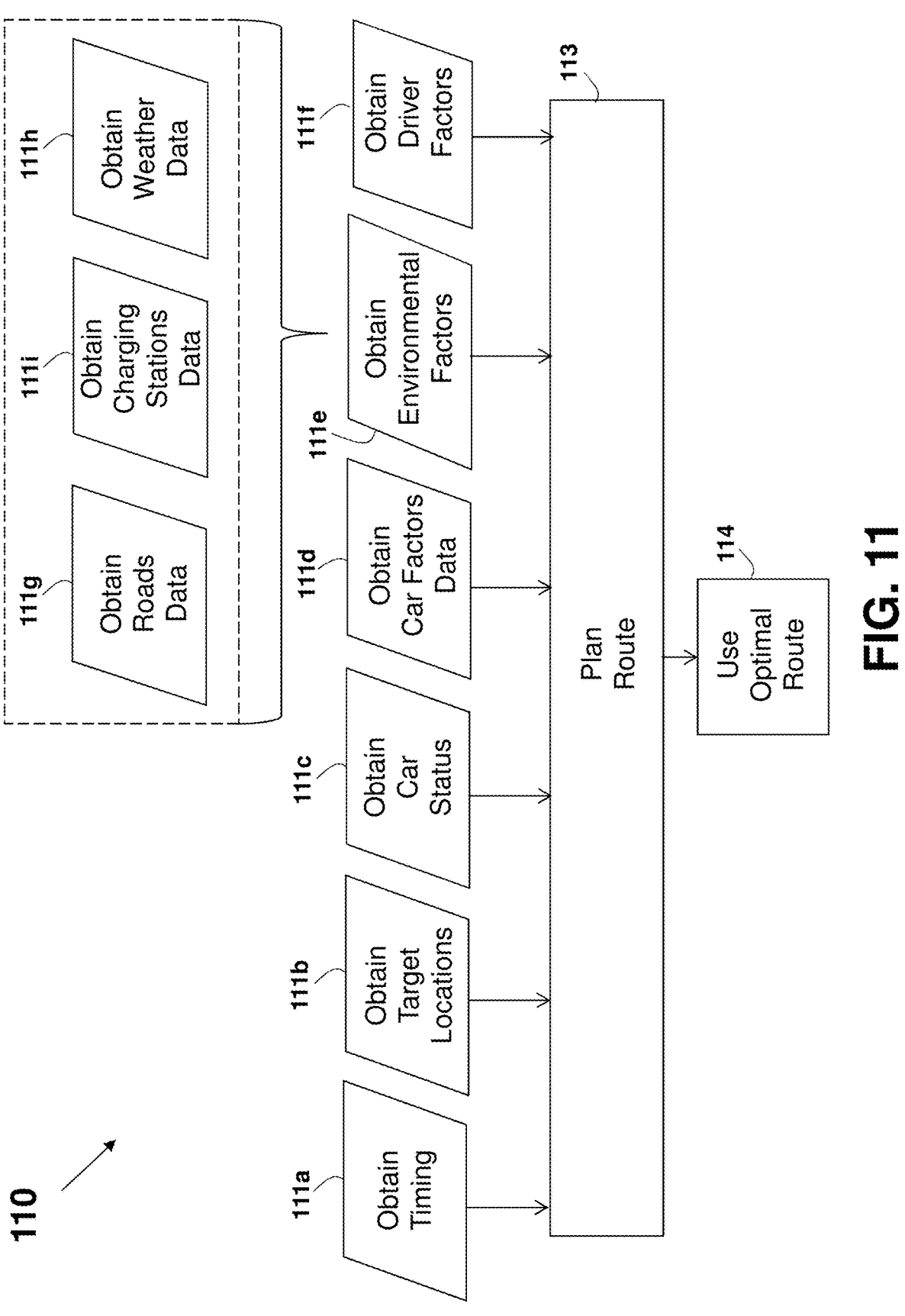
FIG. 11 illustrates a simplified schematic flow chart of a method for generating an optimal route based on obtaining various factors and data items.

An example of a flow-chart 110 for generating and using an optimal route 97 is shown in FIG. 11. The optimal route is planned and generated as part of a "Plan Route" step 113, that may correspond to the "Route Planner" 94 shown as part of the data arrangement 90 in FIG. 9. The algorithm executed as part of the "Plan Route" step 113 may be based on, or may use, timing data obtained as part of an "Obtain Timing" step 111a that may correspond to the "Date/Hour" data 99, timing data that may be obtained as part of an "Obtain Target Locations" step 111b that may correspond to the "Target Locations" data 95, electric car 30 data that may be obtained as part of an "Obtain Car Status" step 111c that may correspond to the "Car Status" data 96, car factors data that may be obtained as part of an "Obtain Car Factors Data" step 111d that may correspond to the "Car Factors" data 92, environmental factors data that may be obtained as part of an "Obtain Environmental Factors" step 111e that may correspond to the "Environmental Factors" data 91, driver factors may be obtained as part of an "Obtain Driver Factors" step 111f that may correspond to the "Driver Factors" data 93, or any combination thereof.

Based on the data structure 100 shown in FIG. 10, the "Obtain Environmental Factors" step 111e may include steps of an "Obtain Roads Data" step 111g that may correspond to the "Roads" data 105a, an "Obtain Weather Data" step 111h that may correspond to the "Weather" data 105c, an "Obtain Charging Stations Data" step 111i that may correspond to the "Charging Stations" data 105b, or any combination thereof. The generated optimal route 97 is used as part of a "Use Optimal Route" step 114.

In one example, the flow-chart 110 shown in FIG. 11, or any part thereof, may be performed at a smartphone, such as the smartphone 65. In such a case, the flow-chart 110 is performed by executing by the processor 12 the instruction 67b that are stored in the storage 63, as shown in the arrangement 60 in FIG. 6. Alternatively or in addition, the flow-chart 110 shown in FIG. 11, or any part thereof, may be performed at the electric car 30, such as in the electric car 30a or 30b in the arrangement 80 shown in FIG. 8. In such a case, the flow-chart 110 is performed by executing by a processor in the electric car 30, such as in the Telematics ECU 22b as part of the car block-diagram 21 shown in FIG. 2.

Alternatively or in addition, the flow-chart 110 shown in FIG. 11, or any part thereof, may be performed at a server, such as by the service server 23c. In one example, the service server 23c may be cloud-based implemented as part of a public cloud-based service, and any public cloud-based service herein may be provided by Amazon Web Services® (AWS®), Microsoft® Azure™, or Google® Compute Engine™ (GCP). Alternatively ort in addition, the functionalities provided by the service server 23c may be part of a cloud-based service, where the service server 23c is implemented as Infrastructure as a Service (IaaS) or as a Software as a Service (SaaS) (or as a Platform as a Service (PaaS)), providing the benefits of a cloud based computing, such as consolidation, virtualization, better cost, reliability, level of service, and automation. One benefit involves balancing between off-premises and on-premises cloud storage options, or a mixture of the two options, depending on relevant decision criteria that is complementary to initial direct cost savings potential. The cloud may be operated or provided by a public cloud provider, such as by Amazon AWS, Microsoft Azure, or Google GCP.

In one example, the route planning as part of the "Plan Route" step 113 may use, or may be based on, the calculation or selection described in a paper by Dalip and Vijay Kumar, both from MMEC, Maharishi Markandeshwar University, Ambala, India entitled: "*Optimum Route Selection for Vehicle Navigation*", published in (IJACSA) International Journal of Advanced Computer Science and Applications, Vol. 7, No. 2, 2016, the calculation or selection may be as described in an handbook entitled: "*Alternate Route Handbook*", Report No. FHWA-HOP-06-092 published May 2006 by Federal Highway Administration, the calculation or selection may be as described in a paper by Zhiyong Wang and Sisi Zlatanova, both of Delft University of Technology, Delft, The Netherlands, published 2013 by Springer—Verlag Berlin Heidelberg [ISBN: 978-3-642-33217-3] entitled: "*An A\*-Based Search Approach for Navigation Among Moving Obstacles*", the calculation or selection may be as described in an article entitled: "*Route Planning Algorithms for Car Navigation*" by Ingrid C. M.

Flinsenberg of the Eindhoven University published 2004 [ISBN: 90-386-0902-7], the calculation or selection may be as described in an paper by W. Wen & S. W. Hsu of the Department of Information Management, LungHwa University of Science and Technology, Taiwan R. O. C. entitled: "*A route navigation system with a new revised shortest path routing algorithm and its performance evaluation*", published 2005 in WTT Transaction on The Built Environment, Vol. 77 [ISSN 1743-3509], or the calculation or selection may be as described in a thesis by Xueyuan Song *of the State University of New Jersey entitled: "ON MY WAY. SYSTEM FOR OPTIMIZING DRIVING ROUTES FOR CROWD-SOURCING APPLICATIONS*", published May 2014, which are all incorporated in their entirety for all purposes as if fully set forth herein.

The optimal route 97 that is generated as part of the "Plan Route" step 113 may be used, such as by being executed or by notify a driver (such as visually or audibly), as part of a "Use Optimal Route" step 114. The optimal route 97 may include a map where the optimal route is shown or overlayed on (such as the optimal route 74 is shown overlayed on the map 71 as shown in the view 70b in FIG. 7b), a maneuvers list with sequenced turn directions, a turn-by-turn guidance (which may generally "pop up" in advance of a turn), or any combination thereof. The optimal route 97 may further comprise driving time, either between locations or in a segment of a route, such as the optimal route 97, parking time, such as waiting in a line or waiting for a shop to open, or charging time, such as until the battery 33 is fully or partially charged in a charging station 41.

The route guidance as part of the "Use Optimal Route" step 114 may be performed by comparing the present position with the selected route, and the user (such as driver) is directed along a route by interaction with the navigation system, commonly using auditory, visual, or haptic interface. Route recommendations are mainly reproduced acoustically (voice output), which allows the user (such as the driver) to follow the directions without being distracted from the task of driving. Graphics, preferably positioned in the primary field of vision (e.g., in the instrument cluster), support the driver in understanding the directions. These graphics range from simple arrow symbols through to the display of a map excerpt optimally adapted in size.

In one example, the optimal route is used as part of the "Use Optimal Route" step 114, in the same device that execute part of, or whole of, the "Plan Route" step 113. For example, in the case where the "Plan Route" step 113 is performed (at least in part) by the smartphone 65a, the optimal route 97 may be notified to the user 66 by an output component 64 of the smartphone 65 shown in FIG. 6. Alternatively or in addition, the "Plan Route" step 113 may be performed (at least in part) in the electric car 30, and the optimal route 97 may be notified to a driver of the electric car 30 by an output component, such as the display dashboard 26 shown as part of the car block diagram 21.

Figure 11A:
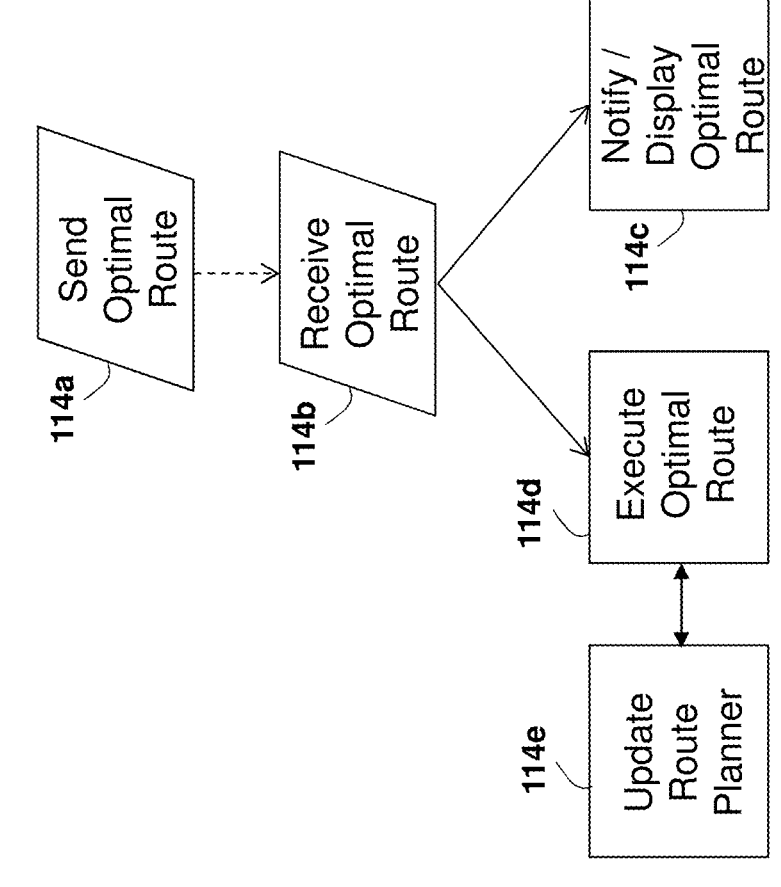
FIG. 11*a* illustrates a simplified schematic flow chart of a step of using a generated optimal route.

Alternatively or in addition, the optimal route is used as part of the "Use Optimal Route" step 114 in a device that is different and distinct from the device that executes part of, or whole of, the "Plan Route" step 113. Such a scenario is described in a flow chart 110a shown in FIG. 11a. As part of a "Send Optimal Route" step 114a, the optimal route 97, or any part thereof, is send from the device that performs a part of, or whole of, the "Plan Route" step 113, to another device that receives the send optimal route (or part thereof) as part of a "Receive Optimal Route" step 114b, and further use the received optimal route as part of an "Execute Optimal Route" step 114d, as part of an "Notify/Display Optimal Route" step 114c, or any combination thereof.

In one example, the electric car 30 is an autonomous vehicle, and the "Execute Optimal Route" step 114d include actual causing the car to autonomously trave according to the optimal route 97. In case of huma-driven car, the "Execute Optimal Route" step 114d may include assisting the driver to follow the optimal route 97.

Figure 9B:
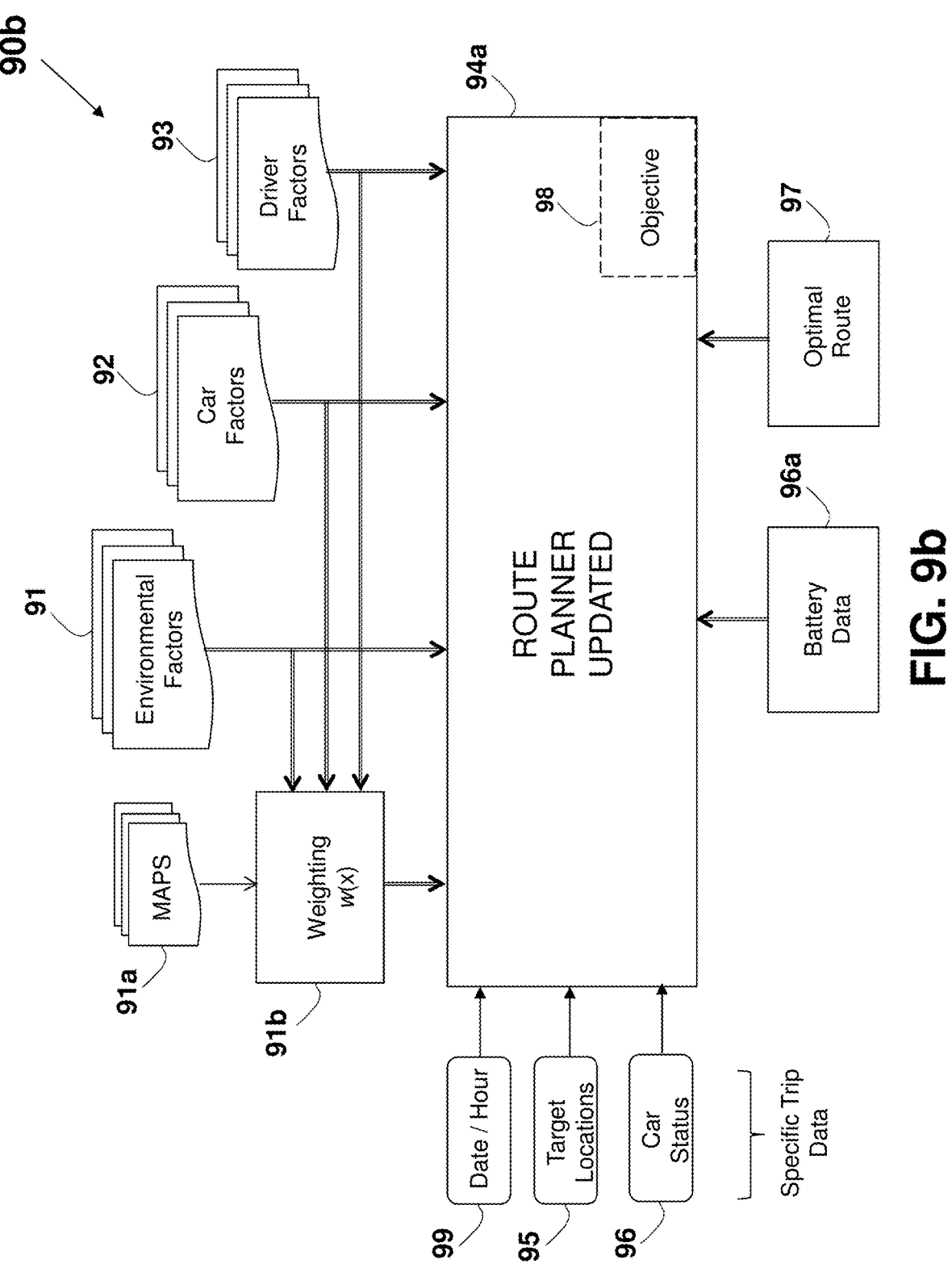
FIG. 9b depicts schematically a data flow that includes updating of planning algorithm of an executed optimal route.

In one example, as part of, or in parallel with, the executing of the optimal route 97, the battery 33 discharging rate is sensed or monitored, shown as a data item 'Battery Data' 96a, and the Route Planner 94 is updated or adjusted based on a learning of the relations between the various input factors and data items to result in an updated route planner 94a as shown in an arrangement 90b shown in FIG. 9b.

Figure 11B:
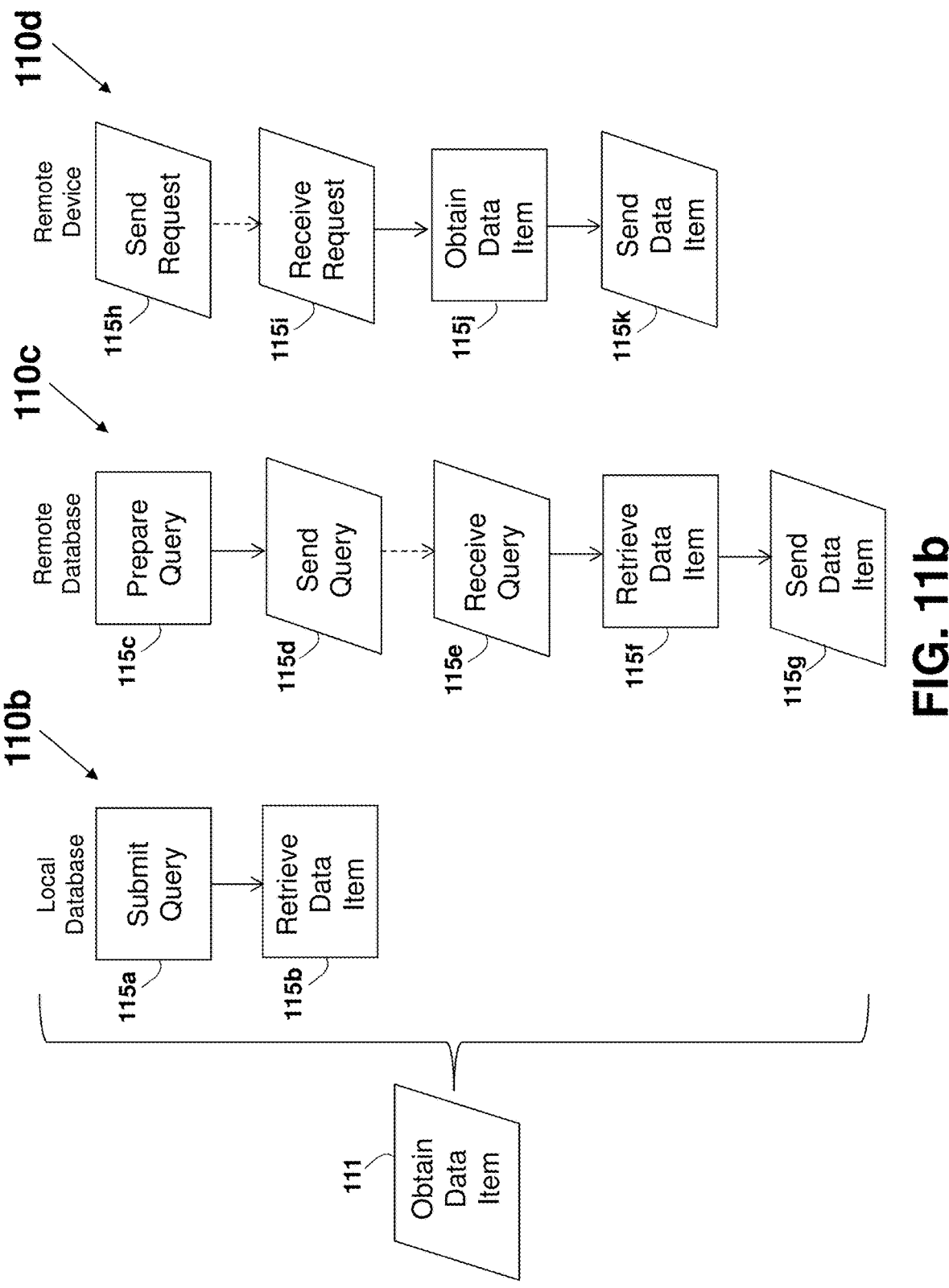
FIGS. 11*b* and 11*c* illustrate simplified schematic flow charts of a step of obtaining a data item.
Figure 11C:
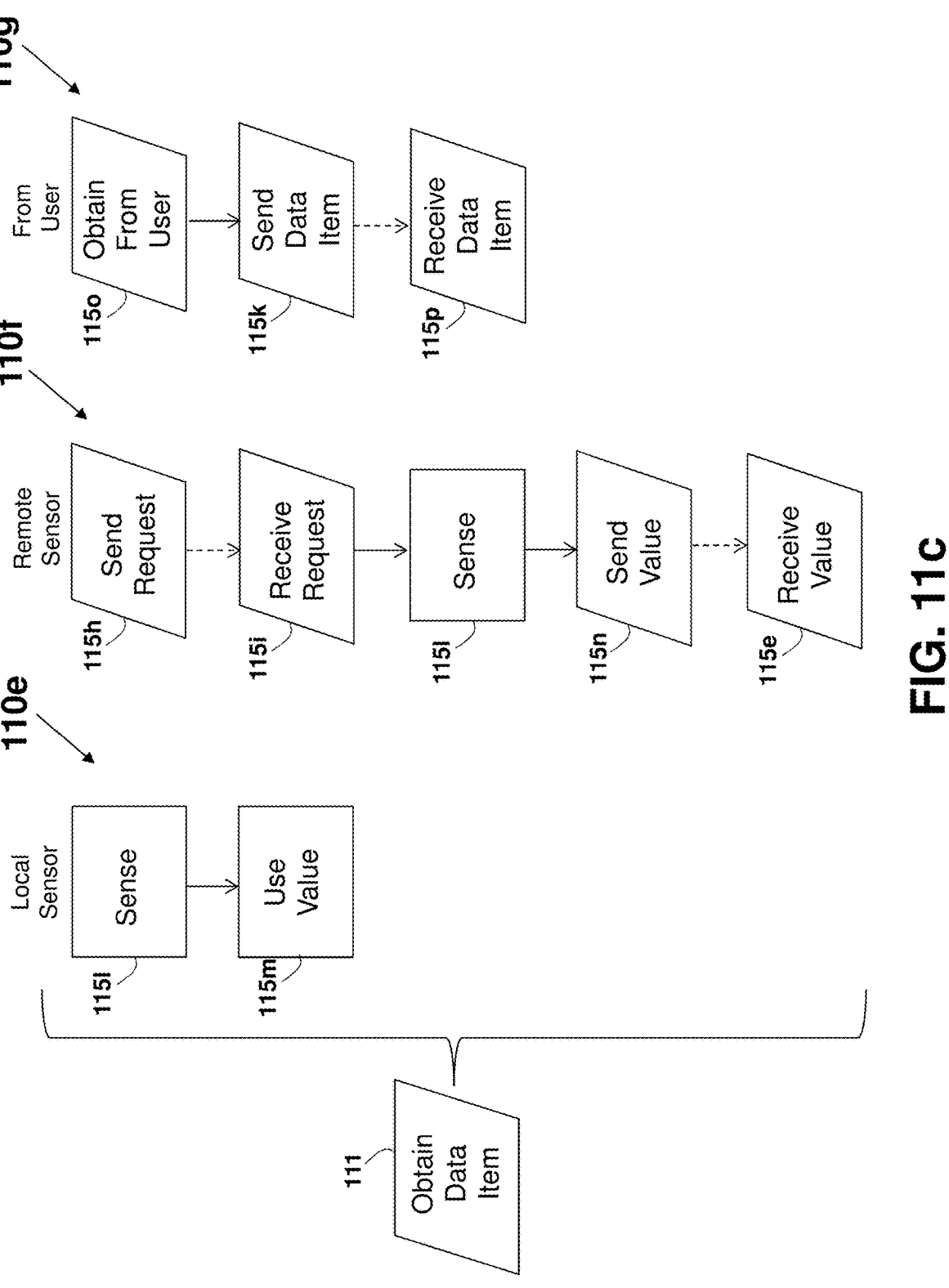
Figure 11D:
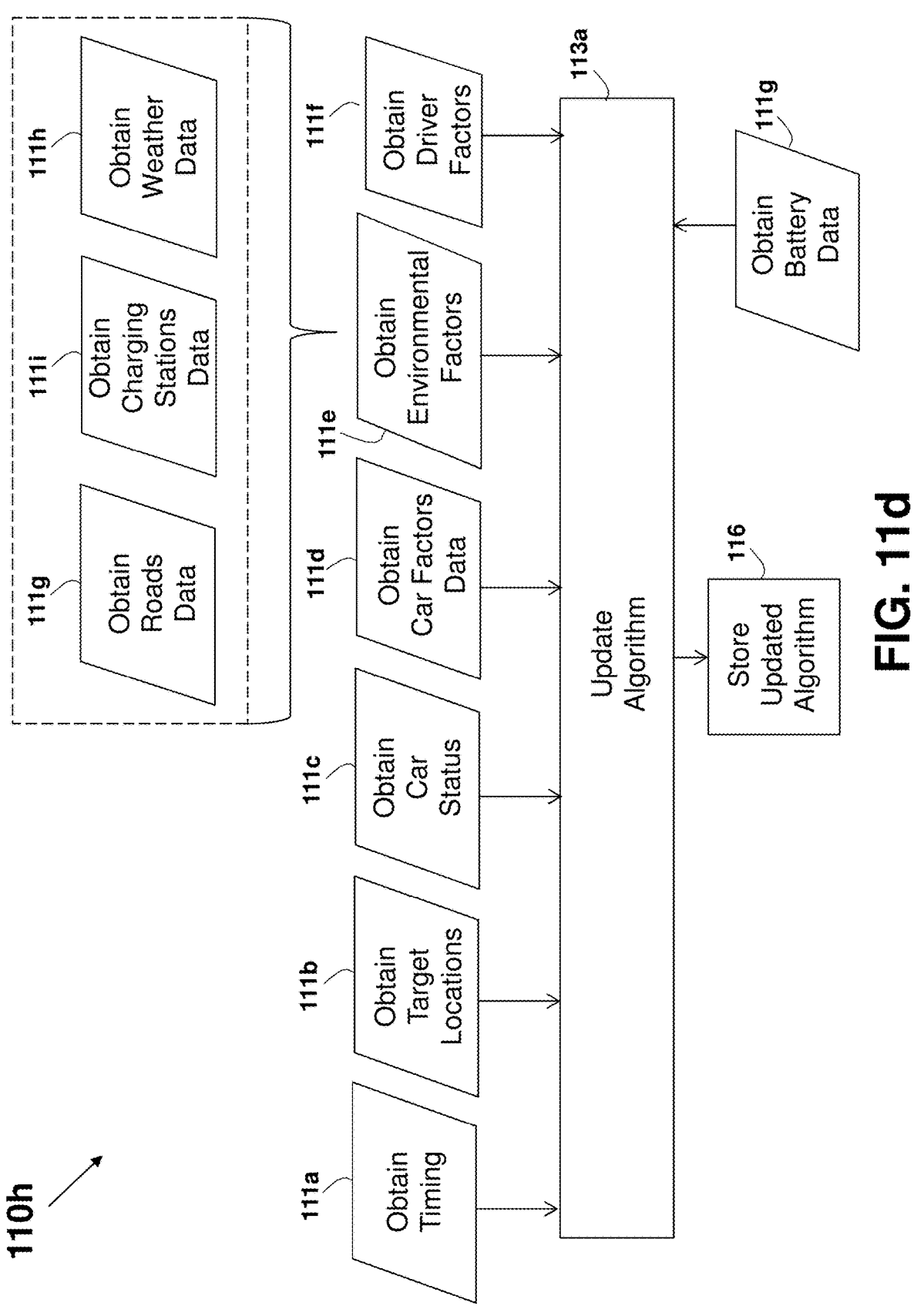
FIG. 11*d* illustrates a simplified schematic flow chart of a method for updating a planning algorithm when executing the optimal route.

A flow chart 110h of Machine Learning (ML) process that includes updating, adjusting, or improving the optimal routing algorithm that is generated as part of the "Plan Route" step 113 is shown in FIG. 11d. In addition to the obtaining and using the various data items shown in the flow chart 110 shown in FIG. 11, an "Obtain Battery Data" step 111g is added, where the battery status, such as the charge level or the discharging rate is estimated or measured during the executing of the optimal route as part of the "Execute Optimal Route" step 114d. The expected or planned battery level or battery discharging rate is compared to the actual estimation or measurement, and the algorithm is adjusted or updated accordingly as part of a "Update Algorithm" step 113a. As part of the trip itself as part of the "Execute Optimal Route" step 114d, or upon completing the trip, the updated algorithm generated as part of the "Update Algorithm" step 113a is stored in a memory, as part of a "Store Updated Algorithm" step 116, to be used in the next trip planning as part of the "Plan Route" step 113. The memory that stores the updated learned algorithm may be any device that stores the route planner 94, and the storing may include replacing the route planner 94 with the updated route planner 94a.

In the example where the "Plan Route" step 113 is performed by the smartphone 65a, the optimal route 97 may be sent over the link or connection 81b as part of the "Send Optimal Route" step 114a, and may be received as part of a "Receive Optimal Route" step 114b and used (such as being displayed) by the other smartphone 65b over the Internet 22 via the link or connection 81a. Alternatively or in addition, the optimal route 97 may be sent over the link or connection 81b as part of the "Send Optimal Route" step 114a, and may be received as part of a "Receive Optimal Route" step 114b and used (such as being displayed) by the electric car 30a over the Internet 22 via the link or connection 81g. Alternatively or in addition, the optimal route 97 may be sent over the link or connection 81b as part of the "Send Optimal Route" step 114a, and may be received as part of a "Receive Optimal Route" step 114b and used (such as being displayed) by the service server 23c over the Internet 22 via the link or connection 81j.

In the example where the "Plan Route" step 113 is performed by the service server 23c, the optimal route 97 may be sent over the link or connection 81j as part of the "Send Optimal Route" step 114a, and may be received as part of a "Receive Optimal Route" step 114b and used (such as being displayed) by the smartphone 65a over the Internet 22 via the link or connection 81b. Alternatively or in addition, the optimal route 97 may be sent over the link or connection 81j as part of the "Send Optimal Route" step 114a, and may be received as part of a "Receive Optimal Route" step 114b and used (such as being displayed) by the electric car 30a over the Internet 22 via the link or connection 81g.

In the example where the "Plan Route" step 113 is performed by the electric car 30a, the optimal route 97 may be sent over the link or connection 81g as part of the "Send Optimal Route" step 114a, and may be received as part of a "Receive Optimal Route" step 114b and used (such as being displayed) by the smartphone 65a over the Internet 22 via the link or connection 81b. Alternatively or in addition, the optimal route 97 may be sent over the link or connection 81g as part of the "Send Optimal Route" step 114a, and may be received as part of a "Receive Optimal Route" step 114b and used (such as being displayed) by the other electric car 30b over the Internet 22 via the link or connection 81f. Alternatively or in addition, the optimal route 97 may be sent over the link or connection 81g as part of the "Send Optimal Route" step 114a, and may be received as part of a "Receive Optimal Route" step 114b and used (such as being displayed) by the service server 23c over the Internet 22 via the link or connection 81j.

Figure 12:
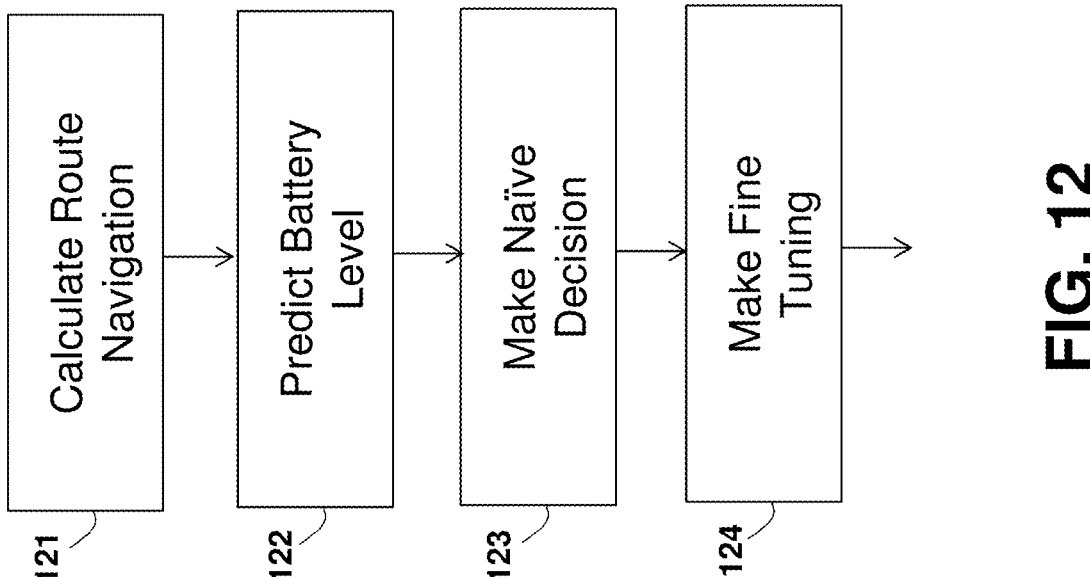
FIG. 12 illustrates a simplified schematic flow chart of an example of a clustering-based algorithm for generating an optimal route.
Figure 12:
Figure 13:
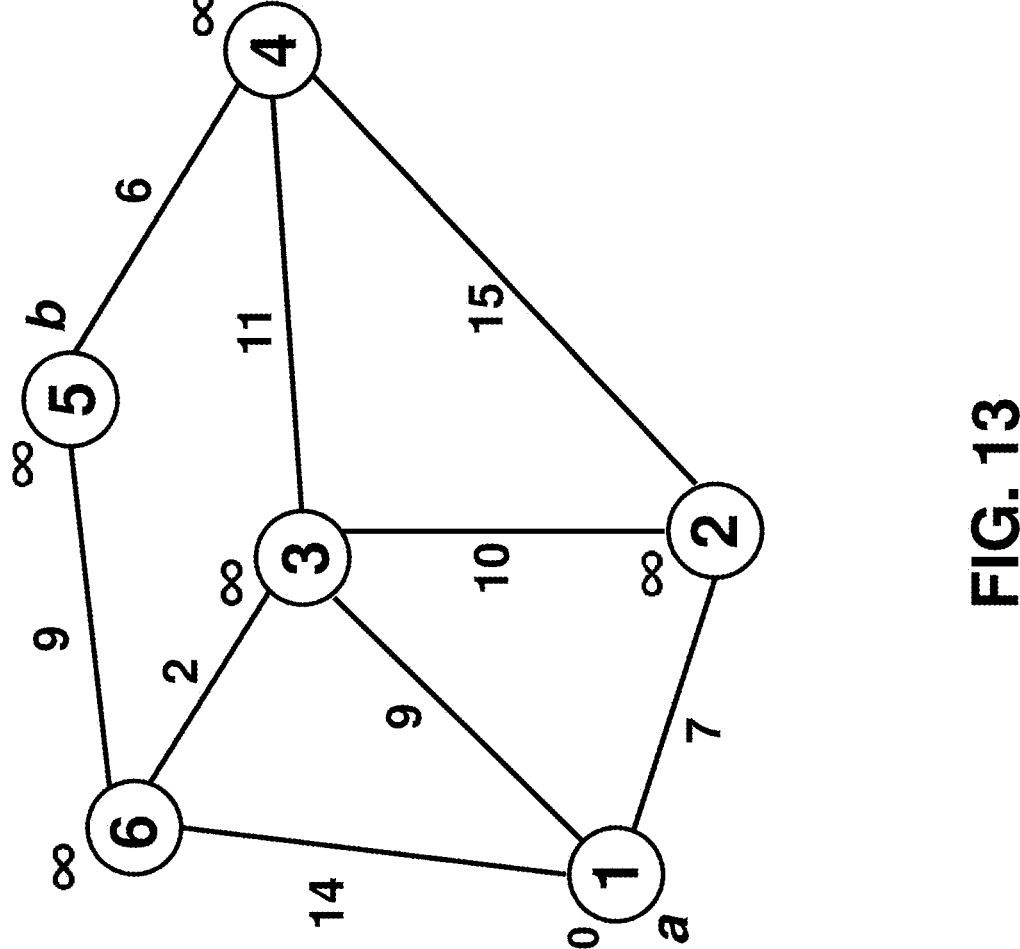
FIG. 13 depicts schematically a graph where prices are associated to routes between two points.
Figure 13:
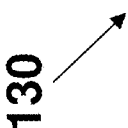
Figure 13A:
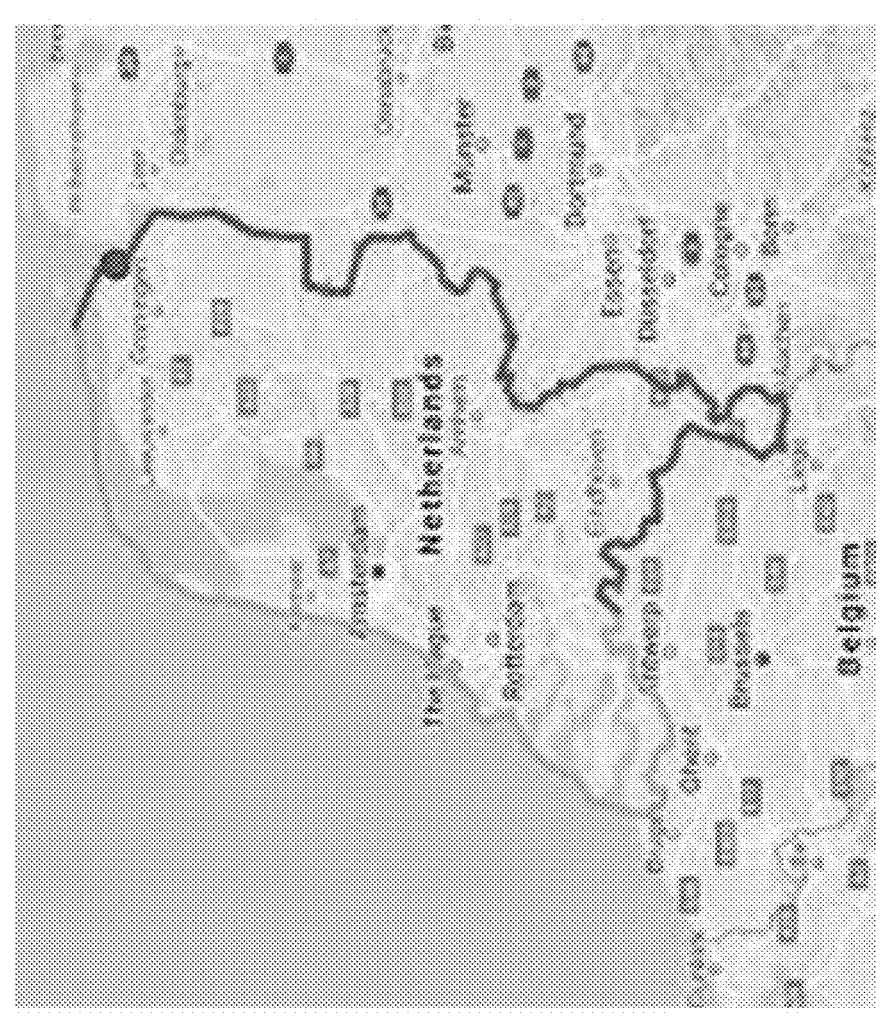
FIG. 13*a* depicts schematically a series of points (a polyline) on a map.
Figure 13A:

An example of a flow-chart 120 of a clustering-based algorithm that may be used as part of, or may include, the "Plan Route" step 113 is shown in FIG. 12. An example of a code that may be used as part of, or may include, the "Plan Route" step 113, is attached in an Appendix. The flow-chart 120 comprises four sequential phases, where each phase uses the results of a former phase. As part of a first phase "Calculate Route Navigation" 121, a graph of the points is formed on a map and prices are associated between two points, as exampled in a view 130 in FIG. 13. Then a navigation algorithm is performed for finding the optimal route that is associated with minimum cumulative prices, along a series of points (polyline) on the map, as exampled in a view 130a shown in FIG. 13a. In one example, the Dijkstra algorithm may be used.

Figure 13B:
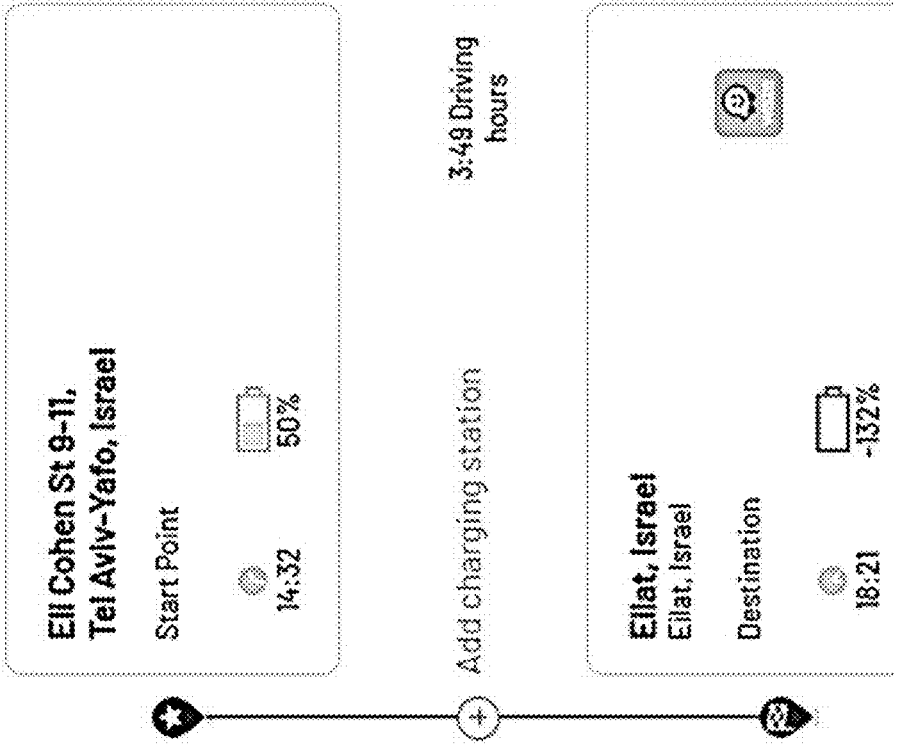
FIG. 13*b* depicts schematically a charging level of a battery along a route segment.
Figure 13C:
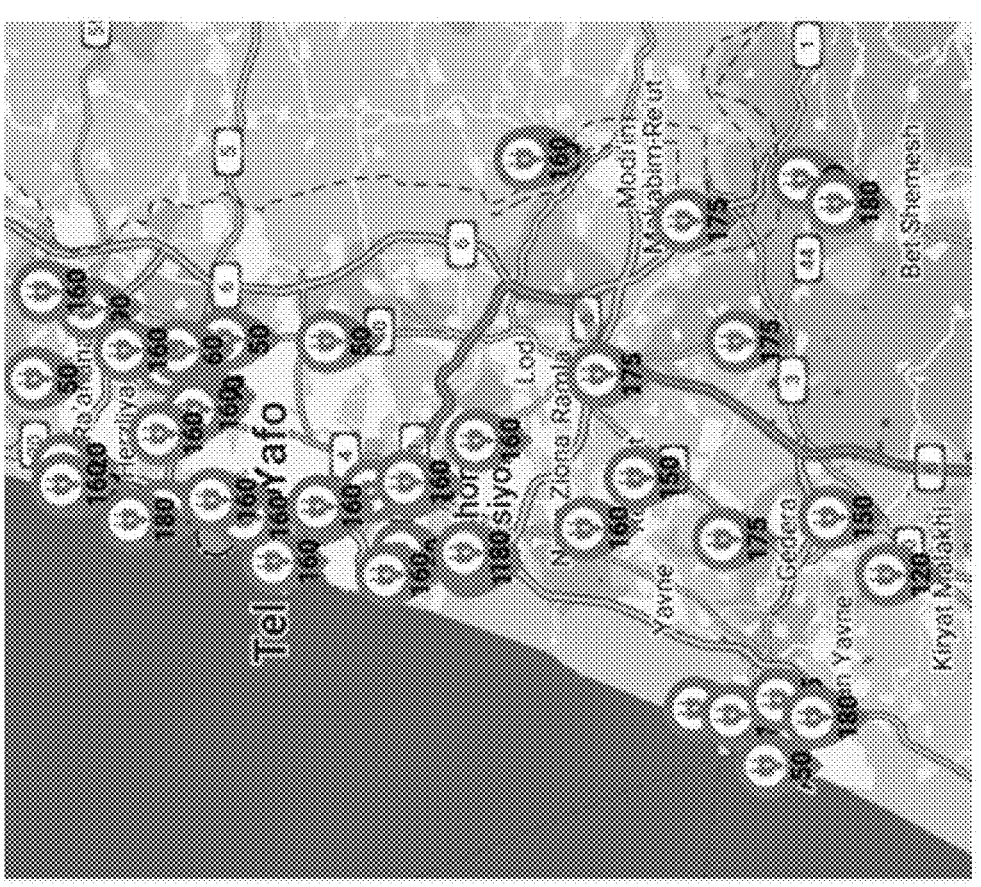
FIG. 13*c* depicts schematically locations of charging stations on a map.
Figure 13C:
Figure 13D:
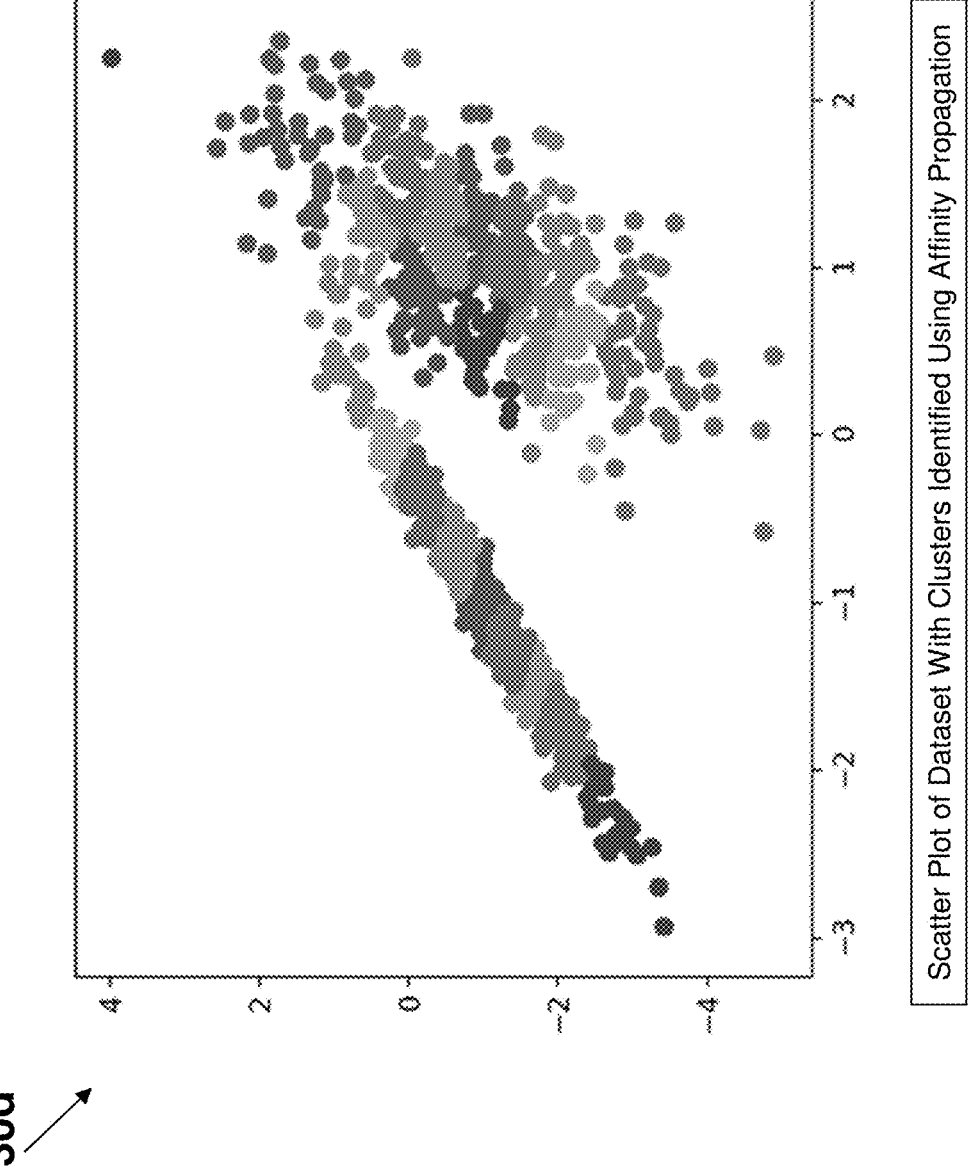
FIG. 13*d* depicts schematically a scatter plot of dataset with clusters identified using affinity propagation.
Figure 13E:
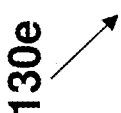
FIG. 13*e* depicts schematically an optimal route on a map.
Figure 13E:
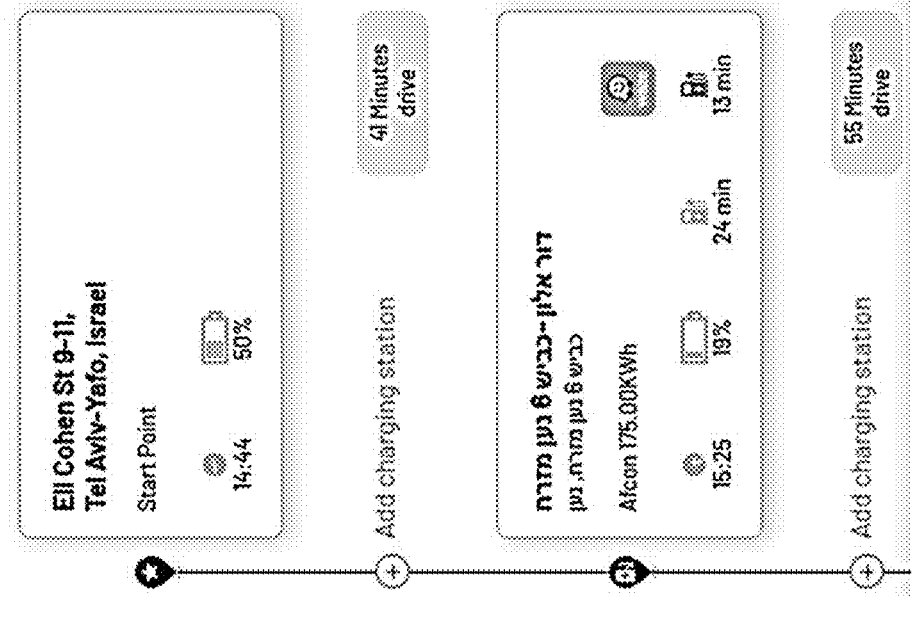
Figure 13E:
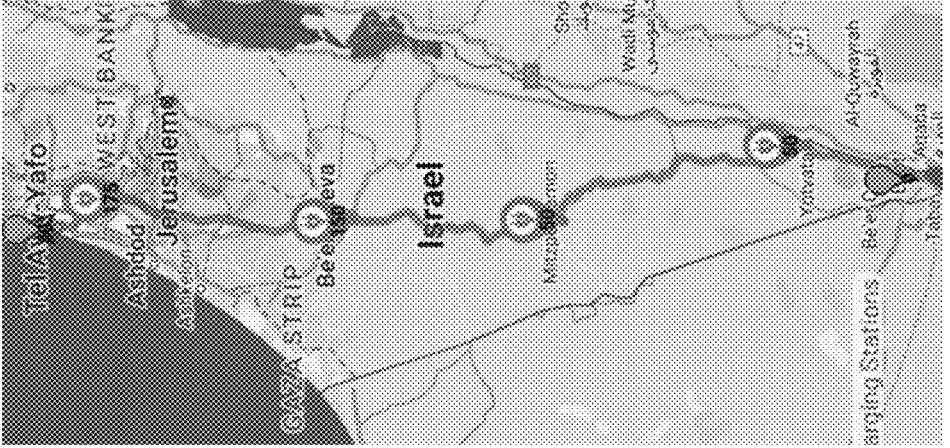

As part of a second phase "Predict Battery Level" 122, a level of battery charge when arriving to the destination point is calculated. If such battery charge level is lower than zero (0%) or lower than a pre-defined threshold, then charging needs to be optimized, as exampled in a view 130b shown in FIG. 13b. The charging is optimized by be introducing a naïve set of optional charging stations along the route as part of a third phase "Make Naïve Decision" step 123. An example of first naive cluster of charging-stations locations is shown in a view 130c in FIG. 13c. The set of charging stations is mainly based on the polyline from the first phase with additional data such as charging stations parameters such as speed or power level (KWh), user preferences such as preferred providers. This list of charging stations along the route is considered to be the "Naive Set" for the algorithm and it is the first cluster to be considered within the algorithm.

In order to choose the most efficient and relevant charging stations from the first set of naive charging stations options that are required for completing the route, a series of decision-making procedures are taken as part of a fourth phase "Make Fine Tuning" step 124. The charging stations to be used may be selected based on distance from original route, predicted battery charging level when arriving to the charging station, distance from the start point location (or from any previous point location), distance to destination point location, charging speed, price, arrival time, or any combination thereof. A K-mean weight grade is calculated for each possible charging station, creating a new set cluster of possible charging stations. This set can be drawn on a graph and is then creating a cartesian product between the highest K-mean Charging Stations calculating the new weight for the combination of the charging stations resulting in a sorted set when charging stations can be shown on a graph and can be picked by the algorithm to complete the most efficient route based on the input parameters (user preferences). As example of such scatter plot of dataset with clusters identified using affinity propagation is shown in a view 130_d_ in FIG. 13_d_.

The flow chart 120 shown in FIG. 12 results in a complete route with multiple stops and additional charging stations, as well as calculated times needed for the travel, charging, and arriving at the destination. Further, the flow chart 120 results in the locations of the recommended charging stations to use, their prices, as well as a complete route that includes the start point location, the destination point location, the stops along the route, the charging stations to use along the route, a time of arriving and leaving each location or charging station, state of battery charge in each stop, time needed for charging in each charging station, pricing for the charging, and any combination thereof, as well as a polyline format of the whole route. An example of an output of such an algorithm is shown as a view 130_e_ in FIG. 13_e_.

Flow charts 110_b_-110_f_ shown in FIGS. 11_b_ and 11_c_ describes various alternatives for implementing an "Obtain Data Item" step 111, that may correspond to, may include, or may be included in, any one (or more) of the data obtaining steps shown in the flow-chart 110 in FIG. 11, such as the "Obtain Timing" step 111_a_, the "Obtain Target Location" step 111_b_, the "Obtain Car Status" step 111_c_, the "Obtain Car Factors Data" step 111_d_, the "Obtain Driver Factors" step 111_f_, the "Obtain Roads Data" step 111_g_, the "Obtain Weather Data" step 111_h_, the "Obtain Charging Stations Data" 111_i_, or any combination thereof.

The flow-chart 110_b_ shown in FIG. 11_b_ describes an obtaining of a data item from a local database, where the database is part of, or is directly connected to, the device that executes part of, or whole of, the "Route Plan" step 113. A query for the required data item is prepared and locally submitted to the database as part of a "Submit Query" step 115_a_, and the data item is retrieved from the local database as part of a "Retrieve Data Item" 115_b_, for use as part of the "Route Plan" step 113.

In one example, the "Plan Route" step 113 (or part thereof) is performed by the smartphone 65_a_. In such a case, a data item may be locally retrieved from the local database 67_a_ shown as part of the block diagram 65 shown in FIG. 6. Alternatively or in addition, the "Plan Route" step 113 (or part thereof) is performed by the service server 23_c_. In such a case, a data item may be locally retrieved from the connected or integrated local database 82_c_ shown as part of the arrangement 80 shown in FIG. 8. Alternatively or in addition, the "Plan Route" step 113 (or part thereof) is performed in the electric car 30_a_. In such a case, a data item may be locally retrieved from a database in the electric car 30_a_.

The flow-chart 110_c_ shown in FIG. 11_b_ describes an obtaining of a data item from a remote database, such as a database available via the Internet 22, where the database part of a device that is not part of, or is not directly connected to, another requesting device that executes part of, or whole of, the "Route Plan" step 113. A query for the required data item is prepared as part of a "Prepare Query" step 115_c_, and send to the device that stores the database as part of a "Send Query" step 115_d_. The request is received by the database-stored device as part of a "Receive Query" step 115_e_, where the requested data item is retrieved from the database as part of a "Retrieve Data Item" 115_f_ (that may be the same as, similar to, or different from, the "Retrieve Data Item" 115_b_), and then the retrieved data item is sent to the requesting device (such as over the Internet 22) as part of the "Send Data Item" step 115_g_, to be received and used thereon as part of the "Route Plan" step 113.

In one example, the data item to be retrieved as part of the generic "Obtain Data Item" step 111 is stored in the smartphone 65_a_, such as in the database 67_a_ shown as part of the block diagram 65 shown in FIG. 6. Upon receiving a query as part of the "Receive Query" step 115_e_ by the smartphone 65_a_ over the connection or link 81_b_, the requested data item is retrieved from the database 67_a_ as part of the "Retrieve Data Item" step 115_f_, and sent to the requesting device as part of the "Send Data Item" step 115_g_. For example, the requesting device may be the smartphone 65_b_, where the request for the data item as part of the "Send Query" step 115_d_, as well as the receiving of the data item in response to the sending of the data item as part of the "Send Data Item" step 115_g_, is over the Internet via the connection or link 81_a_. Alternatively or in addition, the requesting device may be the service server 23_c_, where the request for the data item as part of the "Send Query" step 115_d_, as well as the receiving of the data item in response to the sending of the data item as part of the "Send Data Item" step 111_g_, is over the Internet via the connection or link 81_j_. Alternatively or in addition, the requesting device may be the electric car 30_a_, where the request for the data item as part of the "Send Query" step 115_d_, as well as the receiving of the data item in response to the sending of the data item as part of the "Send Data Item" step 115_g_, is over the Internet via the connection or link 81_g_.

In another example, the data item to be retrieved as part of the generic "Obtain Data Item" step 111 is stored in the database 82_c_ shown as part of the arrangement 80 shown in FIG. 8. Upon receiving a query as part of the "Receive Query" step 115_e_ by the service server 23_c_ over the connection or link 81_j_, the requested data item is retrieved from the database 82_c_ as part of the "Retrieve Data Item" step 115_f_, and sent to the requesting device as part of the "Send Data Item" step 115_g_. For example, the requesting device may be the smartphone 65_a_, where the request for the data item as part of the "Send Query" step 115_d_, as well as the receiving of the data item in response to the sending of the data item as part of the "Send Data Item" step 115_g_, is over the Internet via the connection or link 81_b_. Alternatively or in addition, the requesting device may be the electric car 30_a_, where the request for the data item as part of the "Send Query" step 115_d_, as well as the receiving of the data item in response to the sending of the data item as part of the "Send Data Item" step 115_g_, is over the Internet via the connection or link 81_g_.

Figure 2:
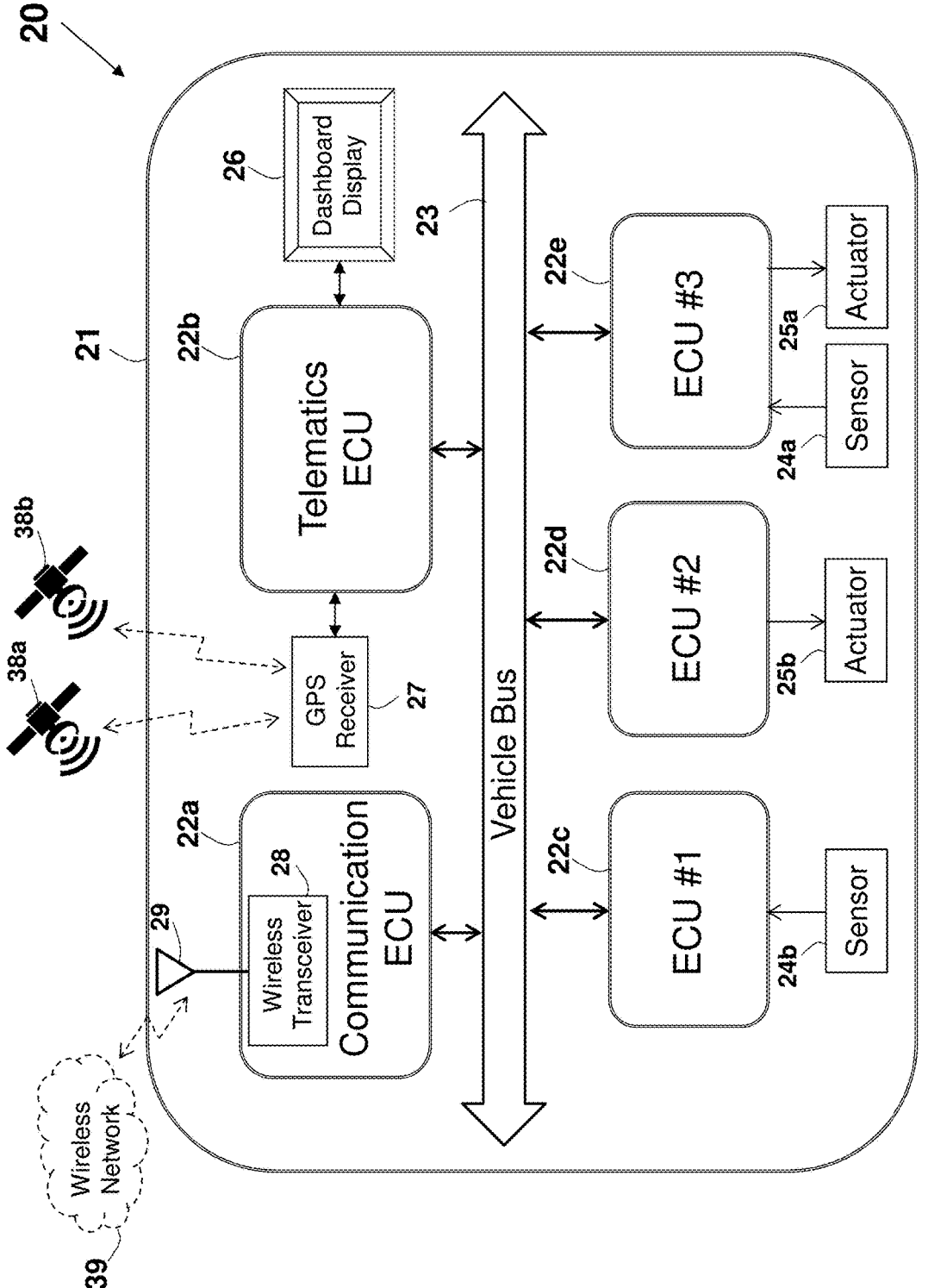
FIG. 2 illustrates a simplified schematic block diagram of a prior-art electronics architecture in a vehicle.
Figure 2B:
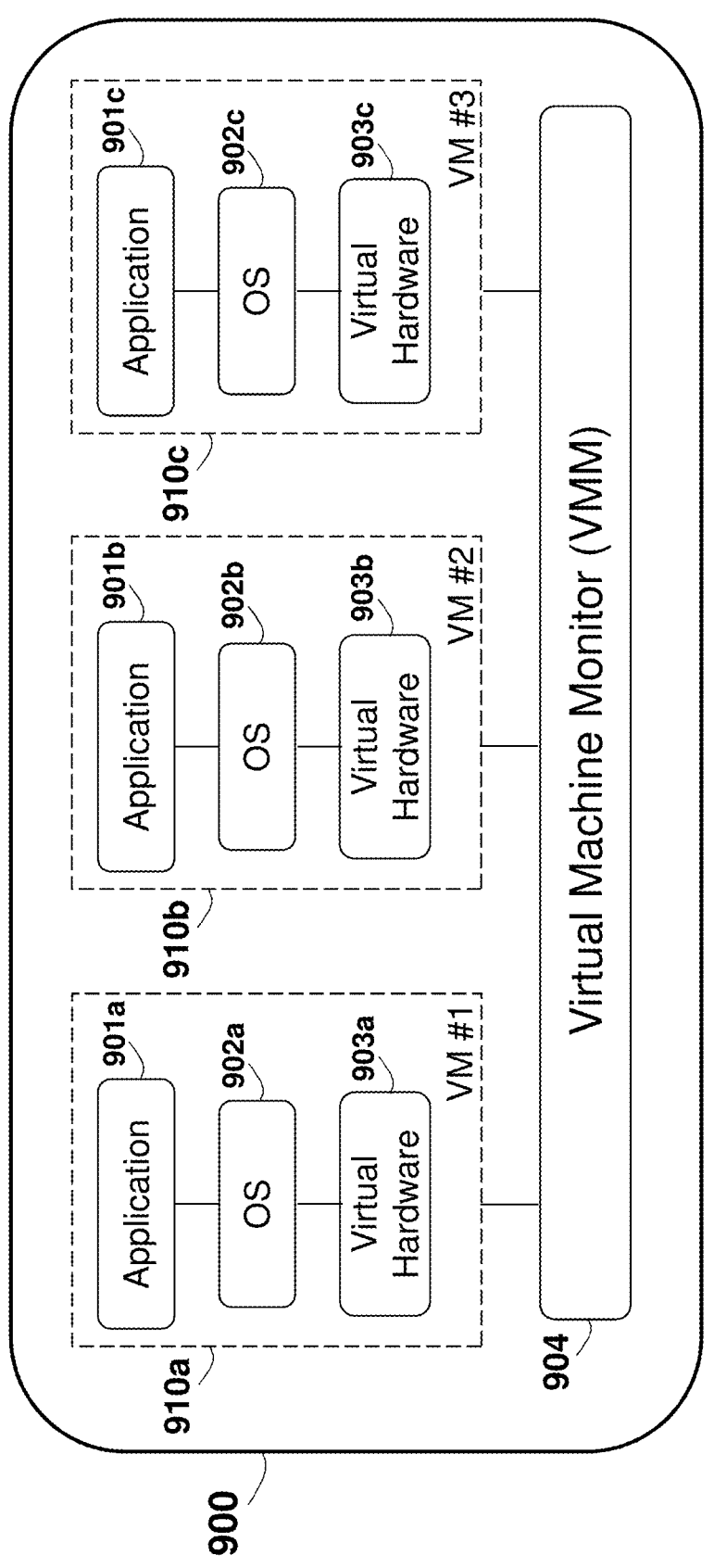
FIG. 2b illustrates schematically a prior-art arrangement of virtualization.
Figure 2C:
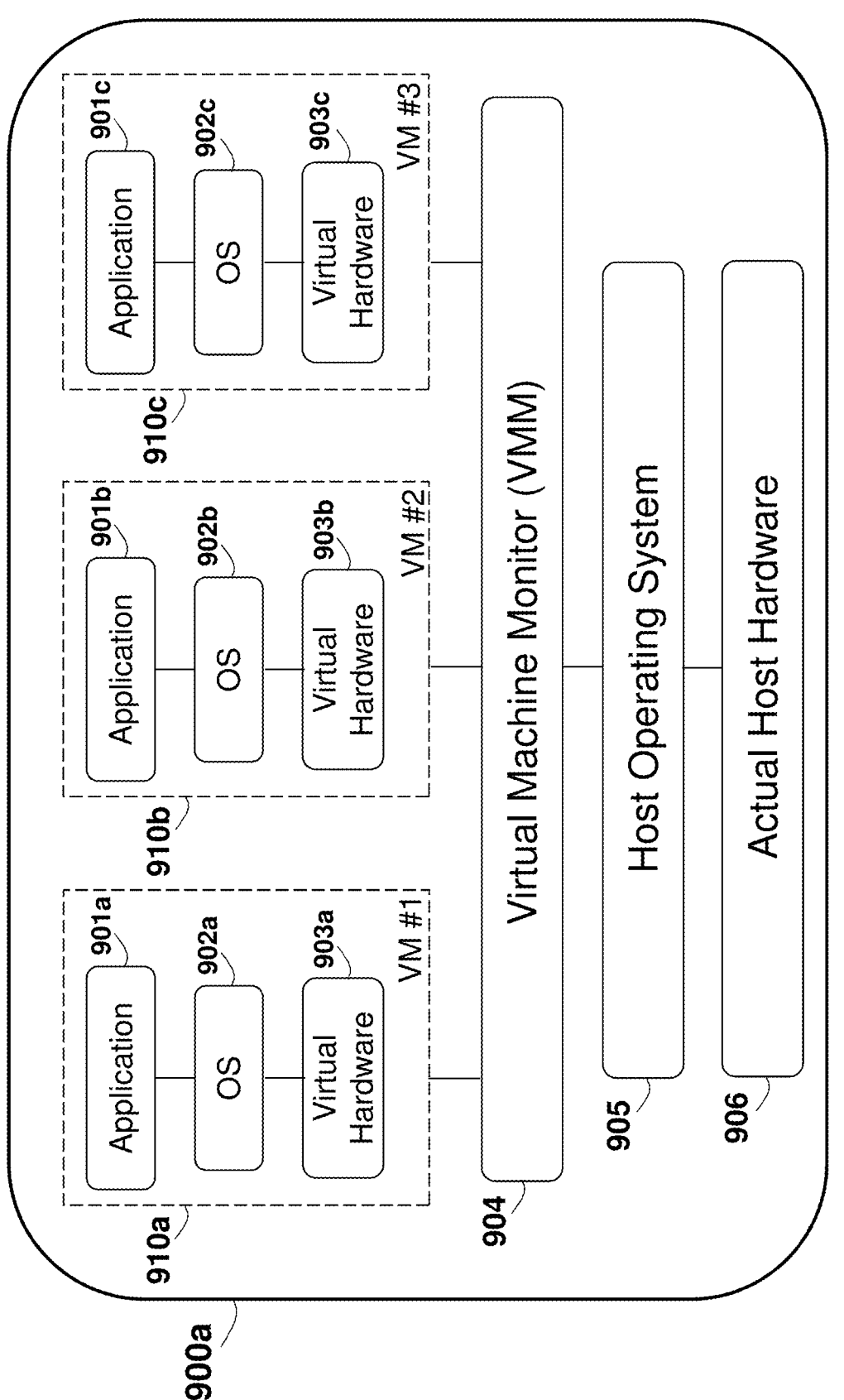
FIG. 2c illustrates schematically a prior-art arrangement of hosted architecture of virtualization.
Figure 2D:
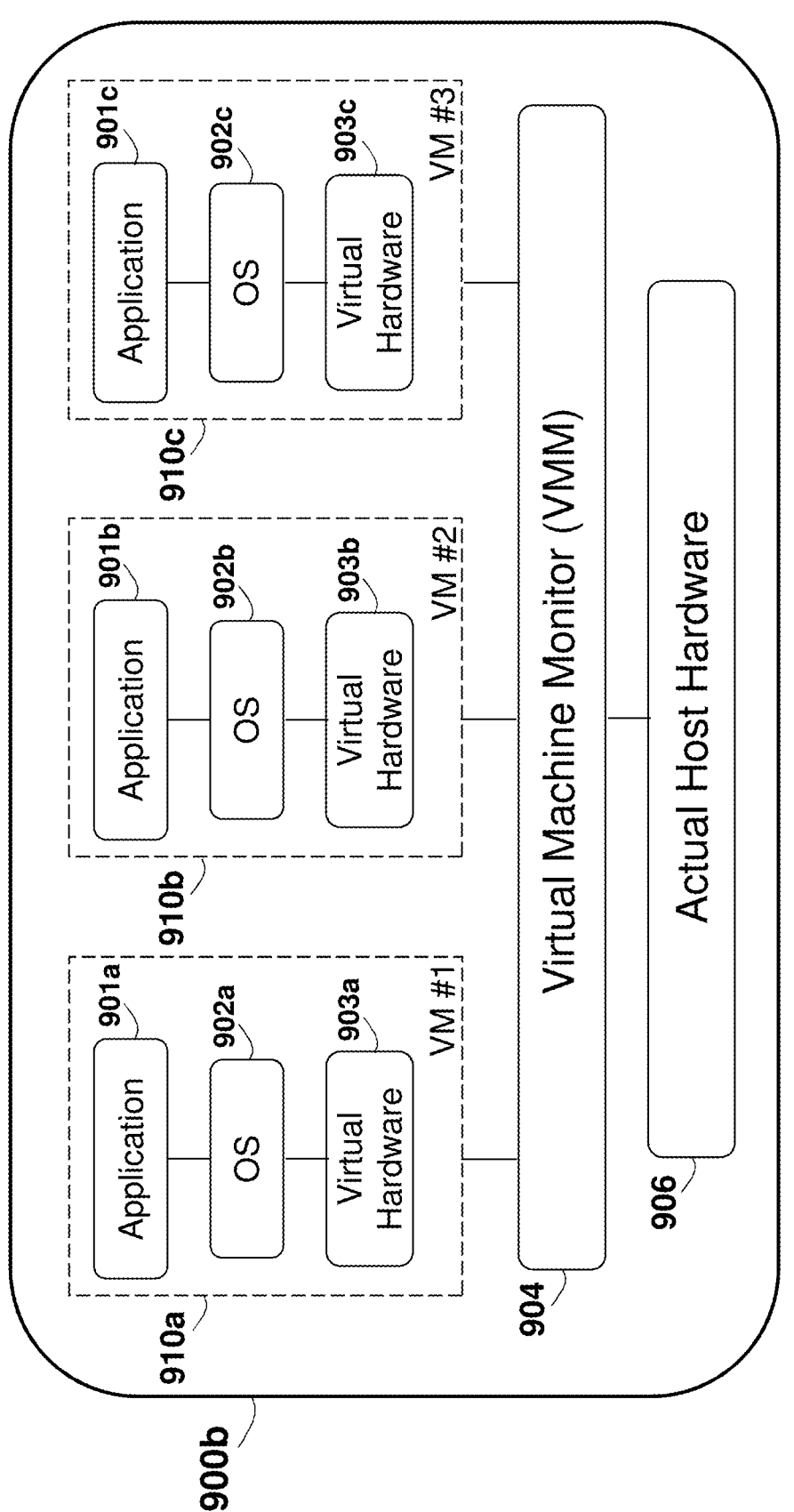
FIG. 2d illustrates schematically a prior-art arrangement of bare-metal (hypervisor) architecture of virtualization.

In another example, the data item to be retrieved as part of the generic "Obtain Data Item" step 111 is stored in a database in the electric car 30_a_, such as being part of the Telematics ECU 22_b_ shown as part of the car arrangement 21 shown in FIG. 2. Upon receiving a query as part of the "Receive Query" step 115_e_ by the service server 23_c_ over the connection or link 81_j_, the requested data item is retrieved from the database in the car 30_a_ as part of the "Retrieve Data Item" step 115_f_, and sent to the requesting device as part of the "Send Data Item" step 115_g_. For example, the requesting device may be the smartphone 65_a_, where the request for the data item as part of the "Send Query" step 115_d_, as well as the receiving of the data item in response to the sending of the data item as part of the "Send Data Item" step 115_g_, is over the Internet via the connection or link 81_b_. Alternatively or in addition, the requesting device may be the service server 23_c_, where the request for the data item as part of the "Send Query" step 115*d*, as well as the receiving of the data item in response to the sending of the data item as part of the "Send Data Item" step 115*g*, is over the Internet via the connection or link 81*j*. Alternatively or in addition, the requesting device may be the other electric car 30*b*, where the request for the data item as part of the "Send Query" step 115*d*, as well as the receiving of the data item in response to the sending of the data item as part of the "Send Data Item" step 115*g*, is over the Internet via the connection or link 81*f*.

The flow-chart 110*d* shown in FIG. 11*b* describes an obtaining of a data item from a remote device, such as over the Internet 22, where the data item is available in a device that is not part of, or is not directly connected to, another requesting device that executes part of, or whole of, the "Plan Route" step 113. A request for the required data item is send to the device that stores the required data item as part of a "Send Request" step 115*h*. The request is received by the device that stores the requested data item as part of a "Receive Request" step 115*i*, where the requested data item is locally identified and obtained as part of an "Obtain Data Item" 115*j* (that may be the same as, similar to, or different from, the "Retrieve Data Item" 115*b*), and then the identified and obtained data item is sent to the requesting device (such as over the Internet 22) as part of the "Send Data Item" step 111*k*, to be received and used thereon as part of the "Plan Route" step 113.

In one example, the data item to be retrieved as part of the generic "Obtain Data Item" step 111 is stored in the smartphone 65*a*. Upon receiving a request as part of the "Receive Request" step 115*i* by the smartphone 65*a* over the connection or link 81*b*, in response to the sending of the request for the data item as part of the "Send Request" step 115*h*, the requested data item is identified and obtained as part of the "Obtain Data Item" step 115*j*, and sent to the requesting device as part of the "Send Data Item" step 115*k*. For example, the requesting device may be the other smartphone 65*b*, where the request for the data item as part of the "Send Request" step 115*h*, as well as the receiving of the data item in response to the sending of the data item as part of the "Send Data Item" step 111*k*, is over the Internet via the connection or link 81*a*. Alternatively or in addition, the requesting device may be the electric car 30*a*, where the request for the data item as part of the "Send Request" step 115*h*, as well as the receiving of the data item in response to the sending of the data item as part of the "Send Data Item" step 115*k*, is over the Internet via the connection or link 81*g*. Alternatively or in addition, the requesting device may be the service server 23*c*, where the request for the data item as part of the "Send Request" step 115*h*, as well as the receiving of the data item in response to the sending of the data item as part of the "Send Data Item" step 115*k*, is over the Internet via the connection or link 81*j*.

In one example, the data item to be retrieved as part of the generic "Obtain Data Item" step 111 is stored in the connected car 30*a*. Upon receiving a request as part of the "Receive Request" step 115*i* by the connected car 30*a* over the connection or link 81*g*, in response to the sending of the request for the data item as part of the "Send Request" step 115*h*, the requested data item is identified and obtained as part of the "Obtain Data Item" step 115*j*, and sent to the requesting device as part of the "Send Data Item" step 115*k*. For example, the requesting device may be the other electric car 30*b*, where the request for the data item as part of the "Send Request" step 115*h*, as well as the receiving of the data item in response to the sending of the data item as part of the "Send Data Item" step 115*k*, is over the Internet via the connection or link 81*f*. Alternatively or in addition, the requesting device may be the service server 23*c*, where the request for the data item as part of the "Send Request" step 115*h*, as well as the receiving of the data item in response to the sending of the data item as part of the "Send Data Item" step 115*k*, is over the Internet via the connection or link 81*j*.

In one example, the data item to be retrieved as part of the generic "Obtain Data Item" step 111 is stored in the data server #1 23*a*. Upon receiving a request as part of the "Receive Request" step 115*i* by the data server #1 23*a* over the connection or link 81*i*, in response to the sending of the request for the data item as part of the "Send Request" step 115*h*, the requested data item is identified and obtained as part of the "Obtain Data Item" step 115*j*, and sent to the requesting device as part of the "Send Data Item" step 115*k*. For example, the requesting device may be the electric car 30*a*, where the request for the data item as part of the "Send Request" step 115*h*, as well as the receiving of the data item in response to the sending of the data item as part of the "Send Data Item" step 115*k*, is over the Internet via the connection or link 81*g*. Alternatively or in addition, the requesting device may be the service server 23*c*, where the request for the data item as part of the "Send Request" step 115*h*, as well as the receiving of the data item in response to the sending of the data item as part of the "Send Data Item" step 115*k*, is over the Internet via the connection or link 81*j*. Alternatively or in addition, the requesting device may be the smartphone 65*a*, where the request for the data item as part of the "Send Request" step 115*h*, as well as the receiving of the data item in response to the sending of the data item as part of the "Send Data Item" step 115*k*, is over the Internet via the connection or link 81*b*.

The flow-chart 110*g* shown in FIG. 11*c* describes an obtaining of a data item from a human user. For example, the user may obtain weather information from the new in a radio or television, and enters this data manually to be used by the "Plan Route" step 113. The data item may be obtained from the human user as part of a "Obtain From User" step 115*o*, such as by using the input component 68 of the smartphone 65, or using an input component as part of the Telematics ECU 22*b* as part of the car 21 shown in FIG. 2. Such input component 68 may include hard/soft keyboard, mouse, resistive or capacitive touch display, a touchscreen, a pointing device (such as a 'computer mouse'), a scanner, a digital camera, a joystick, or any combination thereof. The data item obtained from the user as part of the "Obtain From User" step 115*o*, may be used locally in the same device that includes the input component (such as the smartphone 65*a*), or may be sent to another device, such as via the connection or link 81*b*, over the Internet 22 as part of a "Send Data Item" step 115*k*. For example, the obtained data item may be sent to the other smartphone 65*b*, to the electric car 30*a*, to the service server 23*c*, or any combination thereof, to be received and used thereon as part of a "Receive Data Item" step 115*p*.

In one example, a data item comprises, or corresponds to, a value of a measured or sensed physical phenomenon, using a sensor. The flow-chart 110*e* shown in FIG. 11*c* describes an obtaining of a data item from a sensor, where the sensor is part of, or integrated with, the device that executes part of, or whole of, the "Plan Route" step 113. The data item is obtained by reading the sensor output value that represents, or corresponds to, the measured or sensed physical phenomenon, as part of a "Sense" step 115*l*, and the sensed or measured value is used as part of the "Plan Route" step 113 as part of a "Use Value" step 115*m*.

Alternatively or in addition, the sensor may be part of a device that is not part of, or is not directly connected to, another requesting device that executes part of, or whole of, the "Plan Route" step 113, as shown in a flow-chart 110*f* shown in FIG. 11*c*. A request for the required data item is send to the device that is associated with the sensor as part of a "Send Request" step 115*h*. The request is received by the device that includes (or is connected to) the sensor as part of a "Receive Request" step 115*i*, where the requested data item is obtained by reading the requested value from the sensor as part of the "Sense" step 115*l*, and then the retrieved data item (that corresponds to the value read from the sensor) is sent to the requesting device (such as over the Internet 22) as part of the "Send Value" step 115*n*, to be received thereon as part of a "Receive Value" step 115*e*, to be used thereon as part of the "Plan Route" step 113.

In one example, the sensor used as part of the "Sense" step 115*l* comprises a sensor in the smartphone 65*a*, such as the sensor 69 that is part of the device 65 shown in FIG. 6. Alternatively or in addition, the sensor used as part of the "Sense" step 115*l* comprises a sensor in the electric car 30*a*, such as the sensor 24*a* shown as part of the vehicle 21 in FIG. 2.

In one example, the sensor 69 or the sensor 24*a* is used to measure, sense or detect the temperature of an object, that may be solid, liquid or gas (such as the air temperature), in a location. Such a sensor may be based on a thermistor, which is a type of resistor whose resistance varies significantly with temperature, and is commonly made of ceramic or polymer material. A thermistor may be a PTC (Positive Temperature Coefficient) type, where the resistance increases with increasing temperatures, or may be an NTC (Negative Temperature Coefficient) type, where the resistance decreases with increasing temperatures. Alternatively (or in addition), a thermoelectric sensor may be based on a thermocouple, consisting of two different conductors (usually metal alloys), that produce a voltage proportional to a temperature difference. For higher accuracy and stability, an RTD (Resistance Temperature Detector) may be used, typically consisting of a length of fine wire-wound or coiled wire wrapped around a ceramic or glass core. The RTD is made of a pure material whose resistance at various temperatures is known (R vs. T). A common material used may be platinum, copper, or nickel. A quartz thermometer may be used as well for high-precision and high-accuracy temperature measurement, based on the frequency of a quartz crystal oscillator. The temperature may be measured using conduction, convection, thermal radiation, or by the transfer of energy by phase changes. The temperature may be measured in degrees Celsius (° C.) (a.k.a. Centigrade), Fahrenheit (° F.), or Kelvin (° K). In one example, the temperature sensor (or its output) is used to measure a temperature gradient, providing in which direction and at what rate the temperature changes the most rapidly around a particular location. The temperature gradient is a dimensional quantity expressed in units of degrees (on a particular temperature scale) per unit length, such as the SI (International System of Units) unit Kelvin per meter (K/m).

Any sensor herein may be an electrical sensor used to measure electrical quantities or electrical properties. The electrical sensor may be conductively connected to the measured element. Alternatively or in addition, the electrical sensor may use non-conductive or non-contact coupling to the measured element, such as measuring a phenomenon associated with the measured quantity or property. The electric sensor may be a current sensor or an ampmeter (a.k.a. ampermeter) for measuring DC or AC (or any other waveform) electric current passing through a conductor or wire. The current sensor may be connected such that part or all of the measured electric current may be passing through the ampermeter, such as a galvanometer or a hot-wire ampermeter. An ampermeter may be a current clamp or current probe, and may use the 'Hall effect' or a current transformer concept for non-contact or non-conductive current measurement. The electrical sensor may be a voltmeter for measuring the DC or AC (or any other waveform) voltage, or any potential difference between two points. The voltmeter may be based on the current passing a resistor using the Ohm's law, may be based on a potentiometer, or may be based on a bridge circuit.

The sensor may be a wattmeter measuring the magnitude of the active AC or DC power (or the supply rate of electrical energy). The wattmeter may be a bolometer, used for measuring the power of incident electromagnetic radiation via the heating of a material with a temperature-dependent electrical resistance. The sensor may be an electricity AC (single or multi-phase) or DC type meter (or electrical energy meter), that measures the amount of electrical energy consumed by a load. The electricity meter may be based on a wattmeter, which accumulates or takes the average readings, may be based on induction, or may be based on multiplying measured voltage and current.

The electrical sensor may be an ohmmeter for measuring the electrical resistance (or conductance), and may be a megohmmeter or a microohmeter. The ohmmeter may use the Ohm's law to derive the resistance from voltage and current measurements, or may use a bridge such as a Wheatstone bridge. The sensor may be a capacitance meter for measuring capacitance. A sensor may be an inductance meter for measuring inductance. A sensor may be an impedance meter for measuring an impedance of a device or a circuit. A sensor may be an LCR meter, used to measure inductance (L), capacitance (C), and resistance (R). A meter may use sourcing a DC or an AC voltage, and use the ratio of the measured voltage and current (and their phase difference) through the tested device according to Ohm's law to calculate the resistance, the capacitance, the inductance, or the impedance (R=V/I). Alternatively or in addition, a meter may use a bridge circuit (such as Wheatstone bridge), where variable calibrated elements may be adjusted to detect a null. The measurement may be using DC with a single frequency or a range of frequencies.

Any sensor herein may be a scalar or a vector magnetometer for measuring an H or B magnetic fields. The magnetometer may be based on a Hall effect sensor, magneto-diode, magneto-transistor, AMR magnetometer, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor (a.k.a. Nuclear Magnetic Resonance—NMR), optically pumped magnetic field sensor, fluxgate magnetometer, search coil magnetic field sensor, or Superconducting Quantum Interference Device (SQUID) magnetometer.

Any sensor herein may be an occupancy sensor for detecting occupancy of a space by a human body, and the sensor output may be responsive to detecting a presence of a human by using electric effect, inductive coupling, capacitive coupling, triboelectric effect, piezoelectric effect, fiber optic transmission, or radar intrusion sensing. The occupancy sensor may consist of, may comprise, or may be based on, an acoustic sensor, opacity, geomagnetism, magnetic sensors, magnetometer, reflection of transmitted energy, infrared laser radar, microwave radar, electromagnetic induction, or vibration. Alternatively or in addition, the occupancy sensor may consist of, may comprises, or may be based on, a motion sensor that may be a mechanically actuated sensor, passive or active electronic sensor, ultrasonic sensor, microwave sensor, tomographic detector, Passive Infra-Red (PIR) sensor, laser optical detector, or acoustical detector. Alternatively or in addition, the sensor may be a photoelectric sensor that may respond to a visible or an invisible light, the invisible light may be infrared, ultraviolet, X-rays, or gamma rays, and the photoelectric sensor may be based on the photoelectric or photovoltaic effect, and may consist of, or may comprise, a semiconductor component that may consist of, or may comprise, a photodiode, or a phototransistor that may be based on Charge-Coupled Device (CCD) or a Complementary Metal-Oxide Semiconductor (CMOS) component. Alternatively or in addition, the sensor may be an electrochemical sensor that may respond to an object chemical structure, properties, composition, or reactions, the electrochemical sensor may be a pH meter or a gas sensor responding to a presence of radon, hydrogen, oxygen, or Carbon-Monoxide (CO), may be based on optical detection or on ionization and may be a smoke, a flame, or a fire detector, or may be responsive to combustible, flammable, or toxic gas.

Alternatively or in addition, the sensor may be an electrical sensor that may respond to an electrical characteristics or an electrical phenomenon quantity in an electrical circuit, and may be conductively coupled to the electrical circuit, or may be a non-contact sensor that may be non-conductively coupled to the electrical circuit. The electrical sensor may be responsive to an Alternating Current (AC) or a Direct Current (DC) electric signal.

The electrical sensor may be an ampermeter that responds to electrical current passing through a conductor or wire, and may consist of, or may comprise, a galvanometer, a hot-wire ampermeter, a current clamp, or a current probe. The electrical sensor may be an AC ampermeter connected to measure an AC current from the AC power source or an AC current via the AC load. Alternatively or in addition, the electrical sensor may be a voltmeter that may respond to an electrical voltage, and may consist of, or may comprise, an electrometer, a resistor, a potentiometer, or a bridge circuit. Alternatively or in addition, the electrical sensor may be a wattmeter that may respond to active electrical power. Alternatively or in addition, the electrical sensor may be an AC power wattmeter that may be based on induction, or may be based on multiplying measured voltage and measured current, and may be connected to measure the AC power source supplied power or the AC load consumed power. Alternatively or in addition, the electrical sensor may be an electricity meter that responds to electrical energy, and may be connected to measure the AC power source supplied electrical energy or the AC load consumed electrical energy.

Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current.

Any sensor herein may be an analog sensor having an analog signal output such as analog voltage or current, or may have continuously variable impedance. Alternatively on in addition, a sensor may have a digital signal output. Any sensor herein may serve as a detector, notifying only the presence of a phenomenon, such as by a switch, and may use a fixed or settable threshold level. Any sensor herein may measure time-dependent or space-dependent parameters of a phenomenon. Any sensor herein may measure time-dependencies or a phenomenon such as the rate of change, time-integrated or time-average, duty-cycle, frequency or time period between events. Any sensor herein may be a passive sensor, or an active sensor requiring an external source of excitation. Any sensor herein may be semiconductor-based, and may be based on MEMS technology.

Any sensor herein may measure the amount of a property or of a physical quantity or the magnitude relating to a physical phenomenon, body or substance. Alternatively or in addition, a sensor may be used to measure the time derivative thereof, such as the rate of change of the amount, the quantity or the magnitude. In the case of space related quantity or magnitude, a sensor may measure the linear density, surface density, or volume density, relating to the amount of property per volume. Alternatively or in addition, a sensor may measure the flux (or flow) of a property through a cross-section or surface boundary, the flux density, or the current. In the case of a scalar field, a sensor may measure the quantity gradient. A sensor may measure the amount of property per unit mass or per mole of substance. A single sensor may be used to measure two or more phenomena.

Any sensor herein may be thermoelectric sensor, for measuring, sensing or detecting the temperature (or the temperature gradient) of an object, which may be solid, liquid or gas. Such sensor may be a thermistor (either PTC or NTC), a thermocouple, a quartz thermometer, or an RTD. The sensor may be based on a Geiger counter for detecting and measuring radioactivity or any other nuclear radiation. Light, photons, or other optical phenomena may be measured or detected by a photosensor or photodetector, used for measuring the intensity of visible or invisible light (such as infrared, ultraviolet, X-ray or gamma rays). A photosensor may be based on the photoelectric or the photovoltaic effect, such as a photodiode, a phototransistor, solar cell or a photomultiplier tube. A photosensor may be a photoresistor based on photoconductivity, or a CCD where a charge is affected by the light.

Any sensor herein may be a physiological sensor for measuring, sensing or detecting parameters of a live body, such as animal or human body. Such a sensor may involve measuring of body electrical signals such as an EEG or ECG sensor, a gas saturation sensor such as oxygen saturation sensor, mechanical or physical parameter sensors such as a blood pressure meter. A sensor (or sensors) may be external to the sensed body, implanted inside the body, or may be wearable. The sensor may be an electracoustic sensor for measuring, sensing or detecting sound, such as a microphone. Typically, microphones are based on converting audible or inaudible (or both) incident sound to an electrical signal by measuring the vibration of a diaphragm or a ribbon. The microphone may be a condenser microphone, an electret microphone, a dynamic microphone, a ribbon microphone, a carbon microphone, or a piezoelectric microphone.

Any sensor herein may be an image sensor for providing digital camera functionality, allowing an image (either as still images or as a video) to be captured, stored, manipulated and displayed. The image capturing hardware integrated with the sensor unit may contain a photographic lens (through a lens opening) focusing the required image onto a photosensitive image sensor array disposed approximately at an image focal point plane of the optical lens, for capturing the image and producing electronic image information representing the image. The image sensor may be based on Charge-Coupled Devices (CCD) or Complementary Metal-Oxide-Semiconductor (CMOS). The image may be converted into a digital format by an image sensor AFE (Analog Front End) and an image processor, commonly including an analog to digital (A/D) converter coupled to the image sensor for generating a digital data representation of the image. The unit may contain a video compressor, coupled between the analog to digital (A/D) converter and the transmitter for compressing the digital data video before transmission to the communication medium. The compressor may be used for lossy or non-lossy compression of the image information, for reducing the memory size and reducing the data rate required for the transmission over the communication medium. The compression may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

The digital data video signal carrying a digital data video according to a digital video format, and a transmitter coupled between the port and the image processor for transmitting the digital data video signal to the communication medium. The digital video format may be based on one out of: TIFF (Tagged Image File Format), RAW format, AVI (Audio Video Interleaved), DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards.

Any sensor herein may be an electrical sensor used to measure electrical quantities or electrical properties. The electrical sensor may be conductively connected to the measured element. Alternatively or in addition, the electrical sensor may use non-conductive or non-contact coupling to the measured element, such as measuring a phenomenon associated with the measured quantity or property. The electric sensor may be a current sensor or an ampmeter (a.k.a. ampermeter) for measuring DC or AC (or any other waveform) electric current passing through a conductor or wire. The current sensor may be connected such that part or entire of the measured electric current may be passing through the ampermeter, such as a galvanometer or a hot-wire ampermeter. An ampermeter may be a current clamp or current probe, and may use the 'Hall effect' or a current transformer concept for non-contact or non-conductive current measurement. The electrical sensor may be a voltmeter for measuring the DC or AC (or any other waveform) voltage, or any potential difference between two points. The voltmeter may be based on the current passing a resistor using the Ohm's law, may be based on a potentiometer, or may be based on a bridge circuit.

Any sensor herein may be a Time-Domain Reflectometer (TDR) used to characterize and locate faults in transmission-lines such as conductive or metallic lines, based on checking the reflection of a transmitted short rise time pulse. Similarly, an optical TDR may be used to test optical fiber cables.

Any sensor herein may be a strain gauge, used to measure the strain, or any other deformation, of an object. The sensor may be based on deforming a metallic foil, semiconductor strain gauge (such as piezoresistors), measuring the strain along an optical fiber, capacitive strain gauge, and vibrating or resonating of a tensioned wire. Any sensor herein may be a tactile sensor, being sensitive to force or pressure, or being sensitive to a touch by an object, typically a human touch. A tactile sensor may be based on a conductive rubber, a lead zirconate titanate (PZT) material, a polyvinylidene fluoride (PVDF) material, a metallic capacitive element, or any combination thereof. A tactile sensor may be a tactile switch, which may be based on the human body conductance, using measurement of conductance or capacitance.

Any sensor herein may be a piezoelectric sensor, where the piezoelectric effect is used to measure pressure, acceleration, strain or force, and may use transverse, longitudinal, or shear effect mode. A thin membrane may be used to transfer and measure pressure, while mass may be used for acceleration measurement. A piezoelectric sensor element material may be a piezoelectric-ceramics (such as PZT ceramic) or a single crystal material. A single crystal material may be gallium phosphate, quartz, tourmaline, or Lead Magnesium Niobate-Lead Titanate (PMN-PT).

Any sensor herein may be a motion sensor, and may include one or more accelerometers, which measures the absolute acceleration or the acceleration relative to freefall. The accelerometer may be piezoelectric, piezoresistive, capacitive, MEMS or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

Any sensor herein may be a force sensor, a load cell, or a force gauge (a.k.a. force gage), used to measure a force magnitude and/or direction, and may be based on a spring extension, a strain gauge deformation, a piezoelectric effect, or a vibrating wire. Any sensor herein may be a driving or passive dynamometer, used to measure torque or any moment of force.

Any sensor herein may be a pressure sensor (a.k.a. pressure transducer or pressure transmitter/sender) for measuring a pressure of gases or liquids, and for indirectly measuring other parameters such as fluid/gas flow, speed, water-level, and altitude. A pressure sensor may be a pressure switch. A pressure sensor may be an absolute pressure sensor, a gauge pressure sensor, a vacuum pressure sensor, a differential pressure sensor, or a sealed pressure sensor. The changes in pressure relative to altitude may be used for an altimeter, and the Venturi effect may be used to measure flow by a pressure sensor. Similarly, the depth of a submerged body or the fluid level on contents in a tank may be measured by a pressure sensor.

A pressure sensor may be of of a force collector type, where a force collector (such a diaphragm, piston, bourdon tube, or bellows) is used to measure strain (or deflection) due to applied force (pressure) over an area. Such sensor may be a based on the piezoelectric effect (a piezoresistive strain gauge), may be of a capacitive or of an electromagnetic type. A pressure sensor may be based on a potentiometer, or may be based on using the changes in resonant frequency or the thermal conductivity of a gas, or may use the changes in the flow of charged gas particles (ions).

Any sensor herein may be a position sensor for measuring linear or angular position (or motion). A position sensor may be an absolute position sensor, or may be a displacement (relative or incremental) sensor, measuring a relative position, and may be an electromechanical sensor. A position sensor may be mechanically attached to the measured object, or alternatively may use a non-contact measurement.

A position sensor may be an angular position sensor, for measuring involving an angular position (or the rotation or motion) of a shaft, an axle, or a disk. Absolute angular position sensor output indicates the current position (angle) of the shaft, while incremental or displacement sensor provides information about the change, the angular speed or the motion of the shaft. An angular position sensor may be of optical type, using reflective or interruption schemes, or may be of magnetic type, such as based on variable-reluctance (VR), Eddy-current killed oscillator (ECKO), Wiegand sensing, or Hall-effect sensing, or may be based on a rotary potentiometer. An angular position sensor may be transformer based such as a RVDT, a resolver or a synchro. An angular position sensor may be based on an absolute or incremental rotary encoder, and may be a mechanical or optical rotary encoder, using binary or gray encoding schemes.

Any sensor herein may be an angular rate sensor, used to measure the angular rate, or the rotation speed, of a shaft, an axle or a disc, and may be electromechanical (such as centrifugal switch), MEMS based, Laser based (such as Ring Laser Gyroscope—RLG), or a gyroscope (such as fiber-optic gyro) based. Some gyroscopes use the measurement of the Coriolis acceleration to determine the angular rate. An angular rate sensor may be a tachometer, which may be based on measuring the centrifugal force, or based on optical, electric, or magnetic sensing a slotted disk.

A position sensor may be a linear position sensor, for measuring a linear displacement or position typically in a straight line, and may use a transformer principle such as such as LVDT, or may be based on a resistive element such as linear potentiometer. A linear position sensor may be an incremental or absolute linear encoder, and may employ optical, magnetic, capacitive, inductive, or eddy-current principles.

Any sensor herein may be a mechanical or electrical motion detector (or an occupancy sensor), for discrete (on/off) or magnitude-based motion detection. A motion detector may be based on sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), or vibration (triboelectric, seismic, and inertia-switch sensors). Acoustic sensors may use electric effect, inductive coupling, capacitive coupling, triboelectric effect, piezoelectric effect, fiber optic transmission, or radar intrusion sensing. An occupancy sensor is typically a motion detector that may be integrated with hardware or software-based timing device.

A motion sensor may be a mechanically-actuated switch or trigger, or may use passive or active electronic sensors, such as passive infrared sensors, ultrasonic sensors, microwave sensor or tomographic detector. Alternatively or in addition, motion can be electronically identified using infrared (PIR) or laser optical detection or acoustical detection, or may use a combination of the technologies disclosed herein.

A sensor may be a humidity sensor, such as a hygrometer or a humidistat, and may respond to an absolute, relative, or specific humidity. The measurement may be based on optically detecting condensation, or may be based on changing the capacitance, resistance, or thermal conductivity of materials subjected to the measured humidity.

Any sensor herein may be a clinometer for measuring angle (such as pitch or roll) of an object, typically with respect to a plane such as the earth ground plane. A clinometer may be based on an accelerometer, a pendulum, or on a gas bubble in liquid, or may be a tilt switch such as a mercury tilt switch for detecting inclination or declination with respect to a determined tilt angle.

Any sensor herein may be a gas or liquid flow sensor, for measuring the volumetric or mass flow rate via a defined area or a surface. A liquid flow sensor typically involves measuring the flow in a pipe or in an open conduit. A flow measurement may be based on a mechanical flow meter, such as a turbine flow meter, a Woltmann meter, a single jet meter, or a paddle wheel meter. Pressure-based meters may be based on measuring a pressure or a pressure differential based on Bernoulli's principle, such as a Venturi meter. The sensor may be an optical flow meter or be based on the Doppler-effect.

A flow sensor may be an air flow sensor, for measuring the air or gas flow, such as through a surface (e.g., through a tube) or a volume, by actually measuring the air volume passing, or by measuring the actual speed or air flow. In some cases, a pressure, typically differential pressure, may be measured as an indicator for the air flow measurements. An anemometer is an air flow sensor primarily for measuring wind speed, and may be cup anemometer, a windmill anemometer, hot-wire anemometer such as CCA (Constant-Current Anemometer), CVA (Constant-Voltage Anemometer) and CTA (Constant-Temperature Anemometer). Sonic anemometers use ultrasonic sound waves to measure wind velocity. Air flow may be measured by a pressure anemometer that may be a plate or tube class.

Any sensor herein may be a gyroscope, for measuring orientation in space, such as the conventional mechanical type, a MEMS gyroscope, a piezoelectric gyroscope, a FOG, or a VSG type. A sensor may be a nanosensor, a solid-state, or an ultrasonic based sensor. Any sensor herein may be an eddy-current sensor, where the measurement may be based on producing and/or measuring eddy-currents. Sensor may be a proximity sensor, such as metal detector. Any sensor herein may be a bulk or surface acoustic sensor, or may be an atmospheric sensor.

In one example, multiple sensors may be used arranged as a sensor array (such as linear sensor array), for improving the sensitivity, accuracy, resolution, and other parameters of the sensed phenomenon. The sensor array may be directional, and better measure the parameters of the impinging signal to the array, such as the number, magnitudes, frequencies, Direction-Of-Arrival (DOA), distances, and speeds of the signals. The processing of the entire sensor array outputs, such as to obtain a single measurement or a single parameter, may be performed by a dedicated processor, which may be part of the sensor array assembly, may be performed in the processor of the field unit, may be performed by the processor in the router, may be performed as part of the controller functionality (e.g., in the control server), or any combination thereof. The same component may serve both as a sensor and as actuator, such as during different times, and may be associated with the same or different phenomenon. A sensor operation may be based on an external or integral mechanism for generating a stimulus or an excitation to generate influence or create a phenomenon. The mechanism may be controlled as an actuator or as part of the sensor.

Any sensor herein may provide a digital output, and the sensor output may include an electrical switch, and the electrical switch state may be responsive to the phenomenon magnitude measured versus a threshold, which may be set by the actuator. Any sensor herein may provide an analog output, and the first device may comprise an analog to digital converter coupled to the analog output, for converting the sensor output to a digital data.

Any sensor herein may be a photoelectric sensor that responds to a visible or an invisible light or both, such as infrared, ultraviolet, X-rays, or gamma rays. The photoelectric sensor may be based on the photoelectric or photovoltaic effect, and consists of, or comprises, a semiconductor component such as a photodiode, a phototransistor, or a solar cell. The photoelectric sensor may be based on Charge-Coupled Device (CCD) or a Complementary Metal-Oxide Semiconductor (CMOS) element. The sensor may be a photosensitive image sensor array comprising multiple photoelectric sensors, and may be operative for capturing an image and producing an electronic image information representing the image, and may comprise one or more optical lens for focusing the received light and mechanically oriented to guide the image, and the image sensor may be disposed approximately at an image focal point plane of the one or more optical lens for properly capturing the image. An image processor may be coupled to the image sensor for providing a digital data video signal according to a digital video format, the digital video signal carrying digital data video based on the captured images, and the digital video format may be according to, or based on, one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format) and DPOF (Digital Print Order Format) standards. A video compressor may be coupled to the image sensor for lossy or non-lossy compressing of the digital data video, and may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

Any sensor herein may be an electrochemical sensor and may respond to an object chemical structure, properties, composition, or reactions. The electrochemical sensor may be a pH meter or may be a gas sensor responding to the presence of radon, hydrogen, oxygen, or Carbon-Monoxide (CO). The electrochemical sensor may be a smoke, a flame, or a fire detector, and may be based on optical detection or on ionization for responding to combustible, flammable, or toxic gas.

Any sensor herein may be a physiological sensor and may respond to parameters associated with a live body, and may be external to the sensed body, implanted inside the sensed body, attached to the sensed body, or wearable on the sensed body. The physiological sensor may be responding to body electrical signals such as an EEG Electroencephalography (EEG) or an Electrocardiography (ECG) sensor, or may be responding to oxygen saturation, gas saturation, or blood pressure.

The sensor may be an electroacoustic sensor and may respond to a sound, such as inaudible or audible audio. The electroacoustic sensor may be an omnidirectional, unidirectional, or bidirectional microphone, may be based on the sensing the incident sound-based motion of a diaphragm or a ribbon, and may consist of, or comprise, a condenser, an electret, a dynamic, a ribbon, a carbon, or a piezoelectric microphone.

Any sensor herein may be an absolute, a relative displacement, or an incremental position sensor, and may respond to a linear or angular position, or motion, of a sensed element. The position sensor may be an optical type or a magnetic type angular position sensor, and may respond to an angular position or the rotation of a shaft, an axle, or a disk. The angular position sensor may be based on a Variable-Reluctance (VR), an Eddy-Current Killed Oscillator (ECKO), a Wiegand sensing, or a Hall-effect sensing, and may be transformer based such as an RVDT, a resolver or a synchro. The angular position sensor may be an electromechanical type such as an absolute or an incremental, mechanical or optical, rotary encoder. The angular position sensor may be an angular rate sensor and may respond to the angular rate, or the rotation speed, of a shaft, an axle, or a disc, and may consist of, or comprise, a gyroscope, a tachometer, a centrifugal switch, a Ring Laser Gyroscope (RLG), or a fiber-optic gyro. The position sensor may be a linear position sensor and may respond to a linear displacement or position along a line, and may consist of, or comprise, a transformer, an LVDT, a linear potentiometer, or an incremental or absolute linear encoder.

Any sensor herein may be a strain gauge and may respond to the deformation of an object, and may be based on a metallic foil, a semiconductor, an optical fiber, vibrating or resonating of a tensioned wire, or a capacitance meter. The sensor may be a hygrometer and may respond to an absolute, relative, or specific humidity, and may be based on optically detecting condensation, or based on changing the capacitance, resistance, or thermal conductivity of materials subjected to the measured humidity. The sensor may be a clinometer and may respond to inclination or declination, and may be based on an accelerometer, a pendulum, a gas bubble in liquid, or a tilt switch.

Any sensor herein may be a flow sensor and may measure the volumetric or mass flow rate via a defined area, volume or surface. The flow sensor may be a liquid flow sensor and may be measuring the liquid flow in a pipe or in an open conduit. The liquid flow sensor may be a mechanical flow meter and may consist of, or comprise, a turbine flow meter, a Woltmann meter, a single jet meter, or a paddle wheel meter. The liquid flow sensor may be a pressure flow meter based on measuring an absolute pressure or a pressure differential. The flow sensor may be a gas or an air flow sensor such as anemometer for measuring wind or air speed, and may measure the flow through a surface, a tube, or a volume, and may be based on measuring the air volume passing in a time period. The anemometer may consist of, or comprise, cup anemometer, a windmill anemometer, a pressure anemometer, a hot-wire anemometer, or a sonic anemometer.

Any sensor herein may be a gyroscope for measuring orientation in space, and may consist of, or comprise, a MEMS, a piezoelectric, a FOG, or a VSG gyroscope, and may be based on a conventional mechanical type, a nanosensor, a crystal, or a semiconductor.

Any sensor herein may be an image sensor for capturing an image or video, and the system may include an image processor for recognition of a pattern, and the control logic may be operative to respond to the recognized pattern such as appearance-based analysis of hand posture or gesture recognition. The system may comprise an additional image sensor, and the control logic may be operative to respond to the additional image sensor such as to cooperatively capture a 3-D image and for identifying the gesture recognition from the 3-D image, based on volumetric or skeletal models, or a combination thereof.

Any sensor herein be an image sensor for capturing still or video image, and the sensor or the system may comprise an image processor having an output for processing the captured image (still or video). The image processor (hardware or software based, or a hardware/software combination) may be encased entirely or in part in the first device, the router, the control server, or any combination thereof, and the control logic may respond to the image processor output. The image sensor may be a digital video sensor for capturing digital video content, and the image processor may be operative for enhancing the video content such as by image stabilization, unsharp masking, or super-resolution, or for Video Content Analysis (VCA) such as Video Motion Detection (VMD), video tracking, egomotion estimation, identification, behavior analysis, situation awareness, dynamic masking, motion detection, object detection, face recognition, automatic number plate recognition, tamper detection, video tracking, or pattern recognition. The image processor may be operative for detecting a location of an element, and may be operative for detecting and counting the number of elements in the captured image, such as a human body parts (such as human face or a human hand) in the captured image.

Any photosensor herein may convert light into an electrical phenomenon and may be semiconductor-based. Further, any photosensor herein may consist of, may comprise, may use, or may be based on, a photodiode, a phototransistor, a Complementary Metal-Oxide-Semiconductor (CMOS), or a Charge-Coupled Device (CCD). The photodiode may consist of, may comprise, may use, or may be based on, a PIN diode or an Avalanche PhotoDiode (APD). Any photosensor herein may convert sound into an electrical phenomenon, and may consist of, may comprise, may use, or may be based on, measuring the vibration of a diaphragm or a ribbon. Further, any photosensor may consist of, may comprise, may use, or may be based on, a condenser microphone, an electret microphone, a dynamic microphone, a ribbon microphone, a carbon microphone, or a piezoelectric microphone.

Any sensor herein may consist of, or comprise, an angular position sensor for measuring angular setting or a change of an angle, that may be configured for throttle-valve-angle measuring as part of an engine management on gasoline (SI) engines in the first vehicle. Any sensor herein may consist of, or comprise, a rotational-speed sensor for measuring rotational speeds, positions or angles in excess of 360°, that may be configured for measuring wheel-speed, engine speeds, engine positioning angle, steering-wheel angle, distance covered, or road curves/bends. Any sensor herein may consist of, or comprise, a spring-mass acceleration sensor for measuring changes in the first vehicle speed, and may be configured for measuring vehicular acceleration and deceleration, as part of the Anti-Breaking System (ABS) or the Traction Control System (TCS) of the first vehicle. Any sensor herein may consist of, or comprise, a bending beam acceleration sensor for registering or detecting shock and vibration, and may be configured for detecting impacts or measuring shocks and vibration, or for triggering airbags or belt tighteners. Any sensor herein may consist of, or comprise, a yaw sensor for measuring skidding movements, or for measuring yaw rate and lateral acceleration, of a vehicle, that may be configured for affecting a vehicle dynamics control (e.g., ESP—Electronic Stability Program). Any sensor herein may consist of, or comprise, a vibration sensor for measuring structure-borne vibrations at an engine, a machine, or a pivot bearing, of a vehicle, and may be configured for engine-knock detection as part of an anti-knock control in an engine management system.

Any sensor herein may consist of, or comprise, an absolute-pressure sensor for measuring ranges from 50% to 500% of the earth's atmospheric pressure, and may be configured for manifold vacuum measurement, charge-air-pressure measurement for charge-air pressure control, or altitude-dependent fuel injection for diesel engines. Any sensor herein may consist of, or comprise, a differential-pressure sensor for measuring differential gas pressure, and may be configured for pressure measurement in a fuel tank, or evaporative-emission control system, in a vehicle.

Any sensor herein may consist of, or comprise, a temperature sensor for measuring the temperature of gaseous material or a liquid, and may be configured for displaying of outside and inside temperature, controlling of air conditioner or inside temperature, controlling of radiator or thermostat, or measuring of lube-oil, coolant, or engine temperature. Any sensor herein may consist of, or comprise, a Lambda oxygen sensor for determining the residual oxygen content in the exhaust gas, and may be for controlling of A/F mixture for minimization of pollutant emissions on gasoline and gas engines. Any sensor herein may consist of, or comprise, an air-mass meter used for measuring the flow rate of gas, and may be configured for measuring of the mass of the air drawn in by the engine.

Any message herein, such as any message to or from the smartphone 65a, to or from the service server 23c, to or from the electric car 30a, or any combination thereof, may be sent or received using XMPP, SIMPLE, Apple Push Notification Service (APNs), or BIPS. For example, any message sent or received as part of the "Send Optimal Route" step 114a, the "Receive Optimal Route" step 114b, the "Send Query" step 115d, the "Receive Query" step 115e, the "Send Request" step 115h, the "Receive Request" step 115i, or any combination thereof, may sent or received using XMPP, SIMPLE, Apple Push Notification Service (APNs), or IMPS. Further, the Data Server #2 23b may be a communication related server, that may be operated by a messaging server provider, for supporting such messaging.

Further, any message herein may be a text-based message, such as by using SMS, or Twitter services, as well as social marketing service such as Facebook. Alternatively or addition, the message may include an audio or video message, and sent using MMS or Enhanced Messaging Service (EMS). Other services such as e-mail, Viber, or Whatsapp may be used.

Further, any message herein may be a notification or an alert, to a user. The notification to the user device may be text based, such as an electronic mail (e-mail), website content, fax, or a Short Message Service (SMS). Alternatively or in addition, the notification or alert to the user device may be voice-based, such as a voicemail, a voice message to a telephone device. Alternatively or in addition, the notification or the alert to the user device may activate a vibrator, causing vibrations that are felt by human body touching, or may be based on a Multimedia Message Service (MMS) or Instant Messaging (IM). The messaging, alerting, and notifications may be based on, include part of, or may be according to U.S. Patent Application No. 2009/0024759 to McKibben et al. entitled: "System and Method for Providing Alerting Services", U.S. Pat. No. 7,653,573 to Hayes, Jr. et al. entitled: "Customer Messaging Service", U.S. Pat. No. 6,694,316 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to Adams et al. entitled: "Monitoring and Notification System and Method", U.S. Patent Application No. 2008/0258913 to Busey entitled: "Electronic PersonalAlert System", or U.S. Pat. No. 7,557,689 to Seddigh et al. entitled: "Customer Messaging Service", which are all incorporated in their entirety for all purposes as if fully set forth herein.

Any apparatus, system, or device herein or any part thereof, may be mounted onto, may be attached to, may be part of, or may be integrated with, a rear or front view camera, chassis, lighting system, headlamp, door, car glass, windscreen, side or rear window, glass panel roof, hood, bumper, cowling, dashboard, fender, quarter panel, rocker, or a spoiler of a vehicle.

Any vehicle herein may further comprise an Advanced Driver Assistance Systems (ADAS) functionality, system, or scheme, and any apparatus, device, sensor, or actuator herein may be part of, may be integrated with, may be communicating with, or may be coupled to, the ADAS functionality, system, or scheme. The ADAS functionality, system, or scheme may consist of, may comprise, or may use, Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system, Pre-crash system, Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

Any vehicle herein may further employ an Advanced Driver Assistance System Interface Specification (ADASIS) functionality, system, or scheme, and any sensor or actuator herein may be part of, integrated with, communicates with, or coupled to, the ADASIS functionality, system, or scheme. Further, any message herein may comprise a map data relating to the location of a respective vehicle.

Any mobile device herein may combine video, audio and advanced communications capabilities, such as PAN and WLAN. A mobile phone (also known as a cellular phone, cell phone, smartphone, and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Any smartphone herein may consist of, comprise, or may be based on, Apple iPhone 6 or Samsung Galaxy S6. Any software or firmware herein, such as in a mobile device or a smartphone, may comprise an operating system that may be a mobile operating system. The mobile operating system may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

Any device, component, or apparatus herein, may be structured as, may be shaped or configured to serve as, or may be integrated with, a wearable device. For example, any apparatus or device herein may be wearable on an organ such as on the person head, and the organ may be eye, ear, face, cheek, nose, mouth, lip, forehead, or chin. Alternatively or in addition, any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releaseably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any vehicle herein may be identified using an identifier uniquely identifying the vehicle, which may comprise a Vehicle Identification Number (VIN) or a license plate number, or may comprise a code that identifies the vehicle make, model, color, model year, engine size, or vehicle type. Alternatively or in addition, the identifier of a vehicle may be a digital address such as a layer 3 address that may be a static or dynamic IP address, preferably using IPv4 or IPv6 type address. Alternatively or in addition, the digital address is a MAC layer address selected from the group consisting of MAC-48, EUI-48, and EUI-64 address type.

Any vehicle may estimate its geographical location. Such localization may be used with multiple RF signals transmitted by multiple sources, and the geographical location may be estimated by receiving the RF signals from the multiple sources via one or more antennas, and processing or comparing the received RF signals. The multiple sources may comprise geo-stationary or non-geo-stationary satellites, that may be Global Positioning System (GPS), and the RF signals may be received using a GPS antenna coupled to the GPS receiver 27 for receiving and analyzing the GPS signals. Alternatively or in addition, the multiple sources comprises satellites may be part of a Global Navigation Satellite System (GNSS), such as the GLONASS (GLObal NAvigation Satellite System), the Beidou-1, the Beidou-2, the Galileo, or the IRNSS/VAVIC.

Alternatively or in addition, the processing or comparing may comprise, or may be based on, performing TOA (Time-Of-Arrival) measurement, performing TDOA (Time Difference-Of-Arrival) measurement, performing an AoA (Angle-Of-Arrival) measurement, performing a Line-of-Sight (LoS) measurement, performing a Time-of-Flight (ToF) measurement, performing a Two-Way Ranging (TWR) measurement, performing a Symmetrical Double Sided—Two Way Ranging (SDS-TWR) measurement, performing a Near-Field Electromagnetic Ranging (NFER) measurement, or performing triangulation, trilateration, or MultiLATeration (MLAT).

Alternatively or in addition, the RF signals may be part of the communication over a wireless network in which the vehicle, apparatus, or device is communicating over. The wireless network may be a cellular telephone network, and the sources may be cellular towers or base-stations. Alternatively or in addition, the wireless network may be a WLAN, and the sources may be hotspots or Wireless Access Points (WAPs). Alternatively or in addition, the geographical location may be estimated using, or based on, geolocation, which may be is based on W3C Geolocation API. Any geographical location herein may consist of, or may comprise, a country, a region, a city, a street, a ZIP (or postal) code, latitude, or longitude.

Any apparatus (such as devices, systems, modules, sensor, actuator, or any other arrangement) described herein may consist of, be integrated with, be connected to, or be communicating with, an ECU, which may be an Electronic/engine Control Module (ECM) or Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed control unit (SCU), Telematic Control Unit (TCU), Transmission Control Unit (TCU), Brake Control Module (BCM; ABS or ESC), Battery management system, control unit, or control module.

Any ECU herein may comprise a software, such as an operating system or middleware that may use, may comprise, or may be according to, a part or whole of the OSEK/VDX, ISO 17356-1, ISO 17356-2, ISO 17356-3, ISO 17356-4, ISO 17356-5, or AUTOSAR standards, or any combination thereof.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (µC/OS).

Examples of web browsers include Microsoft Internet Explorer (available from Microsoft Corporation, headquartered in Redmond, Washington, U.S.A.), Google Chrome that is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A.), Opera Mini™ (developed by Opera Software ASA, headquartered in Oslo, Norway), and Android web browser.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

The device 65, or any other device (such as the device 65a) or apparatus herein, may be a client device that may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from Black-Berry Ltd., headquartered in Waterloo, Ontario, Canada). Alternatively or in addition, each of the devices that are not denoted herein as a server, may equally function as a server in the meaning of client/server architecture. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

The steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, usually for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled using the same software or hardware. The term "integration" herein is used to include as applicable, but not limited to, software integration, hardware integration, or any combination thereof.

Any networking protocol may be utilized for exchanging information between the network elements (e.g., clients or servers) within the network (such as the Internet). For example, it is contemplated that communications can be performed using TCP/IP. Generally, HTTP and HTTPS are utilized on top of TCP/IP as the message transport envelope. The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies. As used herein, the term "request" includes, but is not limited to, a message describing an operation to be carried out in the context of a specified resource, such as HTTP GET, POST, PUT, and HEAD commands, and the term "response" includes, but is not limited to, a message containing the result of an executed request, such as an HTML document or a server error message. A request may be an explicit web request that is initiated manually by the user, or may be an implicit request that is initiated by a web client and is transparent to the user, as an ancillary event corresponding to an explicit web request.

Application software is typically a set of one, or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source software. Most applications are designed to help people perform an activity.

Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing devices that are linked through a communications network.

In a distributed computing environment, program modules may be located in both local and remote memory storage devices. Any single step, group of steps, or a flow chart herein may be realized as a computer program in a centralized fashion, in one computer system or in a distributed fashion where different elements are spread across several interconnected computer systems. Any kind of computer system, or other apparatus adapted for carrying out the methods described herein, is suited to perform the functions described herein. A typical centralized implementation could include a general-purpose computer system with a computer program that, when being loaded and executed, will control the computer system, and carry out the methods described herein.

Computer program or application in the present context means any expression, in any language, code or notation, of a set of instructions intended to cause a system having an information processing capability to perform a particular function either directly or after either, or both of the following a) conversion to another language, code or notation; b) reproduction in a different material form. Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems. Some portions of the above description present the techniques described herein in terms of algorithms and symbolic representations of operations on information. These algorithmic descriptions and representations are used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

The corresponding structures, materials, acts, and equivalents of all means plus function elements in the claims below are intended to include any structure, or material, for performing the function in combination with other specifically claimed elements. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

Throughout the description and claims of this specification, the word "couple" and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example, for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a device interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

As used herein, the term "portable" herein refers to physically configured to be easily carried or moved by a person of ordinary strength using one or two hands, without the need for any special carriers.

Any mechanical attachment of joining two parts herein refers to attaching the parts with sufficient rigidity to prevent unwanted movement between the attached parts. Any type of fastening means may be used for the attachments, including chemical material such as an adhesive or a glue, or mechanical means such as screw or bolt. An adhesive (used interchangeably with glue, cement, mucilage, or paste) is any substance applied to one surface, or both surfaces, of two separate items that binds them together and resists their separation. Adhesive materials may be reactive and non-reactive adhesives, which refers to whether the adhesive chemically reacts in order to harden, and their raw stock may be of natural or synthetic origin.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor. Any of the steps, methods, or flow-charts herein may be executed by a processor, such as the processor 12 in the computer system 11, or a processor in the Telematics ECU 22b (or any other ECU) in the vehicle 21.

A non-limiting example of a processor may be 80186 or 80188 available from Intel Corporation located at Santa-Clara, California, USA. The 80186 and its detailed memory connections are described in the manual "80186/80188 High-Integration 16-Bit Microprocessors" by Intel Corporation, which is incorporated in its entirety for all purposes as if fully set forth herein. Other non-limiting example of a processor may be MC68360 available from Motorola Inc. located at Schaumburg, Illinois, USA. The MC68360 and its detailed memory connections are described in the manual "MC68360 Quad Integrated Communications Controller—User's Manual" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Texas, U.S.A.), described in a data sheet published 2015 by Texas Instruments Incorporated [DS-TM4C123GH6PM-15842.2741, SPMS376E, Revision 15842.2741 June 2014], entitled: "Tiva™ TM4C23GH6PM Microcontroller-Data Sheet", which is incorporated in its entirety for all purposes as if fully set forth herein, and is part of Texas Instrument's Tiva™ C Series microcontrollers family that provides designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools that minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a Multi-Chip Module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any non-transitory computer readable medium or any memory, that participates in providing instructions to a processor (such as processor 12) for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, and EPROM, a FLASH-EPROM, any other memory chip or cartridge, a carrier wave as described hereinafter, or any other medium from which a computer can read. Any computer-readable storage medium herein, such as the main memory 15*a*, the storage device 15*c*, the ROM 15*b*, or the storage 63, may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Any process descriptions or blocks in any logic flowchart herein should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Each of the methods or steps herein, may consist of, include, be part of, be integrated with, or be based on, a part of, or the whole of, the steps, functionalities, or structure (such as software) described in the publications that are incorporated in their entirety herein. Further, each of the components, devices, or elements herein may consist of, integrated with, include, be part of, or be based on, a part of, or the whole of, the components, systems, devices or elements described in the publications that are incorporated in their entirety herein.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™—2008 entitled: "*Standard for Information Technology—Portable Operating System Interface (POSIX(R)) Description*", and The Open Group Technical Standard Base Specifications, Issue 7, IEEE STD. 1003.1™, 2013 Edition.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include a Digital Still Camera (DSC), a Digital video Camera (DVC or digital camcorder), a Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device that can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a Personal Digital Assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices that are part of the above networks, one way and/or two-way radio communication systems, cellular radio-telephone communication systems, a cellular telephone, a wireless telephone, a Personal Communication Systems (PCS) device, a PDA device that incorporates a wireless communication device, a mobile or portable GNSS such as the Global Positioning System (GPS) device, a device that incorporates a GNSS or GPS receiver or transceiver or chip, a device that incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Any system or apparatus herein may further be operative for storing, operating, or using, an operating system. Any system herein may comprise a Virtual Machine (VM) for virtualization, and the operating system may be executed as a guest operating system. Any system herein may further comprise a host computer that implements the VM, and the host computer may be operative for executing a hypervisor or a Virtual Machine Monitor (VMM), and the guest operating system may use or may interface virtual hardware. Any virtualization herein, such as any operating system virtualization, may include, may be based on, or may use, full virtualization, para-virtualization, or hardware assisted virtualization.

Any apparatus herein, such as the devices 65, 65*a*, 95, 95*a*, or 95*b*, or such as the server 23*a*, or any combination thereof, may comprise any element or functionality, described in the "BACKGROUND" section above, including in any of the documents incorporated therein. Further, any method or step herein may comprise any element or functionality, or may execute any step, method, or action, described in the "BACKGROUND" section above, including in any of the documents incorporated therein.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, Assembly language, markup languages (e.g., HTML, SGML, XML, VoXML), and the like, as well as object-oriented environments, such as the Common Object Request Broker Architecture (CORBA), Java™ (including J2ME, Java Beans, etc.) and the like, as well as in firmware or other implementations. Generally, program modules include routines, subroutines, procedures, definitional statements and macros, programs, objects, components, data structures, etc., that perform particular tasks or implement particular abstract data types. A compiler may be used to create an executable code, or a code may be written using interpreted languages such as PERL, Python, or Ruby.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

As used in this application, the term "about" or "approximately" refers to a range of values within plus or minus 10% of the specified number. As used in this application, the term "substantially" means that the actual value is within about 10% of the actual desired value, particularly within about 5% of the actual desired value and especially within about 1% of the actual desired value of any variable, element or limit set forth herein.

Any steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

APPENDIX

An example of a code that implements an algorithm for finding the most efficient charging stations along a route (Route Charging Optimization Algorithm) and is constructed of multiple phases, which each one takes the results of the previous one as input until the last phase returns a full route, is provided below, and includes the steps of Route navigation, Battery prediction, Naive decision—First Cluster, and Fine tune—Second Cluster.

The invention claimed is:

1. A method for planning an optimal route in an area for a trip that starts at a start time, by an electric car that comprises a rechargeable battery, from an origin point to a final point via geographical locations of target places, using time- or trip-sensitive data and non-time- or non-trip-sensitive data, the method comprising:

obtaining locations of origin and final points;

obtaining a State of Charge (SoC) of the rechargeable battery at the origin point;

obtaining a roads data that comprises a digital map of the area;

obtaining charging stations data that comprises a first list of geographical locations of charging stations in the area;

obtaining a weather data relating to the area and the start time that comprise a forecasted, estimated, or measured, temperature, a wind, a humidity, a precipitation, or any combination thereof;

obtaining a car data relating to the specific electric car that comprises an estimated or nominal battery discharging rate in reference or ideal conditions;

obtaining drag data that comprises a drag coefficient of the electric car;

obtaining number of passengers;

obtaining driver data;

obtaining the start time;

obtaining target places data that comprises a second list of geographical locations of the target places;

generating, using a Machine Learning (ML) scheme that comprises, or is based on, unsupervised clustering, the optimal route that minimizes a cost function for travelling from the origin point to the final point while visiting at least one charging station location and all target places locations, based on the roads data, the charging stations data, the weather data, the car data, the drag data, the driver data, the number of passengers; the State of Charge (SoC) of the rechargeable battery at the origin point, and the start time; and notifying a user of the generated optimal route or guiding the electric car to navigate according to the generated optimal route, wherein the unsupervised clustering uses, or is based on, K-Means clustering or algorithm.

2. The method according to claim 1, wherein the origin point and the final point are the same point.

3. The method according to claim 1, wherein the area comprises a country, a state, a region, a county, a city, a neighborhood, or a Zone Improvement Plan (ZIP)/postal code area.

4. The method according to claim 1, wherein at least one of the geographical locations in the first or second list is represented as Latitude and Longitude values, according to World Geodetic System (WGS) 84 standard, or according to Universal Transverse Mercator (UTM) zones.

5. The method according to claim 1, wherein at least one of the geographical locations in the first or second list is represented as a building or lot number, a street name, a city name, a country or region name, a state or country name, a Zone Improvement Plan (ZIP)/postal code, or any combination thereof.

6. A non-transitory computer readable medium having computer executable instructions stored thereon, wherein the instructions include the steps according to claim 1.

7. The method according to claim 1, wherein the cost function comprises a total optimal route travel distance, a total optimal route travel time, a total associated discharging of the battery in the electric car, a total cost associated with charging the battery in the one or more charging stations, or any combination thereof.

8. The method according to claim 1, wherein the generating further comprises, or is based on, using a Bayesian optimization or network methodology.

9. The method according to claim 8, wherein the Bayesian optimization or network methodology comprises a first, second, and third vertices graph, wherein a first vertex is associated with environmental factors, a second vertex is associated with decision nodes, and a third vertex is associated with the cost function.

10. The method according to claim 1, wherein the generating further comprises, or is based on, using a casual inference methodology or process.

11. The method according to claim 10, wherein the casual inference methodology or process uses, or is based on, Bayesian inference, Frequentist statistical inference, or any combination thereof.

12. The method according to claim 10, wherein the casual inference methodology or process uses, or is based on, a causal pie model (component-cause), a Pearl's structural causal model (causal diagram+do-calculus), a structural equation modeling, a Rubin causal model (potential-outcome), or any combination thereof.

13. The method according to claim 1, wherein the generating further comprises, or is based on, solving a Travelling Salesman Problem (TSP).

14. The method according to claim 13, wherein the TSP is a symmetric or asymmetric TSP.

15. The method according to claim 13, wherein the TSP solving comprises using an exact or a heuristic algorithm.

16. The method according to claim 13, wherein the TSP problem definition replaces cities with charging-stations locations and target locations.

17. The method according to claim 1, wherein the generating further comprises, or is based on, solving an integer Linear Programming (LP) problem.

18. The method according to claim 17, wherein the LP solving comprises, or is based on, the simplex algorithm.

19. The method according to claim 17, wherein the LP solving comprises, or is based on, using heuristic or combinatorial search method.

20. The method according to claim 1, wherein the generating is based on, or satisfies, a restriction of a defined low-level threshold of the battery in the electric car, so that the battery charge along the optimal route is above the defined low-level threshold.

21. The method according to claim 20, wherein the low-level threshold is at least 1%, 2%, 3%, 5%, 7%, 10%, 12%, 15%, 20%, 25%, or 30% of a maximum charge capacity of the battery.

22. The method according to claim 21, wherein the low-level threshold is less than 2%, 3%, 5%, 7%, 10%, 12%, 15%, 20%, 25%, 30%, or 35% of the maximum charge capacity of the battery.

23. The method according to claim 22, wherein the low-level threshold is at least 1, 2, 3, 5, 7, 10, 12, 15, or 20 KwH.

24. The method according to claim 18, wherein the low-level threshold is less than 2, 3, 5, 7, 10, 12, 15, 20, or 30 KwH.

25. The method according to claim 20, wherein the low-level threshold corresponds to an estimated travel of at least 1, 2, 3, 5, 7, 10, 12, 15, or 20 miles or Kilometers.

26. The method according to claim 25, wherein the low-level threshold corresponds to an estimated travel of less than 2, 3, 5, 7, 10, 12, 15, 20, or 30 miles or Kilometers.

27. The method according to claim 1, further comprising executing, by the electric car, the generated optimal route, by travelling along the generated optimal route or a part thereof.

28. The method according to claim 27, further comprising obtaining or monitoring a battery data that comprises the State of Charge (SoC), the discharging rate, or a combination thereof, of the rechargeable battery, as part of, or in response to, the executing.

29. The method according to claim 28, further comprising updating or adjusting the unsupervised clustering as part of the Machine Learning (ML) scheme.

30. The method according to claim 1, wherein the car data further comprises a car weight.

31. The method according to claim 1, wherein the car weight comprises a weight of a payload.

32. The method according to claim 1, wherein the car data comprises an estimated or measured pressure of at least one of the tires in the electric car.

33. The method according to claim 1, wherein the driver data comprises a style, a habit, an experience, an aggressiveness, a skill, or any combination thereof, of the driver.

34. The method according to claim 1, wherein the driver data comprises an age, a gender, a number of years as a driver, of any combination thereof, or wherein the driver data is based on, or uses, data of former trips of the driver.

\* \* \* \* \*